United States Patent
Limberg

(10) Patent No.: US 8,416,888 B2
(45) Date of Patent: Apr. 9, 2013

(54) CODING AND DECODING OF 8-VSB DIGITAL TELEVISION SIGNALS FOR MOBILE/HANDHELD RECEIVERS

(76) Inventor: Allen LeRoy Limberg, Port Charlotte, FL (US)

( * ) Notice: Subject to any disclaimer, the term of this patent is extended or adjusted under 35 U.S.C. 154(b) by 269 days.

(21) Appl. No.: 12/928,187

(22) Filed: Dec. 6, 2010

(65) Prior Publication Data

US 2011/0135039 A1     Jun. 9, 2011

Related U.S. Application Data

(60) Provisional application No. 61/283,673, filed on Dec. 7, 2009, provisional application No. 61/335,246, filed on Jan. 4, 2010, provisional application No. 61/337,680, filed on Feb. 11, 2010, provisional application No. 61/340,957, filed on Mar. 25, 2010, provisional application No. 61/397,178, filed on Jun. 8, 2010.

(51) Int. Cl.
*H04L 27/06*      (2006.01)

(52) U.S. Cl.
USPC .......................................................... 375/340

(58) Field of Classification Search .................. 375/262, 375/265, 316, 340–341; 714/792, 794–796
See application file for complete search history.

(56) References Cited

U.S. PATENT DOCUMENTS

| | | | |
|---|---|---|---|
| 6,608,870 B1 * | 8/2003 | Fimoff | 375/270 |
| 2002/0172277 A1 * | 11/2002 | Choi et al. | 375/240.01 |
| 2003/0226097 A1 * | 12/2003 | Cameron | 714/796 |
| 2007/0071110 A1 * | 3/2007 | Choi et al. | 375/240.27 |
| 2009/0122922 A1 * | 5/2009 | Chang et al. | 375/341 |
| 2009/0135936 A1 * | 5/2009 | Chang et al. | 375/265 |

* cited by examiner

*Primary Examiner* — Khanh C Tran

(57) ABSTRACT

Modified systems for broadcasting M/H data employ two-dimensional coding of RS Frames that combines transverse RS coding with subsequent byte-error-locating block coding that generates codewords of a prescribed standard length. This prescribed standard length is chosen such that an integral number of codewords of the byte-error-locating block code fits exactly, or substantially so, into the portion of each RS Frame that is encoded in CCC for inclusion within an M/H Group. The byte-error-locating block coding is CRC coding by way of one specific example or is Reed-Solomon (LRS) forward-error-correction (FEC) coding by way of another specific example. M/H receivers are described in which codewords of this byte-error-locating block coding are decoded and used to influence the soft decisions concerning data bits. Then, these soft decisions are processed and used for locating byte errors for the transverse Reed-Solomon (TRS) codes on an individual basis.

21 Claims, 46 Drawing Sheets

CR = CODE RATE OF OUTER CONVOLUTIONAL CODE
NoG = NO. OF GROUPS PER M/H SUB-FRAME IN M/H PARADE
P = NO. OF CHECKSUM OR PARITY BYTES IN 420 BYTES

E.G., K CAN BE 190

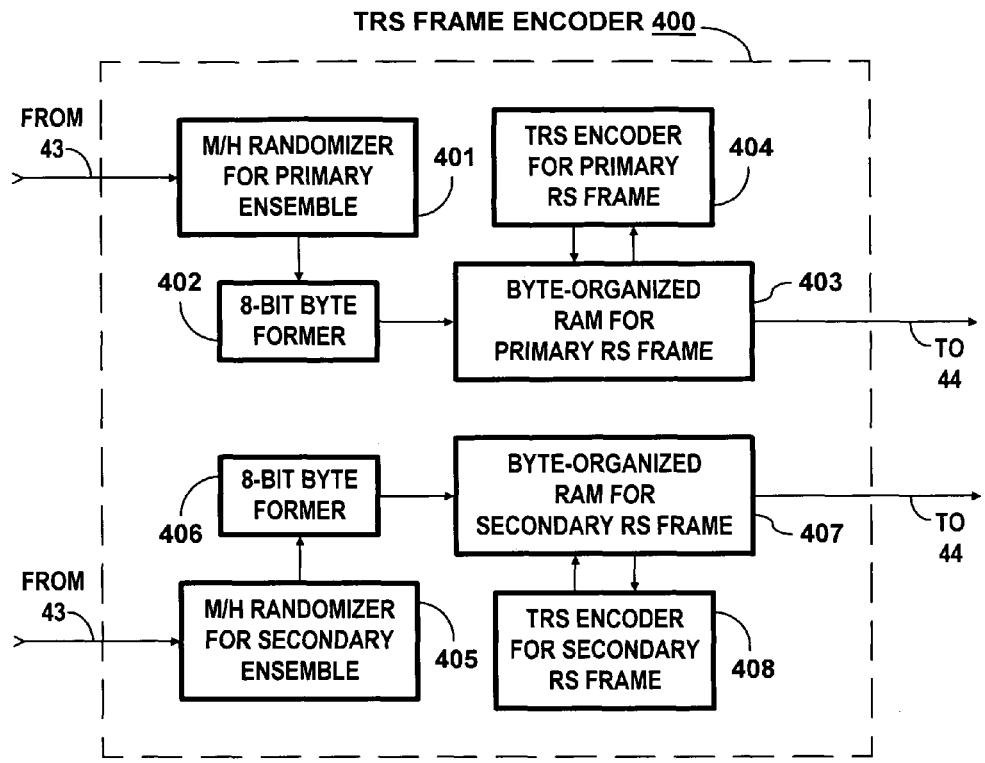
Fig. 10
Fig. 11   Bit Order for SCCC M/H Transmissions
D'S ARE DATA BITS.        P'S ARE PARITY BITS.
Fig. 12   Bit Order for PCCC M/H Transmissions

| 1ST TRANSMISSION OF PROGRAM A | SET #0 of M/H GROUPS 0, 4, 8 & 12 |
| --- | --- |
| 2ND TRANSMISSION OF PROGRAM A | SET #1 of M/H GROUPS 1, 5, 9 & 13 |
| 1ST TRANSMISSION OF PROGRAM B | SET #2 of M/H GROUPS 2, 6, 10 & 14 |
| 2ND TRANSMISSION OF PROGRAM B | SET #3 of M/H GROUPS 3, 7, 11 & 15 |

Fig. 17 Slot Allocations for a 1st Transmitter in a 1st Network

| 1ST TRANSMISSION OF PROGRAM B | SET #0 of M/H GROUPS 0, 4, 8 & 12 |
| --- | --- |
| 2ND TRANSMISSION OF PROGRAM B | SET #1 of M/H GROUPS 1, 5, 9 & 13 |
| 1ST TRANSMISSION OF PROGRAM A | SET #2 of M/H GROUPS 2, 6, 10 & 14 |
| 2ND TRANSMISSION OF PROGRAM A | SET #3 of M/H GROUPS 3, 7, 11 & 15 |

Fig. 18 Slot Allocations for a 2nd Transmitter in a 1st Network

IN FIGS. 17 & 18 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

| | |
|---|---|
| 2ND TRANSMISSION OF PROGRAM A | SET #0 of M/H GROUPS 0, 4, 8 & 12 |
| 1ST TRANSMISSION OF PROGRAM B | SET #1 of M/H GROUPS 1, 5, 9 & 13 |
| 2ND TRANSMISSION OF PROGRAM B | SET #2 of M/H GROUPS 2, 6, 10 & 14 |
| 1ST TRANSMISSION OF PROGRAM A | SET #3 of M/H GROUPS 3, 7, 11 & 15 |

Fig. 19 Slot Allocations for a 3rd Transmitter in a 1st Network

| | |
|---|---|
| 2ND TRANSMISSION OF PROGRAM B | SET #0 of M/H GROUPS 0, 4, 8 & 12 |
| 1ST TRANSMISSION OF PROGRAM A | SET #1 of M/H GROUPS 1, 5, 9 & 13 |
| 2ND TRANSMISSION OF PROGRAM A | SET #2 of M/H GROUPS 2, 6, 10 & 14 |
| 1ST TRANSMISSION OF PROGRAM B | SET #3 of M/H GROUPS 3, 7, 11 & 15 |

Fig. 20 Slot Allocations for a 4th Transmitter in a 1st Network

IN FIGS. 19 & 20 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

| 1ST TRANSMISSION OF PROGRAM A | SET #0 of M/H GROUPS 0, 4, 8 & 12 |
| --- | --- |
| 1ST TRANSMISSION OF PROGRAM B | SET #1 of M/H GROUPS 1, 5, 9 & 13 |
| 2ND TRANSMISSION OF PROGRAM A | SET #2 of M/H GROUPS 2, 6, 10 & 14 |
| 2ND TRANSMISSION OF PROGRAM B | SET #3 of M/H GROUPS 3, 7, 11 & 15 |

Fig. 21 Slot Allocations for a 1st Transmitter in a 2nd Network

| 1ST TRANSMISSION OF PROGRAM B | SET #0 of M/H GROUPS 0, 4, 8 & 12 |
| --- | --- |
| 2ND TRANSMISSION OF PROGRAM A | SET #1 of M/H GROUPS 1, 5, 9 & 13 |
| 2ND TRANSMISSION OF PROGRAM B | SET #2 of M/H GROUPS 2, 6, 10 & 14 |
| 1ST TRANSMISSION OF PROGRAM A | SET #3 of M/H GROUPS 3, 7, 11 & 15 |

Fig. 22 Slot Allocations for a 2nd Transmitter in a 2nd Network

IN FIGS. 21 & 22 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

| | |
|---|---|
| 2ND TRANSMISSION OF PROGRAM A | SET #0 of M/H GROUPS 0, 4, 8 & 12 |
| 2ND TRANSMISSION OF PROGRAM B | SET #1 of M/H GROUPS 1, 5, 9 & 13 |
| 1ST TRANSMISSION OF PROGRAM A | SET #2 of M/H GROUPS 2, 6, 10 & 14 |
| 1ST TRANSMISSION OF PROGRAM B | SET #3 of M/H GROUPS 3, 7, 11 & 15 |

Fig. 23 Slot Allocations for a 3rd Transmitter in a 2nd Network

| | |
|---|---|
| 2ND TRANSMISSION OF PROGRAM B | SET #0 of M/H GROUPS 0, 4, 8 & 12 |
| 1ST TRANSMISSION OF PROGRAM A | SET #1 of M/H GROUPS 1, 5, 9 & 13 |
| 1ST TRANSMISSION OF PROGRAM B | SET #2 of M/H GROUPS 2, 6, 10 & 14 |
| 2ND TRANSMISSION OF PROGRAM A | SET #3 of M/H GROUPS 3, 7, 11 & 15 |

Fig. 24 Slot Allocations for a 4th Transmitter in a 2nd Network

IN FIGS. 23 & 24 THE 2ND TRANSMISSION OF PROGRAM A CAN BE REPLACED BY A 1ST TRANSMISSION OF PROGRAM C, & THE 2ND TRANSMISSION OF PROGRAM B CAN BE REPLACED BY A 1ST TRANSMISSION OF PROGRAM D. EACH OF THE PROGRAMS A, B, C & D CAN BE DIVIDED INTO SEVERAL SMALLER PROGRAMS OR COMBINED WITH AT LEAST 1 OTHER PROGRAM.

Fig. 25   Bit Syntax of TPC in M/H Sub-Frames # 0 & # 1

| SYNTAX | BITS | FORMAT |
| --- | --- | --- |
| TPC_data in initial 2 M/H sub-Frames { | | |
| sub-Frame_number | 1 - 3 | uimsbf |
| Slot_number | 4 - 7 | uimsbf |
| Parade_id | 8 - 14 | uimsbf |
| current_starting_Group_number | 15 - 18 | uimsbf |
| current_number_of_Groups_minus_1 | 19 - 21 | uimsbf |
| Parade_Repetition_Cycle_minus_1 | 22 - 24 | uimsbf |
| current_RS_frame_mode | 25 - 26 | bslbf |
| current_RS_code_mode_primary | 27 - 28 | bslbf |
| current_RS_code_mode_secondary | 29 - 30 | bslbf |
| current_CCC_block_mode | 31 - 32 | bslbf |
| current_CCC_outer_code_mode_a | 33 - 34 | bslbf |
| current_CCC_outer_code_mode_b | 35 - 36 | bslbf |
| current_CCC_outer_code_mode_c | 37 - 38 | bslbf |
| current_CCC_outer_code_mode_d | 39 - 40 | bslbf |
| FIC_version | 41 - 45 | uimsbf |
| Parade_continuity_counter | 46 - 49 | uimsbf |
| current_total_number_of_Groups | 50 - 54 | uimsbf |
| Frames_of_iterative_diversity_delay | 55 - 57 | bslbf |
| extra_Slot_intervals_of_delay | 58 - 59 | uimsbf |
| M/H_data_not_ones'_complemented? | 60 | bslbf |
| iterative_diversity_mode | 61 - 62 | bslbf |
| subchannel_interleaving | 63 - 65 | bslbf |
| CRC_or_LRS? | 66 | bslbf |
| reserved | 67 - 75 | all 1's |
| TPC_protocol_version_major_update | 76 - 77 | bslbf |
| TPC_protocol_version_minor_update | 78 - 80 | bslbf |
| } | | |

Fig. 26    Bit Syntax of TPC in M/H Sub-Frames # 2, # 3 & # 4

| SYNTAX | BITS | FORMAT |
| --- | --- | --- |
| TPC_data in final 3 M/H sub-Frames { | | |
| sub-Frame_number | 1 - 3 | uimsbf |
| Slot_number | 4 - 7 | uimsbf |
| Parade_id | 8 - 14 | uimsbf |
| next_starting_Group_number | 15 - 18 | uimsbf |
| next_number_of_Groups_minus_1 | 19 - 21 | uimsbf |
| Parade_Repetition_Cycle_minus_1 | 22 - 24 | uimsbf |
| next_RS_frame_mode | 25 - 26 | bslbf |
| next_RS_code_mode_primary | 27 - 28 | bslbf |
| next_RS_code_mode_secondary | 29 - 30 | bslbf |
| next_CCC_block_mode | 31 - 32 | bslbf |
| next_CCC_outer_code_mode_a | 33 - 34 | bslbf |
| next_CCC_outer_code_mode_b | 35 - 36 | bslbf |
| next_CCC_outer_code_mode_c | 37 - 38 | bslbf |
| next_CCC_outer_code_mode_d | 39 - 40 | bslbf |
| FIC_version | 41 - 45 | uimsbf |
| Parade_continuity_counter | 46 - 49 | uimsbf |
| next_total_number_of_Groups | 50 - 54 | uimsbf |
| current_total_number_of_Groups | 55 - 59 | uimsbf |
| M/H_data_not_ones'_complemented? | 60 | bslbf |
| iterative_diversity_mode | 61 - 62 | bslbf |
| subchannel_interleaving | 63 - 65 | bslbf |
| CRC_or_LRS? | 66 | bslbf |
| reserved | 67 - 75 | all 1's |
| TPC_protocol_version_major_update | 76 - 77 | bslbf |
| TPC_protocol_version_minor_update | 78 - 80 | bslbf |
| } | | |

Fig. 27 Bit Syntax of RS_Frame_mode

| RS frame mode | Description |
|---|---|
| 00 | THERE IS ONLY A PRIMARY RS FRAME BEGINNING IN BLOCK 4 & CONCLUDING IN BLOCK 3 AFTER WRAP AROUND. |
| 01 | THERE IS A PRIMARY RS FRAME BEGINNING IN BLOCK 4 & CONCLUDING IN BLOCK 8 OR 9. THERE IS A SECONDARY RS FRAME BEGINNING IN BLOCK 8 OR 9, & CONCLUDING IN BLOCK 3 AFTER WRAP AROUND |
| 10 | THERE IS ONLY A PRIMARY RS FRAME BEGINNING IN BLOCK 4 & CONCLUDING IN BLOCK 3 WITH NO WRAP AROUND. |
| 11 | THERE IS A PRIMARY RS FRAME BEGINNING IN BLOCK 4 & CONCLUDING IN BLOCK 8 OR 9. THERE IS A SECONDARY RS FRAME BEGINNING IN BLOCK 8 OR 9, & CONCLUDING IN BLOCK 3 WITH NO WRAP AROUND. |

Fig. 28 Bit Syntax of RS_code_mode

| RS code mode | RS Code | Number of Parity Bytes (P) |
|---|---|---|
| 00 | (230, 182) | 48 |
| 01 | (230, 194) | 36 |
| 10 | (230, 206) | 24 |
| 11 | RESERVED | |

Fig. 29 Bit Syntax of CCC_outer_code_mode

| CCC outer code mode | Description |
|---|---|
| 00 | THE OUTER CODE RATE OF AN SCCC BLOCK IS 1/2. |
| 01 | NOT USED WITH THIS VERSION OF TPC |
| 10 | NOT USED WITH THIS VERSION OF TPC |
| 11 | THE OUTER CODE RATE OF A PCCC BLOCK IS 1/2. |

Fig. 30  Bit Syntax of iterative_diversity_delay

| iterative_diversity_delay | MEANING |
| --- | --- |
| 000 | NOT TO BE DELAYED ANY EXTRA M/H FRAMES |
| 001 | TO BE DELAYED 4 EXTRA M/H FRAMES |
| 010 | TO BE DELAYED 8 EXTRA M/H FRAMES |
| 011 | TO BE DELAYED 12 EXTRA M/H FRAMES |
| 100 | TO BE DELAYED 16 EXTRA M/H FRAMES |
| 101 | TO BE DELAYED 20 EXTRA M/H FRAMES |
| 110 | TO BE DELAYED 24 EXTRA M/H FRAMES |
| 111 | TO BE DELAYED 32 EXTRA M/H FRAMES |

Fig. 31  Bit Syntax of iterative_diversity_mode

| iterative_diversity_mode | MEANING |
| --- | --- |
| 00 | ONE OF SIMULTANEOUS FREQUENCY-DIVERSITY TRANSMISSIONS |
| 01 | INITIAL COMPONENT OF ITERATIVE-DIVERSITY TRANSMISSION |
| 10 | FINAL COMPONENT OF ITERATIVE-DIVERSITY TRANSMISSION |
| 11 | SINGLE-TIME TRANSMISSION |

Fig. 32 Bit Syntax of subchannel_interleaving

| subchannel_interleaving | MEANING |
|---|---|
| 101 | 1ST TRANSMITTER, 1ST NETWORK, PER FIG. 5 |
| 110 | 2ND TRANSMITTER, 1ST NETWORK, PER FIG. 6 |
| 111 | 3RD TRANSMITTER, 1ST NETWORK, PER FIG. 7 |
| 100 | 4TH TRANSMITTER, 1ST NETWORK, PER FIG. 8 |
| 001 | 1ST TRANSMITTER, 2ND NETWORK, PER FIG. 9 |
| 010 | 2ND TRANSMITTER, 2ND NETWORK, PER FIG. 10 |
| 011 | 3RD TRANSMITTER, 2ND NETWORK, PER FIG. 11 |
| 000 | 4TH TRANSMITTER, 2ND NETWORK, PER FIG. 12 |

Fig. 33

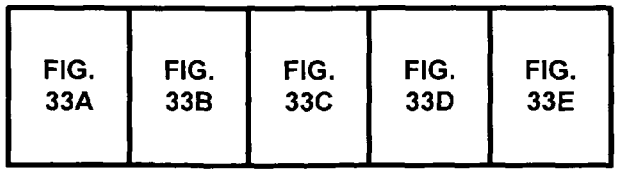

| FIG. 33A | FIG. 33B | FIG. 33C | FIG. 33D | FIG. 33E |

Fig. 40  A First Embodiment of the Information-exchange Unit 150

Fig. 41 A Second Embodiment of the Information-exchange Unit 150

Fig. 42 Structure of Confidence Level Adjusters 138 & 148

Fig. 43  Method of Extracting IP Packets from Turbo Decoding Results

Fig. 44  Method of Turbo Decoding by FIG. 37 Turbo Decoder 130-1

Fig. 46  Method of Turbo Decoding by FIG. 45 Turbo Decoder 130-2

Fig. 48  Method of Turbo Decoding by FIG. 47 Turbo Decoder 130-3

Fig. 50  Method of Turbo Decoding by FIG. 49 Turbo Decoder 130-4

US 8,416,888 B2

CODING AND DECODING OF 8-VSB DIGITAL TELEVISION SIGNALS FOR MOBILE/HANDHELD RECEIVERS

This application claims the benefit of the filing dates of provisional U.S. Pat. App. Ser. No. 61/283,673 filed 7 Dec. 2009, provisional U.S. Pat. App. Ser. No. 61/335,246 filed 4 Jan. 2010, provisional U.S. Pat. App. Ser. No. 61/337,680 filed 11 Feb. 2010, provisional U.S. Pat. App. Ser. No. 61/340, 957 filed on 25 Mar. 2010 and provisional U.S. Pat. App. Ser. No. 61/397,178 filed on 8 Jun. 2010.

The invention relates to digital television (DTV) signals for over-the-air broadcasting, transmitters for such broadcast DTV signals, receivers for such broadcast DTV signals, and in particular those items as designed for implementing a system of broadcasting concatenated convolutionally coded (CCC) data to mobile and hand-held receivers, collectively referred to as "M/H" receivers.

BACKGROUND OF THE INVENTION

The Advanced Television Systems Committee (ATSC) published a Digital Television Standard in 1995 as Document A/53, hereinafter referred to simply as "A/53" for sake of brevity. ATSC published "ATSC Mobile DTV Standard, Parts 1-8" on 26 Oct. 2009 as Document A/153, hereinafter referred to simply as "A/153" for sake of brevity. A/153 specifies robust ancillary transmissions time-division multiplexed into 8-VSB DTV, which ancillary transmissions are designed for reception by mobile receivers and by hand-held receivers that are referred to collectively as "M/H receivers". The ancillary data employ internet-protocol (IP) transport streams. The ancillary data are randomized and subjected to transverse Reed-Solomon (TRS) forward-error-correction (FEC) coding before serial concatenated convolutional coding (SCCC) that uses the ⅔ trellis coding of 8-VSB as inner convolutional coding. This TRS FEC coding helps overcome temporary fading in which received signal strength momentarily falls below that needed for successful reception. The strongest TRS codes prescribed by A/153 can overcome such drop-outs in received signal strength that are as long as four tenths of a second.

Rows of data bytes and rows of parity bytes in the RS Frames of TRS-coded data are subjected to cyclic-redundancy-check (CRC) coding before SCCC. An M/H receiver can use the CRC coding as an error-locating code for the TRS FEC codewords. This permits the use of a Reed-Solomon decoding algorithm that can correct twice as many byte errors in each TRS codeword as an algorithm that must locate, as well as correct, byte errors. The SCCC coding is designed primarily for correcting errors arising from additive white Gaussian noise (AWGN) or similar noise, and the TRS FEC coding is relied on for the correction of errors arising from sustained burst noise. The TRS FEC coding is quite effective in overcoming drop-outs in received signal strength that cause sustained burst noise leading to the loss or severe corruption of as much as two complete M/H sub-Frames of the received signal. There are five sub-Frames in each 986 milliseconds long M/H Frame.

Since the adoption of A/153, some members of ATSC have expressed concern with the capability of transmissions made in accordance with A/153 having sufficient capability to overcome impulse noise. These members of A/153 have suggested further error-correction coding of M/H data, such further FEC coding designed to be decoded in the internet-protocol (IP) transport-stream (TS) packets recovered from the RS Frames in the so-called "physical layer" portion of an M/H receiver.

The term "impulse noise" refers to burst noise that is of shorter duration and is apt to occur frequently within M/H Frames. Frequently occurring impulse noise is usually the result of interference generated by man-made electrical apparatus. A spike of impulse noise is typically stretched for a short time by selective filtering in the tuner portion of the M/H receiver. Burst noise of long duration is usually the result of a drop-out in the strength of received signal caused by change in receiver location or multipath reception conditions. Automatic gain control (AGC) of the RF and IF amplifiers of the M/H receiver increases the gain through those amplifiers in the attempt to maintain received signal level, which amplifies Gaussian noise and results in degradation of SNR.

Concatenated convolutional coding (CCC), whether serial concatenated convolutional coding (SCCC) or parallel concatenated convolutional coding (PCCC), is designed primarily for overcoming additive white Gaussian noise (AWGN) or the like and is not particularly effective at overcoming impulse noise. Decoders for convolutional coding undesirably exhibit tendencies to create and stretch impulse noise. Uncorrected impulse noise in the results of decoding convolutional coding tend to be grouped as running errors, and a receiver preferably employs some form of de-interleaving to disperse these groups of running errors to facilitate subsequent error correction responsive to FEC coding. Accordingly, the transmitter interleaves the FEC coding before CCC coding.

The principal design task for the transverse Reed-Solomon (TRS) coding used in the RS Frames prescribed by A/153 is overcoming drop-outs in received strength caused by reception nulls when the receiver is moved through an electromagnetic field subject to multipath reception. However, the shortened 255-byte Reed-Solomon (RS) codes used for TRS coding can be very powerful codes for correcting shorter burst errors owing to impulse noise, especially when used together with codes for locating byte-errors. If RS codes are relieved of having to locate byte-errors as well as correct them, they can correct as many byte-errors within each of them as each has parity bytes. If RS codes have to locate byte-errors as well as correct them, they can correct only one-half as many byte-errors within each of them as each has parity bytes. Providing a sufficient number of parity bytes in each RS code to implement the principal design task for TRS coding requires a significant investment in reduced M/H payload. Care should be taken to maximize the return from that investment. Proposals to add further FEC coding in the IP transport stream should be skeptically reviewed to ascertain whether they can provide better performance that can be obtained by better use of the TRS coding.

A/153 prescribes two-dimensional coding of RS Frames of randomized M/H data in which the bytes in each RS Frame are cyclically redundantly coded row by row to form respective cyclic redundancy check (CRC) codewords. These row-long CRC codewords can be used as error-locating codes for the TRS codewords, but only in common, on a collectively shared basis. This works reasonably well when overcoming protracted drop-outs in received strength caused by reception nulls when the receiver is moved through an electromagnetic field subject to multipath reception. These protracted errors typically extend over several rows of bytes in the RS Frame and affect all TRS codewords in the RS Frame.

In his previous work, the inventor discerned that each occurrence of impulse noise generates burst noise apt to be short enough in duration to affect only some of the TRS codewords in the RS Frame. Several occurrences of such shorter burst noise can occur in some RS Frames. The row-long CRC codewords will respond to each occurrence of shorter burst noise to locate a byte error in each and all of the TRS codewords in the RS Frame. Several occurrences of shorter burst noise in an RS Frame can cause the row-long CRC codewords to locate more possible byte-error locations than can be accommodated by a TRS decoder using a byte-error-correction-only decoding algorithm for correcting TRS codewords. The TRS decoder can be designed so as to use a byte-error-location-and-correction decoding algorithm as an alternative way for correcting TRS codewords. However, the byte-error-correction capability of the TRS decoder is halved when using a byte-error-location-and-correction decoding algorithm.

The inventor further discerned in his previous work that using a plurality of shorter CRC codewords in each row of the RS Frame is likely to result in fewer TRS codewords having to switch over to a byte-error-location-and-correction decoding algorithm. If the RS Frame is coded in a number 5M of M/H Groups, M being an integer more than one but no more than sixteen, each row of bytes in the RS Frame is preferably apportioned into M CRC codewords or into a prescribed multiple of M CRC codewords. These shorter CRC codewords have utility in improving turbo decoding of the CCC in M/H receivers, particularly when PCCC is used instead of the SCCC prescribed by A/153. In U.S. patent application Ser. No. 12/800,559 filed 18 May 2010 by A. L. R. Limberg and titled "Burst-error correction methods and apparatuses for wireless digital communications systems" the inventor described his preference for PCCC transmissions at code rate one-half the 8-VSB symbol rate being used in iterative-diversity and frequency-diversity reception.

The above-referenced U.S. patent application Ser. No. 12/800,559 describes implied symbol interleaving for CCC, which CCC uses the ⅔ trellis coding of 8-VSB symbols as its inner convolutional coding. This implied symbol interleaving is a species of code interleaving. At the DTV transmitter the bits of bytes that the M/H Frame encoder supplies to the block processor are subjected to prefatory de-interleaving. This de-interleaving is done in a pattern complementary to the inter-leaving of 2-bit symbols from the encoder of outer convolutional coding before their application to the encoder for the ⅔ trellis coding used as inner convolutional coding in the CCC. In an M/H receiver short-duration burst noise arising from impulse noise or momentary drop-outs in the received signal is dispersed in time by the de-interleaving of the 2-bit symbols supplied to the decoder for outer convolutional coding. Uncorrected remnants of the dispersed noise may appear in the response of that decoder, which response is subjected to re-interleaving before being fed back to implement turbo decoding or before being supplied as a result of turbo coding. The re-interleaving should collect uncorrected remnants of short-duration burst noise arising from impulse noise so as to be less widely distributed among the successive bytes of turbo coding response supplied for being written to an RS-Frame-storage memory that supports subsequent TRS decoding. It is pointed out in U.S. patent application Ser. No. 12/800,559 that this re-interleaving procedure should present fewer erroneous bytes to be corrected during TRS decoding and error-correction procedures.

CRC codes in the recovered 2-dimensionally-coded RS Frame data can be used to check whether or not sequences of data bits in the symbol-interleaved results of the outer convolutional coding of a CCC transmission at code rate one-half the 8-VSB symbol rate are presumably correct. The above-referenced U.S. patent application Ser. No. 12/800,559 describes those sequences of data bits with checksums indicating them very likely to be correct having the confidence levels associated with their parent soft data bits heightened. De-interleaving of the parent soft data bits that have the heightened confidence levels scatters them throughout the outer convolutional coding used in the next iteration of decoding the outer convolutional coding. The heightened confidence levels of scattered soft data bits concentrates the decoding of the outer convolutional coding on the soft data bits with lower confidence levels, helping to avoid the bit-error-rate (BER) "floor" phenomena characteristic that can afflict CCC, especially PCCC. When the CRC codes indicate that substantially all the sequences of data bits in the interleaved results of decoding outer convolutional coding of the CCC transmission are very likely to be correct, this information can be used to discontinue the iterative procedures associated with turbo decoding the CCC.

The above-referenced U.S. patent application Ser. No. 12/800,559 describes the confidence levels of soft data bits resulting from turbo decoding being used to generate confidence levels for bytes of hard data bits derived from those soft data bits. These confidence levels for bytes of hard data bits are subsequently used for locating byte errors in the TRS codewords of RS Frames. This procedure locates byte errors in each of the TRS codewords as individually considered, rather than byte errors being located for several TRS codewords as collectively considered. This better confines the effects of impulse noise artifacts in the turbo decoding results upon byte error location to fewer of the TRS codewords in an RS Frame. This increases the likelihood that each of these TRS codewords can be corrected using a byte-error-correction-only decoding algorithm, rather than having to switch over to a byte-error-location-and-correction decoding algorithm with reduced capability for correcting byte errors.

The inventor considered whether there might be advantages in two-dimensional coding of RS Frames that combines the TRS coding with lateral FEC coding, rather than with lateral CRC coding that can detect errors but does not correct them. After some thought the inventor realized that FEC coding is preferably of a type in which parity bits are not dispersed throughout the bytes of turbo decoding results, but rather are grouped into particular ones of 8-bit bytes of the turbo decoding results. This allows the parity bits easily to be separated from bytes of the payload encoded within the FEC coding and discarded before writing those payload bytes into RS Framestore memory that supports decoding of TRS codewords. U.S. Pat. No. 7,197,685 issued 27 Mar. 2007 to A. L. R. Limberg and titled "Robust signal transmissions in digital television broadcasting" describes 2-dimensional coding that combines TRS coding with (207, 187) lateral Reed-Solomon (LRS) forward-error-correction (FEC) coding similar to that used in 8-VSB DTV broadcasting of main-service data. The decoding of the 2-dimensional coding is preceded by convolutional byte interleaving that disperses running errors caused by the decoder for the ⅔ trellis coding used for recovering the data fields.

LRS FEC coding of the TRS decoding results in the M/H transmissions differs from what U.S. Pat. No. 7,197,685 describes in that the outer convolutional coding of the CCC and symbol interleaving of that outer convolutional coding are interposed between the LRS FEC coding and the ⅔ trellis coding used as the inner convolutional coding of the CCC. Furthermore, the length of the shortened 255-byte RS codes used for LRS FEC coding of the TRS decoding results in the M/H transmissions has to be chosen carefully if an integral number of LRS FEC codewords is to fit exactly into each M/H Group. Such exact fit facilitates an M/H receiver being able to use the LRS FEC coding to assist decoding of the CCC. The re-interleaving of the response of the decoder for outer convolutional coding before the decoder of the LRS FEC coding breaks up any remnant errors from the decoder for outer convolutional coding that the decoder of the LRS FEC coding is supposed to correct or help to correct.

SUMMARY OF THE INVENTION

The invention as whole concerns a modified system for broadcasting M/H data in which the two-dimensional coding of RS Frames combines transverse RS coding with subsequent a byte-error-locating block coding that generates codewords of a prescribed standard length. This prescribed standard length is chosen such that an integral number of codewords of the byte-error-locating block code fits exactly, or substantially so, into the portion of each RS Frame that is encoded in CCC for inclusion within an M/H Group. The byte-error-locating block coding is CRC coding, by way of one specific example, or is Reed-Solomon (LRS) forward-error-correction (FEC) coding, by way of another specific example. In an M/H receiver embodying a particular aspect of the invention, codewords of the byte-error-locating block coding are decoded and used to influence the soft decisions concerning data bits. Then, these soft decisions are processed and used for locating byte errors for the transverse Reed-Solomon (TRS) codes on an individual basis.

BRIEF DESCRIPTION OF THE DRAWING

FIG. 10 is a detailed schematic diagram of a representative embodiment of one of the RS Frame encoders in the FIG. 4 M/H Frame encoder.

FIG. 11 is a diagram of the bit order in half-rate outer convolutional coding when M/H data are encoded in SCCC.

FIG. 12 is a diagram of the bit order in half-rate outer convolutional coding when M/H data are encoded in PCCC.

FIGS. 17, 18, 19 and 20 are tables illustrating a first arrangement for allocating Slots to transmissions that allow for iterative-diversity and frequency-diversity reception.

FIGS. 21, 22, 23 and 24 are tables illustrating a second arrangement for allocating Slots to transmissions that allow for iterative-diversity and frequency-diversity reception.

FIG. 25 is a table depicting a representative bit syntax for the Transmission Parameter Channel (TPC) that the signaling encoder of the FIG. 1 DTV transmitter apparatus uses during the initial two sub-Frames of each M/H Frame, which bit syntax includes novel indications of the differential delay between pairs of signals received during diversity reception.

FIG. 26 is a table depicting a representative bit syntax for the Transmission Parameter Channel (TPC) that the signaling encoder of the FIG. 1 DTV transmitter apparatus uses during the final three sub-Frames of each M/H Frame.

FIG. 27 is a table showing a bit syntax for a CCC_outer_code_mode that the FIG. 25 and FIG. 26 TPC tables use in place of the SCCC_outer_code_mode used in the TPC tables specified by A/153.

FIG. 28 is a table depicting a detailed bit syntax of the RS_Frame_mode field included in each of the FIG. 25 and FIG. 26 bit syntax tables for TPC.

FIG. 29 is a table depicting a detailed bit syntax of the RS_code_mode field included in each of the FIG. 25 and FIG. 26 bit syntax tables for TPC.

FIG. 30 is a table depicting a detailed bit syntax of a novel iterative_diversity_mode field included in each of the FIG. 25 and FIG. 26 bit syntax tables for TPC.

FIG. 31 is a table depicting a detailed bit syntax of a novel iterative_diversity_delay field included in each of the FIG. 25 and FIG. 26 bit syntax tables for TPC.

FIG. 32 is a table depicting a detailed bit syntax of a novel subchannel_interleaving field included in each of the FIG. 25 and FIG. 26 bit syntax tables for TPC.

Figure 1:
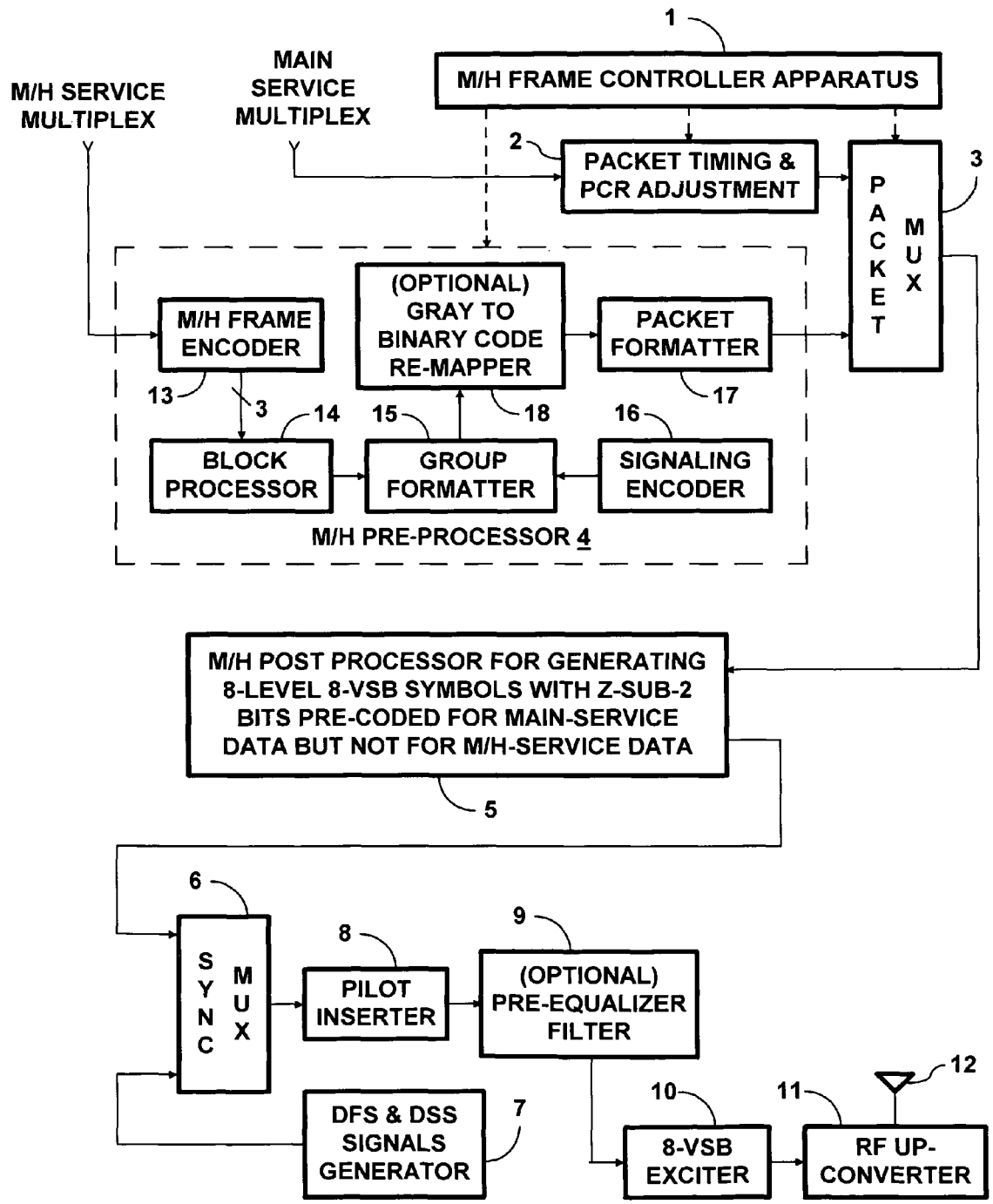
FIG. 1 is a schematic diagram of DTV transmitter apparatus in which interference filter pre-coding of Z-sub-2 bits is discontinued during the transmission of coded M/H data.

Connections for control signals are indicated by successions of short dashes, although not all control signal connections are explicitly shown. Shim delays that a person of ordinary skill in the art would customarily introduce to make signal timings precisely correct in some instances are apt to be omitted in the figures of the drawing. Such omissions are made to conform to drafting limitations and to keep the figures easier to understand.

DETAILED DESCRIPTION

FIG. 1 shows transmitter apparatus for broadcast DTV signals including those intended for reception by mobile receivers and by hand-held receivers, which receivers are collectively referred to as "M/H receivers". The transmitter apparatus receives two sets of input streams, one composed of the MPEG transport-stream (TS) packets of the main-service data and the other composed of IP TS packets of the M/H-service data. The M/H-service data are encapsulated in 208-byte-long MPEG-like TS packets before emission, which MPEG-like TS packets are called "M/H encapsulating packets" or "MHE packets". This avoids disrupting the reception of the main-service data by legacy 8-VSB receivers. The FIG. 1 transmitter apparatus combines the MPEG TS packets of the main-service data and the IP TS packets of the M/H-service data within one stream of MPEG or MPEG-like TS packets, then processes the combined stream to be transmitted as an ATSC trellis-coded 8-VSB signal.

M/H Frame controller apparatus 1 controls these procedures. The main-service multiplex stream of data is supplied to packet timing and PCR adjustment circuitry 2 before the packets of that stream are routed to a packet multiplexer 3 to be time-division multiplexed with MHE packets encapsulating M/H-service data. (PCR is the acronym for "Program Clock Reference".) Because of their time-division multiplexing with the MHE packets encapsulating M/H-service data, changes have to be made to the time of emission of the main-service stream packets compared to the timing that would occur with no M/H stream present. The packet timing and PCR adjustment circuitry 2 makes these timing changes responsive to control signals supplied thereto from the M/H Frame controller apparatus 1. The packet multiplexer 3 time-division multiplexes the main-service TS packets with TS packets encapsulating M/H-service data, as directed by control signals from the M/H Frame controller apparatus 1. The operations of the M/H transmission system on the M/H data are divided into two stages: the M/H pre-processor 4 and the M/H post-processor 5.

The M/H-service multiplex stream of data is supplied to the M/H pre-processor 4 for processing. The pre-processor 4 rearranges the M/H-service data into an M/H data structure, enhances the robustness of the M/H-service data by additional coding measures, inserts training sequences, and subsequently encapsulates the processed enhanced data within MHE packets, thus to generate an ancillary transport stream (TS). The MHE packets are supplied to the packet multiplexer 3 after data encapsulation within their payload fields is completed. The operations performed by the pre-processor 4 include M/H Frame encoding, block processing, Group formatting, optional Gray-code-to-natural-binary-code conversion, packet formatting, and encoding M/H signaling. The M/H Frame controller apparatus 1 provides the necessary transmission parameters to the pre-processor 4 and controls the multiplexing of the main-service TS packets and the M/H-service TS packets by the packet multiplexer 3 to organize the M/H Frame. Preferably, the pre-processor 4 differs from that described in A/153 in regard to the M/H Frame encoding, in regard to the block processing and in regard to Gray-code-to-natural-binary-code conversion. The block processing includes capability for the generation of parallel concatenated convolutional coding (PCCC) that has half the code rate of 8-VSB transmissions of the type originally prescribed by A/53.

The post-processor 5 processes the main-service TS packets by normal 8-VSB encoding and re-arranges the pre-processed M/H-service TS packets in the combined stream to assure backward compatibility with ATSC 8-VSB. The post-processor 5 differs from that described in A/153 in that pre-coding of the most significant bits of 8-VSB symbols is disabled when the symbols describe M/H-service data. Consequently, receivers need not use post-comb filtering of the most significant bits of 8-VSB symbols during reception of M/H-service data, avoiding the reduction in signal-to-noise ratio associated with such filtering. Disabling the pre-coding of the most significant bits of 8-VSB symbols descriptive of M/H-service data allows the use of Gray-code labeling of outer convolutional coding of the CCC and also allows the use of PCCC. The most significant bits of 8-VSB symbols descriptive of main-service TS packets are pre-coded, so as not to disrupt the operation of legacy receivers. Main-service data in the combined stream are processed exactly the same way as for ordinary 8-VSB transmission: randomizing, Reed-Solomon (RS) encoding, convolutional byte interleaving, and trellis encoding. The M/H-service data in the combined stream are processed differently from the main-service data, with the pre-processed M/H-service data bypassing data randomization. The pre-processed MHE packets are subjected to non-systematic RS encoding, which re-arranges the bytes of those packets within RS codewords. The non-systematic RS encoding allows the insertion of the regularly spaced long training sequences so as not to disrupt the operation of legacy receivers. Additional operations are done on the pre-processed M/H-service data to initialize the trellis encoder memories at the beginning of each training sequence included in the pre-processed M/H-service data.

A synchronization multiplexer 6 is connected for receiving, as the first of its two input signals, the ⅔ trellis-coded data generated by the post-processor 5. The sync multiplexer 6 is connected for receiving its second input signal from a generator 7 of synchronization signals comprising the data segment sync (DSS) and the data field sync (DFS) signals. Per custom, the DSS and DFS signals are time-division multiplexed with the ⅔ trellis-coded data in the output signal from the sync multiplexer 6, which is supplied to a pilot inserter 8 as input signal thereto. The pilot inserter 8 introduces a direct-component offset into the signal to cause a pilot carrier wave to be generated during subsequent balanced modulation of a suppressed intermediate-frequency (IF) carrier wave. The output signal from the pilot inserter 8 is a modulating signal with offset, which optionally is passed through a pre-equalizer filter 9 before being supplied as input signal to an 8-VSB exciter 10 to modulate the suppressed IF carrier wave. Alternatively, the pre-equalizer filter 9 precedes the pilot inserter 8 in their cascade connection with each other. Other transmitter designs omit the pre-equalizer filter 9 in favor of a direct connection. The 8-VSB exciter 10 is connected for supplying the suppressed IF carrier wave to a radio-frequency (RF) up-converter 11 to be converted upward in frequency to repose within the broadcast channel. The up-converter 11 also amplifies the power of the RF signal it applies to a broadcast antenna 12.

More specifically, the M/H pre-processor 4 comprises an M/H Frame encoder 13, a block processor 14, a Group formatter 15, a signaling encoder 16, a packet formatter 17 and optionally a Gray-code-to-binary-code re-mapper 18. The M/H-service multiplex stream of data supplied to the M/H pre-processor 4 is applied as input signal to the M/H Frame encoder 13, which provides transverse Reed-Solomon (TRS) coding of that data. Each M/H Frame is composed of one or more RS Frames, each comprising a TRS Frame of TRS coding. The data in each TRS Frame are randomized independently from each other and from the data of the main-service multiplex. The TRS-coded M/H data are subsequently further coded with a byte-error-locating block code that M/H receivers can utilize for locating byte errors in the TRS codewords. This byte-error-locating block coding replaces the periodic cyclic-redundancy-check (CRC) coding prescribed by A/153. In a departure from the prior art the codewords of this byte-error-locating block coding have a prescribed standard length in number of 8-bit bytes, irrespective of TNoG, the total number of M/H Groups in each M/H Frame. This byte-error-locating block coding can be CRC coding or can be lateral Reed-Solomon (LRS) forward-error-correction (FEC) coding. The inventor's patent application Ser. No. 12/580,534 filed 16 Oct. 2009, teaches that byte-error-locating CRC coding is better done for each the M/H Groups in an M/H Frame on an individual basis, rather than for all those M/H Groups on a collective basis. This is particularly advantageous for PCCC transmissions, since the CRC coding can be used to mitigate any BER floor problem that is experienced during reception of such transmissions. LRS FEC coding can be used for this purpose in place of the CRC coding and can be used to facilitate turbo coding further by correcting errors. The standard length of the codewords of the byte-error-locating block coding is chosen such that an integral number of those codewords fits exactly (or substantially so) within the portion of each RS Frame conveyed by an individual M/H Group. This permits the M/H Frame encoder 13 to use a single encoder for the byte-error-locating block coding for every RS Frame, no matter its size. This departs from the prior-art practice of having a respective encoder for the CRC coding of each RS Frame in an M/H Frame.

The M/H Frame encoder 13 is connected for supplying the byte-error-locating block codewords to the block processor 14, as input signal thereto. The block processor 14 includes apparatus for encoding single-phase outer convolutional coding that is used for SCCC M/H transmissions at a code rate one half the 8-VSB symbol rate. Furthermore, the block processor 14 includes apparatus for encoding outer convolutional coding that is used for PCCC M/H transmissions at a code rate one half the 8-VSB symbol rate. The outer convolutional coding used for PCCC M/H transmissions can be single-phase. Alternatively, it can be 12-phase.

The Group formatter 15 is connected for receiving the interleaved outer convolutional coding from the block processor 14 as input addressing signal. The Group formatter 15 includes an interleaved Group format organizer that operates on the Group format as it will appear after the ATSC data interleaver. The interleaved Group format organizer maps the FEC coded M/H-service data from the block processor into the corresponding M/H blocks of a Group, adding pre-determined training data bytes and data bytes to be used for initializing the trellis encoder memories. The interleaved Group format organizer inserts headers for the MHE packets, preferably truncated to just 2-byte length to accommodate more bytes of M/H data in those packets. The interleaved Group format organizer also inserts place-holder bytes for main-service data and for non-systematic RS parity. The interleaved Group format organizer inserts a few dummy bytes to complete construction of the intended Group format. The interleaved Group format organizer assembles a group of 118 consecutive TS packets. Some of these TS packets are composed of the interleaved outer convolutional coding supplied by the block processor 14. A signaling encoder 16 generates others of these TS packets.

Still others of these TS packets are prescribed training signals stored in read-only memory within the Group formatter 15 and inserted at prescribed intervals within the group. The prescribed training signals inserted by the Group formatter 15 in FIG. 1 will differ from those described in A/153 if the Z-sub-2 bits of the training signal symbols are modified to take into account the pre-coding of those bits being selectively discontinued during M/H signals. The apparatus for selective discontinuation of such pre-coding is described in more detail further on in this specification, with reference to FIG. 3 of the drawing. However, because transmitter apparatus constructed for implementing A/153 is already in the field, it is more likely that the Z-sub-2 bits of the training signal symbols will be pre-coded, avoiding the Group formatter 15 having to be modified in this regard. The Group formatter 15 may differ from that prescribed by A/153 in the way that M/H Blocks are mapped into M/H Groups. U.S. patent application Ser. No. 12/924,074 filed 20 Sep. 2010 by A. L. R. Limberg and titled "Terminated concatenated convolutional coding of M/H Group data in 8 VSB digital television signals" describes wrap-around coding of each M/H Group. A portion of a coded primary RS Frame begins in M/H Block 4 of each M/H Group and, absent a coded secondary RS Frame, wraps around to conclude in M/H Block 3 of the same M/H Group. If a coded secondary RS Frame is used, a portion thereof begins in M/H Block 9 of a respective M/H Group and wraps around to conclude in M/H Block 3 of the same M/H Group. This procedure is described in more detail further on in this application, with reference to FIG. 15 of the drawing.

The M/H transmission system has two kinds of signaling channels generated by the signaling encoder 16. One is the Transmission Parameter Channel (TPC), and the other is the Fast Information Channel (FIC). The TPC is for signaling the M/H transmission parameters such as various FEC modes and M/H Frame information. The FIC is provided to enable a receiver to acquire a broadcast service quickly, and the FIC contains cross-layer information between the physical layer of the receiver and its upper layer(s). The "physical layer" of the receiver is that portion of the receiver used to recover the IP transport stream, and the succeeding "upper layer" processes the IP transport stream. The TPC and FIC signals are encoded within parallel concatenated convolutional coding that has a code rate one-quarter the 8-VSB symbol rate.

Within the Group formatter 15 the interleaved Group format organizer is followed in cascade connection by a byte de-interleaver that complements the ATSC convolutional byte interleaves. The Group formatter 15 is connected for supplying the response of this de-interleaves as its output signal, which is applied as input signal to the Gray-code-to-binary-code re-mapper 18. The Gray-code-to-binary-code re-mapper 18 recodes 2-bit symbols of its input signal which is considered to be in reflected-binary (Gray) code to the natural-binary code that governs the modulating signal used in 8-VSB amplitude modulation. This implements a procedure known as "Gray-code labeling". The conversion is performed by exclusive-ORing the least significant bit (LSB) of each 2-bit symbol of the re-mapper 18 input signal with the most significant bit (MSB) thereof to generate the LSB of the re-mapper 18 output signal. The MSB of the re-mapper 18 output signal reproduces the MSB of the re-mapper 18 input signal. The MSB and the LSB of the re-mapper 18 output signal respectively correspond to bits referred to as the "X-sub-2 bit" and the "X-sub-1 bit" during subsequent trellis coding procedure. The Gray-code-to-binary-code re-mapper 18 recodes the quarter-rate PCCC encoding the TPC and FIC signals unless provision is made for the re-mapper 18 not to do so. The re-mapper 18 output signal is supplied to the packet formatter 17.

The inclusion of the Gray-code-to-binary-code re-mapper 18 in the FIG. 1 transmitter apparatus is optional. If the re-mapper 18 is not included, the output signal from the Group formatter 15 is supplied directly to the packet formatter 17 as input signal thereto. In an initial procedure therein, the packet formatter 17 expunges the main-service data place holders and the RS parity place holders that were inserted by the interleaved Group format organizer for proper operation of the byte de-interleaver in the Group formatter 15. The packet formatter 17 inserts an MPEG TS sync byte before each 187-byte data packet as a prefix thereof. The packet formatter 17 supplies 118 M/H-service transport-stream packets per group to the packet multiplexer 3, which time-division multiplexes the M/H-service TS packets and the main-service TS packets to construct M/H Frames.

The M/H Frame controller apparatus 1 controls the packet multiplexer 3 in the following way when the packet multiplexer schedules the 118 TS packets from the packet formatter 17. Thirty-seven packets immediately precede a DFS segment in a 313-segment VSB field of data, and another eighty-one packets immediately succeed that DFS segment. The packet multiplexer 3 reproduces next-in-sequence main-service TS packets in place of MPEG null packets that contain place-holder bytes for main-service data in their payload fields. The packet multiplexer 3 is connected to supply the TS packets it reproduces to the M/H post-processor 5 as input signal thereto.

Figure 2:
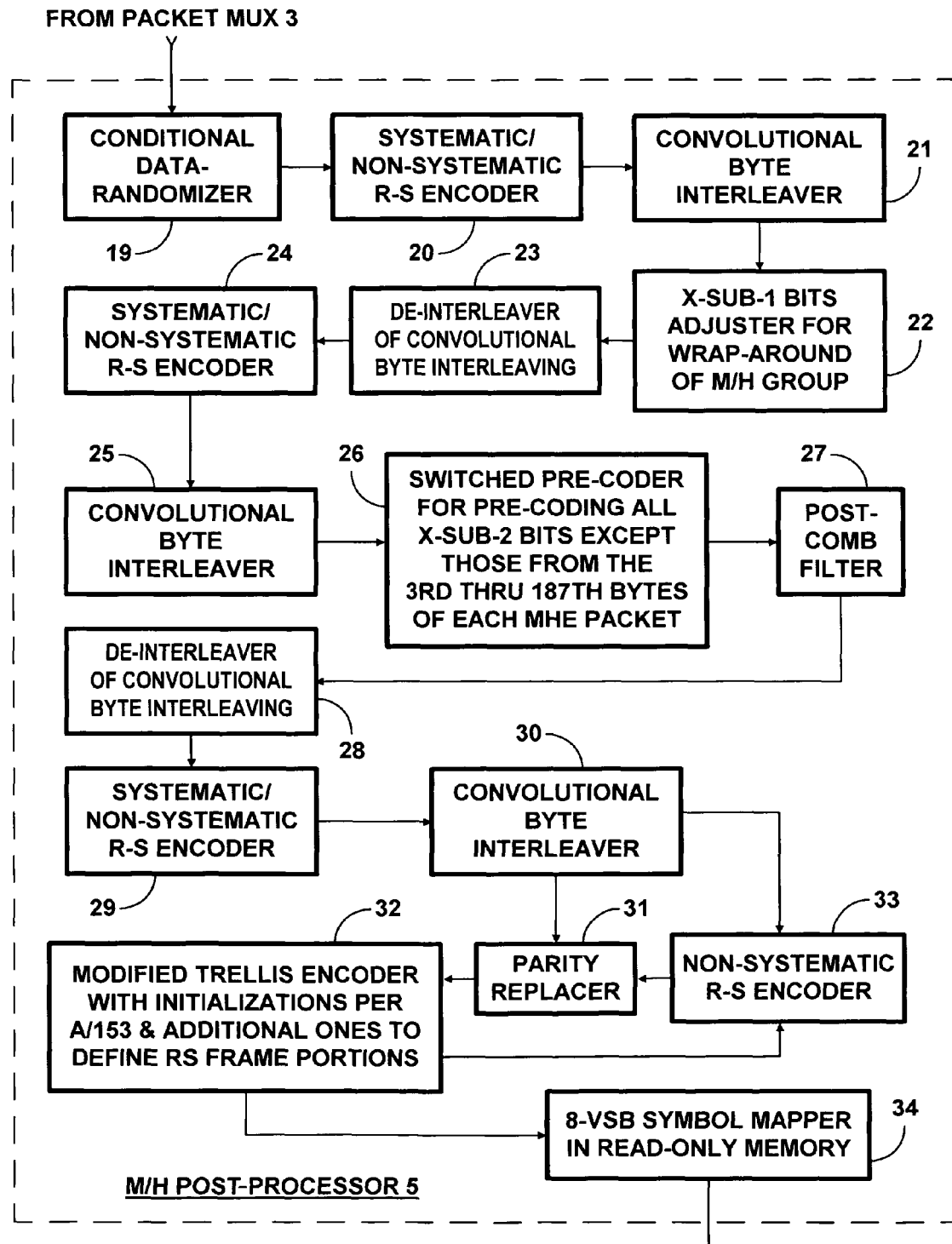
FIG. 2 is a detailed schematic diagram of a representative embodiment of the M/H post-processor in the FIG. 1 DTV transmitter apparatus, which M/H post-processor discontinues interference filter pre-coding of Z-sub-2 bits during the transmission of coded M/H data.

FIG. 2 shows in more detail a representative embodiment of the M/H post-processor 5 as constructed in accordance with inventive precepts previously described in U.S. patent application Ser. No. 12/924,074 filed 20 Sep. 2010. The M/H post-processor 5 includes a conditional data randomizer 19 operated as prescribed by A/153, Part 2, §5.3.2.2.1.1 "M/H Randomizer". FIG. 2 shows the packet multiplexer 3 connected to apply the TS packets it reproduces to the conditional data randomizer 19 as the input signal thereto. The conditional data randomizer 19 suppresses the sync bytes of the 188-byte TS packets and randomizes the remaining data in accordance with conventional 8-VSB practice, but only on condition that it is not within an M/H-service TS packet. The M/H-service TS packets bypass data randomization by the conditional data randomizer 19. The other remaining data are randomized per A/53, Annex D, §4.2.2. The conditional data randomizer 19 is connected for supplying the conditionally randomized data packets that it generates to an encoder 20 for preliminary systematic/non-systematic (207, 187) Reed-Solomon coding. The Reed-Solomon encoder 20 is as prescribed by A/153, Part 2, §5.3.2.9 "Systematic/Non-Systematic RS Encoder". The RS parity generator polynomial and the primitive field generator for the RS encoder 20 are the same as those that FIG. 4 of A/53, Annex D, prescribes for (207, 187) Reed-Solomon coding. The RS encoder 20 is connected for supplying the resulting segments of the data field generated therein as input signal to a convolutional byte interleaver 21. When the RS encoder 20 receives a main-service data packet, the RS encoder 20 performs the systematic RS coding process prescribed in A/53, Annex D, §4.2.3. The resulting twenty bytes of RS parity data are appended to the conclusion of the 187-byte packet in the main-service data packet subsequently supplied to the input port of the convolutional byte interleaver 21. When the RS encoder 20 receives an M/H-service data packet, the RS encoder 20 performs a non-systematic RS encoding process. The twenty bytes of RS parity data obtained from the non-systematic RS encoding process are inserted in various parity byte locations within each M/H-service TS packet subsequently supplied to the input port of the convolutional byte interleaver 21. These insertions correspond to what A/153 prescribes for M/H-service TS packets similarly located within an 8-VSB data field. The convolutional byte interleaver 21 is of the type specified in Section 5.3.2.10 "Convolutional Data Byte Interleaver" of Part 2 of A/153 or of a type equivalent in function. The byte-interleaver 21 response is supplied as a serial stream of 2-bit symbols, each composed of a respective X-sub-2 bit and a respective X-sub-1 bit.

Preferably, the serial stream of 2-bit symbols from the convolutional byte interleaver 21 is applied as input signal to an X-sub-1 bits adjuster 22 that resets the ⅔ trellis coding used as inner convolutional coding of the each M/H Group at the beginning of each M/H Group. The X-sub-1 bits adjuster 22 also resets that ⅔ trellis coding at the conclusion of each M/H Group. U.S. patent application Ser. No. 12/924,074 filed 20 Sep. 2010 provides a detailed description of the construction of an X-sub-1 bits adjuster suitable for inclusion in the M/H post-processor 5. The resetting of the ⅔ trellis coding at the conclusion of each M/H Group as well as its beginning allows for wrap-around decoding of the ⅔ trellis coding of each individual M/H Group. The response from the X-sub-1 bits adjuster 22 includes both M/H-service data segments and forwarded main-service data segments. This response is applied as input signal to a convolutional byte de-interleaver 23 of a type that is complementary to the convolutional byte interleaver 21. Still another encoder 24 for systematic/non-systematic (207, 187) Reed-Solomon codes per A/153, Part 2, §5.3.2.9 is connected to receive, as its input signal, the output signal from the byte de-interleaver 23. The Reed-Solomon encoder 24 recalculates the RS parity bytes in the M/H-service data segments affected by the X-sub-1 bits adjuster 22 having reset the ⅔ trellis coding at the beginning of each M/H Group and at the conclusion of each M/H Group. The RS encoder 24 response is supplied to the input port of a convolutional byte interleaver 25. The byte-interleaver 25 response is supplied as a serial stream of 2-bit symbols, each composed of a respective X-sub-2 bit and a respective X-sub-1 bit. The RS parity bytes from just two M/H-service data segments from each M/H Group need to be re-calculated to correct for adjustments of X-sub-1 bits. So, the byte de-interleaver 23, the RS encoder 24 and the byte interleaver 25 can be replaced by simpler circuitry providing equivalent operation.

The serial stream of 2-bit symbols supplied as byte-interleaver 25 response is applied as input signal to a switched interference-filter pre-coder 26 for precoding all the X-sub-2 bits from the main-service (207, 187) RS codewords, the X-sub-2 bits from just the first two bytes of each MHE packet, and the X-sub-2 bits from the M/H-service (207, 187) RS codewords. The pre-coder 26 provides selective pre-coding of the X-sub-2 bits received as input signal, skipping over the X-sub-2 bits of the M/H-service data from the final 185 bytes of each MHE packet. If the Group formatter 15 inserts M/H training signals that have their X-sub-2 bits already pre-coded, the pre-coder 26 also skips over pre-coding those X-sub-2 bits as well. If the Group formatter 15 inserts M/H training signals that do not have their X-sub-2 bits already pre-coded, the pre-coder 26 pre-codes those X-sub-2 bits. The pre-coder 26 response is applied as input signal to a post-comb filter 27 similar to those used in DTV receivers, and the post-comb filter 27 response is applied as input signal to a convolutional byte de-interleaver 28 of a type complementary to the convolutional byte interleaver 25. Another encoder 29 for systematic/non-systematic (207, 187) Reed-Solomon codes per A/153, Part 2, §5.3.2.9 is connected to receive, as its input signal, the output signal from the byte de-interleaver 28. The Reed-Solomon encoder 29 recalculates the parity bytes both in the main-service data segments and in the M/H-service data segments. Except for changes apt to be subsequently introduced into a few of the MHE packets during deterministic trellis-resetting, the response of the convolutional byte de-interleaver 28 resembles the data segments that a DTV receiver is expected to supply to its decoder of (207, 187) Reed-Solomon forward-error-correction coding.

A convolutional byte interleaver 30 is connected for receiving, as its input signal, the main-service and M/H-service data segments with re-calculated RS parity bytes from the RS encoder 29. The byte interleaver 30 is as specified by A/153, Part 2, §5.3.2.10 "Convolutional Data Byte Interleaver" or an equivalent thereof. The byte interleaver 30 is connected for supplying byte-interleaved 207-byte RS codewords to a parity replacer 31 that reproduces portions of those codewords in its response. This response is applied as input signal to a modified trellis encoder 32 of a type similar to that specified by A/153, Part 2, §5.3.2.11 "Modified Trellis Encoder" or an equivalent thereof. The modified trellis encoder 32 converts the byte-unit data from the parity replacer 31 to successive 2-bit symbols and performs a 12-phase trellis coding process on those symbols.

In order for the output signal from the trellis encoder 32 to include pre-defined known training data, initialization of the memories in the trellis encoder 32 is required, as described in A/153. This initialization is very likely to cause the RS parity data calculated by the RS encoder 29 prior to the trellis initialization to be erroneous. The RS parity data must be replaced to ensure backward compatibility with legacy DTV receivers. Accordingly, as described in A/153, Part 2, §5.3.2.11 "Modified Trellis Encoder", the modified trellis encoder 32 is connected for supplying the changed initialization bytes to an encoder 33 for non-systematic (207, 187) Reed-Solomon codes, as described in A/153, Part 2, §5.3.2.12 "Non-Systematic RS Encoder and Parity Replacer". The RS encoder 33 re-calculates the RS parity of the affected M/H packets. The RS encoder 33 is connected for supplying the re-calculated RS parity bytes to the RS parity replacer 31, which substitutes the re-calculated RS parity bytes for the original RS parity bytes before they can be supplied to the modified trellis encoder 32. That is, the RS parity replacer 31 reproduces the output of the byte interleaver 30 as regards the data bytes for each packet in its output signal, but reproduces the output of the non-systematic RS encoder 33 as regards the RS parity bytes for each packet in its output signal.

The modified trellis encoder 32 is connected for supplying its output signal to a read-only memory (ROM) 34 that responds to successive 3-bit input addresses to map them to respective ones of eight possible 8-VSB symbol levels. These 8-VSB symbol levels are supplied as the output signal from the M/H post-processor 5 and are applied as input signal to the sync multiplexer 6 shown in FIG. 1. If RS Frames are mapped into M/H Groups as described in U.S. patent application Ser. No. 12/924,074 filed 20 Sep. 2010, rather than as prescribed by A/153, the modified trellis encoder 32 will differ slightly from that described in A/153, Part 2, §5.3.2.11. This is because a further trellis initialization is introduced in data segment 132 of each M/H Group to introduce separation between a portion of a primary RS Frame and a portion of secondary RS Frame that appears in some M/H Groups.

Figure 3:
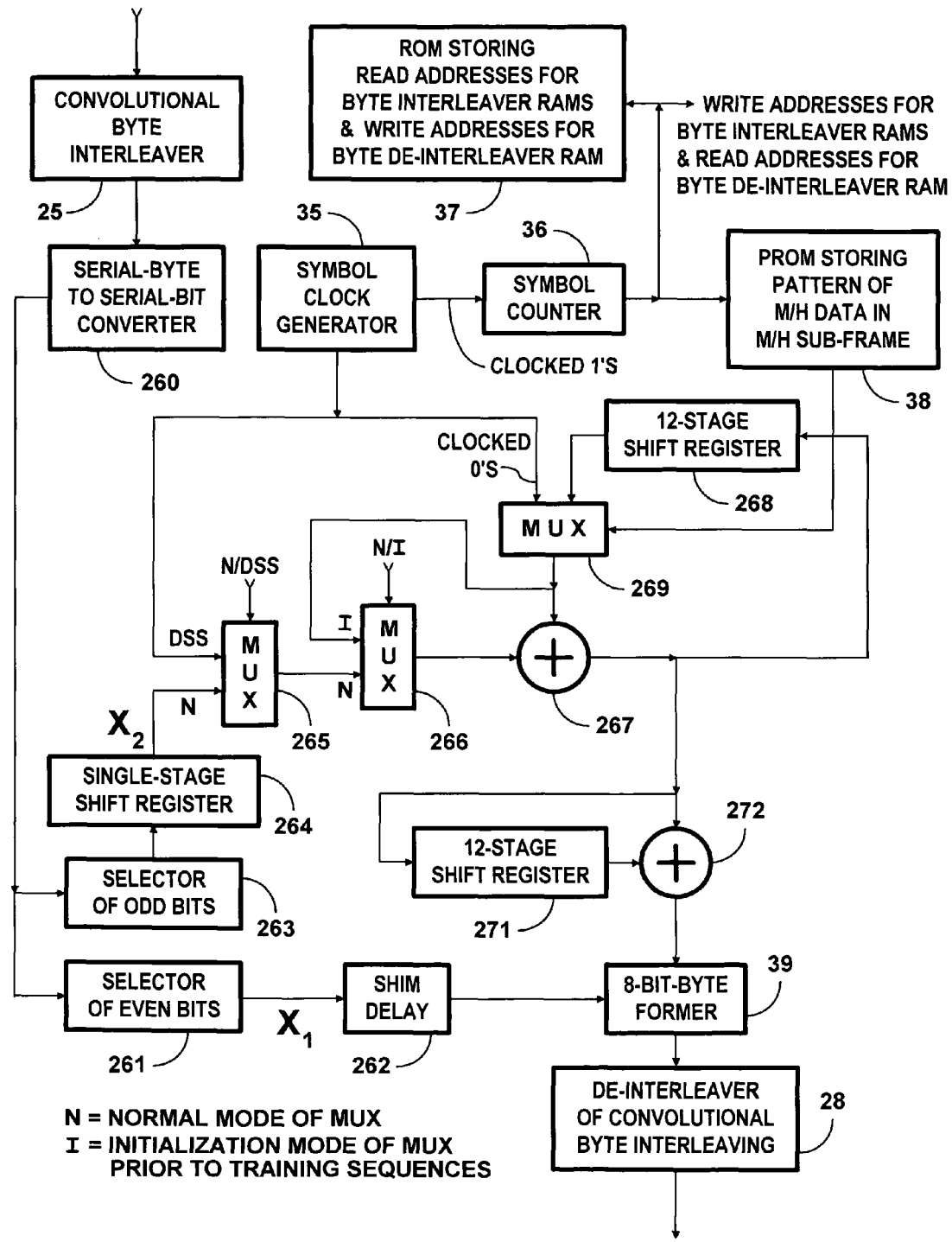
FIG. 3 is a schematic diagram showing in more detail the switched interference-filter pre-coder for only the X-sub-2 bits of main-service data and the post-comb filter used in the FIG. 2 M/H post-processor.

FIG. 3 shows in more detail representative constructions of the switched interference-filter pre-coder 26 and of the post-comb filter 27 cascaded thereafter. The precoder 26 for the X-sub-2 bits of main-service data comprises elements 260-269. The post-comb filter 27 comprises a 12-stage shift register 271 and a modulo-2 adder 272 (which is an exclusive-OR gate). A symbol clock generator 35 generates clocked ONEs and clocked ZEROes during 8-VSB data segments. The clocked ONEs are applied to a symbol counter 36 that counts the symbols in each M/H sub-Frame. This count is most convenient to use if made on a symbol-per-data-segment and data-segment-per-M/H-sub-Frame basis, since such count can be used with suitable delays as write addressing of respective random-access memories (RAMs) within the byte interleavers 21, 25 and 30. With suitable delay, such count can also be used as read addressing of random-access memory (RAM) within the byte de-interleavers 23 and 28. Portions of the count from the symbol counter 36 are applied as read addressing to a read-only memory 37 and as read addressing to a programmable read-only memory 38. With suitable delays, the response from the ROM 37 provides read addressing of the RAM within the byte de-interleavers 23 and 28. With suitable delays, the response from the ROM 37 provides write addressing of the respective RAMs within the byte interleavers 21, 25 and 30. With suitable delay, the response from the PROM 38 maps the pattern of M/H data symbols within each M/H sub-Frame to control the selective precoding of the X-sub-2 bits of main-service data by the interference-filter pre-coder 26. The programmability of the PROM 38 permits the broadcaster to change the number of M/H Groups per M/H sub-Frame.

More particularly, the PROM 38 stores a pattern of ONEs and ZEROes descriptive of the pattern of M/H-service and main-service 8-VSB symbols in an M/H sub-Frame. The pattern of ONEs and ZEROes descriptive of the pattern of M/H-service and main-service 8-VSB symbols in an M/H sub-Frame is read from the PROM 38 for controlling the operation of the pre-coder 26 in the M/H post processor 5 as shown in FIG. 2. Since the pattern changes only at boundaries between bytes, the size of the PROM 38 can be reduced if byte pattern information, rather than symbol pattern information, is stored therein. If the PROM 38 is reduced in size by storing byte pattern information, the two least significant bits of the symbol count from the symbol counter 35 are not included in the input addressing applied to the PROM 38.

The convolutional byte interleaver 25 is connected for applying successive eight-bit bytes of its response to the input port of a byte-to-bit converter 260 for conversion to serial-bit format at the input of the pre-coder 26. A selector 261 is connected for selectively reproducing just the even-occurring X-sub-1 bits from the serial-bit response of the byte-to-bit converter 260. These X-sub-1 bits are forwarded via shim delay 262 to an 8-bit byte former 39 to be bit-interleaved with processed X-sub-2 bits from the post-comb filter 27 as a preparatory step in forming 8-bit bytes for application to the byte de-interleaver 28. A selector 263 is connected for selectively reproducing just the odd-occurring X-sub-2 bits from the serial-bit response of the byte-to-bit converter 261. The selector 263 is connected for applying the reproduced X-sub-2 bits to the input port of a single-stage shift register 264. The output port of the shift register 264 is connected for applying the reproduced X-sub-2 bits to a first of two input ports of a multiplexer 265, which port is labeled 'N' in FIG. 3. The single-stage shift register 264 delays X-sub-2 bits selected from the serial-bit response of the byte-to-bit converter 260 for better aligning them temporally with X-sub-1 bits selected from that serial-bit response. A second of the two input ports of the multiplexer 265, which port is labeled 'DSS' in FIG. 3, is connected for receiving clocked ZEROes generated by the symbol clock generator 35. The multiplexer 265 is conditioned by a control signal (labeled N/DSS in FIG. 3) to reproduce at an output port thereof two selected ones of these clocked ZEROes during each data segment synchronization (DSS) interval. At times other than DSS intervals, the multiplexer 265 is conditioned by its control signal to reproduce at its output port the X-sub-2 bits supplied to its first input port. The output port of the multiplexer 265 is connected to a first of two input ports of a multiplexer 266, which input port is labeled 'N' in FIG. 3. During normal operation the multiplexer 266 is conditioned by a normal/initialize (N/I) control signal to reproduce at its output port the multiplexer 265 response. The output port of the multiplexer 266 is connected for applying a first of two summand input signals applied to a modulo-2 adder 267 (which is an exclusive-OR gate). The modulo-2 adder 267 is connected for applying a serial-bit sum output signal therefrom to the post-comb filter 27.

The modulo-2 adder 267 is also connected for applying its serial-bit sum output signal to the input port of a 12-stage shift register 268. The output port of the 12-stage shift register 268 is connected to one of two input ports of a multiplexer 269, the output port of which is connected for supplying a second of the two summand input signals applied to the modulo-2 adder 267. The other input port of the multiplexer 269 is connected for receiving ZERO bits clocked at symbol rate from the symbol clock generator 35. When the multiplexer 269 receives a control signal conditioning it to reproduce the serial-bit sum output signal of the adder 267 as delayed by the 12-stage shift register 268, the bits supplied to the post-comb filter 27 are pre-coded. When the multiplexer 269 receives a control signal conditioning it to reproduce the clocked ZEROes supplied from the symbol clock generator 35, the bits supplied to the post-comb filter 27 are not pre-coded. Rather, they are identical to the X-sub-2 bits supplied from the output port of the multiplexer 269.

FIG. 3 shows the modulo-2 adder 267 connected for applying the selectively pre-coded X-sub-2 bits of its serial-bit sum output signal to the input port of a 12-stage shift register 271 in the post-comb filter 27. The output port of the 12-stage shift register 268 is connected for supplying delayed response to the adder 267 sum output signal as one of the two summand input signals of the modulo-2 adder 272 in the post-comb filter 27. The adder 267 is connected for applying its sum output signal to the modulo-2 adder 272 as the second of the two summand input signals thereof. The adder 272 is connected for applying the selectively post-comb-filtered X-sub-2 bits of its serial-bit sum output signal to the 8-bit byte former 39 to be bit-interleaved with X-sub-1 bits forwarded via shim delay 263. The byte former 39 forms 8-bit bytes from the results of this bit-interleaving, which bytes are supplied to the byte de-interleaver 28 as input signal thereto.

The shift registers 268 and 271 are continuously clocked at symbol epoch rate throughout data fields, even during the data-segment synchronization (DSS) intervals. The FIG. 3 arrangement can be modified to omit the shift register 271. The response of the 12-stage shift register 268 is then applied as the first summand input signal of the modulo-2 adder 272 instead of the response of the 12-stage shift register 271 being so applied. One skilled in the art of designing electronics will recognize that the 12-phase trellis coding procedures can be carried out using commutated operation of twelve single-phase encoders, rather than by a single 12-phase encoder as depicted in FIG. 3. Such equivalent circuitry is more similar to the trellis encoders described in A/53 and in A/153.

Figure 4:
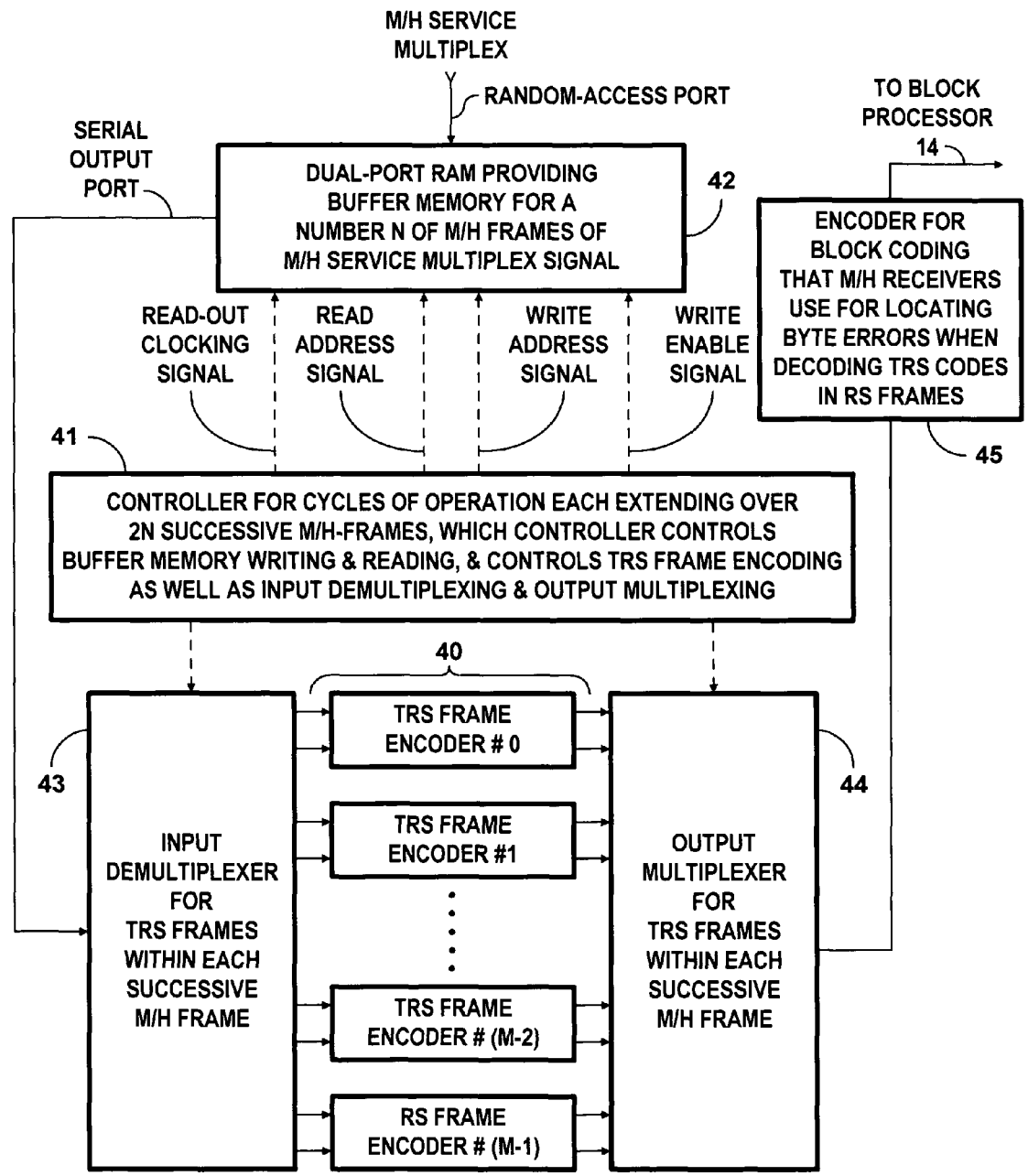
FIG. 4 is a detailed schematic diagram of a representative embodiment of the M/H Frame encoder used in the FIG. 1 DTV transmitter apparatus, which M/H Frame encoder is depicted in combination with buffer memory that supports iterative-diversity transmissions and an encoder for lateral block coding that can be used to locate byte errors for the TRS decoding in an M/H receiver.

FIG. 4 depicts in some detail a particular form for the M/H Frame encoder 13 of the FIG. 1 DTV transmitter apparatus, which includes a set 40 of TRS Frame encoders. This set 40 preferably includes as many TRS Frame encoders as there can be Parades in two M/H Frames—that is, 32, twice as many as in the M/H Frame encoder described in A/153. A controller 41 is included in the FIG. 4 M/H Frame encoder 13 for controlling its operations, including those of the TRS Frame encoders in the set 40 of them.

The FIG. 4 M/H Frame encoder 13 further includes a dual-port random-access memory 42 connected to provide buffer memory for the Ensembles of M/H Service Multiplex data supplied as input signals to an input de-multiplexer 43 for distribution to the set 40 of TRS Frame encoders. The RAM 42 has the temporary storage capability to store the Ensembles of M/H Service Multiplex data for a number P at least one of successive M/H Frames. Ensembles of M/H Service Multiplex data are applied to the random-access port of the RAM 42 and are written into temporary storage locations therein in accordance with write address and write enable signals generated within the controller 41 and supplied to the RAM 42. Read-out clocking signal is generated within the controller 41 and is supplied to the RAM 42 for clocking the read-out of successive Ensembles of M/H Service Multiplex data. These successive Ensembles of M/H Service Multiplex data are read to respective ones of the set 40 of TRS Frame encoders as selected by the input de-multiplexer 43 under the direction of the controller 41. A (partial) read addressing signal is generated within the controller 41 and is supplied to the RAM 42 for selecting the temporarily stored Ensembles of M/H Service Multiplex data to be clocked out through the RAM 42 serial output port to the input port of the input de-multiplexer 43. The RAM 42 allows the Ensembles of M/H Service Multiplex data temporarily stored therewithin to be read via its serial port with timing that facilitates the random-access memories within the set 40 of TRS Frame encoders being over-written during reading therefrom.

The Ensembles of M/H Service Multiplex data that are read from the serial output port of the RAM 42 are applied as input signals to the input de-multiplexer 43. The input de-multiplexer 43 is further connected for distributing those M/H Ensembles to the set 40 of TRS Frame encoders as their respective input signals. This distribution is controlled by respective control signals that the controller 41 generates and supplies to the input de-multiplexer 43. An output multiplexer 44 for RS sub-Frames is connected for time-division multiplexing sub-Frame responses from the set 40 of TRS Frame encoders for application to the input port of an encoder 45 for block coding. This time-division multiplexing is controlled by respective control signals that the controller 41 generates and supplies to the output multiplexer 44.

The encoder 45 generates lateral block coding that M/H receivers can use for locating byte errors when decoding TRS codes in RS Frames. This byte-error-locating coding is CRC coding, for example, or is lateral Reed-Solomon (LRS) forward-error-correction (FEC) coding, by way of an alternative example. In a departure from the practice described in A/153 the encoder 45 generates lateral codewords of uniform length. This allows the single encoder 45 to generate the lateral block coding for all RS Frames, irrespective of whether they are primary RS Frames or are secondary RS Frames. The output port of the encoder 45 is connected for supplying two-dimensionally coded RS Frame data as input signal for the block processor 14.

The output multiplexer 44 for reading from the set 40 of RS Frame encoders is operated to provide RS Frame portion to CCC Block conversion for the block processor 14. Considering the operation of the output multiplexer 44 more generally, it converts RS Frame portions to concatenated-convolutional-coding (CCC) Blocks, which CCC Blocks may be considered as being either SCCC Blocks or PCCC Blocks, depending upon the subsequent processing of these CCC Blocks by the block processor 14.

The controller 41 is designed to be capable of conducting the writing and reading of the RAM 42 so as to support iterative-diversity transmissions when the RAM 42 is capable of storing the Ensembles of M/H Service Multiplex for several M/H Frames. That is, when the number P of stored M/H Frames of data is apt to be as large as up to thirty-two or so. Each Ensemble of M/H Service Multiplex data is read a first time from the RAM 42 to a respective one of the set 40 of TRS Frame encoders to be processed for its first transmission earlier in time than a second transmission of that same Ensemble. Each Ensemble of M/H Service Multiplex data is subsequently read a second time from the RAM 42 to a respective one of the set 40 of RS Frame encoders to be processed for its second transmission later in time than the first transmission of that same Ensemble. These first and second transmissions can be separated by almost as much as P M/H Frames. The separation is not an integral number of M/H Frames, however, at least usually. Therefore, each M/H Frame can contain M/H Groups used for transmitting earlier components of the iterative-diversity transmissions and can further contain M/H Groups used for transmitting later components of the iterative-diversity transmissions. Respective transmissions of the two types of M/H Groups are staggered within each M/H sub-Frame.

The separation between the first and second transmissions can be as little as only one Slot. Alternatively, the separation between the first and second transmissions can be just two Slots or can be just three Slots. Iterative-diversity transmissions of one-third-code-rate CCC signals with such small separations between the first and second transmissions are preferable to single-time transmissions of one-sixth-code-rate CCC signals as permitted by A/153. Iterative-diversity transmissions of one-third-code-rate CCC signals with such small separations can use much the same apparatus for turbo decoding used for iterative-diversity transmissions of one-third-code-rate CCC signals with larger separation. There is no need for additional apparatus to implement turbo decoding of single-time transmissions of one-sixth-code-rate CCC signals. Furthermore, iterative-diversity transmissions of one-third-code-rate CCC signals are more likely to be successfully decoded despite impulse noise than are single-time transmissions of one-sixth-code-rate CCC signals.

Figure 5:
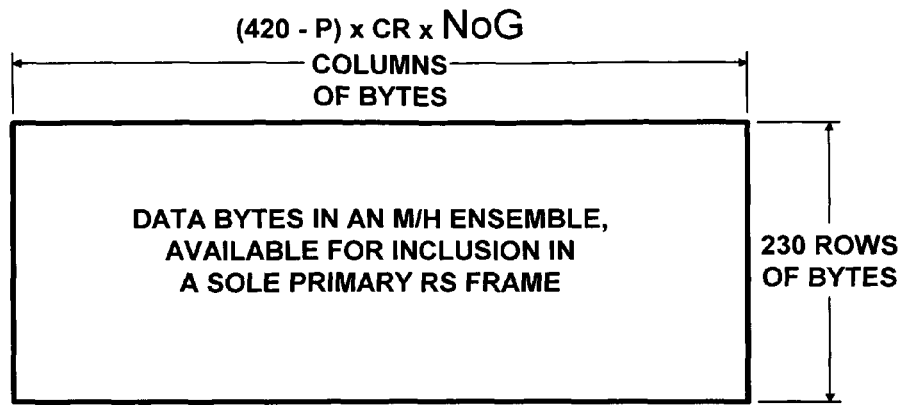
FIG. 5 is a diagram depicting the size of an Ensemble that is available for packing a primary RS Frame unaccompanied by a secondary RS Frame.

FIG. 5 depicts the size of a primary RS Frame unaccompanied by a secondary RS Frame that is needed for temporarily storing an M/H Ensemble. The number of coded bytes respectively associated with each M/H Group is preferably a multiple of four. Then, an integral number of bytes of one-quarter-rate or one-half-rate outer convolutional codes will fit within the M/H Group, with no bytes being split between two M/H Groups. It is desirable to pack the byte epochs available for data in the M/H Groups as fully as possible and to minimize the number of those byte epochs left over which will be filled with "stuffing" bytes. The number of columns of bytes in an primary RS Frame unaccompanied by a secondary RS Frame is accordingly preferably a multiple of TNoG, the total number of M/H Groups per M/H Frame in the M/H Parade that will fill that RS Frame. Up to 19,359 bytes of coded primary RS Frame can be accommodated within each M/H Group if the A/153 dummy bytes and the third bytes of MHE packets are replaced with data bytes. This is described in detail in No. 12/924,074 filed 20 Sep. 2010.

Preferably, the transverse Reed-Solomon (TRS) codewords are a multiple of five bytes long, with one-fifth of the bytes in the RS Frame being transmitted in each M/H sub-Frame with as few bytes left over as possible. Preferably, each M/H Group should contain the same number of complete codewords of the block coding used for locating erroneous bytes for decoding TRS coding, with as few bytes left over as possible. The inventor found it advantageous to use transverse Reed-Solomon (TRS) codewords that are 230 bytes long. Dividing the 9,679 bytes from an M/H Group coded at one-half the 8-VSB symbol rate by 230/5=46 means codewords of the lateral block coding used for locating erroneous bytes can each consist of 210 bytes. There are 19 bytes left over. This allows a few isolated bytes at the beginning and the end of the M/H Group to be ignored. Then, the primary RS Frame unaccompanied by a secondary RS Frame has 230 rows of bytes, with (420−P) times CR times NoG bytes in each row. P is the number of checksum or parity bytes included in 420 consecutive bytes of the outer convolutional coding of the CCC, CR is the code rate of that outer convolutional coding, and NoG is the number of M/H Groups per M/H sub-Frame in the M/H Ensemble.

The weakest of the 230-byte TRS codewords can use (230, 206) coding designed to overcome a drop-out in received signal strength that extends over somewhat more than an M/H sub-Frame. The strongest of the 230-byte TRS codewords can use (230, 182) coding designed to overcome a drop-out in received signal strength that extends over somewhat more than two M/H sub-Frames. Intermediate-strength (230, 194) TRS coding can also be used.

If the code rate of the outer coding of the CCC is one half, the primary RS Frame unaccompanied by a secondary RS Frame is suited to be used with an encoder 45 that generates lateral block coding with codewords that are a 210 bytes long or a submultiple of 210 bytes long. The encoder 45 can generate shortened 255-byte-long lateral Reed-Solomon coding that has 210-byte length codewords, for example, and this LRS coding can be systematic. In the M/H receiver the parity bytes of the 210-byte LRS codewords can be retained in the turbo decoding results written row by row to byte-organized framestore memory for a 2-dimensionally coded RS Frame. Such framestore memory temporarily stores 230 successive rows of bytes each containing 210 successive bytes. The parity bytes of the LRS coding will occupy only selected columns of the byte-storage locations arrayed within the byte-organized framestore memory, to the exclusion of data bytes and TRS parity bytes in those selected columns of byte-storage locations. The data bytes in each of the columns of byte-storage locations can be read to a decoder for TRS decoding, and the results of that TRS decoding can be written back to the column of byte-storage locations. The LRS codewords in each of the rows of byte-storage locations can be decoded again to further correct IP information encapsulated within the LRS codewords or to verify the correctness of that IP information.

If the code rate of the outer coding of the CCC is one quarter, the primary RS Frame unaccompanied by a secondary RS Frame is suited to be used with an encoder 45 that generates shortened 255-byte-long Reed-Solomon coding with 210-byte codewords, but preferably is non-systematic. Parity bytes are positioned similarly in the initial and final halves of each 210-byte-long non-systematic LRS codeword. This enables an M/H receiver to write the turbo decoding results to byte-organized framestore memory for a 2-dimensionally coded RS Frame such that LRS parity bytes occupy only selected columns of the byte-storage locations, to the exclusion of data bytes and TRS parity bytes. This facilitates TRS decoding and subsequent LRS decoding procedures similar to those that the preceding paragraph describes for the code rate of the outer coding of the CCC being one half.

Figure 6:
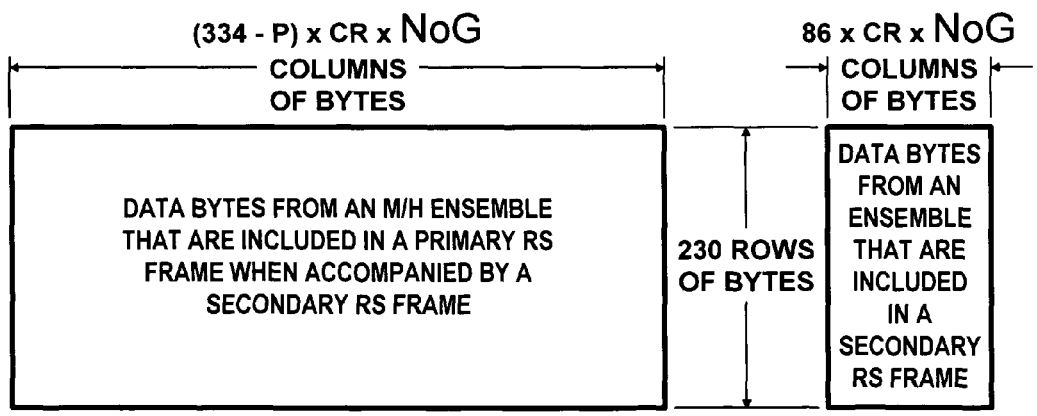
FIG. 6 is a diagram depicting the relative sizes of a primary RS Frame and an accompanying secondary RS Frame.

FIG. 6 illustrates the relative sizes of a primary RS Frame and an accompanying secondary RS Frame. Each of the primary and secondary RS Frames has 230 rows of bytes therein. FIG. 6 shows the primary RS Frame having (334−P) times CR times NoG bytes in each row and the secondary RS Frame having 86 times CR times NoG bytes in each row. This restricts the code rate of the outer convolutional coding of the CCC to being one half if NoG is allowed to be odd, since it is necessary that there be an integral numbers of columns of bytes in the RS Frames. If the outer convolutional coding of the CCC is one quarter code rate, the secondary RS Frame is increased in size to have 88 times CR times NoG bytes in each row. The primary RS Frame is then reduced in size to have only (332−P) times CR times NoG bytes in each row.

At the beginning of each M/H Group, the outer convolutional coding of the CCC conveys CR times 2068 bytes of M/H data from a respective portion of the secondary RS Frame depicted in FIG. 6. This includes all the M/H data that are conveyed by outer convolutional coding in Blocks B1 and B2 of the M/H Group. At the conclusion of each M/H Group, the outer convolutional coding of the CCC conveys CR times 1892 bytes of M/H data from a subsequent respective portion of the secondary RS Frame depicted in FIG. 6. This includes all the M/H data which are conveyed by outer convolutional coding in Blocks B9 and B10 of the M/H Group. During the intervening Blocks B3, B4, B5, B6, B7, and B8 of each M/H Group, the outer convolutional coding of the CCC conveys CR times 46(334−P) bytes of M/H data from a respective portion of the primary RS Frame depicted in FIG. 6.

Figure 7:
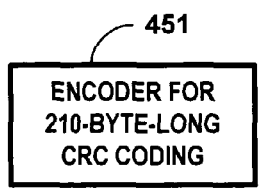
FIG. 7 is a depiction of an encoder for 210-byte-long cyclic redundancy check (CRC) coding that is used as the encoder for lateral block coding in a first embodiment of the FIG. 4 M/H Frame encoder.

FIG. 7 depicts an encoder 451 for 210-byte-long cyclic redundancy check (CRC) coding that is used as the encoder 45 for lateral block coding in a first embodiment of the FIG. 4 M/H Frame encoder. The 2-byte checksums in the 210-byte-long CRC codewords result in P, the number P of checksum or parity bytes in 420 bytes, being four. The 2-byte checksums exact a little less than 1 percent coding overhead from these 210-byte-long CRC codewords, forty-six of which are included in each M/H Group, presuming a one-half code rate for the outer convolutional coding of the CCC. If a respective pair of CRC checksum bytes at the end of each of the 210-byte-long CRC codewords is forwarded to byte-organized framestore memory as part of the turbo decoding results, those pairs of CRC checksum bytes can automatically fill columns of bytes. However, such result is conditioned on the framestore being arranged to store a primary RS Frame that was transmitted without an accompanying secondary RS Frame. In actual practice the CRC checksums are apt not to be forwarded to byte-organized framestore memory as part of the turbo decoding results. Instead, byte extensions are forwarded to byte-organized framestore memory to be used to indicate probably erroneous bytes for TRS decoding. This practice facilitates the loading of framestore memories for secondary RS Frames and for primary RS Frames that were accompanied by secondary RS Frames.

This practice also permits the forty-six 210-byte-long CRC codewords per M/H Group to be replaced by twenty-three 420-byte-long CRC codewords per M/H Group. The 2-byte checksums exact a little less than ½ percent coding overhead from these 420-byte-long CRC codewords. Alternatively, the forty-six 210-byte-long CRC codewords per M/H Group could be replaced by twenty-one 460-byte-long CRC codewords, or even by seven 1140-byte-long CRC codewords. However, shorter CRC codewords should provide more precise location of byte errors for TRS decoding. Also, they are apt to be better at speeding up turbo decoding procedures as bit error rate (BER) becomes quite low.

Figure 8:
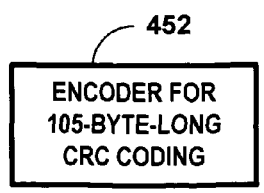
FIG. 8 is a depiction of an encoder for 105-byte-long cyclic redundancy check (CRC) coding that is used as the encoder for lateral block coding in a second embodiment of the FIG. 4 M/H Frame encoder.

FIG. 8 depicts an encoder 452 for 105-byte-long cyclic redundancy check (CRC) coding that is used as the encoder 45 for lateral block coding in a second embodiment of the FIG. 4 M/H Frame encoder. The 2-byte checksums in the 105-byte-long CRC codewords result in P, the number P of checksum or parity bytes in 420 bytes, being eight. The 2-byte checksums exact almost 2 percent coding overhead from these 105-byte-long CRC codewords, ninety-two of which are included in each M/H Group, presuming a one-half code rate for the outer convolutional coding of the CCC. If a respective pair of CRC checksum bytes at the end of each of the 105-byte-long CRC codewords is forwarded to byte-organized framestore memory as part of the turbo decoding results, those pairs of CRC checksum bytes can automatically fill columns of bytes. However, such result is conditioned on the framestore being arranged to store a primary RS Frame that was transmitted without an accompanying secondary RS Frame.

Even shorter 70-byte-long or 35-byte-long CRC codewords could be used, but the coding overhead becomes substantial. If these larger coding overheads are to be suffered, it is preferable to use coding that can correct byte errors in addition to locating them for TRS coding. Correction of occasional byte errors within the turbo decoding procedures can reduce the number of iterations of the turbo decoding cycle required to get low-error results from the turbo decoding procedures. While error-correcting codes that correct errors amongst bits might also provide a basis for locating byte errors, Reed-Solomon codes are error-correcting codes that correct erroneous bytes very effectively with modest coding overhead.

Figure 9:
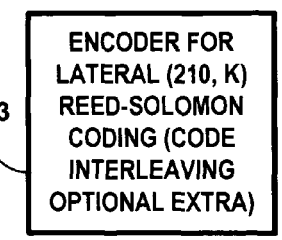
FIG. 9 is a depiction of an encoder for (210, K) lateral Reed-Solomon (LRS) coding that is used as the encoder for lateral block coding in a third embodiment of the FIG. 4 M/H Frame encoder.

FIG. 9 depicts an encoder 453 for (210, K) lateral Reed-Solomon (LRS) coding that is used as the encoder 45 for lateral block coding in a third embodiment of the FIG. 4 M/H Frame encoder. A preferred value of K is 190 with a 9.52 percent coding overhead. The inventor's preference for (210, 190) LRS coding is based in large part on its similarity to the somewhat more shortened (207, 187) RS coding already used in DTV. The twenty parity bytes in the 210-byte-long LRS codewords result in P, the number P of checksum or parity bytes in 420 bytes, being forty. Alternatively, a slightly stronger (210, 186) LRS code with 11.43 percent overhead is similar to the (211, 187) TRS code prescribed by A/153. The twenty-four parity bytes in these stronger 210-byte-long LRS codewords result in P, the number P of checksum or parity bytes in 420 bytes, being forty-eight. In any case (210−K), the number of parity bytes in each 210-byte-long LRS codeword is preferably even. Preferably, (210−K) is also of such value that complete 230-byte-long TRS codewords fill respective columns of byte-storage locations in a byte-organized memory for storing a primary RS Frame that was transmitted with an accompanying secondary RS Frame. This is done without any M/H data bytes being left over.

Designing the lateral block coder 45 so that it fits an integral number of codewords into each M/H Group exactly, or substantially so, facilitates the lateral block coding being used to improve turbo decoding procedures in an M/H receiver. The lateral block coding can be decoded during each cycle of CCC decoding procedure to determine whether or not further cycles of the CCC decoding procedure are likely further to reduce errors in the decoding results. If the collective results of decoding the lateral block codes indicate that in every block of the lateral coding within an M/H Group the turbo decoding results are substantially error-free, scheduled iteration of the CCC decoding procedure on the M/H Group can be curtailed to conserve operating power. If the individual results of decoding the lateral block codes indicate that turbo decoding results are substantially free of error in just selected blocks of the lateral coding within an M/H Group, the confidence levels of soft decoding results from those blocks can be increased. Subsequent cycles of the CCC decoding procedure can then be concentrated on those portions of the M/H Group known still to be in error. If error-correcting RS codes constitute the lateral block coding, the error correction they afford during each consecutive cycle of the CCC decoding procedure can speed up the elimination of remaining errors by the turbo decoding procedures.

It is intended that M/H receivers will employ an LRS decoder that decodes the (210, K) lateral Reed-Solomon (LRS) coding so as to detect erroneous bytes caused by occasionally occurring impulse noise and, if possible, correct those erroneous bytes. Preferably, such detection and correction is done during the course of turbo decoding, so the confidence levels of soft data bits from correct or corrected (210, K) LRS codewords can be increased to facilitate turbo decoding procedures. Decoding the (210, K) LRS coding before TRS decoding is advisable in any case. To the extent that erroneous bytes arising from occasionally occurring impulse noise can be corrected, there is less burden on the subsequent TRS decoding to correct erroneous bytes. Since the (210, K) LRS coding is primarily directed to detecting errors caused by occasionally occurring impulse noise and correcting them as much as possible, there is not much need for the transmitter to introduce byte interleaving directly following the (210, K) LRS coding. Such byte interleaving would accommodate each M/H receiver performing complementary byte de-interleaving before decoding the (210, K) LRS coding. Such de-interleaving would disperse longer-duration burst noise amongst several 210, K) LRS codeword and improve the chances of its correction by the decoder for (210, K) LRS coding. If the transmitter is to use byte interleaving together with (210, K) LRS coding, it is preferable that code interleaving or implied interleaving be used. Furthermore, the interleaving should be block interleaving in which an integral number of blocks fit exactly within each M/H Group. This facilitates decoding of the (210, K) LRS coding during the course of turbo decoding.

FIG. 10 shows in more detail the structure of an RS Frame encoder 400 that is a representative embodiment of RS Frame encoders in the set 40 of them. An M/H data randomizer 401 is connected for receiving as input signal thereto a primary Ensemble from the input multiplexer 43 of the M/H Frame encoder 13. The M/H data randomizer 401 is further connected for supplying its response to an 8-bit byte former 402, which forms 8-bit bytes of randomized M/H data to be written into rows of byte-storage locations in a byte-organized random-access memory 403. Thereafter, the byte-storage locations in the RAM 403 are read one partial column at a time to an encoder 404 for transverse Reed-Solomon coding, which generates parity bytes to write the remaining byte-storage locations in the column. This completes the primary TRS Frame stored within the RAM 403. Successive rows of the byte-storage locations in the RAM 403 are subsequently read from for supplying an input signal to the output multiplexer 44 of the M/H Frame encoder 13.

An M/H data randomizer 405 is connected for receiving as input signal thereto a secondary Ensemble from the input multiplexer 43 of the M/H Frame encoder 13. The M/H data randomizer 405 is further connected for supplying its response to an 8-bit byte former 406, which forms 8-bit bytes of randomized M/H data to be written into rows of byte-storage locations in a byte-organized random-access memory 407. Thereafter, the byte-storage locations in the RAM 407 are read one partial column at a time to an encoder 408 for transverse Reed-Solomon coding which generates parity bytes to write the remaining byte-storage locations in the column. This completes the secondary TRS Frame stored within the RAM 407. Successive rows of the byte-storage locations in the RAM 407 are subsequently read from for supplying an input signal to the output multiplexer 44 of the M/H Frame encoder 13.

FIG. 11 shows the bit order in the outer convolutional coding generated for SCCC responsive to a byte of data composed of successive bits $D_1$, $D_2$, $D_3$, $D_4$, $D_5$, $D_6$, $D_7$ and $D_8$ of data. The parity bits $P_1$, $P_2$, $P_3$, $P_4$, $P_5$, $P_6$, $P_7$ and $P_8$ succeed respective ones of the data bits $D_1$, $D_2$, $D_3$, $D_4$, $D_5$, $D_6$, $D_7$ and $D_8$ in the 2-bit symbols generated by the block processor 14 and ultimately supplied to the modified trellis encoder 32.

FIG. 12 shows the bit order in the outer convolutional coding generated for PCCC responsive to a byte of data composed of successive bits $D_1$, $D_2$, $D_3$, $D_4$, $D_5$, $D_6$, $D_7$ and $D_8$ of data. The parity bits $P_1$, $P_2$, $P_3$, $P_4$, $P_5$, $P_6$, $P_7$ and $P_8$ precede respective ones of the data bits $D_1$, $D_2$, $D_3$, $D_4$, $D_5$, $D_6$, $D_7$ and $D_8$ in the 2-bit symbols generated by the block processor 14 and ultimately supplied to the modified trellis encoder 32.

Figure 13:
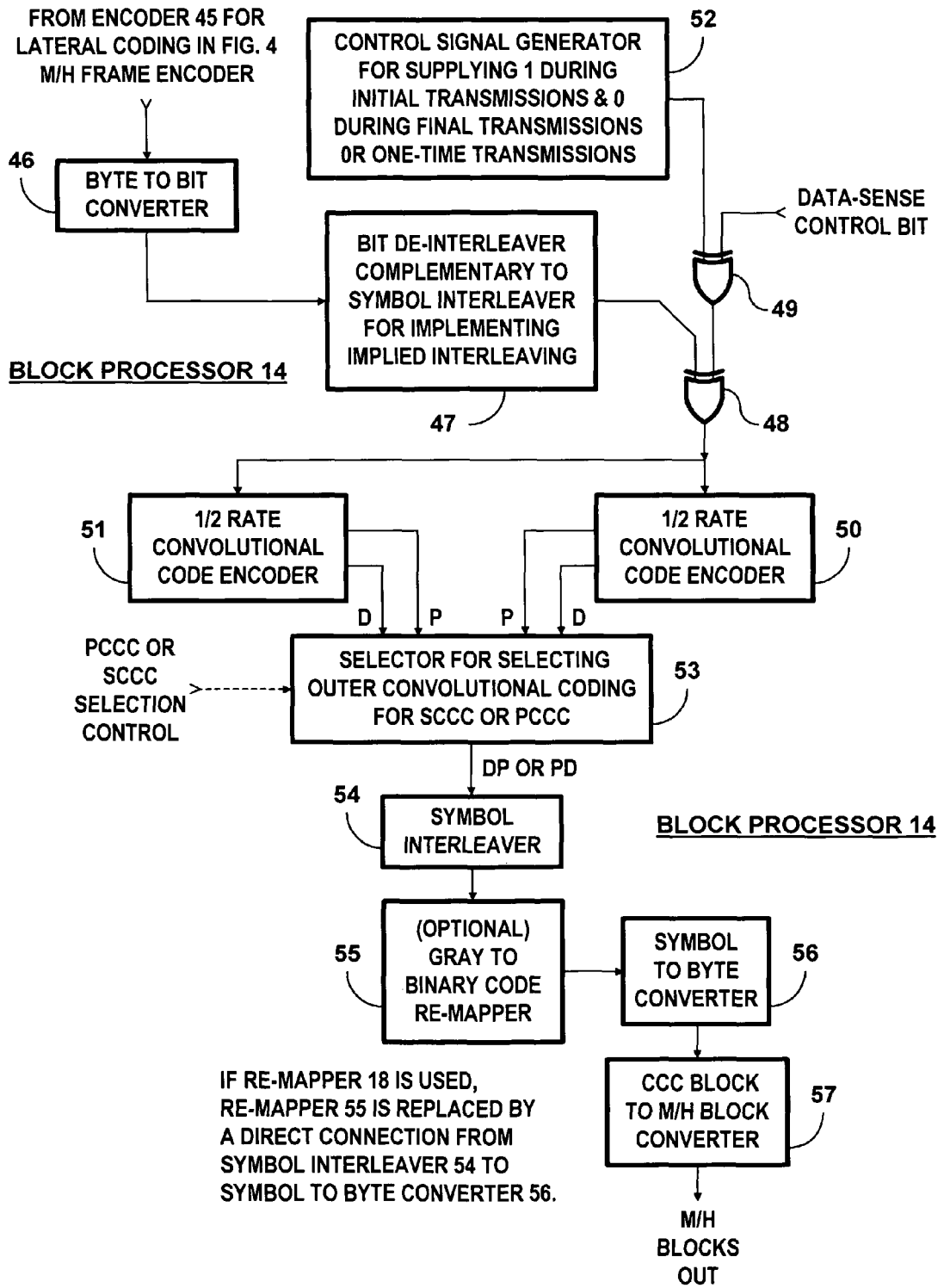
FIG. 13 is a detailed schematic diagram of a representative embodiment of the block processor in the FIG. 1 DTV transmitter apparatus.

FIG. 13 is a detailed schematic diagram of the novel block processor 14 in the FIG. 1 DTV transmitter apparatus. As noted supra the output multiplexer 44 and the encoder 45 in the FIG. 4 M/H Frame encoder 13 are operated to convert RS Frame Portions to CCC Blocks of TRS-coded and further block-coded M/H Service data. Either single M/H Blocks or pairs of M/H Blocks are converted into respective CCC Blocks of TRS-coded M/H Service data that are supplied to the encoder 45 for generating the block coding that M/H receivers use to locate byte errors when decoding TRS codes in RS Frames. The encoder 45 in the FIG. 4 M/H Frame encoder 13 is connected for supplying the codewords that it generates to a byte-to-bit converter 46 in the FIG. 13 block processor 14.

The byte-to-bit converter 46 is connected for supplying its bit-stream response to a prefatory data-bit de-interleaver 47 to be de-interleaved in accordance with a pattern complementary to that employed for 2-bit symbols in a symbol interleaver used in later processing. This is done to help implement "implied" or "coded" interleaving of outer convolutional coding for the CCC signal used for M/H transmissions. This type of interleaving and its benefit to decoding of TRS codewords are described in U.S. patent application Ser. No. 12/800,559. Interestingly, decoding of LRS coding as described herein also benefits from implied symbol interleaving in the CCC reducing the dispersal of bit errors caused by impulse noise. This helps reduce the number of bytes placed into error by a short-duration noise pulse.

It is expected that each M/H receiver for the M/H broadcasting system disclosed herein will include a re-interleaver complementary to the prefatory data-bit de-interleaver 47, which re-interleaver succeeds a decoder for outer convolutional coding and precedes a decoder for the block coding introduced by the encoder 45 in the FIG. 4 M/H Frame encoder 13. This re-interleaver disperses any running error from the decoder for outer convolutional coding, which helps the decoding of LRS coding that the encoder 45 generates in some embodiments of the FIG. 4 M/H Frame encoder 13.

An exclusive-OR gate 48 has a first input port connected for receiving the de-interleaved 2-dimensionally-coded M/H-service data that the bit de-interleaver 47 generates and has a second input port connected for receiving the response of another exclusive-OR gate 49. The XOR gate 48 has an output port connected for supplying input signal for an encoder 50 for one-half-rate convolutional coding and for supplying input signal for an encoder 51 for one-half-rate convolutional coding. One input port of the XOR gate 49 is connected for receiving a control signal from a control signal generator 52, and the other input port of the XOR gate 49 is connected for receiving a DATA-SENSE CONTROL bit. This DATA-SENSE CONTROL bit is a logic ZERO, except in selected ones of cooperating transmitters that broadcast the same material in different DTV channels.

The control signal generator 52 generates a logic ONE control signal when the de-interleaved 2-dimensionally-coded M/H Service data from the bit de-interleaver 47 is to be transmitted as the initial part of an iterative-diversity transmission. If the DATA-SENSE CONTROL bit is a logic ZERO, the XOR gate 49 response is a logic ONE. This logic ONE conditions the XOR gate 48 to generate a response that ones' complements the de-interleaved 2-dimensionally-coded M/H-service data received from the bit de-interleaver 47. If the DATA-SENSE CONTROL bit is a logic ONE, the XOR gate 51 response is a logic ZERO. This logic ZERO conditions the XOR gate 48 to reproduce in its own response the de-interleaved 2-dimensionally-coded M/H-service data received from the bit de-interleaver 47.

The control signal generator 52 generates a logic ZERO control signal when the de-interleaved 2-dimensionally-coded M/H-service data received from the bit de-interleaver 47 is to be transmitted as the final part of an iterative-diversity transmission or is to be transmitted only a single time. If the DATA-SENSE CONTROL bit is a logic ZERO, the XOR gate 49 response is a logic ZERO. This ZERO conditions the XOR gate 48 to generate a response that reproduces the de-interleaved 2-dimensionally-coded M/H-service data received from the bit de-interleaver 47. If the DATA-SENSE CONTROL bit is a logic ONE, the XOR gate 49 response is a logic ONE. This logic ONE conditions the XOR gate 48 to generate a response that ones' complements the de-interleaved 2-dimensionally-coded M/H-service data received from the bit de-interleaver 47. The XOR gate 48 response is supplied as input signal to both of the encoders 50 and 51 for one-half-rate convolutional coding. The encoder 50 responds to this input signal to generate 2-bit symbols in which the parity bit precedes the data bit, supplying outer convolutional coding for PCCC. The encoder 51 responds to this input signal to generate 2-bit symbols in which the data bit precedes the parity bit, supplying outer convolutional coding for SCCC.

The set of parity bits in the final-transmission component of an iterative-diversity transmission differs from the set of parity bits in the initial-transmission component of the iterative-diversity transmission. Despite the M/H data having been randomized, there will be times that the respective convolutional coding generated by each of the encoders 50 and 51 will tend to be sparsely populated by ONEs. Outer convolutional coding that has a sparse population of ONEs tends to give rise to less powerful CCC. A desirable feature of an iterative-diversity transmission is for the outer convolutional coding of one of those transmissions to be densely populated by ONEs at times corresponding to the times that the outer convolutional coding of the other of those transmissions is sparsely populated by ONEs. If there are portions of the de-interleaver 48 response that are only sparsely populated by ONEs, the ones' complemented de-interleaver 48 response will be densely populated by ONEs. The outer convolutional coding that the encoders 50 and 51 generate in response to this denser population of ONEs will tend to be less under-populated by ONEs than that generated by the encoders 50 and 51 in response to the non-complemented response of the bit de-interleaver 48. If there are portions of the ones' complemented de-interleaver 48 response that are only sparsely populated by ONEs, the non-complemented de-interleaver 48 response will be densely populated by ONEs. The outer convolutional coding that the encoders 50 and 51 generate in response to this denser population of ONEs will tend to be less under-populated by ONEs than that generated by the encoders 50 and 51 in response to the ones' complemented response of the bit de-interleaver 48.

FIG. 13 shows a selector 53 having first and second input ports connected for receiving outer convolutional coding from the encoder 50 and from the encoder 51, respectively. The selector 53 has an output port at which the outer convolutional coding received from a selected one of the encoders 50 and 51 is reproduced for application to the input port of a symbol interleaver 54. FIG. 13 shows a connection for supplying PCCC OR SCCC SELECTION CONTROL signal to the selector 53 for controlling this selection. It is presumed that eventually in actual practice one of the encoders 50 and 51 will be omitted from M/H transmitters together with the selector 53. In such case the output port of the remaining one of the encoders 50 and 51 will be connected to the input port of a symbol interleaver 54.

FIG. 13 shows the output port of the symbol interleaver 54 connected for supplying the output symbols in its symbol-interleaved response to the input port of a Gray-to-binary-code re-mapper 55. The re-mapper 55 Gray-code labels the symbol-interleaved outer convolutional coding that is supplied as natural-binary-coded response to a symbol-to-byte converter 56 for conversion to 8-bit bytes for being written into a byte-organized random-access memory operated as a CCC Block to M/H Block converter 57. The order of cascade connection of the symbol interleaver 54 and the Gray-to-binary-code re-mapper 55 can be reversed without affecting overall operation of the M/H transmitter.

FIG. 1 shows the possible connection of the Gray-to-binary-code re-mapper 18 following the M/H Group formatter 15. The Gray-to-binary-code re-mapper 18 can be operated to re-map symbols of the TPC and FIC signaling as well as the symbols of M/H data. If in such an alternative procedure the Gray-to-binary-code re-mapper 18 performs the Gray-to-binary-code re-mapping, the Gray-to-binary-code re-mapper 55 is replaced by a direct connection from the output port of the symbol interleaver 54 to the input port of the symbol-to-byte converter 56. The Gray-to-binary-code re-mapper 55 is also replaced by a direct connection from the output port of the symbol interleaver 54 to the input port of the symbol-to-byte converter 56 if the symbol-interleaved outer convolutional coding is conveyed by 8-VSB symbols without the use of Gray-code labeling.

M/H Blocks are read from the byte-organized RAM operable as the CCC Block to M/H Block converter 57 shown in FIG. 13 to the Group formatter 15 shown in the FIG. 1 general schematic diagram. The Group formatter 15 in the FIG. 1 DTV transmitter apparatus is operated for placing the initial and final transmissions of data for iterative-diversity reception into different sets of Slots within M/H sub-Frames. The general principle for delaying the final transmissions from the corresponding initial transmissions is that the delay is always the same, being an integral number of M/H Frames plus or minus an integral number of Slots. By way of illustration this integral number of M/H Frames is ten, which provides for withstanding drop-outs in received signal strength that are almost a second in duration. As noted earlier in this specification, the integral number of M/H Frames can be zero to provide a replacement for CCC that employs one-quarter-rate outer convolutional coding. The initial and final transmissions of coded M/H-service data for iterative-diversity reception are positioned within different sets of Slots within each M/H sub-Frame, preferably as described further on in this specification with reference to FIGS. 17-24.

Figure 14:
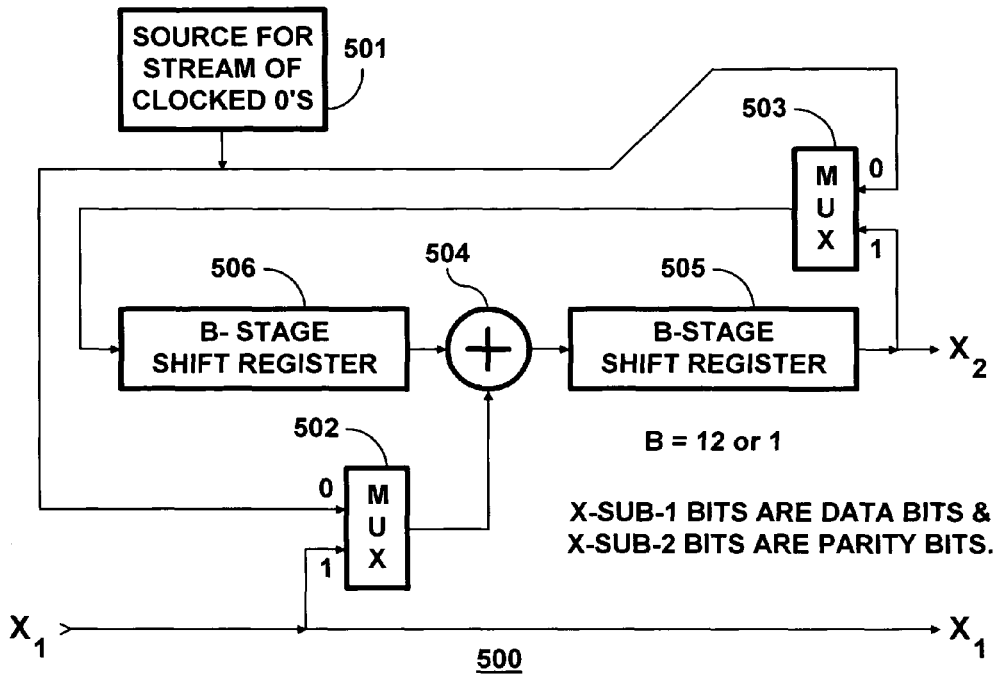
FIG. 14 is a detailed schematic diagram of a representative encoder of half-rate outer convolutional coding that the FIG. 13 embodiment of the block processor can use for generating PCCC.

FIG. 14 details a representative general construction 500 of the FIG. 13 encoder 50 for generating half-rate outer convolutional coding for PCCC. The construction 500 includes a source of ZEROes 501 clocked at 8-VSB symbol rate to the respective first input ports of time-division multiplexers 502 and 503, each of which has a respective pair of input ports. The second input port of the multiplexer 502 is connected for receiving the X-sub-1 bits of M/H data. The response from the multiplexer 502 is applied as a first summand input signal to a clocked modulo-2 adder 504, which essentially comprises a two-input exclusive-OR gate. The sum output response from the adder 504 is subjected to B bits of delay from a shift register 505 before its application to the second input port of the multiplexer 503. The response from the multiplexer 503 is subjected to B bits of delay from a shift register 506 before its application to the clocked modulo-2 adder 504 as a second summand input signal. FIG. 14 shows the shift register 505 response supplying X-sub-2 parity bit responses to successive X-sub-1 M/H data bits. The number B of bits of delay that each of the shift registers 505 and 506 provides can be essentially one, as A/153 prescribes for an encoder generating half-rate outer convolutional coding for SCCC. However, if the number B of bits of delay that each of the shift registers 505 and 506 provides is twelve, the M/H receiver apparatus can use the same decoding apparatus on a staggered time basis both for decoding inner convolutional coding and for decoding outer convolutional coding. This is feasible because there is no interference-filter precoding of the most significant bits of 8-VSB symbols conveying M/H data.

Usually, the time-division multiplexers 502 and 503 respond to their respective input signals as received at the second ones of their respective input ports. When the M/H coding of a portion of an RS Frame included within an M/H Group concludes, there is a zero-flushing procedure for sweeping out the stored contents of the shift registers 505 and 506. During each such zero-flushing procedure, which lasts for twenty-four 8-VSB symbol epochs, the time-division multiplexers 502 and 503 respond to the clocked ZEROes as received at the first ones of their respective input ports.

Figure 15:
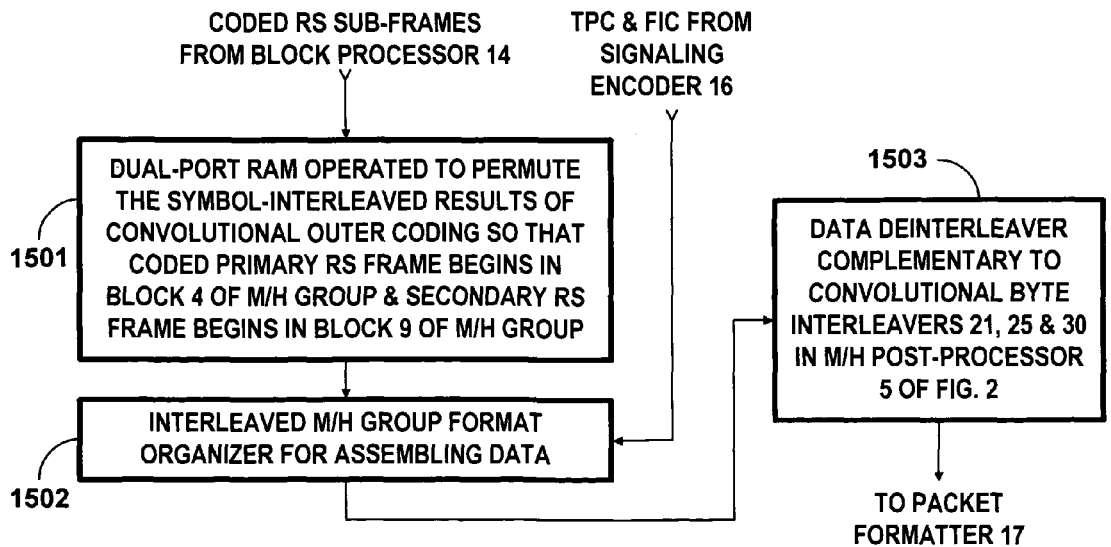
FIG. 15 is a schematic diagram of a representative embodiment of the M/H Group processor employed in the FIG. 1 DTV transmitter apparatus, which embodiment of the M/H Group processor includes random-access memory operable to permute the positioning of RS Frames within M/H Groups.

FIG. 15 shows a preferred construction of the M/H Group formatter 15, previously disclosed in the above-referenced U.S. Pat. App. Ser. No. 12/924,074. Bytes from the block processor 14 are written to a dual-port random-access memory 1501 within the Group formatter 15. The RAM 1501 is operable for permuting the symbol-interleaved results of outer convolutional coding read from the RAM 1501 and supplied as input signal to an interleaved M/H Group format organizer 1502 included within the Group formatter 15. The permutation is such that the coded primary RS Frame of each M/H Group will begin immediately after the sequence of TPC and FIC signaling in Block 4 of that M/H Group. If the coded primary RS Frame is not accompanied by a secondary RS Frame within the same M/H Group, the coded primary RS Frame loops back to the beginning of the M/H Group and concludes just before the training signal in Block 3 of that M/H Group. If the coded primary RS Frame is accompanied by a secondary RS Frame within the same M/H Group, the coded primary RS Frame concludes near the conclusion of Block 8 of that M/H Group with the coded secondary RS Frame beginning shortly thereafter. Then, following Block 10 of the M/H Group, the coded secondary RS Frame loops back to the beginning of the M/H Group and concludes just before the training signal in Block 3 of that M/H Group.

The interleaved Group format organizer 1502 is generally similar to that described in A/153, operating on the Group format as it will appear after the ATSC data interleaver. The interleaved Group format organizer 1502 maps the FEC-coded M/H-service data from the block processor into the corresponding M/H blocks of a Group, adding pre-determined training data bytes and place-holder bytes that will later be replaced by deterministic trellis reset (DTR) bytes. Also, the interleaved Group format organizer 1502 inserts 2-byte headers for the MHE packets. In a departure from A/153 practice the third byte of each MHE packet header is replaced by an M/H data byte. The interleaved Group format organizer 1502 further inserts place-holder bytes for main-service data and for non-systematic RS parity. The interleaved Group format organizer 1502 supplies the resulting interleaved M/H Group to a byte de-interleaver 1503 that complements the ATSC convolutional byte interleaver. This byte de-interleaver 1503 is included within the Group formatter 15. The Group formatter 15 is connected for supplying the response of the byte de-interleaver 1503 as its output signal, which is applied as input signal to the packet formatter 17. Initially, the packet formatter 17 expunges the place-holder bytes that were inserted by the interleaved Group format organizer 1502 for proper operation of the byte de-interleaver in the Group formatter 15. The packet formatter 17 inserts an MPEG TS sync byte before each 187-byte data packet as a prefix thereof, thereby generating a respective MHE packet supplied to the packet multiplexer 3 for time-division multiplexing with the main-service TS packets.

Figure 16:
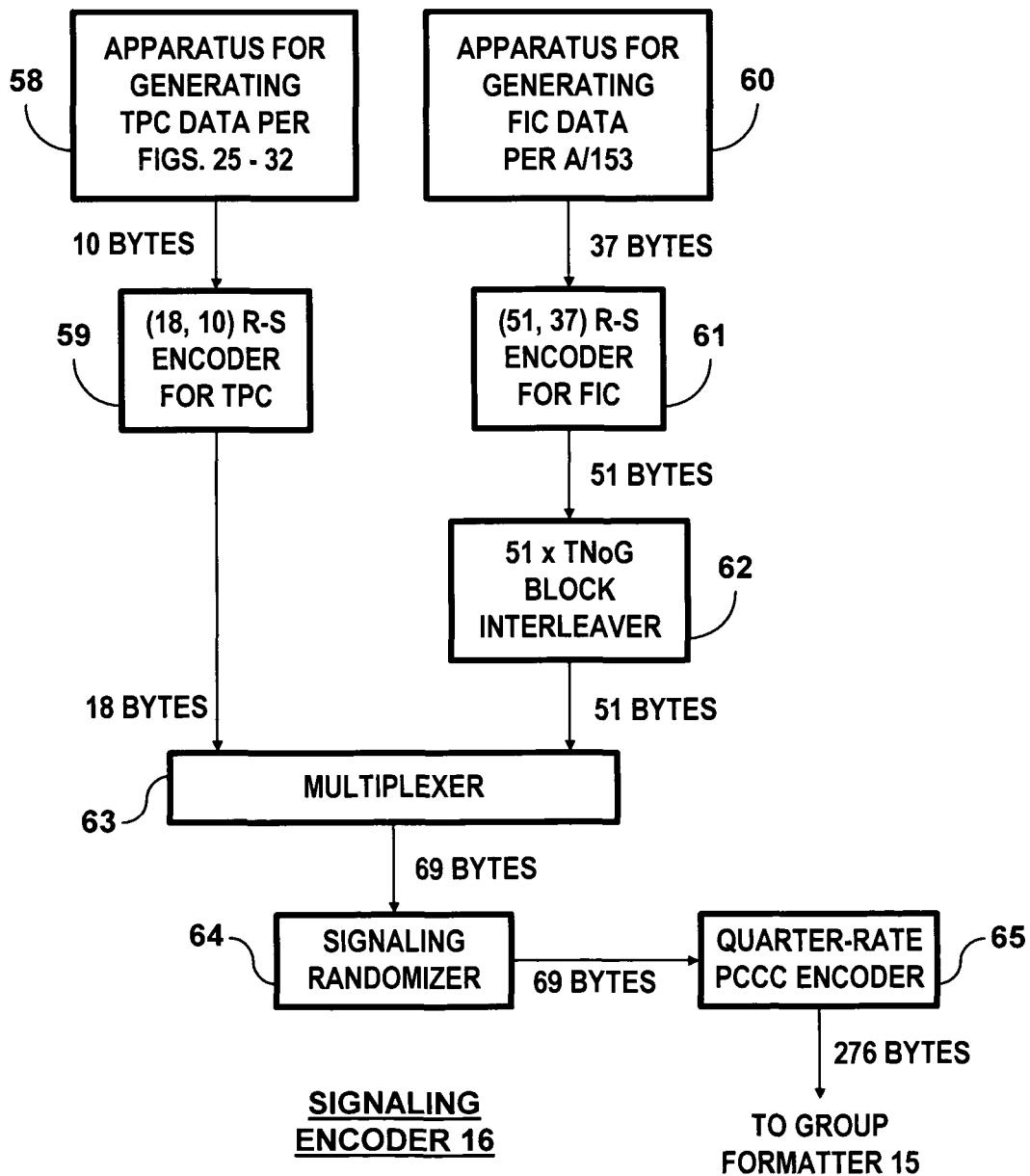
FIG. 16 is a schematic diagram of a representative embodiment of the novel signaling encoder employed in the FIG. 1 DTV transmitter apparatus.

FIG. 16 is a detailed schematic diagram of a representative embodiment of the signaling encoder 16 in the FIG. 1 DTV transmitter apparatus. Apparatus 58 for generating Transmission Parameter Channel (TPC) data using the bit syntax shown in FIGS. 25-32 is connected for supplying that TPC data to an encoder 59 for (18, 10) Reed-Solomon coding bytes of that TPC data. Apparatus 60 for generating Fast Information Channel (FIC) data using the bit syntax prescribed by A/153 is connected for supplying that FIC data to an encoder 61 for (51, 37) Reed-Solomon coding FIC bits. The encoder 61 encodes thirty-seven bits per Group and is connected for supplying the resulting 51 bits of RS-coded FIC to a matrix-type block interleaver 62. A time-division multiplexer 63 is connected for supplying a response that interleaves 51 bytes of block interleaver 62 response as received at a first input port of the multiplexer 63 between each 18-byte RS codeword received from the encoder 59 at a second input of the multiplexer 63. The multiplexer 63 is connected for supplying its response to a signaling randomizer 64. The signaling randomizer 64 is connected for supplying its response as input signal to a quarter-rate PCCC encoder 65, which is in turn connected to supply the quarter-rate PCCC that it generates to the Group formatter 15.

FIGS. 17, 18, 19 and 20 are tables showing a how in a first network Slots are allocated amongst up to four different transmitters that have coverage areas which overlap at least in part. The Slot allocations facilitate frequency-diversity reception. Each M/H sub-Frame includes four sets of Slots. The Slots in each set are separated by intervening sequences of three Slots. Transmitters that have coverage areas which overlap transmit similar program material in different ones of these sets of Slots so that an M/H receiver located in an overlapping coverage area can receive the similar program material twice, as time-division multiplexed between two of these sets of Slots. The time-division multiplexing accommodates an M/H receiver with just a single front-end tuner of a frequency-agile type that can rapidly switch tuning between the different carrier frequencies of two 8-VSB transmitters.

A second transmission of Program A information repeats a first transmission of Program A information in an earlier M/H Frame when Program A information is transmitted twice to implement iterative-diversity reception. A second transmission of Program A information repeats the first transmission of Program A information within the same or next M/H sub-Frame when Program A information is transmitted twice principally to implement decoding the outer convolutional coding of the M/H CCC at one-quarter the 8-VSB symbol rate. A first transmission of Program C replaces the second transmission of Program A information if the Program A information is transmitted only one time. While each of the FIGS. 17-20 shows the Program A information being transmitted in four M/H Groups, the Program A information can be divided into smaller individual programs transmitted in all or just some of the four M/H Groups.

A second transmission of Program B information repeats a first transmission of Program B information in an earlier M/H Frame when Program B information is transmitted twice to implement iterative-diversity reception. A second transmission of Program B information repeats the first transmission of Program B information within the same or next M/H sub-Frame when Program B information is transmitted twice principally to implement decoding the outer convolutional coding of the M/H CCC at one-quarter the 8-VSB symbol rate. A first transmission of Program D information replaces the second transmission of Program B information if the Program B information is transmitted only one time. While each of the FIGS. 17-20 shows the Program B information being transmitted in four M/H Groups, the Program B information can be divided into smaller individual programs transmitted in all or just some of the four M/H Groups.

The FIG. 17 table shows how Slots for diversity transmissions are allocated within the first 8-VSB transmitter in the first network of transmitters. The set of Slots #0, #4, #8 and #12 is used for a first transmission of Program A information. The set of Slots #1, #5, #9 and #13 is used for a second transmission of Program A information, presuming it to be transmitted twice. The set of Slots #1, #5, #9 and #13 is used for a single transmission of Program C information, however, if Program A information is transmitted only once. The set of Slots #2, #6, #10 and #14 is used for a first transmission of Program B information. The set of Slots #3, #7, #11 and #15 is used for a second transmission of Program B information, presuming it to be transmitted twice. The set of Slots #3, #7, #11 and #15 is used for a single transmission of Program D information, however, if Program B information is transmitted only once.

The FIG. 18 table shows how Slots for diversity transmissions are allocated within the second 8-VSB transmitter in the first network of transmitters. The set of Slots #0, #4, #8 and #12 is used for a first transmission of Program B information. The set of Slots #1, #5, #9 and #13 is used for a second transmission of Program B information, presuming it to be transmitted twice. The set of Slots #1, #5, #9 and #13 is used for a single transmission of Program D information, however, if Program B information is transmitted only once. The set of Slots #2, #6, #10 and #14 is used for a first transmission of Program A information. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

The FIG. 19 table shows how Slots for diversity transmissions are allocated within the third 8-VSB transmitter in the first network of transmitters. The set of Slots #0, #4, #8 and #12 is used for a second transmission of Program A information, presuming it to be transmitted twice. The set of Slots #0, #4, #8 and #12 is used for a single transmission of Program C information, however, if Program A information is transmitted only once. The set of Slots #1, #5, #9 and #13 is used for a first transmission of Program B information. The set of Slots #2, #6, #10 and #14 is used for a second transmission of Program B information, presuming it to be transmitted twice. The set of Slots #2, #6, #10 and #14 is used for a single transmission of Program D information, however, if Program B information is transmitted only once. The set of Slots #3, #7, #11 and #15 is used for a first transmission of Program A information.

The FIG. 20 table shows how Slots for diversity transmissions are allocated within the fourth 8-VSB transmitter in the first network of transmitters. The set of Slots #0, #4, #8 and #12 is used for a second transmission of Program B information, presuming it to be transmitted twice. The set of Slots #0, #4, #8 and #12 is used for a single transmission of Program D information, however, if Program B information is transmitted only once. The set of Slots #1, #5, #9 and #13 is used for a first transmission of Program A information. The set of Slots #2, #6, #10 and #14 is used for a second transmission of Program A information, presuming it to be transmitted twice. The set of Slots #2, #6, #10 and #14 is used for a single transmission of Program C information, however, if Program A information is transmitted only once. The set of Slots #3, #7, #11 and #15 is used for a first transmission of Program B information.

Other networks with up to four transmitters having overlapping coverage areas can have Slot allocations for diversity transmissions different from those shown in FIGS. 17, 18, 19 and 20, respectively. FIGS. 21, 22, 23 and 24 are tables showing how Slots are allocated among up to four different transmitters that are included in a second network and have coverage areas which overlap at least in part. These Slot allocations facilitate frequency-diversity reception using an M/H receiver with just a single front-end tuner of a frequency-agile type that can rapidly switch tuning between the different carrier frequencies of two 8-VSB transmitters.

The FIG. 21 table shows how Slots for diversity transmissions are allocated within the first 8-VSB transmitter in the second network of transmitters. The set of Slots #0, #4, #8 and #12 is used for a first transmission of Program A information. The set of Slots #1, #5, #9 and #13 is used for a first transmission of Program B information. The set of Slots #2, #6, #10 and #14 is used for a second transmission of Program A information, presuming it to be transmitted twice. The set of Slots #2, #6, #10 and #14 is used for a single transmission of Program C information, however, if Program A information is transmitted only once. The set of Slots #3, #7, #11 and #15 is used for a second transmission of Program B information, presuming it to be transmitted twice. The set of Slots #3, #7, #11 and #15 is used for a single transmission of Program D information, however, if Program B information is transmitted only once.

The FIG. 22 table shows how Slots for diversity transmissions are allocated within the second 8-VSB transmitter in the second network of transmitters. The set of Slots #0, #4, #8 and #12 is used for a first transmission of Program B information. The set of Slots #1, #5, #9 and #13 is used for a first transmission of Program A information. The set of Slots #2, #6, #10 and #14 is used for a second transmission of Program B information, presuming it to be transmitted twice. The set of Slots #2, #6, #10 and #14 is used for a single transmission of Program D information, however, if Program B information is transmitted only once. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

The FIG. 23 table shows how Slots for diversity transmissions are allocated within the third 8-VSB transmitter in the second network of transmitters. The set of Slots #0, #4, #8 and #12 is used for a second transmission of Program A information, presuming it to be transmitted twice. The set of Slots #0, #4, #8 and #12 is used for a single transmission of Program C information, however, if Program A information is transmitted only once. The set of Slots #1, #5, #9 and #13 is used for a second transmission of Program B information, presuming it to be transmitted twice. The set of Slots #1, #5, #9 and #13 is used for a single transmission of Program D information, however, if Program B is transmitted only once. The set of Slots #2, #6, #10 and #14 is used for a first transmission of Program A information. The set of Slots #3, #7, #11 and #15 is used for a first transmission of Program B information.

The FIG. 24 table shows how Slots for diversity transmissions are allocated within the fourth 8-VSB transmitter in the second network of transmitters. The set of Slots #0, #4, #8 and #12 is used for a second transmission of Program B information, presuming it to be transmitted twice. The set of Slots #0, #4, #8 and #12 is used for a single transmission of Program D information, however, if Program B information is transmitted only once. The set of Slots #1, #5, #9 and #13 is used for a first transmission of Program A information. The set of Slots #2, #6, #10 and #14 is used for a first transmission of Program B information. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

Each of the FIGS. 25 and 26 is a table showing a preferred syntax of bits in the TPC data. The FIG. 25 table specifies the bit syntax for TPC signal transmitted in each M/H Group contained in the initial two sub-Frames #0 and #1 of each M/H Frame. The FIG. 26 table specifies the bit syntax for TPC signal transmitted in each M/H Group contained in the final three sub-Frames #2, #3 and #4 of each M/H Frame. There are eighty bits in the TPC data transmitted with each Group, and in this specification they are referred to by number according to the order of their transmission within the M/H Group. The bits 1-59 and 70-80 of the TPC bit syntax shown in the tables of FIGS. 25 and 26 have syntax similar to that specified in A/153. However, bits 31-40 are descriptive of concatenated convolutional coding (CCC) in general, including parallel concatenated convolutional coding (PCCC) as well as serial concatenated convolutional coding (SCCC). A/153 specifies the TPC bits 60-75 as being reserved, but the tables in FIGS. 25 and 26 show only bits 64-75 of this sequence of bits to be reserved.

In both the FIG. 25 and FIG. 26 tables the bits 1-3 specifying sub_Frame_number the bits 4-7 specifying Slot_number and the bits 8-14 specifying the Parade_ID always apply to the M/H Group being currently received, as well as to the corresponding M/H Group in the next M/H Frame in the Parade repetition cycle (PRC). The Parade_repetition_cycle_minus_one number appearing in bits 22-24 of the TPC bit syntax ranges from zero to seven. It applies to the M/H Group being currently received and signals the number of M/H Frames skipped over from one M/H Frame containing parts of a Parade to the next Frame containing parts of the Parade. The bits 41-45 specify FIC_version as a modulo-32 number. This number is usually the same as that for the corresponding M/H Group in the previous M/H Frame. However, it increments by one when an FIC-Chunk in the current M/H Frame that describes the next M/H Frame differs from a previous FIC-Chunk of like FIC_chunk_major_protocol_version that described the current M/H Frame. The bits 46-49 specify Parade_continuity_counter count as a modulo-16 number that increments by one every M/H Frame in the Parade Repetition Cycle. (Specification of a count of zero or of one, rather than an expected consecutive count, can be used to signal the beginning of a new Parade.)

The last five bits of the TPC data signal the version of TPC data syntax that is being used. Bits 76 and 77 signal major changes in the TPC data used in the M/H Standard. These major changes cause the TPC data to be indecipherable to receivers designed for receiving transmissions made in accordance with earlier versions of the M/H Standard. Bits 78, 79 and 80 signal minor changes in the TPC data used in the M/H Standard. These minor changes leave parts of the TPC data decipherable to receivers designed for receiving transmissions made in accordance with earlier versions of the M/H Standard. In A/153 all the bits 78, 79 and 80 in TPC are ONEs, and each of them shall be rolled to ZERO when the first change in TPC version is adopted by ATSC. In A/153 the bits 76 and 77 in TPC are both ONEs, and each of them shall be rolled over to ZERO when the initial major change in TPC version is adopted by ATSC.

In the FIG. 25 TPC syntax table, bits 15-18 specify the current_starting_Group_number, bits 19-21 specify the current_number_of_Groups_minus_one, bits 25-40 describe a forward-error-correction (FEC) coding for the M/H Frame that is currently received, and bits 50-54 specify the current_total_number_of_Groups. The current_starting_Group_number is the Slot number of the initial M/H Group beginning or resuming the Parade identified by bits 8-14 in each sub-frame of the M/H Frame that is currently received. The current_number_of_Groups_minus_one is one less than the number of M/H Groups assigned to the Parade identified by bits 8-14 in each sub-frame of the M/H Frame that is currently received. The current_total_number_of_Groups specifies the total number of M/H Groups in each sub-frame of the M/H Frame that is currently received.

In the FIG. 26 TPC syntax table bits 15-18 specify the next_starting_Group_number, bits 19-21 specify the next_number_of_Groups_minus_one, and bits 25-40 describe FEC coding for the M/H Frame to be received next. Bits 55-59 specify the current_starting_Group_number. The next_starting_Group_number is the Slot number of the initial M/H Group beginning or resuming the Parade identified by bits 8-14 in each sub-frame of the M/H Frame that will be received next. The next_number_of_Groups_minus_one is one less than the number of M/H Groups assigned to the Parade identified by bits 8-14 in each sub-frame of the M/H Frame that will be received next. The bits 55-59 in the FIG. 26 table specify the next_total_number_of_Groups. That is, the total number of M/H Groups in each sub-frame of the M/H Frame that will be received next after the M/H Frame being currently received.

In the TPC syntax tables of FIGS. 25 and 26 the bits 15-18 specifying a starting Group number and the bits 25-40 prescribing forward-error-correction coding constitute "normally continuing" TPC information. This "normally continuing" TPC information not only stays the same for each Slot of the same number in the sub-Frames of one M/H Frame, but also usually is the same for each Slot of the same number in the sub-Frames of the next M/H Frame in the PRC. The specification of CCC coding conditions in bits 31-40 of the FIG. 25 and FIG. 26 tables encompass PCCC coding conditions, as well as the SCCC coding conditions specified in A/153.

The FIG. 25 TPC syntax table shows bits 25 and 26 specifying current_RS_frame_mode, bits 30 and 31 specifying current_RS_code_mode_primary, and bits 29 and 30 specifying current_RS_code_mode_secondary, which corresponds to the prescription of A/153 for TPC bit syntax in M/H sub-Frames #0 and #1. The FIG. 25 table shows bits 31 and 32 specifying current_CCC_block_mode, bits 33 and 34 specifying current_CCC_outer_code_mode_a, bits 35 and 36 specifying current_CCC_outer_code_mode_b, bits 37 and 38 specifying current_CCC_outer_code_mode_c, and bits 39 and 40 specifying current_CCC_outer_code_mode_d.

The FIG. 26 TPC syntax table shows bits 25 and 26 specifying next_RS_frame_mode, bits 30 and 31 specifying next_RS_code_mode_primary, and bits 29 and 30 specifying next_RS_code_mode_secondary, which corresponds to the prescription of A/153 for TPC bit syntax in M/H sub-Frames #2, #3 and #4. The FIG. 26 table shows bits 31 and 32 specifying next_CCC_block_mode, bits 33 and 34 specifying next_CCC_outer_code_mode_a, bits 35 and 36 specifying next_CCC_outer_code_mode_b, bits 37 and 38 specifying next_CCC_outer_code_mode_c, and bits 39 and 40 specifying next_CCC_outer_code_mode_d.

FIG. 27 depicts in tabular form a preferred bit syntax of the RS_Frame_mode specified by the bits 25-26 of the FIG. 25 and FIG. 26 tables. The use of this bit syntax of the RS_Frame_mode requires that the TPC bit syntax tables of FIGS. 25 and 26 indicate in their bits 76-80 that they are of a version in which RS_Frame_mode bit syntax differs from that prescribed by A/153. Bits 25-26 being 00 specifies that there is only a primary RS Frame for the Parade containing the M/H Group including the TPC. This primary RS Frame begins in Block 4 of the M/H Group, has wrap-around and concludes in Block 3 of the same M/H Group. The bits 25-26 being 01 specifies that there is both a primary RS Frame and a secondary RS Frame for the Parade containing the M/H Group including the TPC. The primary Frame begins in Block 4 of the M/H Group and concludes in Block 8 of the same M/H Group. The secondary RS Frame begins in Block 8 of the M/H Group, has wrap-around and concludes in Block 3 of the same M/H Group. Bits 25-26 being 10 specifies that there is only a primary RS Frame for the Parade containing the M/H Group including the TPC. This primary Frame begins in Block 4 of the M/H Group, has no wrap-around and concludes in Block 3 of the next-transmitted M/H Group in the same Ensemble. Bits 25-26 being 11 specifies that there is both a primary RS Frame and a secondary RS Frame for the Parade containing the M/H Group including the TPC. The primary Frame begins in Block 4 of the M/H Group and concludes in Block 8 or 9 of the same M/H Group. The secondary RS Frame begins in Block 8 or 9 of the M/H Group, has no wrap-around and concludes in Block 3 of the next-transmitted M/H Group in the same Ensemble.

FIG. 28 depicts in tabular form the specific syntax of the RS_code_mode_primary specified by the bits 27-28 and of the RS_code_mode_secondary specified by the bits 29-30 of the FIG. 25 and FIG. 26 tables. Either of these pairs of bits being 00 specifies that (230, 182) TRS coding is employed to generate the RS Frame that they relate to. Either of these pairs of bits being 01 specifies that (230, 194) TRS coding is employed to generate the RS Frame that they relate to. Either of these pairs of bits being 10 specifies that (230, 206) TRS coding is employed to generate the RS Frame that they relate to. FIG. 28 shows the bit pair 11 being held in reserve.

FIG. 29 depicts in tabular form a preferred syntax of the pair of bits in each of the four CCC_outer_code_mode fields in the TPC signal for an M/H Frame that is either currently received or is next to be received. The FIG. 25 TPC syntax table includes current_CCC_outer_code_mode_a, current_CCC_outer_code_mode_b, current_CCC_outer_code_mode_c and current_CCC_outer_code_mode_d fields regarding an M/H Frame that is being currently received. The FIG. 26 TPC syntax table includes a next_CCC_outer_code_mode_a, next_CCC_outer_code_mode_b, next_CCC_outer_code_mode_c and next_CCC_outer_code_mode_d fields regarding for an M/H Frame that is next to be received. The bit syntax specified by the FIG. 29 table is applicable all eight of these fields. The values '00' and '01' provide signaling similar to that prescribed by A/153. A value of '00' signals that the outer convolutional coding has a code rate of ½ and its bit pairs are coded in the CCC block so as to give rise to SCCC response after ⅔ trellis coding. A value of '01' signals that the outer convolutional coding has a code rate of ¼ and its bit pairs are coded in the CCC block so as to give rise to SCCC response after ⅔ trellis coding. The values '10' and '11' are reserved in A/153, but FIG. 29 shows these values being used to signal specific types of CCC transmissions. A value of '10' signals that the outer convolutional coding has a code rate of ⅓ and its bit pairs are coded in the CCC block so as to give rise to CCC response after ⅔ trellis coding. This CCC response is a mixture of SCCC and PCCC. A value of '11' signals that the outer convolutional coding has a code rate of ½ and that its bit pairs are coded in the CCC block so as to give rise to PCCC response after ⅔ trellis coding.

M/H signals may be transmitted using iterative diversity in which earlier and later transmissions of the same data are designed to be combined during turbo decoding procedures. When such transmissions are received by an M/H receiver capable of combining earlier and later transmissions of the same data during turbo decoding procedures, the M/H receiver needs to know whether the currently received Group belongs to the earlier transmission or to the later transmission. If the currently received Group belongs to the earlier transmission, it is diverted to a digital delay line. The digital delay line is usually implemented as a first-in/first-out memory and delays the earlier transmission so its turbo decoding takes place concurrently with the turbo decoding of the later transmission of the same data. The TPC bit syntax in A/153 does not provide for signaling when broadcast transmissions are made that are specifically designed for iterative-diversity reception. The TPC bit syntax in A/153 does not provide for signaling the amount of delay between an earlier transmission of M/H data and a later re-transmission of the same M/H data.

A/153 reserves the bits 55-59 in the TPC syntax for sub-Frames #0 and #1. Bits 55-57 specify Frames_of_iterative_diversity_delay in the FIG. 25 TPC syntax table in coded form. FIG. 30 tabulates the numbers of M/H Frames between early and late transmissions of the same data for iterative-diversity reception. Bits 58-59 specify extra_Slot_intervals_of_delay descriptive of the offset in Slot phasing between earlier and later transmissions of M/H data for diversity reception.

The TPC bit syntax in A/153 does not specify the different ways in which similar program material is broadcast by cooperating DTV transmitters that transmit over different RF channels and have respective coverage areas that partially overlap at least one of the coverage areas of the other DTV transmitters. In each of the TPC syntax tables of FIGS. 25 and 26 the bit 60 transmits an M/H_data_not_ones'_complemented? datum. Bit 60 is a ONE if the M/H data bits are not ones' complemented, but is a ZERO if the M/H data bits are ones' complemented.

The FIG. 25 and FIG. 26 TPC syntax tables each show their respective bits 61 and 62 being used as an iterative_diversity_mode field. Bits 61 and 62 of the iterative_diversity_mode field appear together in the same (18, 10) RS FEC codewords for TPC, which reduces the chance for error in this field. The FIG. 31 table depicts a representative bit syntax for the iterative_diversity_mode field. The iterative_diversity_mode field being '11' signals that an M/H Group is one not being iteratively transmitted, which simplifies design of a receiver that can also receive transmissions made in accordance with A/153. The following other values of the iterative_diversity_mode field signals are suggested by way of example. The iterative_diversity_mode field being '01' signals that the Group currently being received is an initial one of a pair of iteratively transmitted Groups designed for being combined during turbo decoding procedures. The iterative_diversity_mode field being '10' signals that the Group currently being received is a final one of a pair of iteratively transmitted Groups designed for their respective data being combined later on in the receiver using procedures that combine transport stream packets. The iterative_diversity_mode field being '00' signals that the Group currently being received is one of a pair of Groups transmitted simultaneously using two RF carrier waves different in frequency.

The FIG. 25 and FIG. 26 TPC syntax tables each show their respective bits 63, 64 and 65 being used as an subchannel-interleaving field. The bits 63, 64 and 65 of this field appear together in the same (18, 10) RS FEC codewords for TPC, which reduces the chance for error in the field. The FIG. 32 table depicts a representative bit syntax for the subchannel-interleaving field. The three bits of this field designate which one of the eight subchannel-interleaving patterns shown in FIGS. 17-24 is used by the DTV transmitter that transmits the TPC signal, presuming that the iterative_diversity_mode field is not '11' in value. If the iterative_diversity_mode field is '11' in value, standard practice can be to use a subchannel-interleaving field that is '111'.

In each of the TPC syntax tables of FIGS. 25 and 26, the bit 66 transmits an CRC_or_LRS? datum. The bit 66 is a ONE if the encoder 45 in the M/H Frame encoder 13 as shown in FIG. 4 is a CRC encoder. Whether that CRC encoder is the encoder 451 for 210-byte-long CRC coding or the encoder 452 for 105-byte-long CRC coding is presumed to be determined by the last five bits of the TPC data that signal the version of TPC data syntax that is being used. The bit 66 is a ZERO if the encoder 45 in the M/H Frame encoder 13 as shown in FIG. 4 is an encoder for LRS coding. Whether that encoder 453 for systematic (210, 190) RS coding or an encoder for some other (210, K) RS coding is presumed to be determined by the last five bits of the TPC data that signal the version of TPC data syntax that is being used.

Alternatively, bit 67 can be used together with the bit 66 to indicate which options are used for CRC coding and for (210, K) RS coding.

Figure 33A:
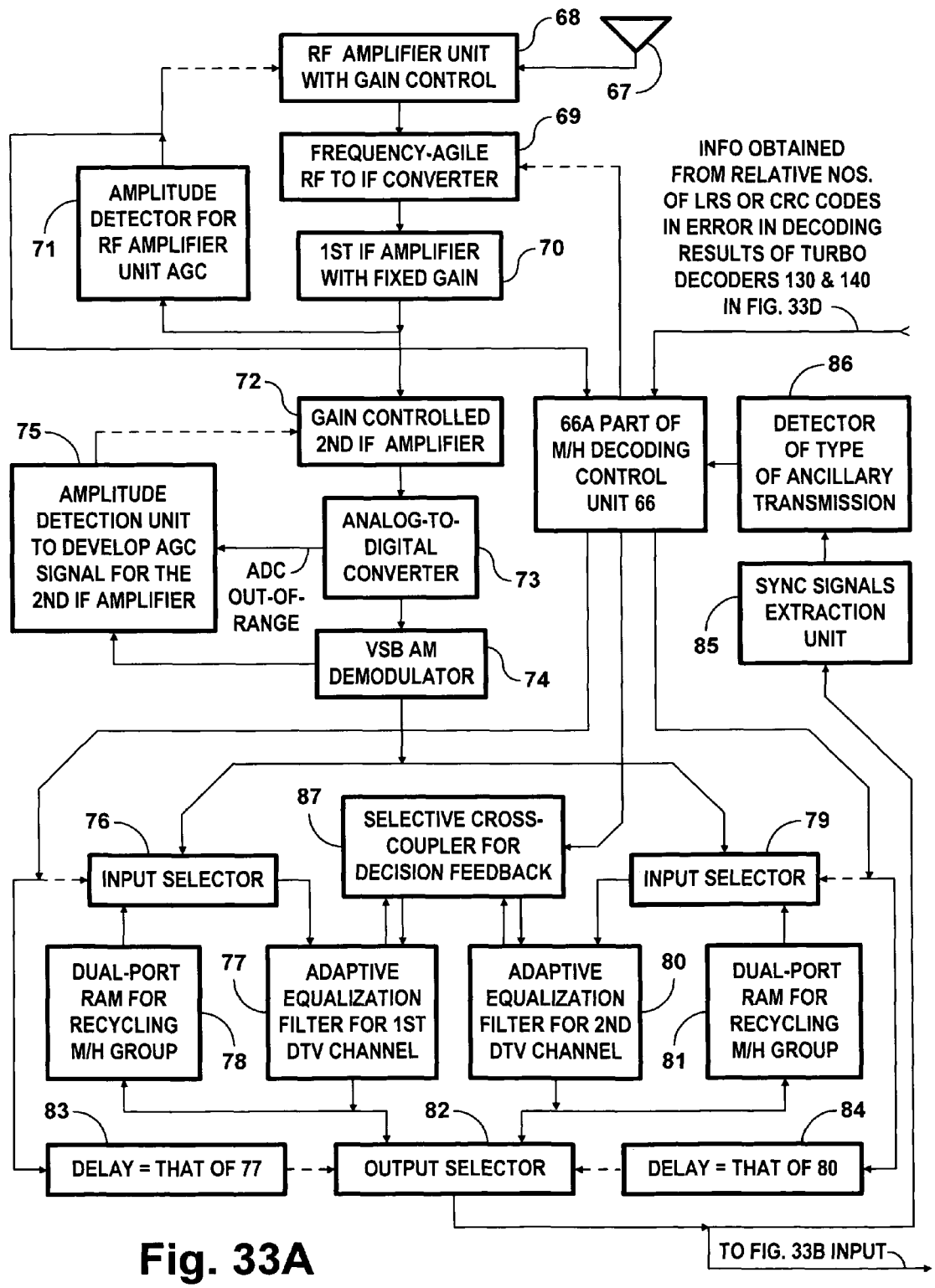
FIG. 33 is an assembly drawing indicating how FIGS. 33A, 33B, 33C, 33D and 33E combine to provide a schematic diagram of receiver apparatus for receiving M/H transmissions sent over the air from the FIG. 1 DTV transmitter apparatus, which receiver apparatus is novel and is a representative embodiment of aspects of the invention.
Figure 33B:
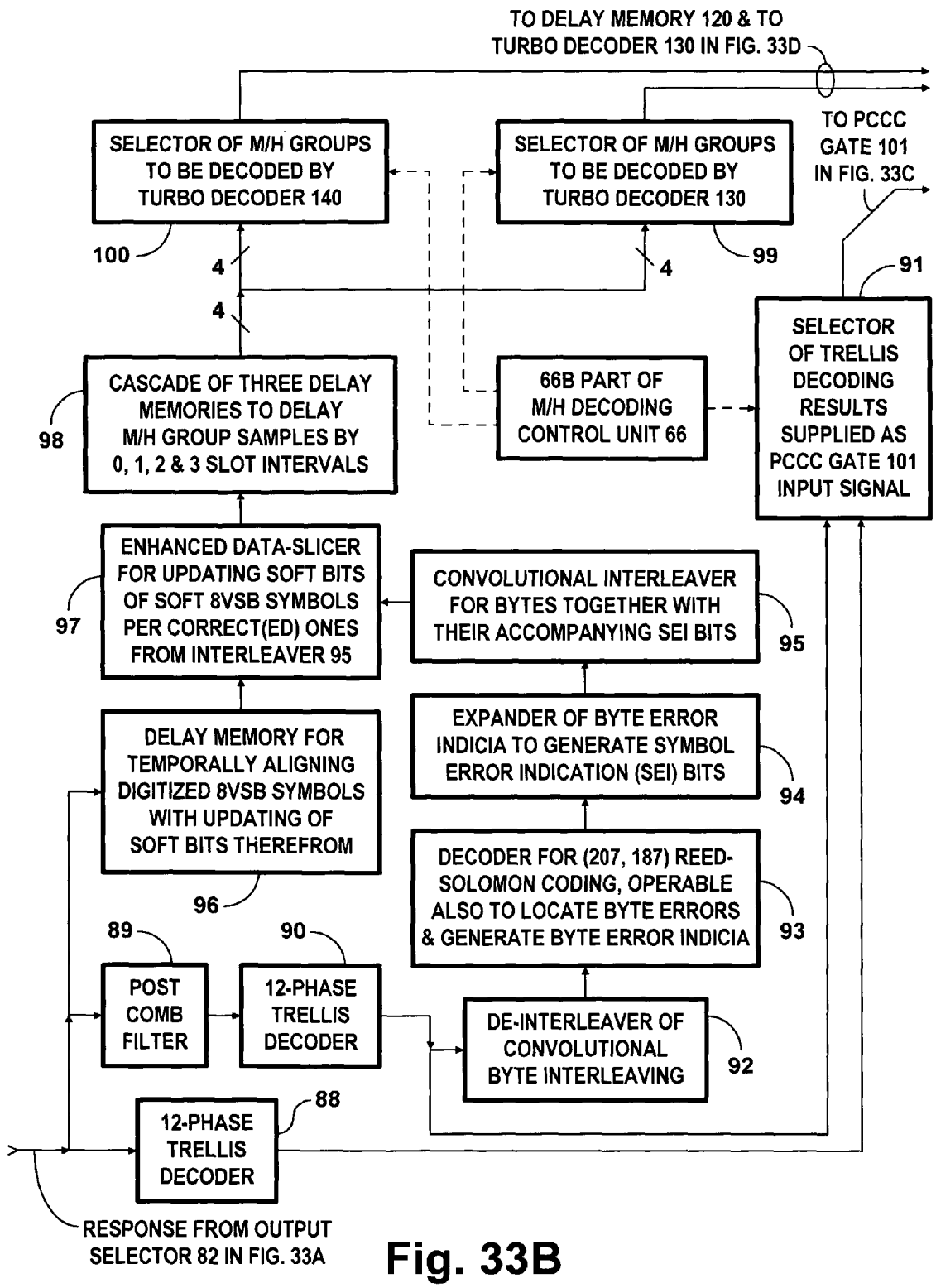
Figure 33C:
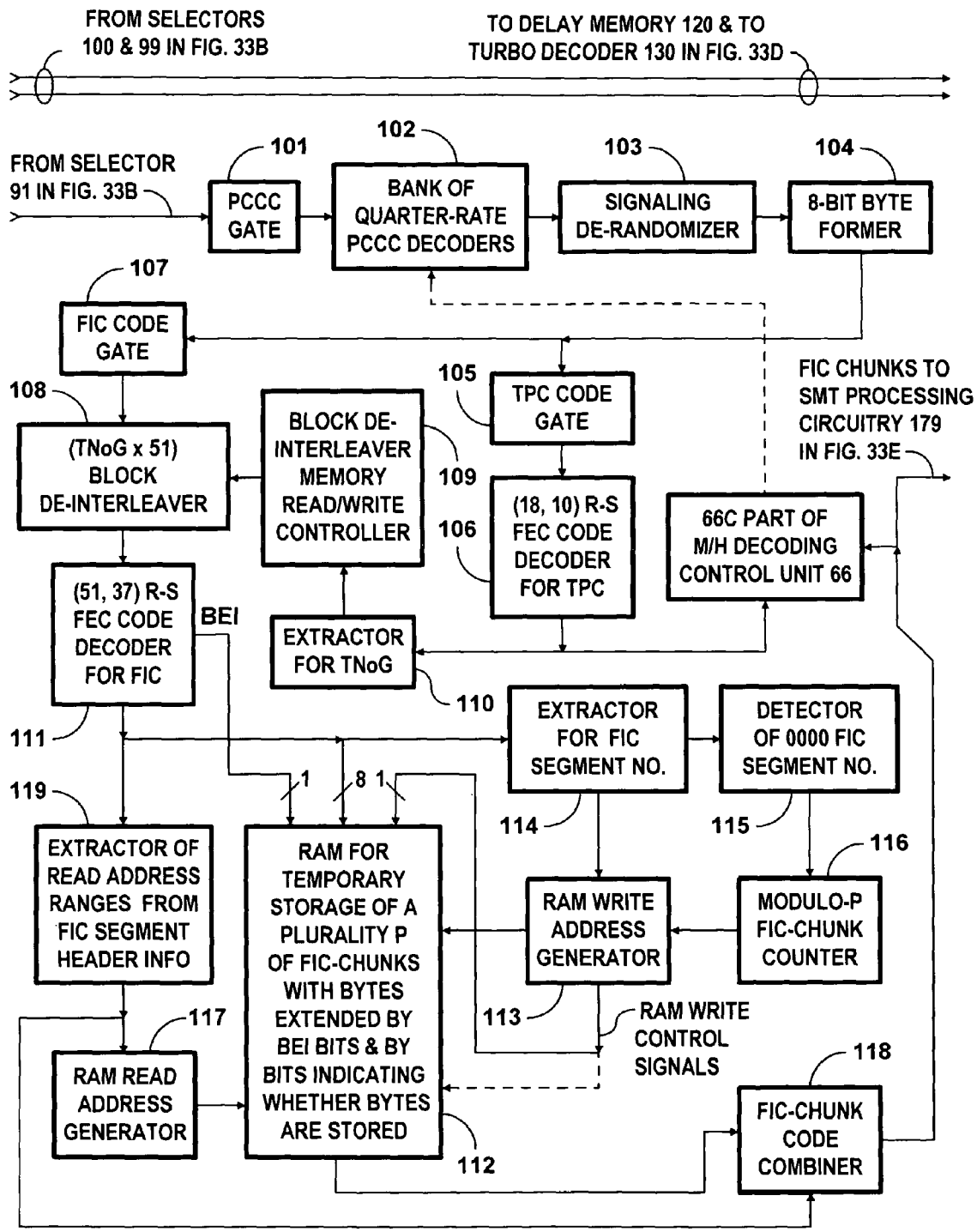

FIG. 33 is an assembly drawing that shows how FIGS. 33A, 33B, 33C, 33D and 33E combine to provide a schematic diagram of a DTV receiver apparatus for receiving M/H transmissions broadcast from two DTV transmitters, each of the sort shown in FIG. 1. The two DTV transmitters broadcast similar program material over different radio-frequency (RF) channels, and their coverage areas partially overlap. The FIG. 33 DTV receiver apparatus is designed for having continuing reception of the similar program material as it is moved from the coverage area of one of the two DTV transmitters to the coverage area of the other of the two DTV transmitters. Continuing reception of the similar program material requires that the movement of the FIG. 33 DTV receiver apparatus remain within the coverage area of at least one of the DTV transmitters broadcasting the similar program material. The number of DTV transmitters that broadcast the similar program material can exceed two, and there may be regions where the coverage areas of more than two of these DTV transmitters overlap. If the FIG. 33 DTV receiver apparatus is moved into such a region, its reception will be primarily directed towards receiving the stronger two of the RF signals available to it. The DTV transmitters that broadcast similar program material and that have overlapping coverage areas are presumed to transmit information concerning the respective TV channels those DTV transmitters use for broadcasting. This information is included in an optional Cell Information Table for ATSC-M/H (CIT-MH) that the transmitters contemporaneously transmit in selected IP packets for each M/H Service. One of the several functions of part 66A of the M/H decoding control unit 66 shown in FIG. 33A is the selection of the radio-frequency (RF) channels to be received, which selection takes the CIT-MH table into account. Part 66C of the M/H decoding control unit 66 shown in FIG. 33C is connected to receive the TPC signals of the RF channels selected for reception. The M/H decoding control unit 66 responds to the sub-channel_interleaving numbers contained within these TPC signals to coordinate the selection of sub-channels conveying the same program material.

FIG. 33A shows an antenna 67 for capturing RF DTV signals applied as input signal to an RF amplifier unit 68 with automatic gain control (AGC). The antenna 67 and the RF amplifier unit 68 are capable of capturing and amplifying ultra-high-frequency (UHF) DTV signals. In some embodiments of the FIG. 33 DTV receiver apparatus the antenna 67 and the RF amplifier unit 68 are further capable of capturing and amplifying very-high-frequency (VHF) DTV signals, or at least the higher-frequency VHF DTV signals. The RF amplifier unit 68 is connected for supplying amplified RF DTV signals to a frequency-agile RF-to-IF converter 69 that converts radio-frequency (RF) DTV signals to intermediate-frequency (IF) DTV signals for application to a first intermediate-frequency amplifier 70 as input signal thereto. A part 66A of the M/H decoding control unit 66 is connected for selecting the beat frequency oscillations that the frequency-agile RF-to-IF converter 69 generates for implementing its RF-to-IF conversion. The first IF amplifier 70 has fixed gain and the amplified RF signal it supplies as output signal is applied as input signal to an amplitude detector 71, which responds to supply gain-control signal to the RF amplifier unit 68, thus completing a loop for its AGC. The gain-control signal developed by the amplitude detector 71 is also supplied to part 66A of the M/H decoding control unit 66, which includes circuitry for comparing the gain-control signals developed for RF DTV signals received at different times from different DTV transmitters. The results of this comparison are used to help in deciding when the signal received from a DTV transmitter is no longer of sufficient strength to be turbo decoded usefully.

The output signal from the first IF amplifier 70 is also applied as input signal to a second IF amplifier 72, which is gain-controlled. The second IF amplifier 72 is connected for supplying an amplified IF signal as its output signal. An analog-to-digital converter 73 is connected for digitizing the amplified IF signal supplied by the second IF amplifier 72. The ADC 73 is connected for supplying digitized amplified IF signal to a demodulator 74 for the digitized vestigial-sideband amplitude-modulated IF carrier wave in that digitized amplified IF signal. The demodulator 74 supplies a digital signal descriptive of the baseband DTV signal that modulated the amplitude of the RF carrier wave from a DTV transmitter that was selected for reception by the FIG. 33 receiver apparatus. An amplitude detection unit 75 is used to develop automatic-gain-control (AGC) signal supplied to the second IF amplifier 72 for controlling the gain thereof. FIG. 33A shows the amplitude detection unit 75 developing AGC signal partly in response to indications from the ADC 73 that its input signal from the first IF amplifier 70 is so large as to be out of range for proper digitization. FIG. 33A shows the amplitude detection unit 75 developing AGC signal in further response to the amplified IF signal that the second IF amplifier 72 supplies as its output signal. A sophisticated design of the amplitude detection unit 75 data-slices the second IF amplifier 72 output signal using a bin comparator. Then, the amplitude detection unit 75 adjusts the gain of the second IF amplifier 72 to make the positive and negative variances of the output signal from bin centers substantially equal to each other. The portion of the FIG. 33 receiver apparatus described in this paragraph has a number of known substantial equivalents, some of which demodulate the amplified VSB AM IF signal before analog-to-digital coversion to recover digital signal descriptive of baseband DTV signal.

An input selector 76 has a first input port to which the output signal of the demodulator 74 is applied, a second input port, and an output port connected to the input port of an adaptive equalization filter 77. Part 66A of the M/H decoding control unit 66 supplies a respective control signal to the input selector 76 conditioning the input selector 76 to reproduce at is output port a selected one of the respective signals applied to its first and second input ports. The control signal conditions the input selector 76 to reproduce only those portions of the output signal of the demodulator 74 responsive to DTV signal received from a first DTV transmitter. The adaptive equalization filter 77 performs adaptive channel equalization solely for the baseband DTV signal received from that first DTV transmitter, as reproduced at the output port of the input selector 76. A dual-port random-access memory 78 has a random-access port connected for being written to from the output port of the equalization filter 77 and has a serial output port connected for reading to the second input port of the input selector 76. The RAM 78 and the input selector 76 are operable for recycling the output signal of the adaptive equalization filter 77 to its input port when signal broadcast by the first DTV transmitter is not otherwise available for updating adaptation of the equalization filter 77.

An input selector 79 has a first input port to which the output signal of the demodulator 74 is applied, a second input port, and an output port connected to the input port of an adaptive equalization filter 80. Part 66A of the M/H decoding control unit 66 supplies a respective control signal to the input selector 79 conditioning the input selector 79 to reproduce at is output port a selected one of the respective signals applied to its first and second input ports. The control signal conditions the input selector 79 to reproduce only those portions of the output signal of the demodulator 74 responsive to DTV signal received from a second DTV transmitter. The adaptive equalization filter 80 performs adaptive channel equalization solely for the baseband DTV signal received from that second DTV transmitter, as reproduced at the output port of the input selector 79. A dual-port random-access memory 81 has a random-access port connected for being written to from the output port of the equalization filter 80 and has a serial output port connected for reading to the second input port of the input selector 79. The RAM 81 and the input selector 79 are operable for recycling the output signal of the adaptive equalization filter 80 to its input port when signal broadcast by the second DTV transmitter is not otherwise available for updating adaptation of the equalization filter 80.

Part 66A of the M/H decoding control unit 66 generates respective control signals applied to the input selector 76 and to the input selector 79, taking into account the subchannel_interleaving information extracted from the TPC signals of received RF channels. When two or more DTV transmitters broadcast the same program material and their respective coverage areas overlap, each DTV transmitter will broadcast that same program material in a different set of M/H Groups than the other DTV transmitter(s). This is done as described supra with reference to FIG. 17-20 or 21-24. The M/H decoding control unit 66 relies on the subchannel_interleaving information for determining the time offset(s) between the same program material being transmitted at different radio frequencies by respective DTV transmitters. The FIG. 33 receiver may be situated where the coverage areas of two or more of these DTV transmitters overlap. Part 66A of the M/H decoding control unit 66 can then arrange for the frequency-agile RF-to-IF converter 69 to convert the RF signals from these DTV transmitters on a time-staggered basis to IF signal for amplification by the cascaded IF amplifiers 70 and 72. The amplified IF signals can then be digitized by the ADC 73 and subsequently demodulated by the VSB AM demodulator 74 to recover two transmissions of the same program material on the time-staggered basis. Subsequent parts 66B and 66C of the M/H decoding control unit 66 shown in FIGS. 33B and 33C respectively can then arrange for the earlier received duplicate program material to be delayed so as to be contemporaneous with the duplicate program material as later received. Then, part 66C of the M/H decoding control unit 66 can arrange for both the earlier received and the later received duplicate program material to be turbo decoded contemporaneously with respective turbo decoders shown in FIG. 33D. The turbo decoders can exchange information with each other concerning the confidence levels of the data bits they each decode, improving the decoding capability of the FIG. 33 receiver when it is situated where the coverage areas of two DTV transmitters overlap.

An output selector 82 is connected for reproducing at an output port thereof a selected one of the equalized baseband DTV signals respectively received at first and second input ports thereof. The first input port of the output selector 82 is connected for receiving the baseband response of the equalization filter 77, and the second input port of the output selector 82 is connected for receiving the baseband response of the equalization filter 80. FIG. 33A shows the control signal applied to the input selector 76 being delayed by a delay unit 83 to compensate for the latent delay of the adaptive equalization filter 77 and thereafter being applied as a first control signal to the output selector 82. The output selector 82 is conditioned by this first control signal to reproduce at its output port the adaptive equalization filter 77 response to the DTV signal received from the first DTV transmitter. FIG. 33A shows the control signal applied to the input selector 79 being delayed by a delay unit 84 to compensate for the latent delay of the adaptive equalization filter 80 and thereafter being applied as a second control signal to the output selector 82. The output selector 82 is conditioned by this second control signal to reproduce at its output port the adaptive equalization filter 80 response to the DTV signal received from the second DTV transmitter.

The output port of the output selector 82 is connected for supplying these selectively reproduced responses of the adaptive equalization filters 77 and 80 to the input port of a synchronization signals extraction unit 85. Responsive to data-field-synchronization (DFS) signals, the sync extraction unit 85 detects the beginnings of data frames and fields. Responsive to data-segment-synchronization (DSS) signals, the sync extraction unit 85 detects the beginnings of data segments. The FIG. 33 DTV receiver apparatus uses the DSS and DFS signals for controlling its operations similarly to the way this is conventionally done in DTV receivers. None of FIGS. 33A, 33B, 33C, 33D and 33E explicitly shows the apparatus and connections thereof for effecting these operations.

A decoder 86 for detecting the type of ancillary transmission responds to 8-bit sequences contained in final portions of the reserved portions of DFS signals separated by the sync extraction unit 85. The decoder 86 is connected for indicating the type of ancillary transmission to part 66A of the M/H decoding control unit 66, which control unit 66 controls turbo decoding of CCC and plural-dimensional decoding of RS Frames in the FIG. 33 DTV receiver apparatus. The type of ancillary transmission that the decoder 86 detects may be one that conditions the decoder 86 to extract further information concerning the ancillary transmission from the initial portions of the reserved portions of DFS signals separated by the sync extraction unit 85. The decoder 86 is connected for supplying such further information to part 66A of the M/H decoding control unit 66. Many of the connections of the M/H decoding control unit 66 to the elements involved in turbo decoding of CCC and in plural-dimensional decoding of RS Frames are not explicitly shown in FIGS. 33A, 33B, 33C, 33D and 33E. This is done so as to keep those figures from being too cluttered to be understood readily.

A selective cross-coupling of decision feedback for the adaptive equalization filters 77 and 80 provides for parallel incremental updating of their respective filter coefficients during iterative-diversity reception. The adaptive equalization filters 77 and 80 are structurally similar, each of them being of a type that uses a Kalman feedback loop for incrementally adjusting its filter coefficients. The M/H decoding control unit 66 is connected for generating control signal that controls a selective cross-coupler 87 of decision feedback for the adaptive equalization filters 77 and 80. This control signal indicates the times when frequency-diversity reception is not being used, but iterative-diversity reception is being used. During such times a portion of the selective cross-coupler 87 transmits incremental error information from the Kalman loop of the adaptive equalization filter 77 to the Kalman loop of the adaptive equalization filter 80. Also, during such times the selective cross-coupler 87 transmits incremental error information from the Kalman loop of the adaptive equalization filter 80 to the Kalman loop of the adaptive equalization filter 77. The one, two or three Slot-interval differential delay between the respective input signals to the equalization filters 77 and 80 is so long that there is no appreciable increase risk of undesired tendency toward self-oscillation in either Kalman loop. However, there appears to be an increase in adaptive gain. The selective cross-coupler 87 provides no cross-coupling of the Kalman loops of the adaptive equalization filters 77 and 80 during frequency-diversity reception, when the filters 77 and 80 have to equalize respective signals transmitted by two different transmitters.

The output port of the output selector 82 is connected for supplying the selectively reproduced responses of the adaptive equalization filters 77 and 80 to the portion of the FIG. 33 receiver shown in FIG. 33B. FIG. 33B shows the output signal from the output selector 82 being received directly as input signal for a 12-phase trellis decoder 88. FIG. 33B shows the output signal from the output selector 82 being supplied to the input port of a post comb filter 89 that has its output port connected for supplying input signal for a 12-phase trellis decoder 90, which may be of Viterbi type. A selector 91 has first and second input ports connected for receiving trellis decoding results as supplied from the output ports of the trellis decoders 88 and 90 respectively. Part 66B of the M/H decoding control unit 66 is connected for supplying a control signal to the selector 91 for selecting which of the trellis decoding results received at the first and second input ports of the selector 91 will be reproduced at the output port thereof. The M/H decoding control unit 66 determines whether or not the DFS signal includes an indication that the most significant bits of the 8-VSB symbols of the PCCC used for TPC and FIC signaling were not pre-coded. If the M/H decoding control unit 66 determines that the DFS signal includes such an indication, the selector 91 selects trellis coding results from the trellis decoder 88 for reproduction. The selection of the trellis coding results from the trellis decoder 90 for reproduction by the selector 91 is based on the M/H decoding control unit 66 determining that the DFS signal includes no such indication. The trellis coding results reproduced at the output port of the selector 91 are forwarded to the portion of the FIG. 33 receiver shown in FIG. 33C to be used in the recovery of TPC and FIC signals.

The input port of a de-interleaver 92 of convolutional byte interleaving per A/53 is connected to receive trellis coding results from the trellis decoder 90. The output port of the byte de-interleaver 92 is connected for supplying segments of a de-interleaved data field to a decoder 93 of (207, 187) Reed-Solomon codewords. If possible, the Reed-Solomon decoder 93 corrects any byte errors in each (207, 187) Reed-Solomon codeword supplied thereto. The RS decoder 93 is operable for individually locating probable errors within the RS codewords it finds to be correctable. The RS decoder 93 is arranged to supply a respective indication of whether each byte of each codeword is or is not probably in error. The RS decoder 93 is arranged to supply a respective indication of probable error in each of the bytes of the RS codewords that the RS decoder 93 finds to have too many bytes probably in error to be capable of correction. The RS decoder 93 is arranged to supply respective indicia of no probable error for each of the bytes of the RS codewords that the RS decoder 93 finds to be correct. These respective indicia of whether or not the bytes in each successive codeword are probably in error are supplied from the RS decoder 93 in the same order as the bytes from the byte de-interleaver 92. The bytes of each (207, 187) RS codeword, as corrected if possible, are supplied to an expander 94 together with corresponding byte error indicia. The expander 94 converts the byte error indicia to Symbol Error Indication (SEI) bits indicating whether or not the four successive 2-bit symbols in each byte are probably in error. The expander 94 supplies the successive bytes of each (207, 187) RS codeword, each byte having been expanded to twelve bits, to a convolutional byte interleaver 95 to be interleaved in a pattern that maps the convolutional byte interleaving prescribed by A/53. FIG. 33B shows a delay memory 96 connected to be written with the output signal from the output selector 82. The output signal from the output selector 82 is temporarily stored in the delay memory 96 for subsequent reading, with the 8-VSB symbol delay in the delay memory 96 essentially matching that of the cascaded elements 89, 90, 91, 93, 94 and 95. Delayed 8-VSB symbols are read from the delay memory 96 to an enhanced data-slicer 97 that provides data-slicing for both the turbo decoders 130 and 140. The enhanced data-slicer 97 includes a conventional data-slicer followed by apparatus for updating the soft bits in the resulting soft 8-VSB symbols per the correct(ed) 8-VSB symbols. A representative construction of the enhanced data-slicer 97 is described in detail further on in the specification, with reference to FIG. 33 of the drawings.

The enhanced data-slicer 97 is connected for supplying enhanced soft data concerning each successively received M/H Group of 8-VSB symbols for application as input signal to a tapped cascade connection 98 of three delay memories operable to delay each successively received M/H Group by 0, 1, 2 and 3 slot intervals. This tapped cascade connection 98 of the three delay memories is used to compensate for any differential delay between signals that contain the same program information and are received from different DTV transmitters used to implement frequency-diverse transmissions. These frequency-diverse transmissions have different types of subchannel interleaving as well to permit reception by an M/H receiver that has only a single frequency-agile front-end tuner for RF signals. This compensation for the differential delay between signals that contain the same program information aligns the signals temporally, permitting them to be turbo-decoded contemporaneously by respective turbo decoders that interchange information concerning the confidence levels of data bits of that same program information.

Figure 33D:
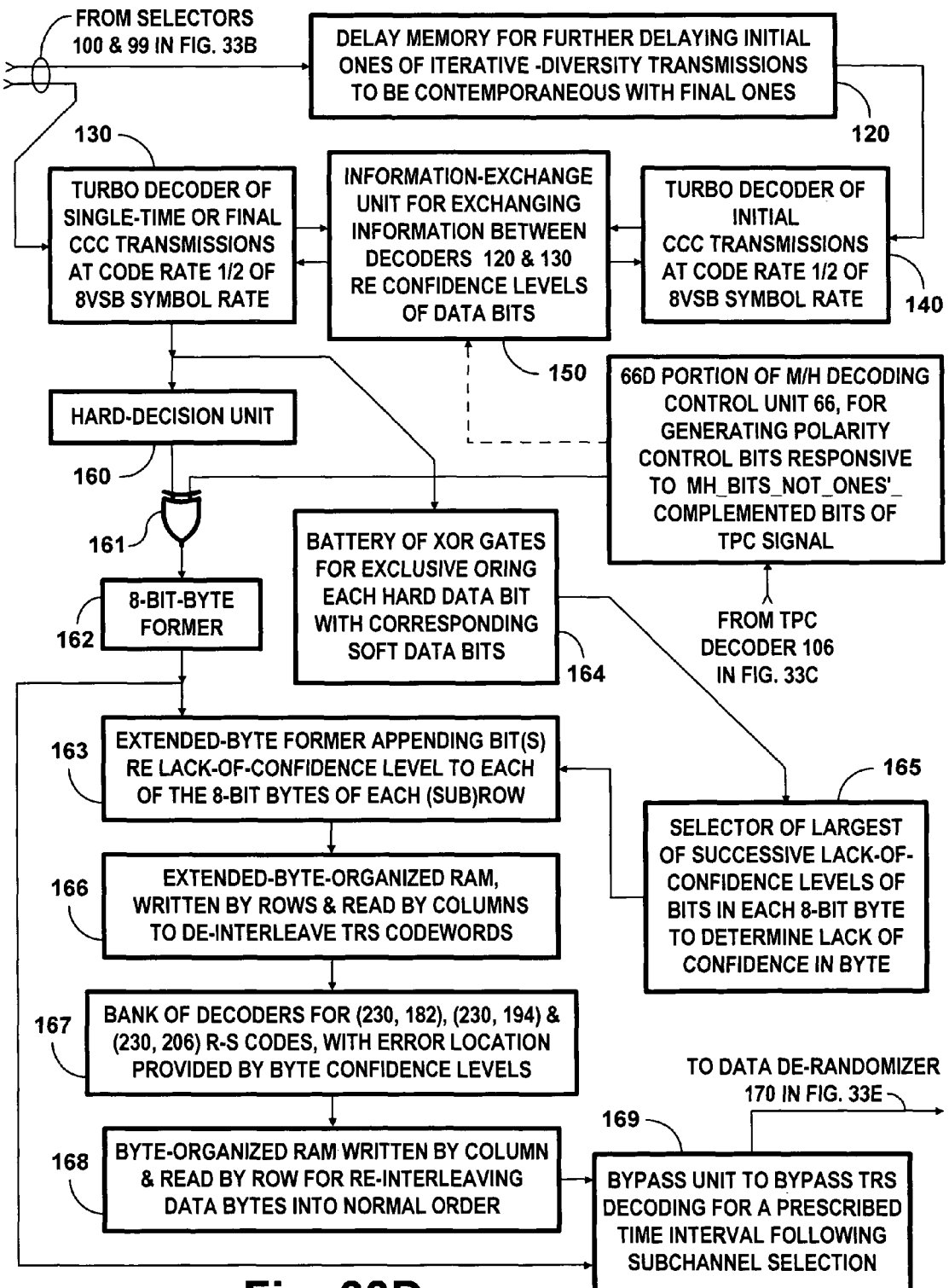

A selector 99 is connected for selectively reproducing one of four input signals thereto at an output port thereof for subsequent application to the input port of a turbo decoder 130 shown in FIG. 33D. These four input signals correspond to the M/H Groups of 8-VSB symbols (with SEI bit extensions) as respectively delayed 0, 1, 2 and 3 slot intervals by the tapped cascade connection 98 of three delay memories. FIG. 33B shows the selector 99 connected for receiving a control signal from part 66B of the M/H decoding control unit 66. This control signal controls the selector 99 in its selection of the one of the four input signals thereto that the selector 99 reproduces at its output port.

A selector 100 is connected for selectively reproducing one of four input signals thereto at an output port thereof to be delayed by a delay memory 120 shown in FIG. 33D before subsequent application to the input port of a turbo decoder 140 shown in FIG. 33D. These four input signals correspond to the M/H Groups of 8-VSB symbols (with SEI bit extensions) as respectively delayed by 0, 1, 2 and 3 slot intervals by the tapped cascade connection 98 of three delay memories. FIG. 33B shows the selector 100 connected for receiving a control signal from part 66B of the M/H decoding control unit 66. This control signal controls the selector 100 in its selection of the one of the four input signals thereto that the selector 100 reproduces at its output port.

FIG. 33C shows a PCCC gate 101 connected for receiving trellis-decoding results from the selector 91, shown in FIG. 33B. The PCCC gate 101 is operable for extracting the PCCC'd signaling within each Group and reproducing that PCCC'd signaling to be applied as input signal to a decoder 102 for quarter-rate PCCC. The decoder 102 reproduces randomized signaling decoded (possibly with some errors) from the quarter-rate PCCC supplied thereto and is connected for supplying that randomized signaling as input signal to a signaling de-randomizer 103. The signaling de-randomizer 103 is connected for supplying de-randomized coded signaling to an 8-bit byte former 104.

FIG. 33C shows a TPC code gate 105 connected for extracting bytes of TPC code from bytes of the de-randomized signaling supplied by the byte former 104 and for supplying those extracted bytes of TPC code as input signal to a decoder 106 for (18, 10) Reed-Solomon coding. The decoder 106 recovers TPC information and is connected for supplying the TPC information to part 66C of the M/H decoding control unit 66 and to other elements of the receiver apparatus. The M/H decoding control unit 66 is able to respond to the TPC information to control selection of the type of outer convolutional decoding to be used on CCC portions of each M/H Group.

FIG. 33C shows an FIC code gate 107 connected for extracting byte-interleaved FIC code bytes from the bytes of de-randomized signaling supplied by the byte former 104 and reproducing those extracted bytes for application as input signal to a block de-interleaver 108. The block de-interleaver 108 is of matrix type and complements the block interleaving done in the signaling encoder 16, which is as described in A/153. In this specification (over)writing refers both to memory writing procedures in which storage locations are empty of content when written by new content and to memory writing procedures in which storage locations have their original contents overwritten by new content. The block de-interleaver 108 is essentially a byte-organized random access memory (RAM) with byte-storage locations arrayed in rows and columns to be (over)written and read in accordance with addressing and read/write control signals supplied from a block de-interleaver memory read/write controller 109. The byte-storage locations are arrayed in 51-byte rows for being (over)written by RS coded FIC data from respective Groups within each M/H sub-Frame. The memory read/write controller 109 needs to know the total number of Groups, TNoG, within each M/H sub-Frame in order to know the number of these 51-byte rows. The memory read/write controller 109 uses this knowledge to control the addressing of successive columns of TNoG byte-storage locations when writing to them.

An extractor 110 is connected to extract TNoG for the current M/H sub-Frame (current_TNoG) from the response of the decoder 106 of the (18, 10) Reed-Solomon coded TPC data. The value of current_TNoG appears NoG times in the TPC data recovered by the decoder 106 from the previous M/H sub-Frame. The extractor 110 selects from the TPC data those bit sequences descriptive of current_TNoG estimates and decides the value of current_TNoG based on the majority of concurring estimates. The extractor 110 is connected to supply that value of current_TNoG to the memory read/write controller 109. In an alternative procedure for determining TNoG for the current M/H sub-Frame, the training signal sequences in the current M/H sub-Frame are counted. U.S. patent application Ser. No. 12/800,559 filed 18 May 2010 by A. L. R. Limberg and titled "Burst-error correction methods and apparatuses for wireless digital communications systems" describes apparatus for so determining TNoG, with reference to FIG. 19 of the drawings of that application.

After the final Group of each M/H sub-Frame concludes, the read/write controller 109 generates read addresses for reading rows of 35×TNoG bytes from the RAM in the block de-interleaver 108. The reading is completed before the initial Group of the next M/H sub-Frame begins and the contents of the memory in the block de-interleaver 108 will be overwritten. The block de-interleaver 108 is connected for supplying its de-interleaved FIC code response as input signal to a decoder 111 for (51, 37) Reed-Solomon coding. The decoder 111 recovers FIC information and is connected for supplying that FIC information to be written into addressed temporary-storage locations within a random-access memory 112. The decoder 111 generates a Byte Error Indication (BEI) bit whenever a (51, 37) Reed-Solomon codeword is found to contain byte error(s) that cannot be corrected. A BEI bit is generated when there is a momentary fade in received RF signal strength, for example.

The RAM 112 provides temporary storage for the bytes of the FIC information for one entire M/H Frame, plus two-bit extensions of those bytes. One of these extension bits is the BEI bit from the decoder 111 for (51, 37) RS coding. A further one of these extension bits is used for signaling whether or not byte-storage locations in the RAM 112 contain FIC information content. When the M/H receiver is initially powered up, or when there is a change in selection of the major reception channel, the contents of the RAM 112 are erased in bulk. This erasure sets the further one-bit extensions to signal the erasure—e.g., the further one-bit extensions are all set to ZERO.

A write address generator 113 is connected for supplying write addressing to the RAM 112 such that FIC information is stored at appropriate locations within the M/H Frame, even if that FIC information begins to be furnished part way through the M/H Frame. An extractor 114 is connected for extracting the current FIC-Segment number from the header of the FIC Segment being currently written into the RAM 112 and supplying that current FIC-Segment number to the write address generator 113. The extractor 114 is further connected for supplying the current FIC-Segment number to a detector 115 for generating a pulse response to the current FIC-Segment number being '0000'. The detector 115 can be a four-input NOR gate operating as a decoder for 0000. An FIC-Chunk counter 116 is connected for receiving pulse responses from the detector 115 as count input signal. The write address generator 113 combines the FIC-Chunk count supplied from the counter 116 with the current FIC-Segment number supplied from the extractor 114 to generate each write address that the write address generator 113 supplies to the RAM 112.

The write addresses that the write address generator 113 supplies to the RAM 112 are accompanied by write control signals, which write control signals are also supplied as the further extension bits of the extended bytes supplied for being written into storage locations of the RAM 112. The value of these write control signals is the opposite—e.g., ONE—of the value indicating that a byte-storage location is empty of content. Accordingly, the further extension bits temporarily stored in respective extended-byte-storage locations of the RAM 112 are indicative of whether or not those locations store bytes of FIC information.

Figure 33E:
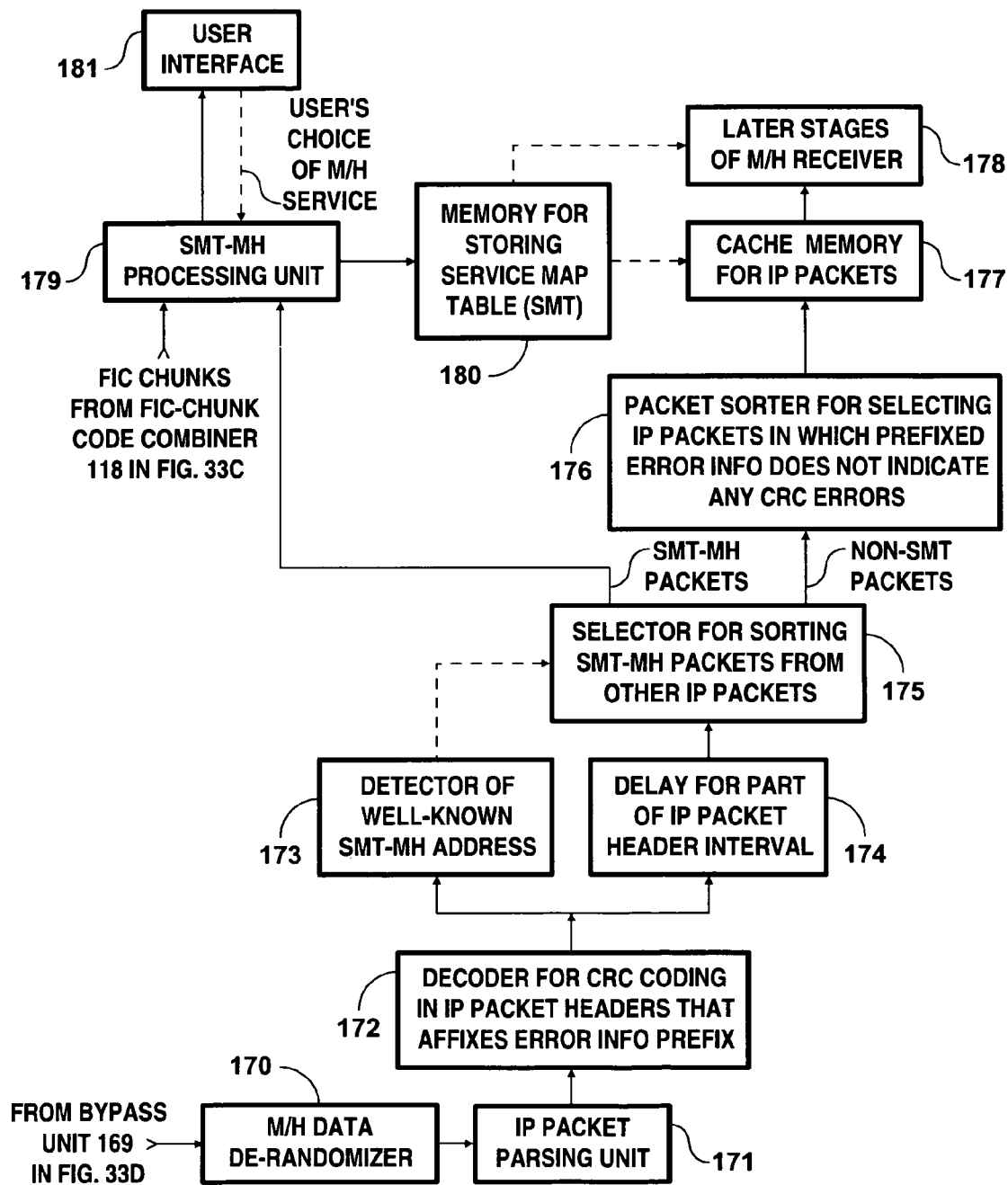

A read address generator 117 is connected for supplying read addressing to the RAM 112 when the RAM 112 reads its stored FIC information to provide input signal for an FIC-Chunk code combiner 118 at the conclusion of each M/H Frame interval. The FIC-Chunk code combiner 118 is connected for supplying processed FIC Chunks to part 66C of the M/H decoding control unit 66. (FIG. 33E shows processed FIC Chunks from the FIC-Chunk code combiner 118 being supplied to SMT-MH processing unit 179 to be integrated with SMT-MH information during the generation of Service Map Data, which are written into memory 180 for temporary storage therewithin.) The FIC-Chunk code combiner 118 combines correct 37-byte FIC-Segments from similar FIC-Chunks to generate correct FIC-Chunks, if possible.

The decoder 111 for (51, 37) RS coding is connected for supplying FIC-Segments to a read-address-ranges extractor 119 for extracting information from their headers concerning the FIC_last_segment_num(ber) of each of the P FIC-Chunks temporarily stored in the RAM 112. This information is temporarily stored in memory within the read-address-ranges extractor 119 to be used for controlling the operation of the read address generator 117 when reading FIC-Chunks in parallel from the RAM 112 to the FIC-Chunk code combiner 118.

FIG. 33D shows the turbo decoder 130 for CCC signal and the delay memory 120 connected for receiving respective input signals from the selector 99 and from the selector 100 in FIG. 33B. The delay memory 120 is operable for temporally aligning the initial-component transmissions of an iterative-diversity broadcast as reproduced in its delayed response with the final-component transmissions of the iterative-diversity broadcast as applied to the turbo decoder 130. The response of the delay memory 120 is applied as input signal to the turbo decoder 140 for CCC signal, which turbo decoder 140 is selectively operable in parallel with the turbo decoder 130. The delay memory 120 provides a number of M/H Frame intervals of delay as determined by the M/H decoding control unit 66 in response to the iterative_diversity_delay bits extracted from the TPC signal that the decoder 106 for (18, 10) RS FEC code supplies. This number of M/H Frame intervals will be zero if a code rate one-quarter the 8-VSB symbol rate is desired without resort to iterative diversity, but is more likely to be eight, twelve or sixteen.

The delay memory 120 facilitates the parallel operation of the turbo decoders 130 and 140 to decode respectively the initial-component transmissions and the final-component transmissions of an iterative-diversity CCC broadcast contemporaneously. Furthermore, the parallel operation of the turbo decoders 130 and 140 permits exchanging information between them concerning the confidence levels of soft data bits. An information-exchange unit 150 is connected between corresponding points in the turbo loops of the decoders 130 and 140 for performing such exchange. The turbo decoder 130 may be operated alone when receiving a single-time SCCC broadcast that does not employ iterative diversity. The delay memory 120, the turbo decoder 140 and the information-exchange unit 150 are not operated when receiving a single-time SCCC broadcast and do not need to be powered at such time.

When a DTV transmitter is operated to permit iterative-diversity reception of its signals alone, the data bits of the early-component transmissions preferably ones' complement the data bits of the corresponding late-component transmissions. When similar program material is broadcast by two cooperating DTV transmitters having respective coverage areas that overlap, it is advantageous for one of the cooperating DTV transmitters to transmit the similar program material in ones' complemented form. When broadcasting is of a sort described in the foregoing two sentences, the information-exchange unit 150 needs to compare the confidence levels of two sets of data bits that are complementary to each other. If similar program material is broadcast by three cooperating DTV transmitters having respective coverage areas all of which overlap in certain regions, two of the transmitters will have to transmit respective sets of data bits that are alike, rather than complementary to each other. Depending on the location of the FIG. 33 receiver apparatus, the information-exchange unit 150 is apt to have to compare the confidence levels of two sets of data bits that are similar to each other, rather than complementary to each other. Accordingly, the information-exchange unit 150 is constructed so it can accommodate comparison of the confidence levels of the two sets of data bits from the turbo loops of decoders 130 and 140 when those sets of data bits are similar to each other, rather than complementary to each other. FIG. 33D shows a portion 66D of the M/H decoding control unit 66 connected for supplying the information-exchange unit 150 a binary control signal. This binary control signal indicates which of the two modes of comparison of the confidence levels of the two sets of data bits from the turbo loops of decoders 130 and 140 is appropriate to use. The M/H decoding control unit 66 generates this binary control signal, which has a first value during iterative-diversity reception of a single DTV channel. When first and second DTV channels are being received in a region where the coverage areas of their transmitters overlap, the M/H decoding control unit 66 generates the binary control signal responsive to the result of exclusive-ORing the M/H data not ones' complemented? bits in the TPC signals of the first and second DTV channels.

The turbo decoder 130 is connected for supplying its decoding results to a hard-decision unit 160 that essentially comprises a hard limiter for soft data bits. As noted in the previous paragraph, some transmitters send a single transmission or the late component-transmission for iterative-diversity reception with ones' complemented data bits. So, the turbo decoding results when receiving M/H data from such transmitters need to be ones' complemented to regenerate the original data bits. The hard-decision unit 160 is connected for supplying hard-decisions concerning data bits to one of two input connections of an exclusive-OR gate 161. Part 66D of the M/H decoding control unit 66 is connected for supplying the other input connection of the XOR gate 161 a binary control signal. The M/H decoding control unit 66 generates this binary control signal dependent on the M/H_bits_not_ones'_complemented? bits in the TPC signal of the baseband DTV signal being decoded by the turbo decoder 130. If the hard-decisions concerning data bits supplied to the XOR gate 161 regenerate the original data bits, the value of the binary control signal supplied to the XOR gate 161 is ZERO. If the hard-decisions concerning data bits supplied to the XOR gate 161 need to be ones' complemented to regenerate the original data bits, the value of the binary control signal supplied to the XOR gate 161 is ONE. In either case the data bits in the output signal of the XOR gate 161 reproduce the original M/H data bits presuming them not to be corrupted by noise.

An 8-bit-byte former 162 forms the serial-bit response of the XOR gate 161 into eight-bit bytes. An extended-byte former 163 is connected for receiving the 8-bit bytes formed by the 8-bit-byte former 162 and appending to each of those bytes a number of bits indicative of the likelihood that that byte is in error. These bits indicative of the level of lack of confidence that a byte is correct are generated in the following way. A battery 164 of exclusive-OR gates is connected for exclusive-ORing the hard bit of each successive soft data bit from the turbo decoder 130 output signal with each of the soft bits descriptive of the level of confidence that hard bit is correct. The battery 164 of XOR gates thus generates a respective set of bits indicative of the level of lack of confidence that each successive hard bit is correct. A selector 165 selects the largest of the successive lack-of-confidence levels regarding the eight bits in each 8-bit-byte to provide the bits indicative of the level of lack of confidence that the byte is correct.

The resulting extended bytes are written row by row into respective rows of extended-byte storage locations in a random-access memory 166 operated to perform the matrix-type block de-interleaving procedure that is a first step of the TRS decoding routine. The RAM 166 is subsequently read one column of 9-bit extended bytes at a time to a selected one of a bank 167 of decoders for (230, 182), (230, 194) and (230, 206) Reed-Solomon codes, respectively. The bank 167 of decoders will further comprise decoders for (235, 187), (223, 187) and (211, 187) Reed-Solomon codes prescribed by A/153 if those TRS codes continue to be used. The M/H decoding control unit 66 selects the appropriate decoder in response to information extracted from the TPC. The extension bits accompanying the 8-bit bytes of the TRS code are used to help locate byte errors for the TRS code, as will be described in further detail infra with reference to FIG. 43 of the drawings. Such previous location of byte errors facilitates successful use of a Reed-Solomon algorithm capable of correcting more byte errors than an algorithm that must locate byte errors as well as correct them. The 8-bit data bytes that have been corrected insofar as possible by the selected one of the RS decoders in the bank 167 are written, column by column, into respective columns of byte-storage locations of a random-access memory 168. The RAM 168 is operated to perform the matrix-type block re-interleaving procedure for data in further steps of the TRS decoding routine. In a final step of the TRS decoding routine, the byte-storage locations in the RAM 168 are read from row-by-row for supplying reproduced randomized M/H data to a bypass unit 169. The bypass unit 169 usually relays this reproduced randomized M/H data to an M/H data de-randomizer 170 shown in FIG. 33E. The bypass unit 169 is connected to bypass TRS decoding for a prescribed time interval following selection of a new sub-channel for reception, however, supplying the data de-randomizer 170 with bytes of randomized M/H data taken directly from the response of the byte former 162. A representative construction of the bypass unit 169 is shown in FIG. 19 of the above-referenced U.S. patent application Ser. No. 12/580,534.

Referring now to FIG. 33E, the M/H data de-randomizer 170 is connected for receiving the output signal from the bypass unit 169 in FIG. 33D. The M/H data de-randomizer 170 de-randomizes the bytes of that signal by converting them to serial-bit form and exclusive-ORing the bits with the prescribed PRBS. The M/H data de-randomizer 170 converts the de-randomized bits into bytes of M/H data and supplies those bytes to a parsing unit 171 for parsing the data stream into internet-protocol (IP) packets. The IP-packet parsing unit 171 performs this parsing responsive to two-byte row headers respectively transmitted at the beginning of each row of IP data in the RS Frame. This row header indicates where the earliest start of an IP packet occurs within the row of IP data bytes within the RS Frame. If a short IP packet is completely contained within a row of the RS Frame, the IP-packet parsing unit 171 calculates the start of a later IP packet proceeding from the packet length information contained in the earlier IP packet within that same row of the RS Frame.

The IP-packet parsing unit 171 is connected for supplying IP packets to a decoder 172 for cyclic-redundancy-check coding in IP packets. Each IP packet contains a two-byte, 16-bit checksum for CRC coding that IP packet. The decoder 172 is constructed to preface each IP packet that it reproduces with a prefix bit indicating whether or not error has been detected in that IP packet. The decoder 172 is connected to supply these IP packets as so prefaced to a detector 173 of a "well-known" SMT-MH address and to a delay unit 174. The delay unit 174 delays the IP packets supplied to a packet selector 175 for selecting SMT-MH packets from other IP packets. The delay unit 174 provides delay of a part of an IP packet header interval, which delay is long enough for the detector 173 to ascertain whether or not the "well-known" SMT-MH address is detected.

If the detector 173 does not detect the "well-known" SMT-MH address in the IP packet, the detector 173 output response conditions the packet selector 175 to reproduce the IP packet for application to a packet sorter 176 as input signal thereto. The packet sorter 176 sorts out those IP packets in which the preface provides no indication of CRC coding error for writing to a cache memory 177 for IP packets. The prefatory prefix bit before each of the IP packets indicating whether there is CRC code error in its respective bytes is omitted when writing the cache memory 177. The cache memory 177 temporarily stores at least those IP packets not determined to contain CRC code error for possible future reading to the later stages 178 of the receiver. These later stages 178 of the receiver are sometimes referred to as the "upper layers" of the receiver.

If the detector 173 does detect the "well-known" SMT-MH address in the IP packet, establishing it as an SMT-MH packet, the detector 173 output response conditions the packet selector 175 to reproduce the SMT-MH packet for application to an SMT-MH processing unit 179, which includes circuitry for generating control signals for the later stages 178 of the M/H receiver. FIG. 33E shows the SMT-MH processing unit 179 connected for receiving FIC information from the FIC-Chunk code combiner 118 in FIG. 33C. The SMT-MH processing unit 179 integrates this FIC information with information from SMT-MH packets during the generation of Service Map Data. The Service Map Data generated by the SMT-MH processing unit 179 is written into memory 180 for temporary storage therewithin and subsequent application to the later stages 178 of the M/H receiver. The SMT-MH processing unit 179 relays those SMT-MH packets that have bit prefixes that do not indicate error in the packets to a user interface 181, which includes an Electronic Service Guide (ESG) and apparatus for selectively displaying the ESG on the viewing screen of the M/H receiver. U.S. patent application Ser. No. 12/555,248 filed 8 Sep. 2009 for A. L. R. Limberg and titled "Sub-channel acquisition in a digital television receiver designed to receive Mobile/Handheld signals" provides more detailed descriptions of the operations of the portion of an M/H receiver as shown in FIG. 33E. The description with reference to the drawing FIGS. 12, 13 and 14 of that application describe operations relying on the SMT-MH tables available in A/153.

Figure 34:
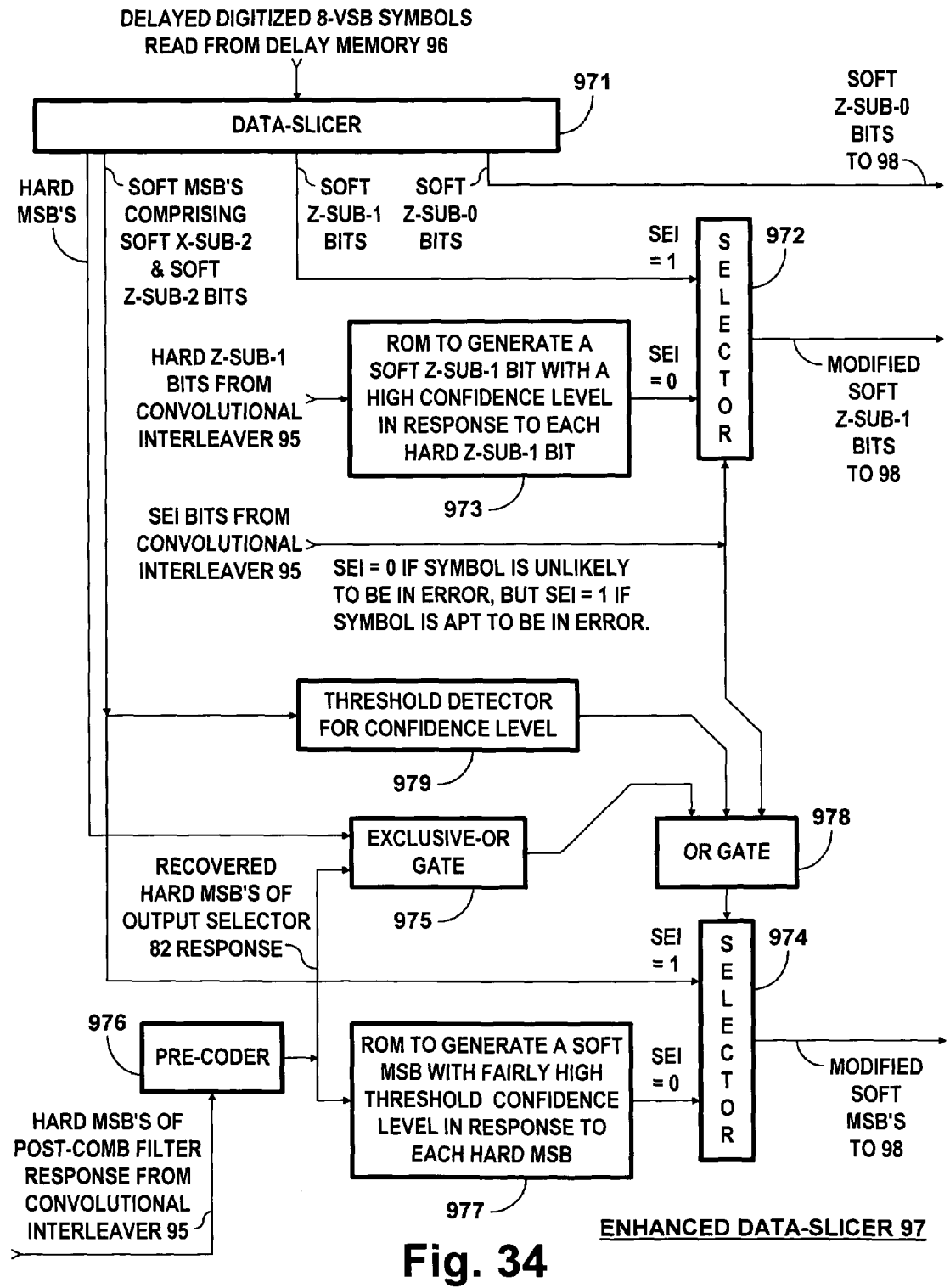
FIG. 34 is a detailed schematic diagram of a representative embodiment of the enhanced data-slicer depicted in FIG. 33B.

FIG. 34 shows a preferred embodiment of the enhanced data-slicer 97 depicted in FIG. 33B. The modified data-slicer 97 includes a conventional data-slicer 971 with an input port connected for receiving delayed digitized 8-VSB symbols read from the delay memory 96. The data-slicer 971 generates a first output signal composed of soft Z-sub-0 bits. Each of these soft Z-sub-0 bits has less-significant bits (LSBs) expressing a level of confidence that its hard most-significant bit (MSB) defining a hard Z-sub-0 bit is correct. These soft Z-sub-0 bits are respective first parts of the modified delayed soft 8-VSB symbols supplied to the cascade connection 98 of delay memories as input signal thereto.

The data-slicer 971 generates a second output signal composed of soft Z-sub-1 bits, which soft Z-sub-1 bits are supplied to the first of two input ports of a selector 972. Each of these soft Z-sub-1 bits has LSBs expressing a level of confidence that its MSB defining a hard Z-sub-1 bit is correct. A read-only memory 973 is connected for receiving hard Z-sub-1 bits from the output port of the convolutional byte interleaver 95 as address input signal and for responding to each hard Z-sub-1 bit for supplying a respective soft Z-sub-1 bit. Each of the soft Z-sub-1 bits read from the ROM 973 has LSBs expressing a high level of confidence that its hard MSB is correct. The soft Z-sub-1 bits read from the ROM 973 are supplied to the second input port of the selector 972. The selector 972 is connected for receiving, as its selection control signal, symbol-error-indication (SEI) bits from the output port of the convolutional byte interleaver 95. An SEI bit being ZERO signals that a hard Z-sub-1 bit from the output port of the convolutional byte interleaver 95 is unlikely to be in error. This conditions the selector 972 to reproduce at its output port the soft Z-sub-1 bit supplied to its second input port. The LSBs of this soft Z-sub-1 bit express a high level of confidence that its hard MSB is correct, which tends to speed up the subsequent turbo decoding procedures. An SEI bit being ONE signals that a hard Z-sub-1 bit from the output port of the convolutional byte interleaver 95 is apt to be in error. This conditions the selector 972 to reproduce at its output port the soft Z-sub-1 bit that the data-slicer 971 supplies to its first input port. The LSBs of this soft Z-sub-1 bit express a level of confidence that its MSB is correct, as determined from data slicing by the data-slicer 971. The soft Z-sub-1 bits reproduced at the output port of the selector 972 are respective second parts of the modified delayed soft 8-VSB symbols supplied to the cascade connection 98 of delay memories as input signal thereto.

The data-slicer 971 generates a third output signal composed of soft Z-sub-2 bits of main-service 8-VSB symbols and soft X-sub-2 bits of M/H-service 8-VSB symbols. These soft most-significant bits (MSBs) of 8-VSB symbols are supplied to the first of two input ports of a selector 974. Each of these soft MSBs has LSBs expressing a level of confidence that its hard MSB, which is supplied to the first of two input ports of an exclusive-OR gate 975, is correct. A pre-coder 976 is connected for receiving hard MSBs of post-comb filter 89 response from the output port of the convolutional byte interleaver 95 as input signal, which post-comb filter 89 response may have been corrected by the decoder 93 for (207, 187) Reed-Solomon coding. The output port of the pre-coder 976 is connected for supplying the second input port of the XOR gate 975 with recovered hard MSBs of output selector 82 response, as possibly corrected by the decoder 93 for RS coding. The output port of the pre-coder 976 is further connected for supplying supposedly recovered hard MSBs of output selector 82 response to a read-only memory 977 as address input signal. The ROM 977 supplies from an output port thereof a respective soft MSB in response to each hard MSB received as address input signal. Each of the soft MSBs read from the ROM 977 has LSBs expressing a fairly high level of confidence that its hard MSB is correct. The soft MSBs read from the ROM 977 are supplied to the second input port of the selector 974. The soft MSBs reproduced at the output port of the selector 974 are respective third parts of the modified delayed soft 8-VSB symbols supplied to the cascade connection 98 of delay memories as input signal thereto.

The selector 974 is connected for receiving, as its selection control signal, the response of an OR gate 978. The output port of the exclusive-OR gate 975 is connected to a first of three input ports of the OR gate 978. The input port of a threshold detector 979 is connected for receiving soft MSBs from the data-slicer 971. The output port of the threshold detector 979 is connected for supplying a ONE to the second input port of the OR gate 978 only if the absolute value of the confidence level expressed by the LSBs exceeds a fairly high threshold. The third input port of the OR gate 978 is connected for receiving symbol-error-indication (SEI) bits from the output port of the convolutional byte interleaver 95.

An SEI bit supplied from the output port of the convolutional byte interleaver 95 being ONE signals that a hard MSB of a symbol of post-comb filter 89 response is apt to have been in error. This implies that the corresponding hard MSB of output selector 82 response recovered by the pre-coder 976 is apt to be in error, owing to the fact that the hard MSB of post-comb filter 89 response depends in part upon the hard MSB of output selector 82 response. So, in response to the SEI bit being ONE, the OR gate 978 supplies a ONE from the output port thereof as selection control signal to the selector 974. That selection control signal being ONE conditions the selector 974 to reproduce at its output port the soft MSB that the data-slicer 971 supplies to its first input port. The LSBs of this soft MSB bit express a level of confidence that its MSB is correct, as determined from data slicing by the data-slicer 971.

An SEI bit supplied from the output port of the convolutional byte interleaver 95 being ZERO signals that a hard MSB of a symbol of post-comb filter 89 response as supplied from the output port of the convolutional byte interleaver 95, after possible correction, is unlikely to be in error. In response to both the SEI bit and the threshold detector 979 response also being ZERO, the OR gate 978 reproduces at its own output port the response it receives from the output port of the exclusive-OR gate 975. The likelihood that the hard MSB of post-comb filter 89 response is correct is strongly suggestive, but not absolutely conclusive, that the supposed hard MSB of output selector 82 response recovered by the pre-coder 976 is correct as well. This is because the hard MSB of post-comb filter 89 response depends partly upon the hard MSB of output selector 82 response, which is exclusive-ORed with accumulated previous output selector 82 responses to generate that hard MSB of post-comb filter 89 response. However, there is a small possibility that both the hard MSB of output selector 82 response and the MSB of the accumulation of previous output selector 82 responses are in error, rather than both being correct, still resulting in lack of byte error in the post-comb filter 89 response. The likelihood of the existence of such double error is substantially lower, however, if the supposed hard MSB of output selector 82 response recovered by the pre-coder 976 corresponds to the hard MSB of output selector 82 response recovered by the data-slicer 971. So, when these MSBs have similar hard values, lower confidence levels expressed by the LSBs of the soft MSB recovered by the data-slicer 971 can be quite safely increased to the fairly high level of confidence expressed by the LSBs of the soft MSB read from the ROM 977.

The exclusive-OR gate 975 in effect compares the hard MSB of output selector 82 response recovered by the pre-coder 976 with the corresponding hard MSB of data-slicer 971 response. If these MSBs are the same, the response of the exclusive-OR gate 975 is a ZERO. The OR gate 978 reproduces this ZERO in its own response if both the concurrent threshold detector 979 response and the concurrent SEI bit are ZEROes. The ZERO response of the OR gate 978 applied to the selector 974 as selection control signal conditions the selector 974 to reproduce at its output port the soft MSB read to its second input port from the ROM 977. The LSBs of this soft MSB express a fairly high level of confidence that its hard MSB is correct. This tends to speed up the subsequent turbo decoding procedures, presuming this fairly high level of confidence that the hard MSB is correct is greater than that expressed by the LSBs of the soft MSB from the data-slicer 971.

This fairly high level of confidence in soft MSBs reproduced in accordance with those from ROM 977 is the same as the level of confidence that the threshold detector 979 uses as a threshold level of confidence. The threshold detector 979 response is a ONE only if the confidence level expressed by the less significant bits of the soft MSB bit supplied from the data-slicer 971 exceeds this threshold level of confidence. The threshold detector 979 response being a ONE causes the OR gate 978 response to be a ONE, which selection control signal conditions the selector 974 to reproduce at its output port the soft MSB supplied by the data-slicer 971. The higher confidence level of the soft MSB supplied by the data-slicer 971 has less tendency than the threshold confidence level of the soft MSB supplied by the ROM 978 to slow the subsequent turbo decoding procedures.

If the hard MSB of output selector 82 response recovered by the pre-coder 976 and the corresponding hard MSB recovered by the data-slicer 971 differ from each other, the response of the exclusive-OR gate 975 is a ONE. The OR gate 978 reproduces this ONE in its own response applied to the selector 974 as selection control signal, which conditions the selector 974 to reproduce at its output port the soft MSB recovered by the data-slicer 971. The LSBs of this soft MSB express a level of confidence that its hard MSB is correct, as determined from data slicing by the data-slicer 971.

Determining correct Z-sub-1 bits of the 8-VSB symbols in reliance upon the (207, 187) RS coding is simpler and more direct than attempting the determination of correct MSBs of the 8-VSB symbols, presuming that the MSBs of symbol-interleaved outer convolutional coding are not pre-coded in final transmission. This because the Z-sub-1 bits of the 8-VSB symbols are encoded directly within the (207, 187) RS coding, whereas the MSBs of those 8-VSB symbols are post-comb filtered before encoding within the (207, 187) RS coding. When the M/H transmissions are made using PCCC at one-half 8-SB symbol rate, the correction of Z-sub-1 bits in reliance upon the (207, 187) RS coding affects the data bits of the symbol-interleaved outer convolutional coding directly. The correction of the symbol MSBs in reliance upon the (207, 187) RS coding is done rather indirectly to affect the parity bits of the symbol-interleaved outer convolutional coding. Insofar as subsequent turbo decoding is concerned, this arrangement with PCCC is somewhat more advantageous than is the arrangement with SCCC, presuming that the MSBs of symbol-interleaved outer convolutional coding are not pre-coded in final transmission. In such SCCC arrangement the correction of Z-sub-1 bits in reliance upon the (207, 187) RS coding affects the parity bits of the symbol-interleaved outer convolutional coding directly. However, the correction of MSBs in reliance upon the (207, 187) RS coding is done rather indirectly in regard to the data bits of the symbol-interleaved outer convolutional coding.

In certain less preferred M/H broadcasting systems embodying aspects of the invention, the MSBs of all 8-VSB symbols are pre-coded in final transmission of them. The correction of these MSBs in reliance upon the (207, 187) RS coding can be done directly. One reason that such M/H broadcasting systems are less preferred is that the MSBs of 8-VSB symbols descriptive of symbol-interleaved outer convolutional coding require post-comb filtering prior to turbo decoding procedures, which filtering reduces signal-to-noise ratio.

Using the (207, 187) RS forward-error-correction coding to modify the soft 8-VSB symbols supplied for turbo decoding involves a considerable amount of computation. The question is whether that amount of computation can improve the subsequent turbo decoding and/or RS-Frame decoding sufficiently to be worthwhile performing. The (207, 187) RS coding performs better when the SNR of received signal is reasonably high and can be effective for overcoming short-duration burst noise randomly distributed over RS Frames, which noise is sometimes referred to as "impulse noise". Prior reduction of impulse noise can help reduce the number of iterations in turbo decoding, possibly saving more power than required for processing the (207, 187) RS forward-error-correction coding. At lower average SNR of received signal, decoding of the (207, 187) RS forward-error-correction coding becomes problematic, and power would be conserved by discontinuing that decoding. M/H receivers can be designed that respond to the SNR of received signal to determine when it is insufficiently high to warrant decoding of the (207, 187) RS forward-error-correction coding. SNR can be measured by accumulating the variances of 8-VSB symbol levels from prescribed levels for data slicing, for example, with the SNR as so measured being used to determine when it is not sufficiently high to warrant decoding of the (207, 187) RS forward-error-correction coding.

Figure 35:
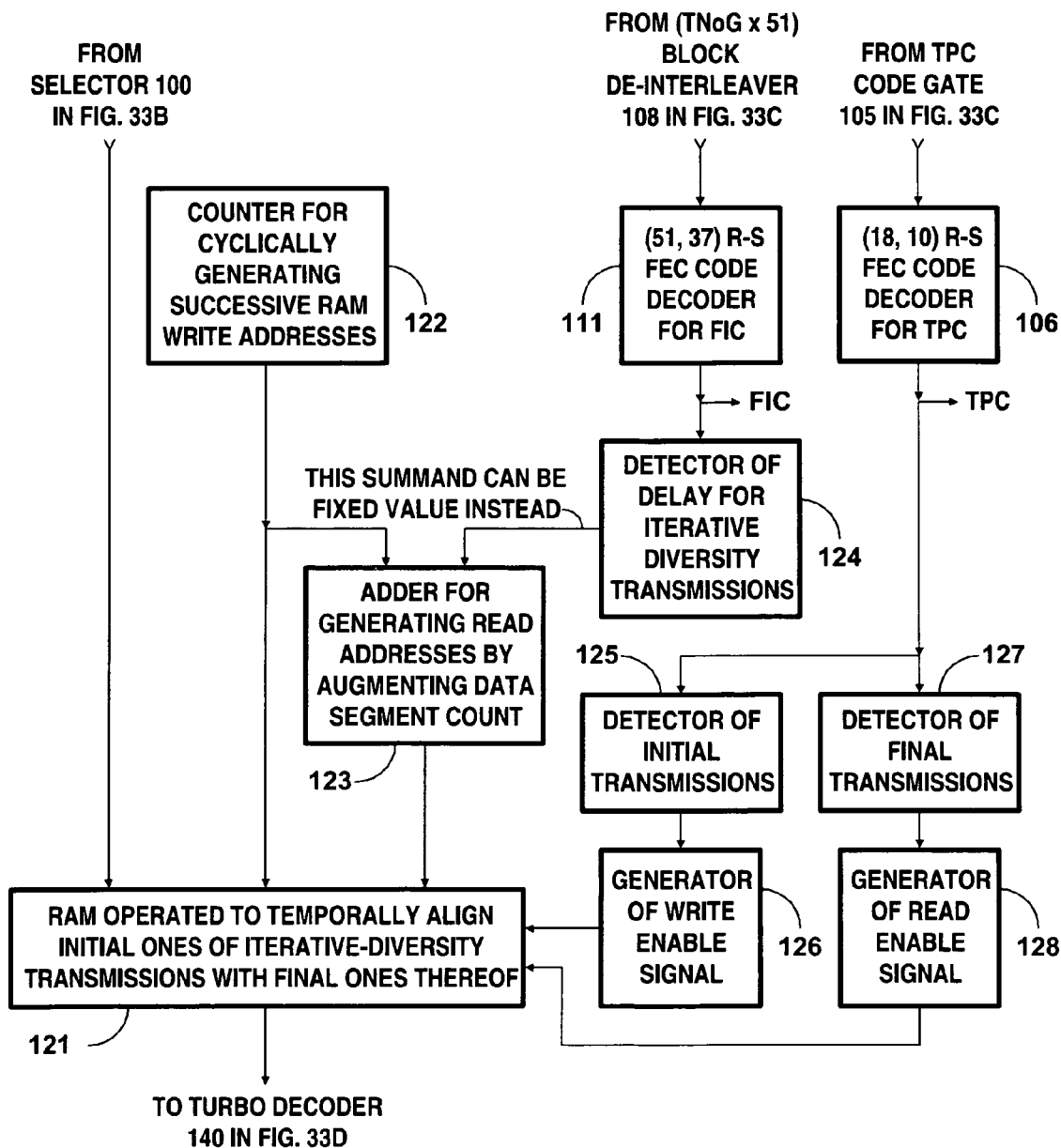
FIG. 35 is a detailed schematic diagram of a representative embodiment of the delay memory used in the FIG. 33D portion of the FIG. 33 receiver apparatus for delaying initial transmissions of M/H data, so as to align them in time with final transmissions of the same M/H data when iterative-diversity transmissions are being received.

FIG. 35 shows more particularly a random-access memory 121 being used as the basis of the delay memory 120 that FIG. 33C shows for delaying the initial-component transmissions when receiving an iterative-diversity broadcast of coded M/H data. FIG. 35 depicts, in detail, the circuitry used to support the operation of the RAM 121. FIG. 35 shows a counter 122 connected for cyclically generating successive write addresses for the RAM 121. The output count from the counter 122 is partitioned into a data field count, a data segment count and an 8-VSB symbol count. The data segment count, the 8-VSB symbol count and the least significant bit of the data field count are reset to appropriate values responsive to information in the data field synchronizing (DFS) signals at the beginning of 8-VSB data fields. The RAM 121 accepts a full range of data segment count that is an integer multiple M times 312 in number, as partial addresses both for writing and for reading. However, the RAM 121 need not have actual storage locations for symbols associated with all the full addresses that contain these partial addresses. The full addresses that have partial addresses related to data segments that do not include M/H data do not need actual storage locations for symbols associated with them. This reduces the number of actual storage locations for symbols required in the RAM 121 by the rather small factor of 156/150.

A digital adder 123 is connected for generating read addresses for the RAM 121 by augmenting the data segment count portions of the successive write addresses for the RAM 121 generated by the counter 122. The augmentation can be a fixed value, for offsetting the read addresses from the write addresses that they respectively augment by a specified odd multiple of 156, which multiple is typically 156 times either 81 or 79.

FIG. 35 shows a more sophisticated way of determining the offset between write addresses and read addresses for the RAM 121. The offset is determined responsive to an indication supplied by bits in the FIC signal from the decoder 111 for the (51, 37) RS FEC coded FIC. A detector 124 of the delay for iterative diversity transmission responds to these bits to generate the offset between the data segment count portions of the write and read addresses to be supplied to the RAM 121. This offset is supplied as the summand input signal to the digital adder 123 that augments the data segment count portions of the successive write addresses generated by the counter 122, thus to generate read addresses for the RAM 121. Programming the offset between write addresses and read addresses for the RAM 121 responsive to bits of the FIC signal, allows receivers to be made with different amounts of storage capability for bytes of iterative-diversity signals. As memory becomes cheaper, more receivers can be built with longer delays for overcoming momentary drop-outs in received signal strength. More importantly perhaps, such programming offers the broadcaster some trade-off in the way the RAM 121 is used in the receiver. If fewer Slots are used for iterative-diversity transmissions, the excess storage capacity of the RAM 121 can be utilized to provide longer delay for overcoming momentary drop-outs in received signal strength.

The RAM 121 will seldom, if ever, be called upon to temporarily store more than 40 M/H Groups of data per M/H Frame. The RAM 121 will never be called upon to temporarily store more than 40 M/H Groups of data per M/H Frame if careful broadcast practices are followed. Accordingly, the number of storage locations in the RAM 121 can be halved if their addressing takes into account the subchannel_interleaving and iterative_diversity_mode information extracted from TPC signaling.

A detector 125 for detecting initial transmissions is connected for receiving TPC signal from the decoder 106 for the (18, 10) RS FEC coded TPC. The TPC signal presumably includes an iterative_diversity_mode datum. The detector 125 responds to that iterative_diversity_mode datum indicating an initial transmission is currently being made to condition a generator 126 of write-enable signal to begin generating a write-enable signal for application to the RAM 121. Generation of the write-enable signal continues until the then current Slot concludes. The RAM 121 is conditioned by the write-enable signal to write the equalized baseband M/H signal supplied from the selector 100 to symbol storage locations specified by the write addressing received from the digital adder 123. These symbol storage locations will not be reached for reading until a second or so later.

A detector 127 for detecting final transmissions is connected for receiving TPC signal from the decoder 106 for the (18, 10) RS FEC coded TPC. The detector 127 responds to the iterative_diversity_mode datum indicating an final transmission being currently made to condition a generator 128 of read-enable signal to begin generating a read-enable signal for application to the RAM 121. Generation of the read-enable signal continues until the then current Slot concludes. The RAM 121 is conditioned by the read-enable signal to read delayed equalized baseband CCC from symbol storage locations specified by the read addressing received from the counter 122. The delayed equalized baseband CCC is read from the RAM 121 to supply input signal to the turbo decoder 140 for the initial-component transmissions of the iterative-diversity broadcast. The turbo decoder 140 is depicted in FIG. 33D.

Figure 36:
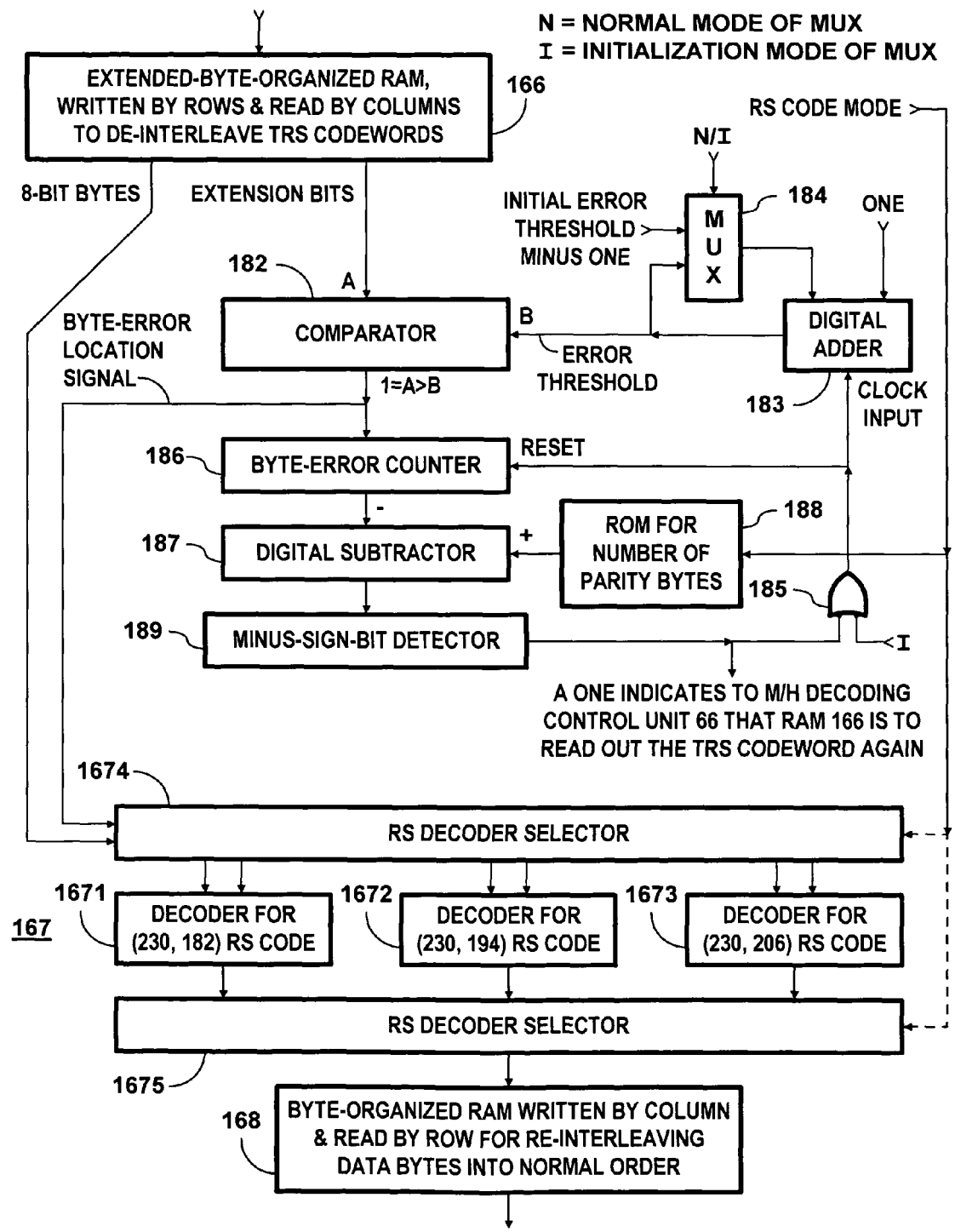
FIG. 36 is a detailed schematic diagram of representative structure of apparatus for decoding RS Frames in accordance with the invention.

FIG. 36 shows the structure of the bank 167 of RS decoders in more detail. The bank 167 of RS decoders is shown as comprising a decoder 1671 for (230, 182) RS code, a decoder 1672 for (230, 194) RS code, a decoder 1673 for (230, 206) RS code, and RS decoder selectors 1674 and 1675. The RS decoder selector 1674 is connected for applying the TRS codeword read from the preceding RAM 166 to one of the decoders 1671, 1672 and 1673 as selected responsive to an RS CODE MODE pair of bits. The M/H decoding control unit 66 supplies this pair of bits responsive either to the current_RS_code_mode_primary or the current_RS_code_mode_secondary bits detected by the TPC decoder 106 in FIG. 33C. The RS decoder selector 1675 is connected for applying to the succeeding RAM 168 the error-corrected results from the one of the decoders 1671, 1672 and 1673 as selected responsive to the RS CODE MODE pair of bits. The RS CODE MODE pair of bits is generated by the M/H decoding control unit 66 responsive to the RS_code_mode bits in the TPC signals decoded by the decoder 106 for (18, 10) RS FEC code.

The one of decoders 1671, 1672 and 1673 selected for operation initially attempts to correct the TRS codeword using a byte-error-location-and-correction decoding algorithm. If the TRS codeword has too many byte errors to be corrected by this algorithm, the selected decoder then resorts to a byte-error-correction-only decoding algorithm. The RS decoder selector 1674 is connected for forwarding indications of byte errors to the selected one of the decoders 1671, 1672 and 1673 together with the bytes of each TRS codeword. The extension bits accompanying each successive 8-bit byte of a TRS codeword from the RAM 166 are supplied to a comparator 182 used as a threshold detector. The extension bits indicate the likelihood that the 8-bit byte is in error, and comparator 182 compares them to an error threshold. If the likelihood that the 8-bit byte is in error exceeds the error threshold, the comparator 182 responds with a logic ONE indicative that the byte is presumably in error. Otherwise, the comparator 182 responds with a logic ZERO indicative that the byte is presumably correct.

FIG. 36 shows the sum output signal from a clocked digital adder 183 supplied to the comparator 182 as the error threshold. The value of the error threshold is initialized in the following way at the outset of each TRS codeword being read from the RAM 166. A two-input multiplexer 184 is connected to supply its response as a first of two summand signals supplied to the adder 183, the second summand signal being arithmetic one. The sum output signal from the clocked adder 183 is applied as one of two input signals to the multiplexer 184, and an initial error threshold value less one is applied as the other input signal to the multiplexer 184. Just before each TRS codeword is read from the RAM 166 a respective pulsed logic ONE is generated by the M/H decoding control unit 66. The pulsed logic ONE is applied as control signal to the multiplexer 184, conditioning it to reproduce the initial error threshold value less one in its response supplied to the adder 183 as a summand input signal. The clocked adder 183 receives its clock signal from an OR gate 185 connected to receive the pulsed logic ONE at one of its input connections. The OR gate 185 reproduces the pulsed logic ONE in its response that clocks an addition by the adder 183. The adder 183 adds its arithmetic one summand input signal to the initial error threshold value less one summand input signal received from the multiplexer 184, generating the initial error threshold value as its sum output signal supplied to the comparator 182.

The pulsed logic ONE also resets to arithmetic zero the output count from a byte-error counter 186 that is connected for counting the number of logic ONEs that the comparator 182 generates during each TRS codeword. This output count is applied as subtrahend input signal to a digital subtractor 187. A read-only memory 188 responds to the RS CODE MODE pair of bits to supply the number of parity bytes in the TRS codewords, which number is supplied as minuend input signal to the subtractor 187. A minus-sign-bit detector 189 is connected for responding to the sign bit of the difference output signal from the subtractor 187. The minus-sign-bit detector 189 generates a logic ONE if and when the number of byte errors in a TRS codeword counted by the counter 186 exceeds the number of parity bytes in a TRS codeword. This logic ONE is supplied to the M/H decoding control unit 66 as an indication that the current TRS codeword is to be read from the RAM 166 again. This logic ONE is supplied to the OR gate 185 as an input signal thereto. The OR gate 185 responds with a logic ONE that resets the counter 186 to zero output count and that clocks the clocked digital adder 183. Normally, the multiplexer 184 reproduces the error threshold supplied as sum output from the adder 183. This reproduced error threshold is applied to the adder 183 as a summand input signal, connecting the clocked adder 183 for clocked accumulation of arithmetic ones in addition to the previous error threshold. The logic ONE from the OR gate 185 causes the error threshold supplied as sum output from the adder 183 to be incremented by arithmetic one, which tends to reduce the number of erroneous bytes located within the TRS codeword upon its being read again from the RAM 187.

If and when the number of erroneous bytes located in the TRS codeword is fewer than the number of parity bytes that the ROM 188 indicates that the TRS codeword should have, the M/H decoding control unit 66 will cause the next TRS codeword in the RS Frame to be processed if such there be. The M/H decoding control unit 66 will begin reading such next TRS codeword from the RAM 166 to the bank 167 of RS decoders and writing the RS decoding results into the RAM 168.

Figure 37:
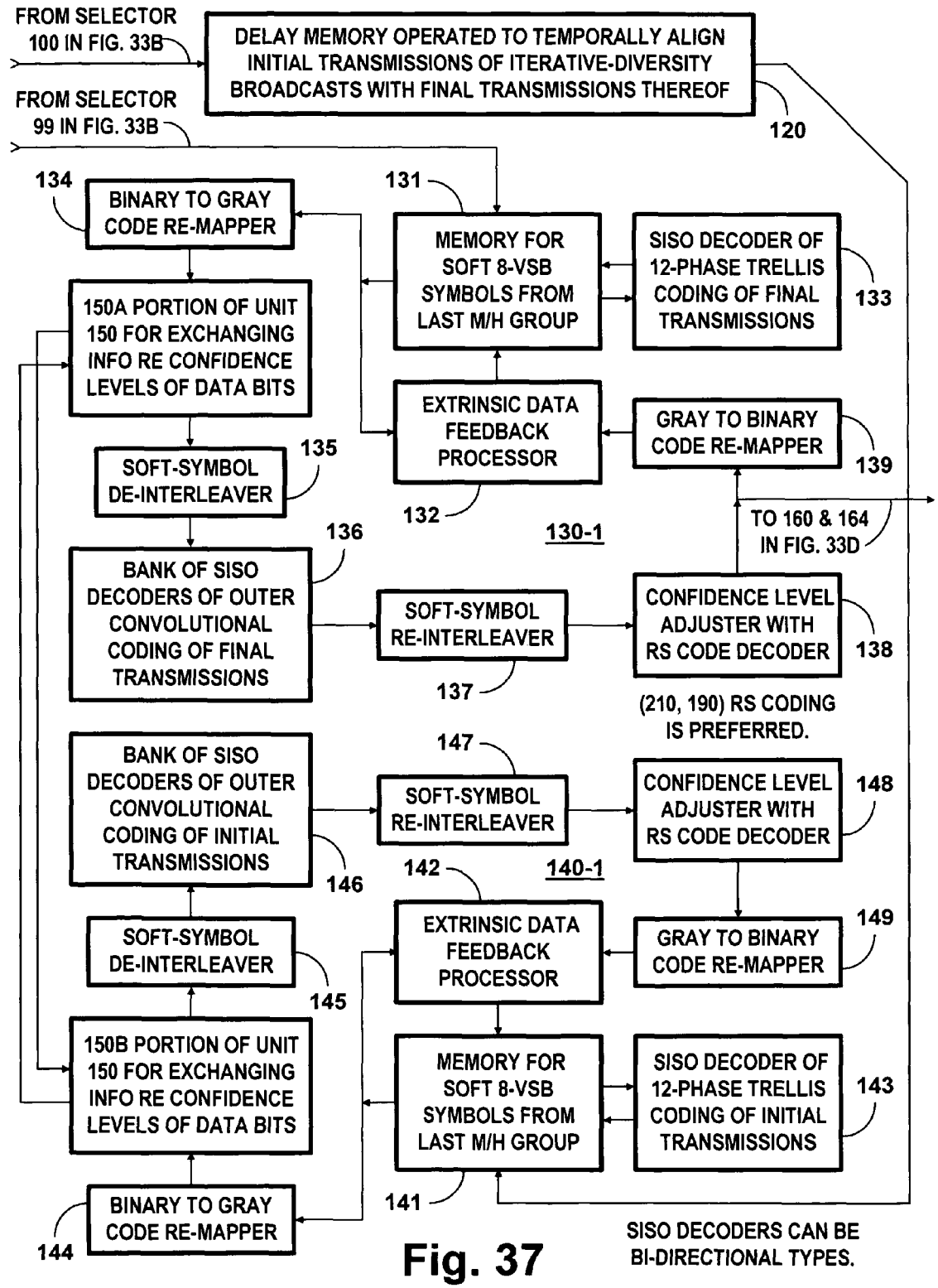
FIG. 37 is a schematic diagram of a first representative embodiment of the paralleled turbo decoders for diversity reception shown in the FIG. 33D portion of the FIG. 33 receiver apparatus.

FIG. 37 shows in some detail an illustrative embodiment of the pair of turbo decoders 130 and 140 operated in parallel, which is used for receiving one-third-code-rate CCC. The turbo decoder 130 comprises elements 131-139. The turbo decoder 140 is similar in construction and comprises elements 141, 142, 143, 144, 145, 166, 167, 168 and 149 that correspond to elements 131, 132, 133, 134, 135, 136, 137, 138 and 139, respectively. A feeling for the general design of a prior-art turbo decoder for PCCC can be developed by reading the M. C. Valenti and J. Sun paper "The UMTS Turbo Code and an Efficient Decoder Implementation Suitable for Software-Defined Radios", *International Journal of Wireless Information Networks*, Vol. 8, No. 4, October 2001, with special reference to FIG. 2 of that paper. A feeling for how the general design of a turbo decoder for SCCC is related thereto can be developed by reading the S. Benedetto, D. Divsalar, G. Montorsi, and F. Pollara paper "Serial Concatenation of Interleaved Codes: Performance Analysis, Design, and Iterative Decoding", *The Telecommunications and Data Acquisition Progress Report* 42-126, 15 Aug. 1995, Jet Propulsion Laboratory, Pasadena, Calif., with special reference to FIG. 14 of that paper. The soft-input/soft-output (SISO) decoders used in these turbo decoding schemes use the sliding-window log-MAP algorithm. The term "log-MAP" is short for "logarithmic maximum a posteriori".

The turbo decoders 130 and 140 shown in FIGS. 37, 45, 47 and 49-56 are configured to accommodate implied symbol interleaving of the outer convolutional coding. Implied symbol interleaving of the outer convolutional coding is described in the inventor's above-referenced U.S. patent application Ser. No. 12/800,559 filed 18 May 2010. The use of implied symbol interleaving of the outer convolutional coding alters the prior-art general configuration of a turbo decoder for CCC in the following ways. A symbol de-interleaver replaces the symbol interleaver between the decoder for inner convolutional coding and the decoder for outer convolutional coding. A symbol interleaver replaces the symbol de-interleaver between the decoder for outer convolutional coding and the decoder for inner convolutional coding. The turbo decoder output signal is extracted before the symbol de-interleaver or after the symbol interleaver, rather than after the symbol de-interleaver or before the symbol interleaver.

A novel feature of the embodiments of the turbo decoders 130 and 140 in each of the FIGS. 37, 45, 47 and 49-56 is that each includes a confidence-level adjuster that includes a decoder for Reed-Solomon coding. Preferably, the decoder is one for decoding systematic (210, K) Reed-Solomon coding, presuming that the outer convolutional coding is one-half-rate coding as described.

Portions 150A and 150B of the information-exchange unit 150 are included in the turbo loops of the turbo decoders 130 and 140, respectively. The fundamental approach used for iterative diversity reception is to delay the initial-component transmissions so that they can be decoded contemporaneously with the final-component transmissions. This facilitates the exchange of information between the turbo decoder 130 for final-component transmissions and the turbo decoder 140 for initial-component transmissions. The information-exchange unit 150 is connected for exchanging information between the respective turbo loops of the turbo decoders 130 and 140, which information concerns the confidence levels of soft data bits.

FIG. 37 is a more detailed schematic diagram of an illustrative embodiment of the FIG. 33D portion of the FIG. 33 M/H receiver apparatus comprising the delay memory 120, a first embodiment 130-1 of the turbo decoder 130, a first embodiment 140-1 of the turbo decoder 140, and the information-exchange unit 150. The differential delay between the initial-component transmissions and the final-component transmissions of the iterative-diversity broadcast is not compensated for in a single stage of delay memory. Rather, the differential delay is compensated for in two stages, as described in the inventor's U.S. patent application Ser. No. 12/800,559. The time interval between an initial-component transmission and the corresponding final-component transmission of an iterative-diversity broadcast can be considered to be an integral number of M/H Frame intervals plus or minus a fraction of an M/H sub-Frame interval. The component of the differential delay that is a fraction of an M/H sub-Frame interval is compensated for by the portion of the FIG. 33B apparatus comprising elements 98, 99 and 100 that is also used to compensate for the differential delay encountered during frequency-diverse reception. The M/H decoding control unit 66 determines the fraction of an M/H sub-Frame interval of delay to be compensated for by the portion of the FIG. 33B apparatus comprising elements 98, 99 and 100. This determination proceeds starting from the subchannel_interleaving bits in the TPC signal. The integral number of M/H Frame intervals component of the differential delay is compensated for by the delay memory 120, which affords delay as programmed by the M/H decoding control unit 66 responsive to the iterative_diversity_delay bits in the TPC signal.

The preparation of the baseband DTV signal for data-slicing within the turbo decoders 130 and 140 differs from that conventionally used for decoders of 8-VSB symbols. This is because, in accordance with an aspect of the invention, the CCC is transmitted without precoding of the Z-sub-2 bits of the 8-VSB symbols. The procedure referred to as "post-combing" is then omitted. The results of data-slicing an equalized baseband DTV signal supplied from the output port of the output selector 82 in FIG. 33A are not delayed and modularly added to the undelayed results of that data-slicing in order to recover Z-sub-2 bits for subsequent turbo decoding. A selected portion of the equalized baseband DTV signal supplied from the output port of the selector 99 in FIG. 33B as possibly subjected to some delay is applied to the turbo decoder 130 as its input signal. The turbo decoder 130 receives its input signal without the MSBs of the equalized baseband DTV signal having been modified by post-comb filtering. A selected portion of the equalized baseband DTV signal supplied from the output port of the selector 100 in FIG. 33B is applied to the input port of the delay memory 120 to be temporarily stored before being read out to the turbo decoder 140 as input signal thereto. The turbo decoder 140 receives its input signal without the MSBs of the equalized baseband DTV signal having been modified by post-comb filtering. If the delay memory 120 is supplied with the final-component transmissions of a frequency-diversity broadcast as input signal, those final-component transmissions are forwarded immediately to the turbo decoder 140 as input signal thereto. Shimming delay of the input signals applied to the turbo decoders 130 and 140 is typically employed so that these respective final-component transmissions are essentially contemporaneous with each other.

If the delay memory 120 is written with the initial-component transmissions of an iterative-diversity broadcast that are supplied from the output port of the selector 100 in FIG. 33B, the delay memory 120 temporarily stores each initial-component transmission until the corresponding final-component transmission of that data appears in the response from the output port of the selector 99 in FIG. 33B. Each initial-component transmission of data is then read to provide input signal to the turbo decoder 140 that is contemporaneous with the corresponding final-component transmission of that data being applied as input signal to the turbo decoder 130.

FIG. 37 shows a first embodiment 130-1 of the turbo decoder 130. A memory 131 in the turbo decoder 130-1 is connected for receiving soft 8-VSB symbols from the output port of the selector 99. The soft bits of the 3-bit 8-VSB symbols from the M/H Group most recently supplied by the selector 99 are written into temporary storage within the memory 131. First, second and third parts of the memory 131 temporarily store the soft decisions that respectively concern Z-sub-2, Z-sub-1 and Z-sub-0 bits supplied by the selector 99. A fourth part of the memory 131 is used for temporarily storing soft decisions concerning portions of M/H data that relate to Z-sub-1 bits, as recovered by decoding the inner convolutional coding of the CCC. A fifth part of the memory 131 is used for temporarily storing soft decisions concerning portions of extrinsic data that relate to Z-sub-1 bits as fed back from a SISO decoder for the outer convolutional coding of the CCC. A sixth part of the memory 131 is used for temporarily storing soft decisions concerning portions of extrinsic data that relate to Z-sub-2 bits as fed back from the SISO decoder for the outer convolutional coding of the CCC when it is SCCC. An extrinsic data feedback processor 132 is connected for writing these portions of extrinsic data to the fifth and sixth parts of the memory 131 each time that the turbo decoder 130-1 decodes the outer convolutional coding of SCCC for an M/H Group. When the turbo decoder 130-1 decodes the outer convolutional coding of PCCC for an M/H Group, the extrinsic data feedback processor 132 writes soft decisions concerning portions of extrinsic data that relate to Z-sub-1 bits to the fifth part of the memory 131. However, the sixth part of the memory 131 need not be written with portions of extrinsic data that relate to Z-sub-2 bits.

The soft decisions concerning the Z-sub-1 bits of 8-VSB symbols from the M/H Group most recently supplied by the selector 99 that are temporarily stored in the second part of the memory 131 are additively combined with soft decisions concerning the Z-sub-1 bits in the extrinsic data that are temporarily stored in the fifth part of the memory 131. The resulting soft decisions concerning the Z-sub-1 bits in the sum response are supplied as part of the input signal to a SISO decoder 133 for 12-phase trellis coding. The remaining part of the input signal to the SISO decoder 133 consists of the corresponding soft decisions concerning the Z-sub-0 bits that are temporarily stored in the third part of the memory 131. The SISO decoder 133 decodes the inner convolutional coding of the final-component M/H transmissions for iterative-diversity reception, when both of the paralleled turbo decoders 130-1 and 140-1 are in operation. The SISO decoder 133 also decodes the inner convolutional coding of single-component M/H transmissions, when possibly just the turbo decoder 130-1 is in operation. Preferably, the SISO decoder 133 performs its decoding during an initial half of each turbo decoding cycle. The soft decisions concerning the Z-sub-1 bits in the SISO decoder 133 decoding results are temporarily stored in the fifth part of the memory 131. This completes a half cycle of the CCC decoding.

When CCC decoding of SCCC signal is done during the half of each turbo decoding cycle that the SISO decoder 133 rests, soft decisions concerning the Z-sub-2 bits in the extrinsic data that are temporarily stored in the sixth part of the memory 131 are additively combined with the soft decisions concerning the Z-sub-2 bits of 8-VSB symbols from the M/H Group most recently supplied by the selector 99 that are temporarily stored in the first part of the memory 131. The resulting soft decisions concerning the Z-sub-2 bits in the sum response are supplied as part of the input signal to a binary-to-Gray-code re-mapper 134. Soft decisions concerning the Z-sub-1 bits in the extrinsic data temporarily stored in the fifth part of the memory 131 are differentially combined with the soft decisions concerning the Z-sub-1 bits of the SISO decoder 133 decoding results temporarily stored in the fourth part of the memory 131. The resulting soft decisions concerning the Z-sub-1 bits in the difference response are supplied as the remaining part of the input signal to the binary-to-Gray-code re-mapper 134.

When CCC decoding of PCCC signal is done during the half of each turbo decoding cycle that the SISO decoder 133 rests, the soft decisions concerning the Z-sub-2 bits of 8-VSB symbols from the M/H Group most recently supplied by the selector 99 are supplied from the first part of the memory 131 as part of the input signal to the binary-to-Gray-code re-mapper 134. Soft decisions concerning the Z-sub-1 bits in the extrinsic data temporarily stored in the fifth part of the memory 131 are differentially combined with the soft decisions concerning the Z-sub-1 bits of the SISO decoder 133 decoding results temporarily stored in the fourth part of the memory 131. The resulting soft decisions concerning the Z-sub-1 bits in the difference response are supplied as the remaining part of the input signal to the binary-to-Gray-code re-mapper 134.

The storage locations in the first, second and third parts of the memory 131 are addressed by a first address generator during their being written with the soft Z-sub-2, Z-sub-1 and Z-sub-0 bits resulting from data-slicing. The first address generator is preferably an up/down symbol counter allowing sweep through the Z-sub-1 and Z-sub-0 trellis coding in reverse as well as forward direction during decoding the inner convolutional coding. The symbol counter in the first address generator counts all the symbols in the M/H Group including those not descriptive of M/H data. The first part of the memory 131 needs actual storage locations only for the soft Z-sub-2 bits from those 8-VSB symbols conveying M/H data. Unless the M/H Group begins with a trellis reset for the Z-sub-0 bits, the second and third parts of the memory 131 need actual storage locations for the soft Z-sub-1 and Z-sub-0 bits from all the 8-VSB symbols within a data field. If the M/H Group begins with such a trellis reset, the second and third parts of the memory 131 need actual storage locations only for the soft Z-sub-1 and Z-sub-0 bits from all the 8-VSB symbols within an M/H Group. The fourth and fifth parts of the memory 131 need actual storage locations only for those Z-sub-1 epochs for which soft extrinsic data will be available. The storage locations in the second, third and fifth parts of the memory 131 are addressed by the first address generator during the temporarily stored soft Z-sub-1 bits, soft Z-sub-0 bits and soft extrinsic data bits being read to support decoding of the inner convolutional coding by the decoder 133. Supposing that the decoder 133 performs the initial half of the first cycle of decoding CCC, the storage locations in the second and third parts of the memory 131 can be addressed by the first address generator so as to implement write-then-read of each of these storage locations.

The storage locations in the first, fourth, fifth and sixth parts of the memory 131 are addressed by a second address generator when the contents of their bit storage locations are read to support the final half of each cycle of decoding CCC. This second address generator generates only the addresses for the first, fourth, fifth and sixth parts of the memory 131 that relate to symbols of M/H data. A representative embodiment of the second address generator comprises a read-only memory (ROM) addressed by an up/down counter. This allows sweep through the Z-sub-2 and Z-sub-1 trellis coding in reverse as well as forward direction during decoding the outer convolutional coding. The second address generator also generates the addresses for writing the bit storage locations in the fifth and sixth parts of the memory 131.

The output port of the binary-to-Gray-code re-mapper 134 is connected for supplying recoded soft decisions concerning the interleaved outer convolutional coding of the transmissions being processed by the turbo decoder 130-1 to the input port of a portion 150A of the information-exchange unit 150. If the turbo decoder 140-1 is not currently processing transmissions, the soft decisions supplied to the input port of the portion 150A of the information-exchange unit 150 are reproduced at its output port. The output port of the portion 150A of the information-exchange unit 150 is connected for supplying modified soft decisions concerning the interleaved outer convolutional coding to the input port of a symbol de-interleaver 135 for soft 2-bit symbols. The output port of the symbol de-interleaver 135 is connected for supplying de-interleaved soft 2-bit symbols concerning the outer convolutional coding of final-component transmissions to the input port of a bank 136 of SISO decoders for outer convolutional coding. The symbol de-interleaver 135 includes memory for temporarily storing soft 2-bit symbols to be available to one of the bank 136 of SISO decoders that the M/H decoding control unit 66 selects for decoding the outer convolutional coding. This memory can be read to the selected SISO decoder for performing sweeps of the outer-convolutional-coding trellis in both forward and reverse directions. The up/down symbol counter for performing these sweeps can be the same one used by the second address generator.

A symbol re-interleaver 137 for soft 2-bit symbols is connected for re-interleaving the pairs of soft bits supplied from the one of the bank 136 of SISO decoders selected for decoding the outer convolutional coding. The output port of the symbol re-interleaver 137 is connected to the input port of a confidence-level adjuster 138 with a decoder for RS code. Preferably, the decoder can decode (210, K) Reed-Solomon coding. The decoder for RS code in the confidence-level adjuster 138 attempts to correct byte errors in the hard data bits of the soft data bits in the pairs of soft bits supplied from the output port of the symbol re-interleaver 137. Then, if the decoder for RS code in the confidence-level adjuster 138 determines that an RS codeword appears to be correct, the confidence-level adjuster 138 increases the levels of confidence of the soft data bits in its response. The confidence-level adjuster 138 is connected for supplying adjusted soft data bits and soft parity bits of the re-interleaved outer convolutional coding in 2-bit-symbol form to a Gray-to-binary-code re-mapper 139. The Gray-to-binary-code re-mapper 139 is for converting the re-interleaved pairs of Gray-coded soft bits received from the confidence-level adjuster 138 back to the natural-binary-coded regime employed by the extrinsic data feedback processor 132 and the SISO decoder 133 for 12-phase trellis coding.

If the turbo decoder 130-1 is used for decoding SCCC, the Gray-to-binary-code re-mapper 139 supplies soft decisions including soft data bits and soft parity bits to a first input port of the extrinsic data feedback processor 132. These soft decisions regarding 2-bit symbols applied to the first input port of the extrinsic data feedback processor 132 are differentially compared to previous soft decisions regarding the same 2-bit symbols. The previous soft decisions are generated by reading the first and second portions of the memory 131, as addressed by the second address generator for the memory 131, and supplied to a second input port of the extrinsic data feedback processor 132. The results of the differential comparison by the extrinsic data feedback processor 139 are extrinsic data. The soft bits of the extrinsic data that relate to Z-sub-1 bits are written into bit storage locations in the fifth part of the memory 131, as addressed by the second address generator for the memory 131. The soft bits of the extrinsic data that relate to Z-sub-2 bits are written into bit storage locations in the sixth part of the memory 131, as addressed by the second address generator for the memory 131.

If the turbo decoder 130-1 is used for decoding PCCC, the Gray-to-binary-code re-mapper 139 supplies just soft data bits to the first input port of the extrinsic data feedback processor 132. These soft data bits are differentially compared to previous soft decisions regarding the same data bits. The previous soft decisions are generated by reading the first portion of the memory 131, as addressed by the second address generator for the memory 131. These previous soft decisions are supplied to the second input port of the extrinsic data feedback processor 132. The soft bits of the extrinsic data that relate to Z-sub-1 bits are written into bit storage locations in the fifth part of the memory 131, as addressed by the second address generator for the memory 131. The soft bits of the extrinsic data that relate to Z-sub-2 bits can be written into bit storage locations in the sixth part of the memory 131, as addressed by the second address generator for the memory 131. However, since extrinsic data that relates to Z-sub-2 bits is not used when decoding PCCC, these soft bits may simply be discarded rather than being written into bit storage locations in the sixth part of the memory 131.

Presuming that the symbol interleaving of the outer convolutional coding is implied, the input port of the hard-decision unit 160 shown in FIG. 33C is connected for receiving soft data bits from the output port of the confidence-level adjuster 138. The battery 164 of XOR gates is also connected for receiving these soft data bits. If the symbol interleaving of the outer convolutional coding is not implied, the input port of the hard-decision unit 160 is instead connected for receiving soft data bits from the output port of the bank 136 of SISO decoders.

The structure and operation of the turbo decoder 140-1 is similar to that of the turbo decoder 130-1. A memory 141, an extrinsic data feedback processor 142 and a SISO decoder 143 in the turbo decoder 140-1 are connected and operated similarly to the memory 131, the extrinsic data feedback processor 142 and the SISO decoder 133 in the turbo decoder 130-1. A binary-to-Gray-code re-mapper 144 is connected for recoding soft decisions concerning the interleaved outer convolutional coding of the transmissions being processed by the turbo decoder 140-1 and supplying the recoded soft decisions to the input port of a portion 150B of the information-exchange unit 150. The output port of the portion 150B of the information-exchange unit 150 is connected for supplying modified soft decisions concerning the interleaved outer convolutional coding to the input port of a symbol de-interleaver 145 for soft 2-bit symbols. The output port of the symbol de-interleaver 145 is connected for supplying de-interleaved soft 2-bit symbols concerning the outer convolutional coding of initial-component transmissions to the input port of a bank 146 of SISO decoders. A symbol re-interleaver 147 for soft 2-bit symbols is connected for re-interleaving the pairs of soft bits supplied from the one of the bank 146 of SISO decoders selected for decoding the outer convolutional coding. The output port of the symbol re-interleaver 147 is connected to the input port of a confidence-level adjuster 148 with decoder for RS coding. The confidence-level adjuster 148 is connected for supplying adjusted soft data bits and soft parity bits of the outer convolutional coding to a Gray-to-binary-code re-mapper 149 to be converted back to the natural-binary-coded regime employed by the extrinsic data feedback processor 142 and the SISO decoder 143.

FIG. 37 does not show the output port of the confidence-level adjuster 148 connected for supplying soft data bits for RS Frame decoding procedures. Such a connection is made when implementing a modification of the FIG. 33 M/H receiver in which two RF tuners replace the single frequency-agile RF tuner. Minor further modifications of such an M/H receiver suit it for accommodating changes in the RF channel to be received without a blank screen or frame-freeze condition in video and a drop-out in audio during the switch-over being quite as evident to a viewer/listener. The turbo decoder 130-1 is used for decoding the RF channel being switched from, and the turbo decoder 140-1 is used for decoding the RF channel being switched to. Program material is taken from RS Frames that have been completely written with decoding results from the turbo decoder 130-1 until program material is available from RS Frames that have been completely written with decoding results from the turbo decoder 140-1.

The memories 131 and 141 can both use the same first address generator and the same second address generator. If the outer convolutional coding is not Gray-code-labeled, the binary-to-Gray-code re-mappers 134 and 144 of FIG. 37 will be replaced by respective direct connections. So will the Gray-to-binary-code re-mappers 139 and 149. The confidence-level adjusters 138 and 148 increase the levels of confidence of the soft data bits regarding RS codewords the hard data bits of which RS codewords appear to be correct to the decoders for RS code within each of the confidence-level adjusters 138 and 148.

Figure 38:
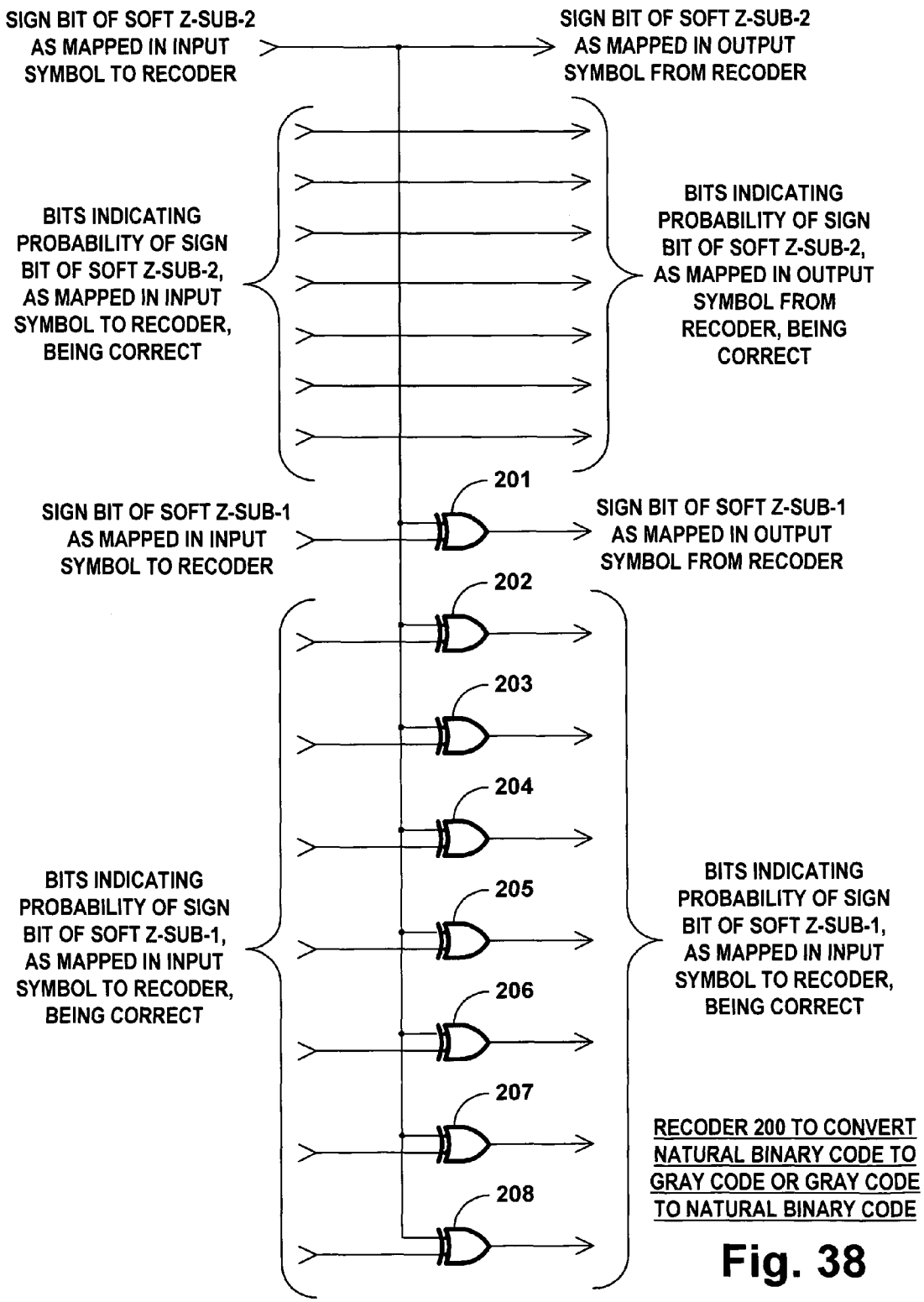
FIG. 38 is a detailed schematic diagram of a representative arrangement used in the turbo decoders of FIGS. 37, 45, 47 and 49-56 for converting 2-bit symbols either from natural binary coding to reflected binary (Gray) coding or from reflected binary (Gray) coding to natural binary coding, which arrangement was disclosed and claimed by A. L. R. Limberg in U.S. patent application Ser. No. 12/456,608 filed 20 Jun. 2009 and titled "System for digital television broadcasting using modified ⅔ trellis coding".

FIG. 38 shows a recoder 200 composed of simple logic circuitry. The recoder 200 can be used as a natural-binary-code-to-reflected-binary-code converter for soft 2-bit symbols. So, the binary-to-Gray-code re-mappers 134 and 144 can each be constructed like the recoder 200. Alternatively, the recoder 200 can be used as a reflected-binary-code-to-natural-binary-code converter for soft 2-bit symbols. So, the Gray-to-binary-code re-mappers 139 and 149 can each be constructed like the recoder 200. Supposing the 2-bit symbols to be composed of a soft Z-sub-2 "more significant" bit and a soft Z-sub-1 "less significant" bit when natural-binary-coded, the soft Z-sub-2 bit stays the same when Gray-coded, but the soft Z-sub-1 bits are "reflected". Positive-going amplitude modulation of the 8-VSB AM signal is associated with the recoded Z-sub-2 "hard" bit being a logic ONE, and negative-going amplitude modulation of the 8-VSB AM signal is associated with the recoded Z-sub-2 bit "hard" being a logic ZERO. Irrespective of the sense of modulation, the Z-sub-1 "hard" bit of a Gray-coded symbol being a logic ONE is associated with lesser amplitude modulation of the 8-VSB AM signal. The Z-sub-1 "hard" bit of a Gray-coded symbol being a logic ZERO is associated with greater amplitude modulation of the 8-VSB AM signal. The remaining bits of each soft bit express the probability of the preceding "hard" bit being correct.

The initial one of the two soft bits in the symbol supplied to the recoder 200 is passed therethrough without change to provide the initial one of the two soft bits in a respective symbol of the recoder 200 response. Each of the component eight simple bits in the final one of the two soft bits in the symbol supplied to the recoder 200 is supplied to a first of two input connections of a respective one of exclusive-OR gates 201, 202, 203, 204, 205, 206, 207 and 208 included within the recoder 200. The component bit of the initial one of the two soft bits in the symbol supplied to the recoder 200 that is variously referred to as its sign bit or "hard" bit is applied to the respective second input connections of the exclusive-OR gates 201, 202, 203, 204, 205, 206, 207 and 208. The final one of the two soft bits in each symbol of the recoder 200 response is supplied from via output connections from the exclusive-OR gates 201, 202, 203, 204, 205, 206, 207 and 208.

Figure 39:
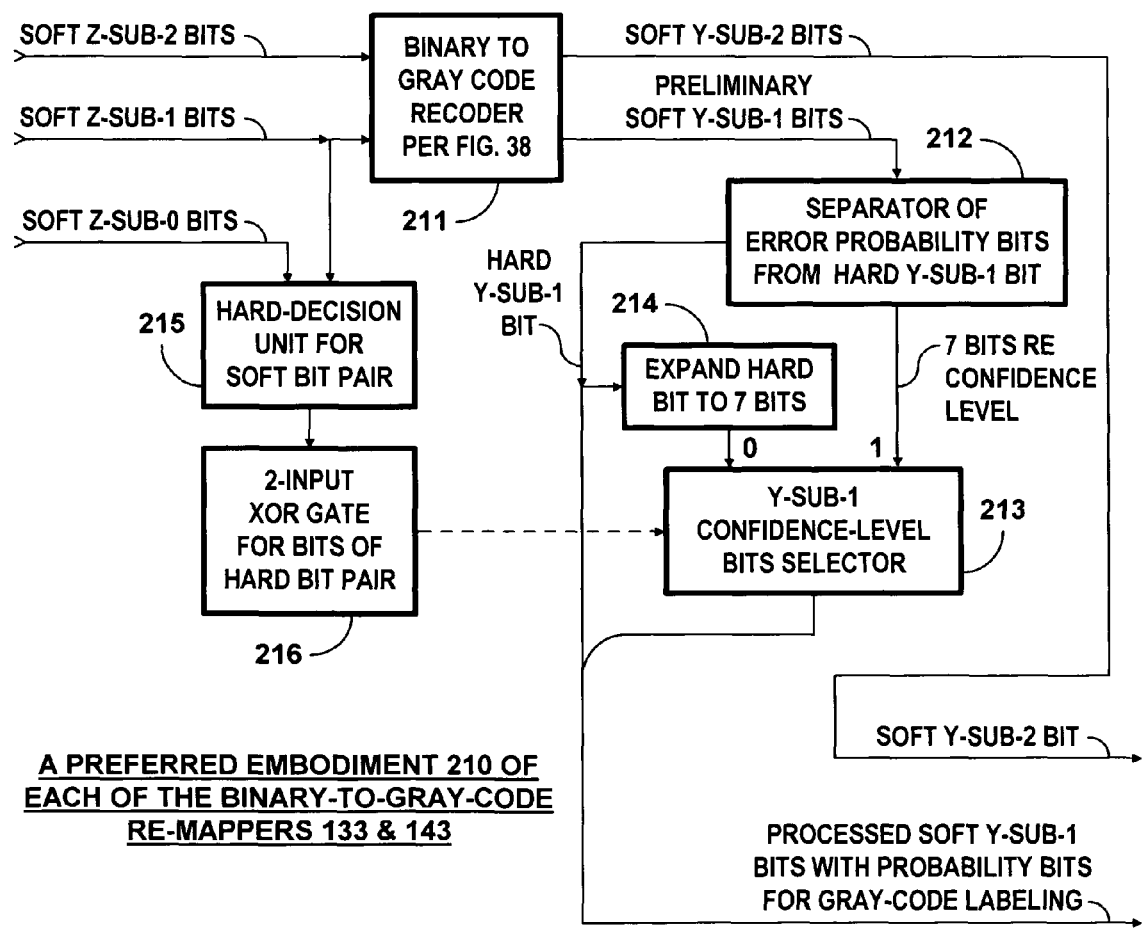
FIG. 39 is a detailed schematic diagram of a novel arrangement that each of the turbo decoders in FIGS. 37, 45, 47 and 49-56 can use advantageously for converting 2-bit symbols from natural binary coding to reflected binary (Gray) coding.

FIG. 39 shows a preferred embodiment 210 of each of the binary-to-Gray-code re-mappers 134 and 144 employed in the paired turbo decoders 130 and 140 shown in FIGS. 37, 45, 47 and 49-56. The FIG. 39 binary-to-Gray-code re-mapper 210 is connected for receiving soft decisions in regard to contemporaneous Z-sub-2, Z-sub-1 and Z-sub-0 bits. FIG. 39 shows the soft Z-sub-2 and Z-sub-1 bits being applied to a binary-to-Gray-code recoder 211 as input signal thereto. The recoder 211 corresponds in structure and operation to the FIG. 38 binary-to-Gray-code recoder 200. The soft Y-sub-2 bits of the recoder 211 response reproduce the Z-sub-2 bits applied thereto and are supplied as part of the ultimate response of the FIG. 39 binary-to-Gray-code re-mapper 210.

FIG. 39 shows preliminary soft Y-sub-1 bits in the recoder 211 response being supplied to a separator 212 that separates the hard Y-sub-1 bit (its sign bit) of each preliminary soft Y-sub-1 bit from the seven or so bits indicative of the level of confidence that that hard Y-sub-1 bit is correct. The separator 212 can be simply constructed by appropriate hard wiring. The groups of seven or so bits indicative of the level of confidence that that hard Y-sub-1 bits are correct, as separated by the separator 212, are applied to a first of two 7-or-so-bits-wide input ports of a Y-sub-1 confidence-level-bits selector 213. FIG. 39 shows an expander 214 for expanding each successive hard Y-sub-1 bit to seven or so bits for application to the second of the two 7-or-so-bits-wide input ports of the selector 213. The hard Y-sub-1 bits are joined with the Y-sub-1 confidence-level-bits that the selector 213 reproduces as its response, thus to form processed soft Y-sub-1 bits supplied as a further part of the ultimate response of the FIG. 39 binary-to-Gray-code re-mapper 210.

The selection of the Y-sub-1 confidence-level-bits reproduced by the selector 213 is controlled responsive to the Z-sub-1 and Z-sub-0 bits descriptive of binary-coded modulation conditions. A hard-decision unit 215 is connected for receiving soft Z-sub-1 bits and soft Z-sub-0 bits descriptive of binary-coded modulation conditions and for supplying contemporaneous hard Z-sub-1 bits and hard Z-sub-0 bits extracted from those soft bits. A 2-input exclusive-OR gate 216 is connected for receiving each successive pair of contemporaneous hard Z-sub-1 bits and hard Z-sub-0 bits that the hard-decision unit 215 extracts from an 8-VSB symbol conveying M/H data. The response of the XOR gate 216 is applied to the selector 213 as a control signal for controlling the selection of Y-sub-1 confidence-level-bits to be reproduced by the selector 213.

If the binary-coded 8-VSB modulation signal encodes '000' level, the Gray-labeled outer convolutional code will have a value '00' in which the ZERO-valued soft Y-sub-1 bit should have a high confidence level that the ZERO-valued hard Y-sub-1 bit is correct. The XOR gate 216 response to the hard Z-sub-1 bit and the hard Z-sub-0 bit both being ZEROes will be a ZERO, conditioning the selector 213 to reproduce the '000 0000' expanded ZERO hard Y-sub-1 bit. This '000

0000' joins with the '0' hard Y-sub-1 bit to supply a processed soft Y-sub-1 bit having a high confidence level that the ZERO-valued hard Y-sub-1 bit is correct.

If the binary-coded 8-VSB modulation signal encodes '011' level, the Gray-labeled outer convolutional code will have a value '01' in which the ONE-valued soft Y-sub-1 bit should have a high confidence level that the ONE-valued hard Y-sub-1 bit is correct. The XOR gate 216 response to the hard Z-sub-1 bit and the hard Z-sub-0 bit both being ONEs will be a ZERO, conditioning the selector 213 to reproduce the '111 1111' expanded ONE hard Y-sub-1 bit. This '111 1111' joins with the '1' hard Y-sub-1 bit to supply a processed soft Y-sub-1 bit having a high confidence level that the ONE-valued hard Y-sub-1 bit is correct.

If the binary-coded 8-VSB modulation signal encodes '100' level, the Gray-labeled outer convolutional code will have a value '11' in which the ONE-valued soft Y-sub-1 bit should have a high confidence level that the ONE-valued hard Y-sub-1 bit is correct. The XOR gate 216 response to the hard Z-sub-1 bit and the hard Z-sub-0 bit both being ZEROes will be a ZERO, conditioning the selector 213 to reproduce the '111 1111' expanded ONE hard Y-sub-1 bit. This '111 1111' joins with the '1' hard Y-sub-1 bit to supply a processed soft Y-sub-1 bit having a high confidence level that the ONE-valued hard Y-sub-1 bit is correct.

If the binary-coded 8-VSB modulation signal encodes '111' level, the Gray-labeled outer convolutional code will have a value '10' in which the ZERO-valued soft Y-sub-1 bit should have a high confidence level that the ZERO-valued hard Y-sub-1 bit is correct. The XOR gate 216 response to the hard Z-sub-1 bit and the hard Z-sub-0 bit both being ONEs will be a ZERO, conditioning the selector 213 to reproduce the '000 0000' expanded ZERO hard Z-sub-1 bit. This '000 0000' joins with the '0' hard Y-sub-1 bit to supply a processed soft Y-sub-1 bit having a high confidence level that the ZERO-valued hard Y-sub-1 bit is correct.

If the binary-coded 8-VSB modulation signal encodes '001', '010', '101' or '110' level, the XOR gate 216 will supply a ONE in response to the hard Z-sub-1 bit and the hard Z-sub-0 bit having different values. This ONE supplied as control signal to the selector 213 conditions the selector 213 to reproduce the seven or so confidence-level bits that the separator 212 separated from the preliminary Y-sub-1 bit supplied thereto from the binary-to-Gray-code recoder 211. These confidence-level bits as reproduced in the selector 213 response are rejoined with the hard Y-sub-1 bit separated by the separator 212 to supply a processed soft Y-sub-1 bit that reproduces the preliminary soft Y-sub-1 bit supplied from the binary-to-Gray-code recoder 211.

In variations of the FIG. 39 binary-to-Gray-code re-mapper 210, the expander 214 of the hard Y-sub-1 bits ones' complements each hard Y-sub-1 bit to form the least significant bit or a few of the less significant bits of the 7-or-so-bit-wide confidence level applied to the second input port of the selector 213.

Figure 40:
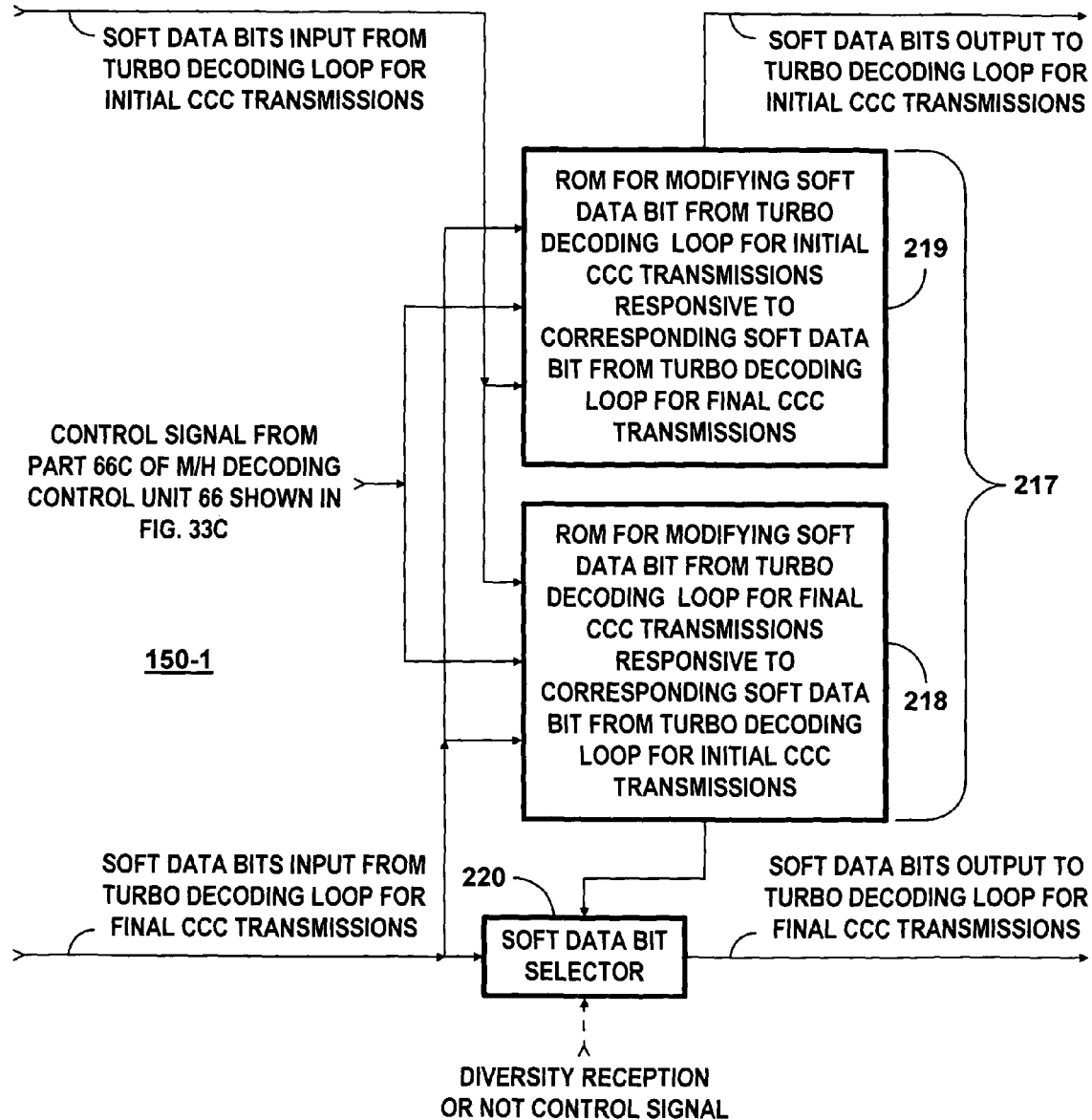
FIG. 40 is a detailed schematic diagram of a first embodiment of the information-exchange unit that the paralleled turbo decoders in FIGS. 37, 45, 47 and 49-56 use during diversity reception to exchange information between their respective turbo loops.

FIG. 40 shows a first embodiment 150-1 of the information-exchange unit 150 for exchanging information regarding soft data bits between the two turbo decoders 130 and 140 shown in each of the FIGS. 33D, 37, 45, 47 and 49-56. This first embodiment 150-1 of the information-exchange unit 150 is implemented with read-only memory (ROM) 217 divided into two halves 218 and 219. Soft data bits from corresponding breakpoints in the turbo loops of the decoders 130 and 140 provide each of the ROM halves 218 and 219 its input addressing. The ROM half 219 is connected to supply adjusted soft data bits for continuing the turbo loop of the decoder 140. The soft data bits from the breakpoint in the turbo loop of the decoder 130 are also supplied to a first of two input ports of a soft-data-bits selector 220, the second input port of which is connected for receiving adjusted soft data bits supplied from the ROM half 218. The soft-data-bits selector 220 has an output port connected for continuing the turbo loop of the decoder 130.

The soft-data-bits selector 220 is operable for reproducing the soft data bits received at one of its input ports as selected responsive to a DIVERSITY RECEPTION OR NOT control signal. This control signal can be furnished from the M/H decoding control unit 66 responsive to the iterative_diversity_mode fields of TPC signals decoded by the decoder 106 of (18, 10) RS FEC code shown in FIG. 33. When the iterative_diversity_mode field of the TPC signal is '11' signaling a single-time transmission, the M/H decoding control unit 66 will generate a DIVERSITY RECEPTION OR NOT control signal state indicating lack of diversity reception. Such indication of lack of diversity reception conditions the soft-data-bits selector 220 for selectively reproducing at its output port the soft data bits supplied to its first input port. When the iterative_diversity_mode field of the TPC signal is '10' indicating the final component of an iterative-diversity transmission, the M/H decoding control unit 66 will generate a DIVERSITY RECEPTION OR NOT control signal indicating diversity reception. Such indication of diversity reception conditions the soft-data-bits selector 220 for selectively reproducing at its output port the soft data bits that the RAM 218 supplies to its second input port. When the iterative_diversity_mode field of the TPC signal is '00' indicating simultaneous frequency-diversity transmissions with no iterative-diversity, the M/H decoding control unit 66 will generate a DIVERSITY RECEPTION OR NOT control signal indicating diversity reception. Such indication of diversity reception also conditions the soft-data-bits selector 220 for selectively reproducing at its output port the soft data bits that the RAM 218 supplies to its second input port. However, an M/H receiver with a single frequency-agile tuner as shown in FIG. 33 is incapable of receiving both of two simultaneous frequency-diversity transmissions without attendant iterative diversity. An M/H receiver with two separate tuners is required for receiving both of two simultaneous frequency-diversity transmissions without attendant iterative diversity.

The output response of the ROM half 218 adjusts the soft data bit received from the breakpoint in the turbo loop of the decoder 130, which soft data bit provides one half of the input addressing of the ROM half 218. This adjustment by the ROM half 218 is responsive to the soft data bit received from the turbo loop of the decoder 140 as the other half of its input address. The output response of the ROM half 219 adjusts the soft data bit received from the breakpoint in the turbo loop of the decoder 140, which soft data bit provides one half of the input addressing of the ROM half 219. This adjustment by the ROM half 219 is responsive to the soft data bit received from the turbo loop of the decoder 130 as the other half of its input address.

FIG. 40 shows a further input address bit being applied to each of the ROM halves 218 and 219, which further input address bit is supplied via a connection from part 66D of the M/H decoding control unit 66 shown in FIG. 33D. This further input address bit has a first value when the M/H data bits being processed by the turbo decoder 140 should be ones' complements of the M/H data bits being processed by the turbo decoder 130. This will be the case during iterative-diversity reception of broadcasts from a single DTV transmitter, which broadcasts repeat the initial-component transmissions just once as final-component transmissions. Also, this will be the case during frequency-diversity reception of broadcasts from certain pairs of DTV transmitters. The further input address bit applied to each of the ROM halves 218 and 219 can have a second value complementary to the first value. This is the case during frequency-diversity reception of broadcasts from certain other pairs of DTV transmitters when the M/H data bits being processed by the turbo decoders 130 and 140 should be similar to each other, rather than being ones' complements of each other.

Suppose that during iterative-diversity reception one of the hard-decision portions of the two soft bits contemporaneously supplied by the turbo loops of the decoders 130 and 140 as input addressing for the two ROM halves 218 and 219 is a ONE and the other is a ZERO. Each of the two soft bits supports increased likelihood that itself and the other bit are correct. If the chance of one of the bits being in error is 1/n, the chance of both being in error is $(1/n) \times (1/n) = 1/n^2$. So, the chance of both being correct is $1-(1/n^2)=(n^2-1)/n^2$. That is, the chance of both bits being correct is $(n^2-1)$ times as likely as both being erroneous. Accordingly, if possible, the output response of the ROM half 218 increases the confidence level of the soft data bit received from the turbo loop of the turbo decoder 130 in the adjusted soft data bit it supplies for continuing that turbo loop. The hard-decision portion of the soft bit received from the turbo loop of the turbo decoder 130 is kept the same in the soft bit that the ROM half 218 supplies for continuing that turbo loop. Furthermore, if possible, the output response of the ROM half 219 increases the confidence level of the soft data bit received from the turbo loop of the turbo decoder 140 in the adjusted soft data bit it supplies for continuing that turbo loop. The hard-decision portion of the soft bit received from the turbo loop of the turbo decoder 140 is kept the same in the soft bit that the ROM half 219 supplies for continuing that turbo loop.

Suppose that during iterative-diversity reception the hard-decision portions of the two soft data bits contemporaneously supplied as first and second halves of the input addressing for the ROM halves 218 and 219 are the same, rather than being different. This indicates that the hard-decision portion of one of the two soft bits is in error. If the confidence levels of both of the soft bits are fairly similar, the soft data bit that the ROM half 218 supplies for continuing the turbo loop of the turbo decoder 130 is, if possible, decreased to be somewhat lower than that of the soft data bit that the ROM half 218 received from that turbo loop. The hard-decision portion of the soft bit that the ROM half 218 supplies for continuing the turbo loop of the turbo decoder 130 is kept the same as that of the soft data bit received from that turbo loop. Furthermore, the soft data bit that the ROM half 219 supplies for continuing the turbo loop of the turbo decoder 140 is, if possible, decreased to be somewhat lower than that of the soft data bit that the ROM half 219 received from that turbo loop. The hard-decision portion of the soft bit that the ROM half 219 supplies for continuing the turbo loop of the turbo decoder 140 is kept the same as that of the soft data bit received from that turbo loop.

Suppose that during iterative-diversity reception the hard-decision portions of the first and second halves of the input addressing for the ROM halves 218 and 219 are the same, rather than being different, but the confidence level of the soft data bit supplied from the turbo decoder 130 is much higher than the confidence level of the soft data bit supplied from the turbo decoder 140. This indicates increased likelihood that the soft bit supplied from the turbo decoder 130 is correct and decreased likelihood that the soft bit supplied from the turbo decoder 140 is correct. Accordingly, if possible, the output response of the ROM half 218 adjusts the soft data bit supplied from the turbo decoder 130 increasing the confidence level of that soft data bit somewhat for continuing the turbo loop of the turbo decoder 130. The hard-decision portion of that adjusted soft data bit is kept the same as that of the soft data bit supplied from the turbo decoder 130. Furthermore, if possible, the output response of the ROM half 219 adjusts the soft data bit supplied from the turbo decoder 140 decreasing the confidence level of that soft data bit somewhat for continuing the turbo loop of the turbo decoder 140. The hard-decision portion of that adjusted soft data bit is kept the same as that of the soft data bit supplied from the turbo decoder 140, if the difference between the confidence levels of the soft data bits contemporaneously supplied from the turbo decoders 130 and 140 is not too great. If the difference is very great because the confidence level of the soft bit supplied from the decoder 140 is very low, turbo decoding is apt to progress faster if the hard-decision portion of that soft data bit is ones' complemented in the adjusted soft data bit supplied for continuing the turbo loop in the turbo decoder 140.

Suppose that during iterative-diversity reception the hard-decision portions of the first and second halves of the input addressing for the ROM halves 218 and 219 are the same, rather than being different, but the confidence level of the soft data bit supplied from the turbo decoder 140 is much higher than the confidence level of the soft data bit supplied from the turbo decoder 130. This indicates increased likelihood that the soft bit supplied from the turbo decoder 140 is correct and decreased likelihood that the soft bit supplied from the turbo decoder 130 is correct. Accordingly, if possible, the output response of the ROM half 219 adjusts the soft data bit supplied from the turbo decoder 140 increasing the confidence level of that soft data bit somewhat for continuing the turbo loop of the turbo decoder 140. The hard-decision portion of that adjusted soft data bit is kept the same as that of the soft data bit supplied from the turbo decoder 140. Furthermore, if possible, the output response of the ROM half 218 adjusts the soft data bit supplied from the turbo decoder 130 decreasing the confidence level of that soft data bit somewhat for continuing the turbo loop of the turbo decoder 130. The hard-decision portion of that adjusted soft data bit is kept the same as that of the soft data bit supplied from the turbo decoder 130, if the difference between the confidence levels of the soft data bits contemporaneously supplied from the turbo decoders 130 and 140 is not too great. If the difference is very great because the confidence level of the soft bit supplied from the decoder 130 is very low, turbo decoding is apt to progress faster if the hard-decision portion of that soft data bit is ones' complemented in the adjusted soft data bit supplied for continuing the turbo loop in the turbo decoder 130.

Figure 41:
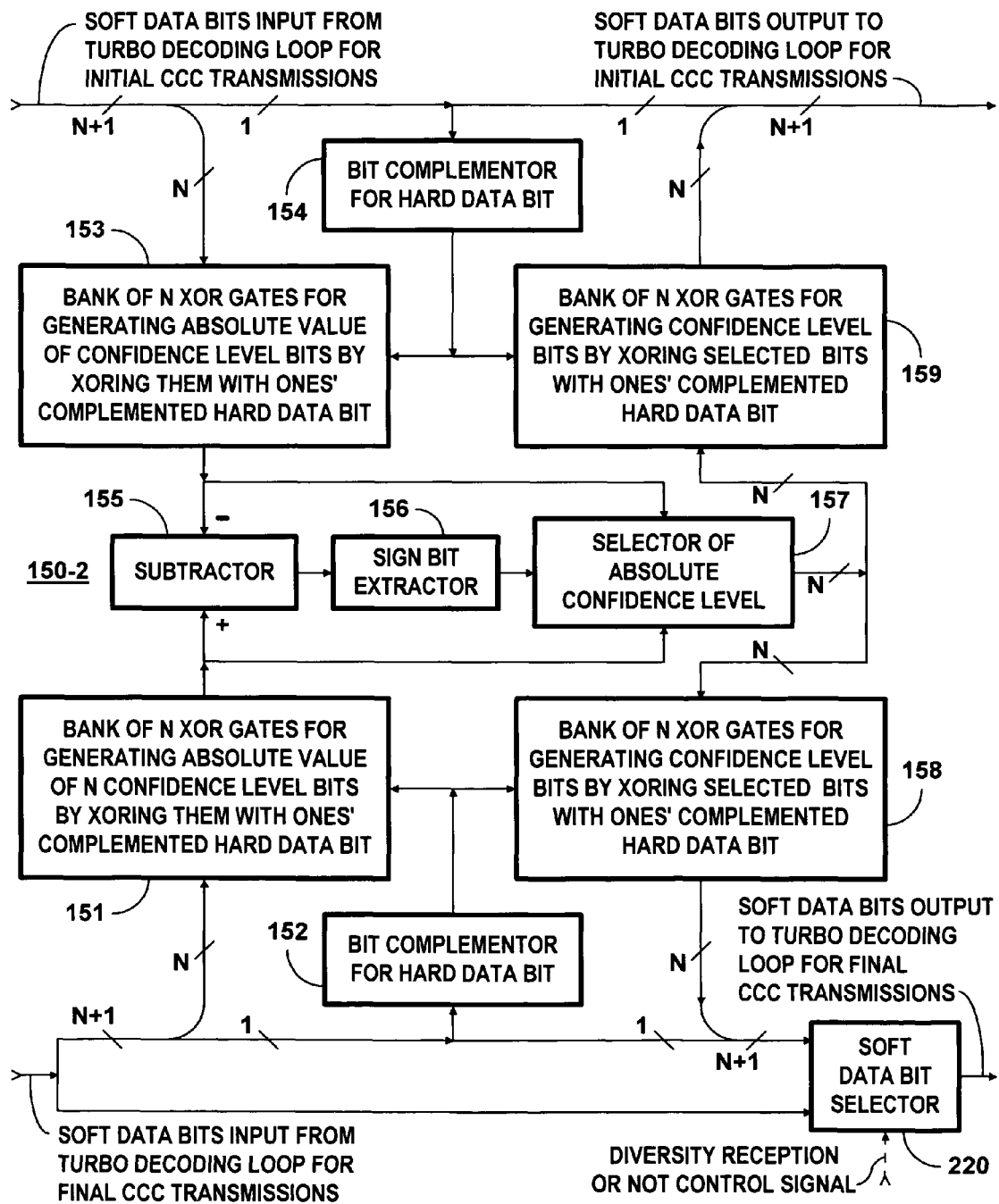
FIG. 41 is a schematic diagram of a second embodiment of the information-exchange unit that the paralleled turbo decoders in FIGS. 37, 45, 47 and 49-56 use during diversity reception to exchange information between their respective turbo loops.

FIG. 41 shows in detail a second embodiment 150-2 of the information-exchange unit 150 for exchanging information regarding data bits between the turbo decoders 130 and 140 shown in each of the FIGS. 33D, 37, 45, 47 and 49-56. This second embodiment of the information-exchange unit 150 comprises elements 151, 152, 153, 154, 155, 156, 157, 158, 159 and 220. The information-exchange unit 150 shown in FIG. 41 compares each soft data bit from a breakpoint in the turbo decoding loop of the turbo decoder 140 for initial transmissions with the corresponding soft data bit from a like breakpoint in the turbo decoding loop of the turbo decoder 130 for final transmissions. The FIG. 41 information-exchange unit 150 then selects the soft data bit with the better confidence level as the basis for continuing the paired turbo loops of the turbo decoders 130 and 140. The structure and operation of the FIG. 41 information-exchange unit 150 are described in further detail, following.

Each of the soft data bits from the breakpoint in the turbo decoding loop of the turbo decoder 130 is separated into two components, a single hard data bit and a number N of confidence-level bits expressing a level of confidence that the hard data bit is correct. A bank 151 of 2-input exclusive-OR gates, N in number, is connected for receiving the N confidence-level bits, which are applied to respective ones of the first input ports of those XOR gates. A bit complementor 152 is connected for ones' complementing the hard data bit and supplying the complemented hard data bit to the second input ports of the XOR gates in the bank 151 of them. The responses from the bank 151 of XOR gates together provide an absolute value of the level of confidence that a hard data bit from the breakpoint in the turbo decoding loop of the turbo decoder 130 is correct.

Each of the soft data bits from the breakpoint in the turbo decoding loop of the turbo decoder 140 is separated into two components, a single hard data bit and a number N of confidence-level bits expressing a level of confidence that the hard data bit is correct. A bank 153 of 2-input exclusive-OR gates, N in number, is connected for receiving the N confidence-level bits, which are applied to respective ones of the first input ports of those XOR gates. A bit complementor 154 is connected for ones' complementing the hard data bit and supplying the complemented hard data bit to the second input ports of the XOR gates in the bank 153 of them. The responses from the bank 153 of XOR gates together provide an absolute value of the level of confidence that a hard data bit from the breakpoint in the turbo decoding loop of the turbo decoder 140 is correct.

A subtractor 155 is connected for receiving the response of the bank 151 of XOR gates as a minuend input signal and for receiving the response of the bank 153 of XOR gates as a subtrahend input signal. The subtractor 155 performs subtraction using twos' complement arithmetic to generate a difference output signal. A sign bit extractor 156 is connected for receiving the difference output signal from the subtractor 155 and extracting the sign bit for application as control signal to a selector 157. The selector 157 responds to this control signal to reproduce the larger of the respective responses of the banks 151 and 153 of XOR gates. That is, the selector 157 is conditioned by its control signal to reproduce the larger absolute value of confidence level associated with a pair of corresponding soft data bits from the turbo loops of the turbo decoders 130 and 140.

A bank 158 of 2-input exclusive-OR gates, N in number, is connected for receiving the N bits of the absolute value of confidence level reproduced by the selector 157, which are applied to respective ones of the first input ports of those XOR gates. The bit complementor 152 is connected for supplying its complemented hard data bit response to the second input ports of the XOR gates in the bank 158 of them. The bank 158 of XOR gates generates N bits of an updated confidence level to be joined with the hard data bit from the breakpoint in the turbo loop of the turbo decoder 130 to generate adjusted soft data bits. The soft data bits from the breakpoint in the turbo loop of the decoder 130 are also supplied to the first input port of the soft-data-bits selector 220, the second input port of which is connected for receiving the adjusted soft data bits with confidence levels generated by the bank 158 of XOR gates. The output port of the soft-data-bits selector 220 is connected for continuing the turbo loop of the decoder 130. The soft-data-bits selector 220 is operable for reproducing at its output port the soft data bits received at a selected one of its two input ports. Control of the selection is similar to that described supra in regard to the first embodiment 150-1 of the information-exchange unit 150 depicted in FIG. 40.

A bank 159 of 2-input exclusive-OR gates, N in number, is connected for receiving the N bits of the absolute value of confidence level reproduced by the selector 157, which are applied to respective ones of the first input ports of those XOR gates. The bit complementor 154 is connected for supplying its complemented hard data bit response to the second input ports of the XOR gates in the bank 159 of them. The bank 159 of XOR gates generates N bits of an updated confidence level to be joined with the hard data bit from the breakpoint in the turbo loop of the turbo decoder 140 to be used in continuing that turbo loop.

In variants of this second embodiment 150-2 of the information-exchange unit 150 the confidence levels supplied from the banks 158 and 159 do not replace original confidence levels as supplied from respective breakpoints in the turbo loops of the turbo decoders 130 and 140 when continuing those loops. Instead, a weighted average of the confidence level generated by the bank 158 of XOR gates and the original confidence level as supplied from the breakpoint in the turbo loop of the turbo decoder 130 is used in continuing that turbo loop. And, a weighted average of the confidence level generated by the bank 159 of XOR gates and the original confidence level as supplied from the breakpoint in the turbo loop of the turbo decoder 140 is used in continuing that turbo loop.

Figure 42:
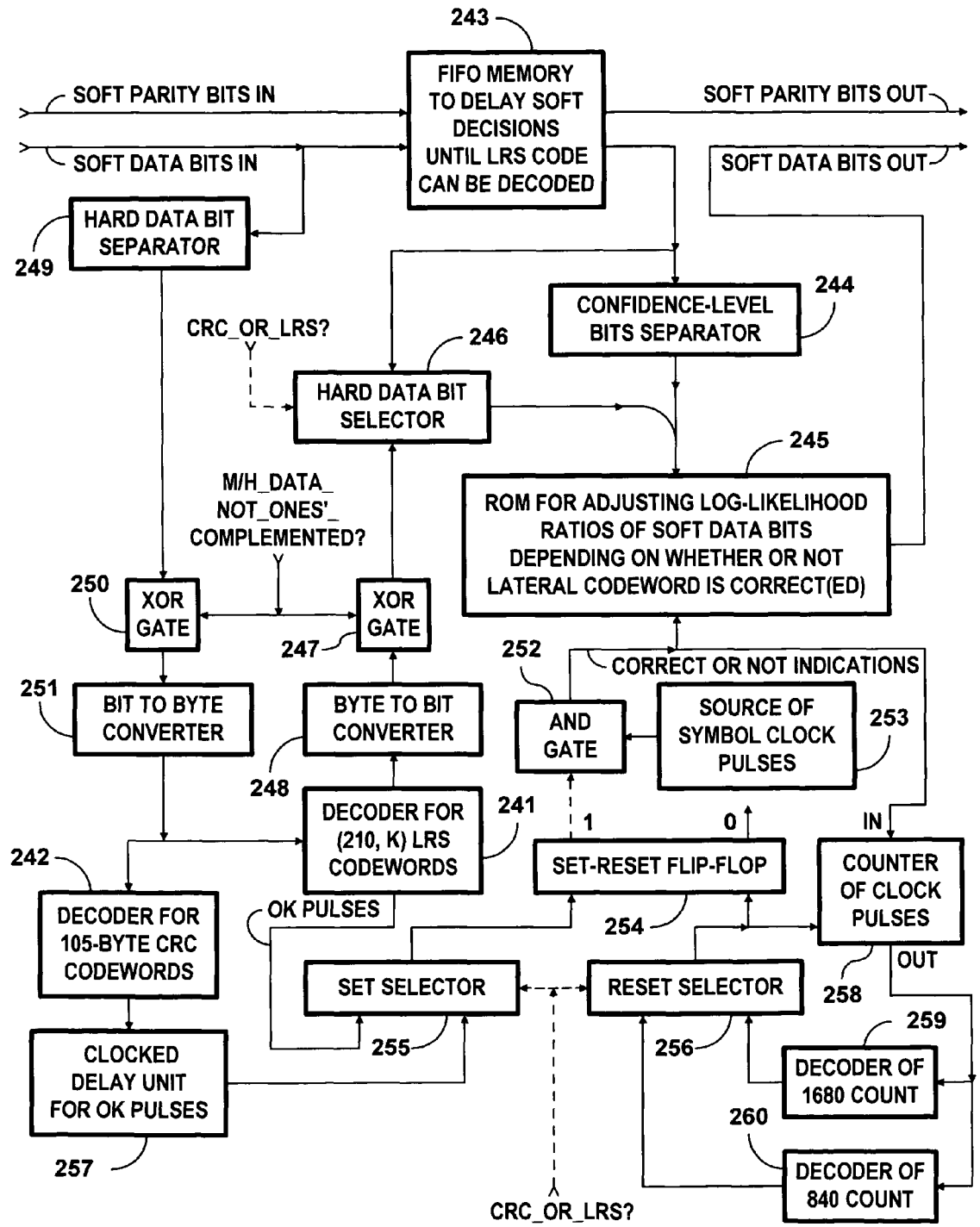
FIG. 42 is a schematic diagram of a novel confidence level adjuster representative of those used in each of the paralleled turbo decoders shown in FIGS. 37, 45, 47 and 49-56 for adjusting the confidence levels of soft data bits during turbo decoding, the adjustments being made responsive to the results of decoding CRC or LRS codewords.

FIG. 42 shows in some detail a structure for each of the confidence-level adjusters 138 and 148 shown in FIGS. 37, 45, 47 and 49-56. Each of these figures indicates that the confidence-level adjusters 138 and 148 include RS code decoders. The FIG. 42 structure for a confidence-level adjuster includes, not just a decoder 241 for decoding (210, 190) LRS codewords, but also a decoder 242 for decoding 105-byte-long CRC codewords.

The CRC_or_LRS? bit 66 in the bit syntax of each TPC signal being a ONE is presumed to indicate that the M/H Frame encoder 13 in the M/H transmitter employed the encoder 452 to generate 105-byte-long CRC codewords from the rows of bytes in TRS Frames. Responsive to such ONE indication, the FIG. 42 confidence-level adjuster adjusts the confidence-level bits of soft data bits all to high levels if those soft data bits are in bytes of 105-byte-long CRC codewords that the decoder 242 determines are very likely to be free of byte error. Such adjustment provides the basis for locating byte-errors for the subsequent TRS decoding procedures. Moreover, such adjustment also facilitates turbo-decoding procedures, particularly for PCCC, by helping to avoid the appearance of the BER floor phenomenon in which the reduction of bit-error-rate (BER) in each iteration is lessened. That is, confidence-level adjusters 138 and 148 each using the FIG. 42 structure have the capability to implement decoding procedures similar to those the inventor described in his U.S. patent application Ser. No. 12/800,559 filed 18 May 2010.

The CRC_or_LRS? bit 66 in the bit syntax of each TPC signal being a ZERO indicates that the M/H Frame encoder 13 in the M/H transmitter employed the encoder 453 to generate (210, 190) lateral Reed-Solomon (LRS) codewords from the rows of bytes in TRS Frames. Responsive to such ZERO indication the FIG. 42 confidence-level adjuster adjusts the confidence-level bits of soft data bits all to high levels if those soft data bits are in bytes of LRS codewords that the decoder 241 determines are very likely to be free of byte error. These bytes may be determined very likely to be free of byte error as received by the decoder 241, or these bytes may be determined very likely to be free of byte error as corrected by the decoder 241. Such adjustment provides the basis for locating byte-errors for the subsequent TRS decoding procedures. Moreover, such adjustment also facilitates turbo-decoding procedures, particularly for PCCC, by helping to avoid the appearance of the BER floor phenomenon in which the reduction of bit-error-rate (BER) in each iteration is lessened. The capability of the decoder 241 of (210, 190) LRS coding to correct erroneous bytes allows for more of such adjustments being made in the earlier iterations of the turbo-decoding cycle than is possible if the decoder 242 makes adjustments responsive to its detecting correct CRC codewords.

The FIG. 42 confidence-level adjuster includes a first-in/first-out memory 243. After a delay as long as the time taken for decoding each of the LRS codewords, the FIFO memory 243 reproduces both the soft data bits and the soft parity bits of re-interleaved CCC outer convolutional coding supplied to the input port of the FIG. 42 confidence-level adjuster. The soft parity bits reproduced with delay by the FIFO memory 243 are supplied without further modification to the output port of the FIG. 42 confidence-level adjuster.

A confidence-level-bits separator 244 separates the confidence-level bits from each of the soft data bits reproduced with delay by the FIFO memory 243 for application to a read-only memory 245 as partial input addressing thereto. The ROM 245 is used to modify the confidence levels of soft data bits that the ROM 245 supplies as read output signal to the output port of the FIG. 42 confidence-level adjuster.

A hard-data-bit selector 246 reproduces at an output port thereof hard data bits supplied to one of two input ports thereof. The hard data bit from each of the soft data bits successively reproduced with delay by the FIFO memory 243 is separated for application to the first input port of the hard-data-bit selector 246. The second input port of the hard-data-bit selector 246 is connected for receiving successive hard data bits from the output port of an exclusive-OR gate 247, which successive hard data bits will have been subjected to correction by the decoder 241 for decoding (210, 190) LRS codewords. The hard data bits reproduced at the output port of the hard-data-bit selector 246 are rejoined with corresponding confidence-level bits from the confidence-level-bits separator 244 to form a further part of the partial input addressing of the ROM 245. The hard-data-bit selector 246 is further connected for receiving as a control signal thereto a stretched-in-time response to the CRC_or_LRS? bit from each of the TPC signals accompanying the M/H data for the turbo decoder 130 or 140 including the confidence-level adjuster.

If the stretched-in-time response to the CRC_or_LRS? bit being a ONE is a ONE, the hard-data-bit selector 246 reproduces at its output port the hard data bits supplied to its first input port. The stretched-in-time ONE response to the CRC_or_LRS? bit being a ONE presumably indicates that the M/H Frame encoder 13 in the M/H transmitter employed the encoder 452 to generate 105-byte-long CRC codewords from the rows of bytes in TRS Frames. Accordingly, LRS coding is unavailable as a valid basis for the successive hard data bits supplied to the second input port of the hard-data-bit selector 246 having been subjected to correction by the decoder 241 for decoding (210,190) LRS codewords.

If the stretched-in-time response to the CRC_or_LRS? bit being a ZERO is a ZERO, the hard-data-bit selector 246 reproduces at its output port the hard data bits supplied to its second input port. The stretched-in-time ZERO response to the CRC_or_LRS? bit being a ZERO indicates that the M/H Frame encoder 13 in the M/H transmitter employed the encoder 453 to generate (210, 190) LRS codewords from the rows of bytes in TRS Frames. Accordingly, LRS coding is available as a valid basis for the successive hard data bits supplied to the second input port of the hard-data-bit selector 246 having been subjected to correction insofar as possible by the decoder 241 for decoding (210, 190) LRS codewords. FIG. 42 shows the decoder 241 arranged for supplying (210, 190) LRS codewords to the input port of a byte-to-bit converter 248. FIG. 42 shows the output port of the byte-to-bit converter 248 connected for then supplying a first input port of the XOR gate 247 with (210, 190) LRS codewords in serial-bit format. These codewords are supplied in serial-bit format with corrections of any byte errors when such correction is possible.

A hard-data-bit separator 249 is connected for extracting hard data bits from the soft data bits supplied to the input port of the FIG. 42 confidence-level adjuster. The hard-data-bit separator 249 is further connected for supplying those hard data bits to a first of two input ports of an exclusive-OR gate 250. The second input ports of the XOR gates 247 and 250 are each connected for receiving a stretched-in-time response to the M/H_data_not_one's_complemented? bit from each of the TPC signals accompanying the M/H data for the turbo decoder including the confidence-level adjuster. Each of the XOR gates 247 and 250 responds to its input signals either by reproducing the hard data bits supplied to its first input port or by complementing them, depending on whether the stretched-in-time response to the M/H_data_not_one's_complemented? bit received at its second input port is a ZERO or a ONE. The output port of the XOR gate 247 is connected for supplying selectively complemented bits to the second input port of the hard-data-bit selector 246.

When an RS codeword is shortened, ones' complementing all its bits results in an incorrect shortened RS codeword. So it is necessary to convert shortened RS codewords back to their original bit sense before decoding and error correction can be done successfully. FIG. 42 shows the output port of the XOR gate 250 connected for supplying selectively complemented bits to the input port of a bit-to-byte converter 251. The selective complementing of bits by the XOR gate 250 restores to original sense the bits in the CRC or LRS codewords supplied for decoding, and the bit-to-byte converter 251 converts the bytes of the codewords to parallel-bit format for the decoders 241 and 242. The byte-to-bit converter 248 converts the complete (210, 190) LRS codewords supplied from the decoder 241 to serial-bit format for application to the first input port of the XOR gate 247. The XOR gate 247 is operated to supply the second input port of the hard-data-bit selector 246 with serial-bit LRS codewords that have been corrected when possible and that have the correct bit sense. (The bit-to-byte converter 251 and the byte-to-bit converter 248 are replaced by respective direct connections if the decoders 241 and 242 are of types that operate using a serial-bit format rather than the more common 8-parallel-bit byte format.)

The XOR gate 247 response is not applied directly to the ROM 245 as part of its input addressing, but rather is selectively applied via the hard-data-bit selector 246 for the following reason. When a ONE CRC_or_LRS? bit 66 in the bit syntax of each TPC signal indicates that the M/H Frame encoder 13 in the M/H transmitter employed the encoder 452 to generate 105-byte-long CRC codewords from the rows of bytes in TRS Frames, the decoder 241 for decoding (210, 190) LRS codewords will occasionally mistake a pair of consecutive 105-byte-long CRC codewords as being a (210, 190) LRS codeword with correctable byte error(s) therein. The correction of the specious (210, 190) LRS codeword by the decoder 241 generates incorrect hard data bits that are inappropriate for application to the ROM 245 as part of its input addressing.

Each successive input address for the ROM 245 includes a further bit in addition to the partial input addressing supplied from the hard-data-bit selector 246 and the confidence-level-bits separator 244, which further bit indicates whether the current data bit was found most likely to be correct by the decoder 241 for decoding (210, 190) LRS codewords or by the decoder 242 for decoding 105-byte-long CRC codewords. Successive further bits providing such indications are generated responsive to OK-pulse bits generated by the decoder 241 or by the decoder 242.

FIG. 42 shows the further bits of ROM 245 input addressing being supplied from the output port of a two-input-port AND gate 252 having its first input port connected for receiving pulsed ONEs from a source 253 supplying them at symbol clock rate. The confidence-level adjusters 138 and 148 in the turbo decoders 130 and 140 of FIGS. 37, 45, 47 and 49-56 can receive pulsed ONEs from the same single source 253.

FIG. 42 shows the AND gate 252 having its second input port connected to the 1-when-set output port of a set-reset flip-flop 254. The set-reset flip-flop 254 is connected for receiving its SET input signal from the output port of a SET selector 255 that reproduces a selected one of SET signals respectively received at first and second input ports thereof. The set-reset flip-flop 254 is further connected for receiving its RESET input signal from the output port of a RESET selector 256 that reproduces a selected one of RESET signals respectively received at first and second input ports thereof. Selections made by the SET selector 255 and selections made by the RESET selector 256 are made responsive to the stretched-in-time response to the CRC_or_LRS? bit.

The decoder 241 for decoding (210, 190) LRS codewords is configured for delivering an OK pulse bit each time that it begins to deliver a complete (210, 190) LRS codeword that is corrected or was received without detectable byte error, which OK pulse is supplied to the first input port of the SET selector 255. The decoder 242 for decoding 105-byte-long CRC codewords is configured for delivering an OK pulse bit each time that it that a 105-byte-long CRC codeword was received without detectable byte error.

If the stretched-in-time response to the CRC_or_LRS? bit is a ZERO, this indicates that the M/H Frame encoder 13 in the M/H transmitter is employing the encoder 453 to generate (210, 190) LRS codewords from the rows of bytes in TRS Frames. The SET selector 255 is conditioned by this ZERO to reproduce at its output port the OK pulses supplied to its first input port from the decoder 241 for decoding (210, 190) LRS codewords.

OK pulses from the decoder 242 are subjected to a clocked delay 257 before being supplied to the second input port of the SET selector 255. This clocked delay 257 delays each OK pulse from the decoder 242 thereby in effect reducing the delay that the FIFO memory 243 introduces, which would otherwise over-compensate for the latent delay of the decoder 242 for decoding 210-byte-long CRC codewords. Delaying each OK pulse from the decoder 242 requires fewer components than delaying the input signal supplied to the decoder 242 to offset the excessive compensation of the latent delay of the decoder 242. If the stretched-in-time response to the CRC_or_LRS? bit is a ONE, this indicates that the M/H Frame encoder 13 in the M/H transmitter is employing the encoder 452 to generate 105-byte-long codewords from the rows of bytes in TRS Frames. The SET selector 255 is conditioned by this ONE to reproduce at its output port the OK pulses supplied to its second port from the decoder 241 subsequent to being delayed by the clocked delay 257.

The setting of the RS flip-flop 254 by a reproduced OK pulse from the output port of the SET selector 255 conditions the 1-when-set output port of the flip-flop 254 to supply a ONE to the first input port of the AND gate 252. Consequently, the AND gate 252 reproduces the ONE pulses applied to its second input port from the source 253 thereof until the flip-flop 254 is reset by a pulse from the output port of the RESET selector 256. The ONE pulses reproduced at the output port of the AND gate 252 are supplied to the count input port of a counter 258 for counting those ONE pulses. The counter 258 is typically constructed with eleven flip-flops allowing a count as high as decimal two thousand forty-seven in binary numbers to be supplied from the count output port of the counter 258 before roll-over to zero count.

The count output port of the counter 258 is connected to the input port of a decoder 259 for a count of decimal one thousand six hundred eighty in binary numbers, the output port of which decoder 259 is connected to the first input port of the RESET selector 256. If the stretched-in-time response to the CRC_or_LRS? bit is a ZERO, this indicates that the M/H Frame encoder 13 in the M/H transmitter is employing the encoder 453 to generate (210, 190)) LRS codewords from the rows of bytes in TRS Frames. The RESET selector 256 is conditioned by this ZERO to reproduce at its output port the pulse that the decoder 259 supplies to its first input port. This pulse resets the set-reset flip-flop 254 after counting the one thousand six hundred eighty bit epochs in a correct(ed) (210, 190) LRS codeword. So, the AND gate 252 supplies ONEs to the ROM 245 to complete its input addressing during the one thousand six hundred eighty bit epochs in the correct(ed) (210, 190) LRS codeword. These ONEs condition the ROM 245 to increase the confidence levels in the soft data bits read therefrom as compared to the confidence levels of the soft data bits used as partial input addressing of the ROM 245.

If the decoder 241 passes on an incorrect (210, 190) LRS codeword, the decoder 241 does not generate an OK pulse at the beginning of that LRS codeword. Presuming the stretched-in-time response to the CRC_or_LRS? bit is a ZERO, conditioning the SET selector 255 to relay OK pulses from the decoder 241 for resetting the flip-flop 254, the flip-flop 254 will remain in a reset condition for the duration of the incorrect (210, 190) LRS codeword as it is used to generate partial input addressing for the ROM 245. The reset condition of the flip-flop 254 causes the AND gate 252 to supply a ZERO to the ROM 245 to complete its input addressing during each of the one thousand six hundred eighty bit epochs in an incorrect (210, 190) LRS codeword.

The count output port of the counter 258 is connected to the input port of a decoder 260 for a count of decimal eight hundred forty in binary numbers, the output port of which decoder 260 is connected to the second input port of the RESET selector 256. If the stretched-in-time response to the CRC_or_LRS? bit is a ONE, this indicates that the M/H Frame encoder 13 in the M/H transmitter is employing the encoder 452 to generate 105-byte-long codewords from the rows of bytes in TRS Frames. The RESET selector 256 is conditioned by this ONE to reproduce at its output port the pulse that the decoder 260 supplies to its second input port. This pulse resets the set-reset flip-flop 254 after counting the eight hundred forty bit epochs in a correct 105-byte-long CRC codeword. So, the AND gate 252 supplies ONEs to the ROM 245 to complete its input addressing during the eight hundred forty bit epochs in the correct CRC codeword. These ONEs condition the ROM 245 to increase the confidence levels in the soft data bits read therefrom as compared to the confidence levels of the soft data bits used as partial input addressing of the ROM 245.

If the decoder 242 determines that a CRC codeword is incorrect, the decoder 241 does not generate an OK pulse after that determination. Presuming the stretched-in-time response to the CRC_or_LRS? bit is a ONE, conditioning the SET selector 255 to relay OK pulses from the decoder 242 for resetting the flip-flop 254, the flip-flop 254 will remain in a reset condition for the duration of the incorrect 105-byte-long CRC codeword as it is used to generate partial input addressing for the ROM 245. The reset condition of the flip-flop 254 causes the AND gate 252 to supply a ZERO to the ROM 245 to complete its input addressing during each of the eight hundred forty bit epochs in the incorrect 105-byte-long CRC codeword.

The inventor has envisioned a future M/H broadcast standard that offers broadcasters the option of the encoder 45 for lateral coding of bytes from the rows of bytes in RS Frames using either CRC coding or LRS coding. CRC coding generally has lower overhead cost than LRS coding, but LRS coding may still be warranted. One-third-rate CCC coding per the current A/153 M/H broadcast standard is reported to provide satisfactory reception for Region A of the M/H Groups, which Region A constitutes in inner M/H Blocks B4, B5, B6 and B7. However, one-sixth-rate CCC coding is needed for satisfactory reception of the outer M/H Blocks in Regions B, C and D of the M/H Groups. The elimination of the pre-coding of the MSBs of the 8-VSB symbols encoding M/H data and the use of Gray-code labeling of outer convolutional coding symbols should improve reception of the outer M/H Blocks in Regions B, C and D of the M/H Groups. LRS coding may offer further help sufficient to provide satisfactory reception of one-third-rate CCC coding in some or all of the outer M/H Blocks. If so, the ten percent or so reduction of payload owing to LRS coding is substantially less than the fifty percent reduction of payload suffered when using one-sixth-rate CCC coding rather than one-third-rate CCC coding.

The FIG. 42 structure for each of the confidence-level adjusters 138 and 148 presumes a version of the M/H transmission standard that transmits either 105-byte-long CRC codewords or (210, 190) LRS codewords. If a version of the M/H transmission standard is used that that transmits either 210-byte-long CRC codewords or (210, 190) LRS codewords, the decoder 260 were it used would decode the same one thousand six hundred eighty bit epochs count as the decoder 259. Accordingly, FIG. 42 structure would probably be modified to omit the reset selector 256 and the decoder 260. The output port of the decoder would then be connected to supply reset pulses directly to the set-reset flip-flop 254 and to the counter 258 of clock pulses.

A future M/H broadcast standard may confine the M/H Frame encoder 13 in the M/H transmitter to having the encoder 45 for lateral coding of bytes from the rows of bytes in RS Frames confined just to generating LRS codewords. In such case the FIG. 42 structure for the confidence level adjusters 138 and 148 could be modified as follows. The decoder 242 for CRC coding, the clocked delay 257, and the SET selector 255 would be omitted. The set-reset flip-flop 254 would be connected for being set by OK pulses supplied directly from the decoder 241 for LRS coding. The RESET selector 255 and the decoder 260 for a 560 count would be omitted, and the set-reset flip-flop 254 would be connected for being reset by pulses supplied directly from the decoder 259 for an 1120 count. Presumably, there would then be no CRC_or_LRS? bit 66 in the bit syntax of each TPC signal. Accordingly, the hard-data-bit selector 246 would be omitted, and the XOR gate 247 response would be applied directly to the ROM 245 as the hard-data-bit part of its input addressing.

A future M/H broadcast standard may confine the M/H Frame encoder 13 in the M/H transmitter to having the encoder 45 for lateral coding of bytes from the rows of bytes in RS Frames confined just to generating CRC codewords of prescribed length. In such case the FIG. 42 structure for the confidence level adjusters 138 and 148 could be modified as follows. The decoder 241 for LRS coding would be omitted, and so would the SET selector 255. The set-reset flip-flop 254 would be connected for being set by delayed OK pulses supplied directly from the clocked delay unit 257. The RESET selector 255 and the decoder 259 for an 1120 count would be omitted, and the set-reset flip-flop 254 would be connected for being reset by pulses supplied directly from the decoder 260 for a 560 count. The hard-data-bit selector 246, the XOR gate 247 and the byte-to-bit converter 248 would be omitted, and the FIFO memory would be connected for applying successive soft data bits in their entirety to the ROM 245 as partial input addressing.

One skilled in the art of designing electronics will understand that the structure of a confidence-level adjuster shown in FIG. 42 is a simplified design representative of a number of more refined designs for a confidence-level adjuster that provide essentially equivalent overall operation. The simple set-reset flip-flop 254 can be replaced by a more sophisticated clocked flip-flop, for example. Designs that use a toggled flip-flop rather than the set-reset flip-flop 254 are possible.

Figure 43:
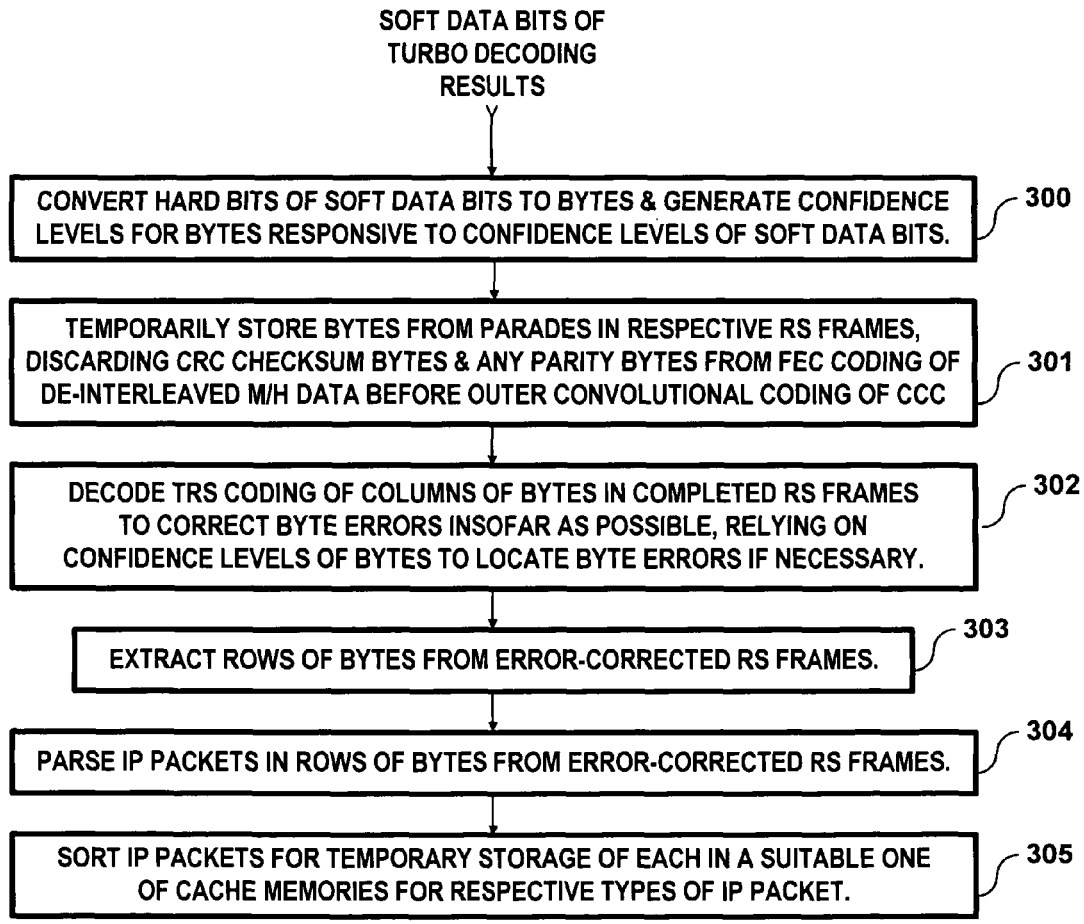
FIG. 43 is a flow chart illustrating the method of processing turbo decoding results to extract internet protocol (IP) data packets therefrom.

FIG. 43 is an informal flow chart illustrating the method of processing turbo decoding results to extract internet protocol (IP) data packets therefrom. Turbo decoding results composed of soft data bits with adjusted confidence levels are forwarded at the conclusion of the final iteration of each turbo decoding procedure on a different portion of the M/H transmission, to be used in an initial step 300 of the method that the FIG. 43 flow chart illustrates. The final iteration of each turbo decoding procedure can be determined by noting when all CRC codewords in one of these different portions of the M/H transmission have been found very likely to be correct. However, there is an upper limit to the number of iterations of each turbo decoding procedure, presuming that sometimes not all CRC codewords can be found very likely to be correct. The hard data bits from the turbo decoding results are converted to bytes in the step 300, and the lowest of the individual adjusted confidence levels of the data bits used to form each byte is ascribed to the byte. Then, in a step 301 the bytes descriptive of a Parade and their respective confidence levels are arrayed in an RS Frame.

After all the bytes descriptive of a Parade have been obtained from the turbo decoding of several M/H Groups in an M/H Frame, so that an RS Frame is complete, a step 302 of TRS decoding respective columns of bytes in the RS Frame begins. One way to perform the step 302 of TRS decoding is initially to attempt TRS decoding of each column of bytes using an error-location-and-correction algorithm. If a column of bytes cannot be successfully decoded without remnant byte errors, then a byte-error-correction-only algorithm is attempted, with the probable locations of byte errors being based on the confidence levels of the bytes in the column. An alternative way to perform the step 302 of TRS decoding is to use just the byte-error-correction-only algorithm on each column of bytes in the RS Frame, with the probable locations of byte errors being based on the confidence levels of the bytes in the column. The step 302 of TRS decoding respective columns of bytes in the RS Frame is followed by a step 303 of extracting rows of error-corrected M/H data bytes from the RS Frame. In a step 304 these rows of error-corrected M/H data bytes are parsed into internet protocol (IP) packets similarly to the prior-art practice for M/H transmissions made in accordance with A/153.

The step 302 differs from prior-art practice for M/H transmissions made in accordance with A/153 in that the CRC coding of rows of bytes in an RS Frame are not used directly to locate erroneous bytes for TRS decoding. The rows of bytes in an RS Frame need not include CRC checksum bytes for rows or sub-rows of TRS bytes in the RS Frame. Accordingly, the CRC checksum bytes need not be forwarded at the conclusion of the final iteration of each turbo decoding procedure on a different portion of the M/H transmission, thereafter to be used in the steps 300, 301 and 302 of the method that The FIG. 43 flow chart illustrates. Accordingly, there will be no need for skipping over these CRC checksum bytes in the step 303 of extracting rows of error-corrected M/H data bytes from the RS Frame or the subsequent step 304 of parsing these rows of error-corrected M/H data bytes into IP packets.

In a final step 305 of the method that the FIG. 43 flow chart illustrates, the IP packets are sorted for temporary storage in cache memories suitable for each type of IP packet. This sorting is done responsive to information as to type contained in the respective header of each IP packet. E.g., the SMT-MH packets are sorted to the M/H processing unit 179 and thence to the SMT table memory 180 in the FIG. 33E portion of the FIG. 33 receiver.

Figure 44:
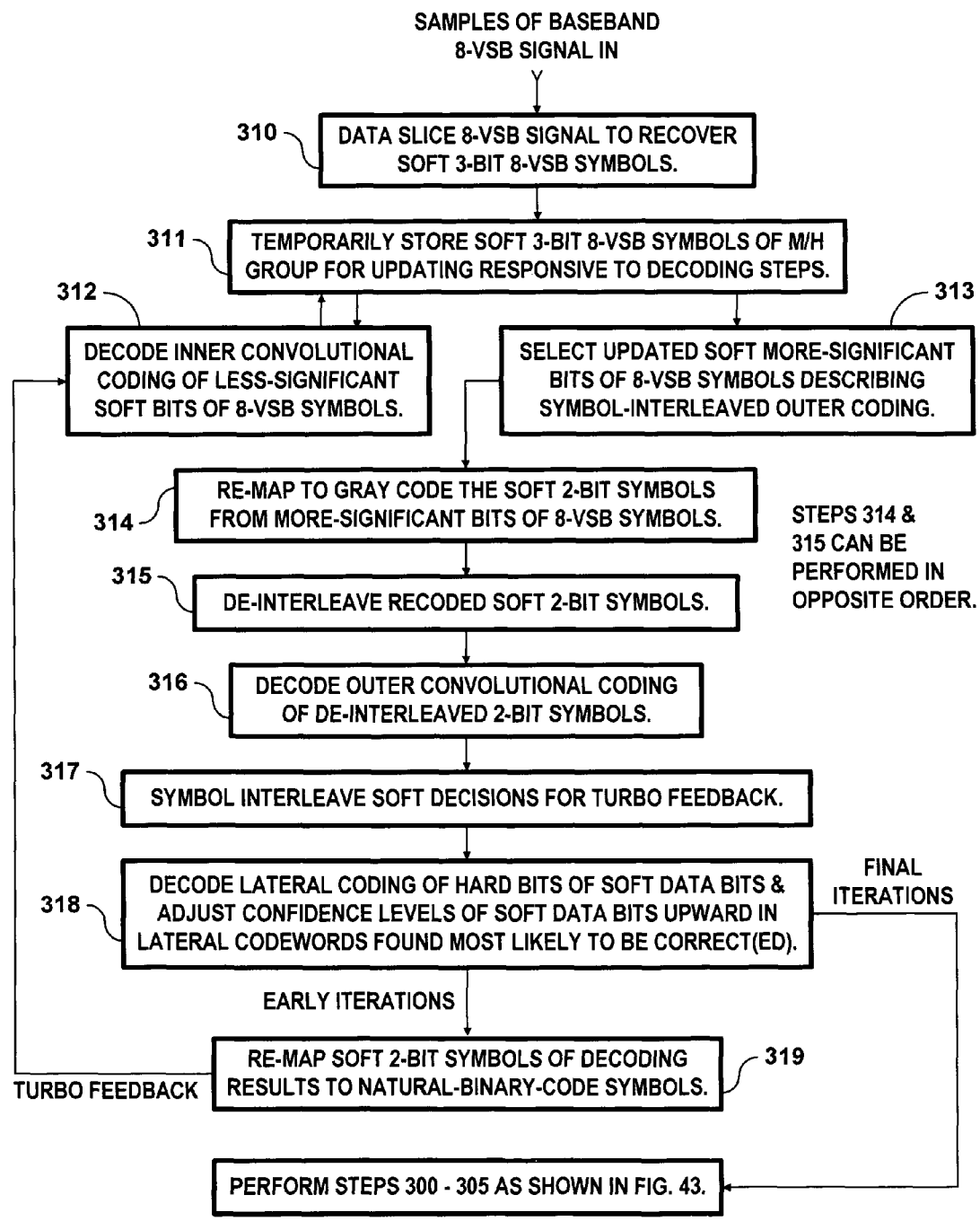
FIG. 44 is a flow chart illustrating the basic decoding method performed by one of the paralleled turbo decoders in each one of the FIGS. 37, 45, 47 and 49-56 and a subsequent RS-Frame decoder, when receiving single-time M/H transmissions at a code rate one-half the 8-VSB symbol rate.

FIG. 44 is an informal flow chart illustrating the basic turbo decoding method as performed by the turbo decoder 130-1 of FIG. 37 when receiving single-time M/H transmissions at a code rate one-half the 8-VSB symbol rate. In a step 310 of this method samples of analog 8-VSB signal are data sliced to generate digitized 8-VSB symbols composed of three soft bits. This data slicing does not include post-comb filtering of the soft most-significant bits of the digitized 8-VSB symbols, presuming that the most-significant bits of 8-VSB symbols were in contradistinction to practice prescribed by A/153 not precoded in the M/H transmissions.

In a subsequent step 311 the three soft bits descriptive of each of the successive digitized 8-VSB symbols are temporarily stored in the memory 131, capable of temporarily storing all the soft 8-VSB symbols in an M/H Group. In a step 312 the successive less-significant two soft bits descriptive of inner convolutional coding in the digitized 8-VSB symbols are decoded by the 12-phase SISO decoder 133, which updates the more-significant bits of the inner convolutional coding. The FIG. 44 flow chart shows the decoding results of step 312 returned with updates for continued temporary storage in the memory 131 per step 310.

In a step 313 the successive more-significant two soft bits descriptive of outer convolutional coding in the digitized 8-VSB symbols, as updated by step 312 of decoding the inner convolutional coding, are selectively read from the memory 131 as soft 2-bit symbols. The selective reading in step 313 omits those portions of the digitized 8-VSB symbols temporarily stored in the memory 131 that do not relate to the outer convolutional coding of M/H transmissions. In subsequent successive steps 314 and 315 the soft 2-bit symbols are re-mapped to Gray code and are symbol de-interleaved, respectively. Alternatively, step 315 is performed before step 314. This allows the symbol de-interleaving step 315 to be performed simply by reading soft 2-bit symbols from the memory 131 in proper order, without involving separate memory to support symbol de-interleaving. However, the symbol de-interleaving step 315 can be performed using memory associated with the SISO decoder for outer convolutional coding and used in subsequent soft-symbol re-interleaving. The de-interleaved soft 2-bit symbols as re-mapped to Gray code, which result from the steps 314 and 315, reproduce the outer convolutional coding. The outer convolutional coding is decoded in a subsequent step 316.

In a step 317 soft 2-bit symbols resulting from the decoding step 316 are interleaved. The soft data bits in these 2-bit symbols include respective hard bits that should reproduce the (210, K) RS codewords from one of the RS Frames. In a subsequent step 318 these hard bits are subjected to decoding of the (210, K) RS codewords in the attempt to correct erroneous hard data bits. If the decoding results for a (210, K) RS codeword indicate that the hard data bits therein are most likely to be correct, the soft data bits containing those hard data bits have their confidence levels adjusted to a higher confidence level. In the final iterations of turbo decoding cycles, the soft data bits with adjusted confidence levels are forwarded as turbo decoding results to be further processed by the steps 300, 301, 302, 303, 304 and 305 of the FIG. 43 method.

In the earlier iterations of turbo decoding cycles, the soft 2-bit symbols modified in step 318 to include soft data bits with adjusted confidence levels are re-mapped to natural-binary-code symbols in a subsequent step 319, thereby generating a turbo feedback signal fed back for use in the step 312 of decoding inner convolutional coding in the next iteration of the turbo decoding procedure. This turbo feedback signal is used for generating an extrinsic turbo feedback signal as part of the iterated step 312 of decoding inner convolutional coding, this procedure not being explicitly shown in the FIG. 44 flow chart for want of space. When the M/H transmissions use SCCC, both soft bits of the re-mapped soft 2-bit symbols are fed back, to be used in the next iterated step 312 of decoding inner convolutional coding. When the M/H transmissions use PCCC, only the soft data bits of the re-mapped soft 2-bit symbols need be fed back to be used in the next iterated step 312 of decoding inner convolutional coding.

Figure 45:
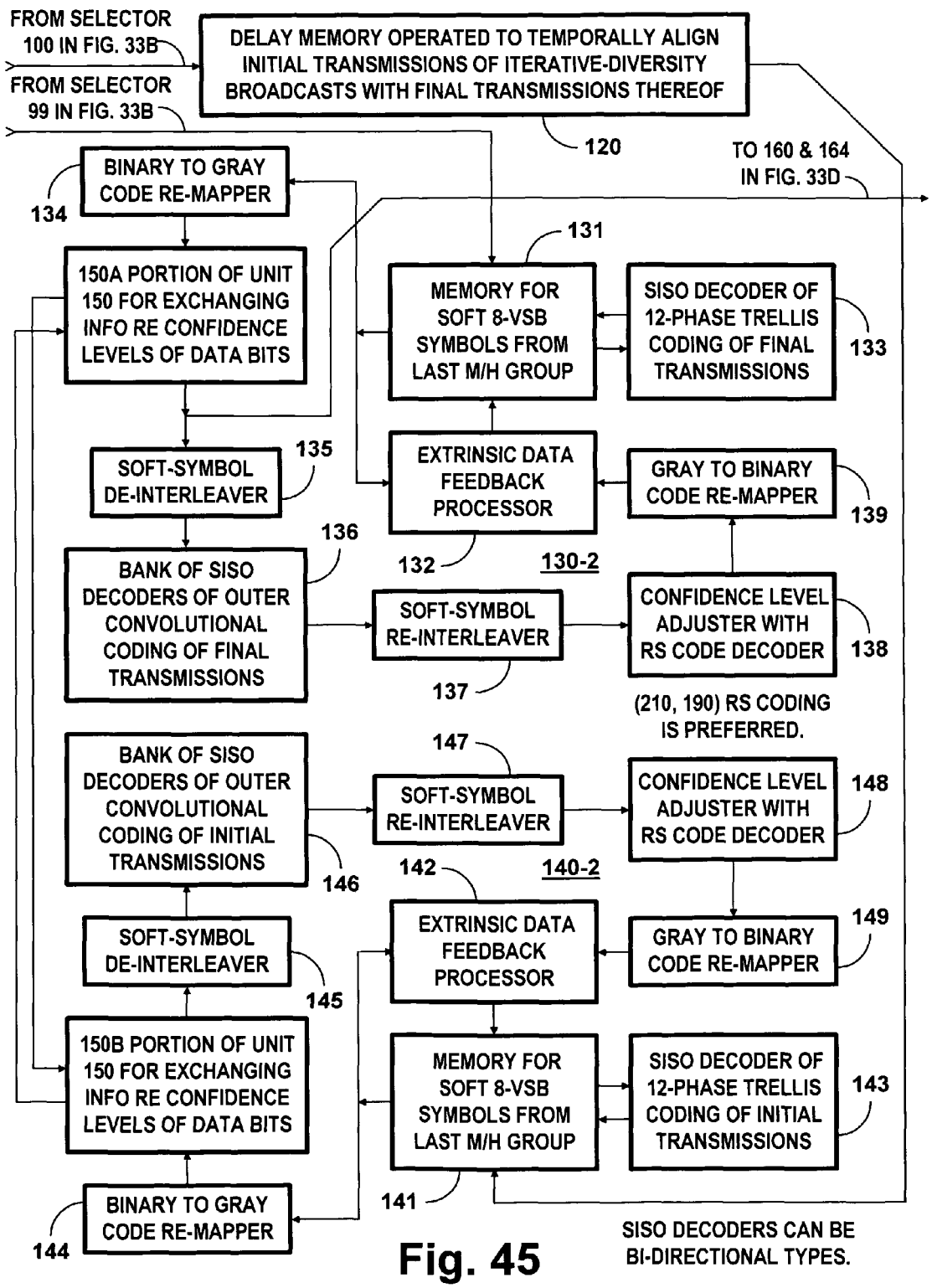
FIG. 45 is a schematic diagram of a second representative embodiment of the paralleled turbo decoders for diversity reception shown in the FIG. 33D portion of the FIG. 33 receiver apparatus.

FIG. 45 is a more detailed schematic diagram of another illustrative embodiment of the FIG. 33D portion of the FIG. 33 M/H receiver apparatus comprising the delay memory 120, a second embodiment 130-2 of the turbo decoder 130, a second embodiment 140-2 of the turbo decoder 140, and the information-exchange unit 150. The paralleled turbo decoders 130-2 and 140-2 shown in FIG. 45 differ in the following ways from the paralleled turbo decoders 130-1 and 140-1 shown in FIG. 37. The response of the portion 150A of the information-exchange unit 150, rather than the response of the confidence-level adjuster 138, is supplied to the FIG. 33D hard-decision unit 160 as input signal thereto. The response of the portion 150A of the information-exchange unit 150 is further supplied to the FIG. 33D battery 164 of XOR gates as input signal thereto, rather than the response of the confidence-level adjuster 138. Another alternative is directly applying the response of the binary-to-Gray-code re-mapper 134 to the FIG. 33D hard-decision unit 160 and to the battery 164 of XOR gates as input signals thereto. This is a less preferred alternative, however.

Figure 46:
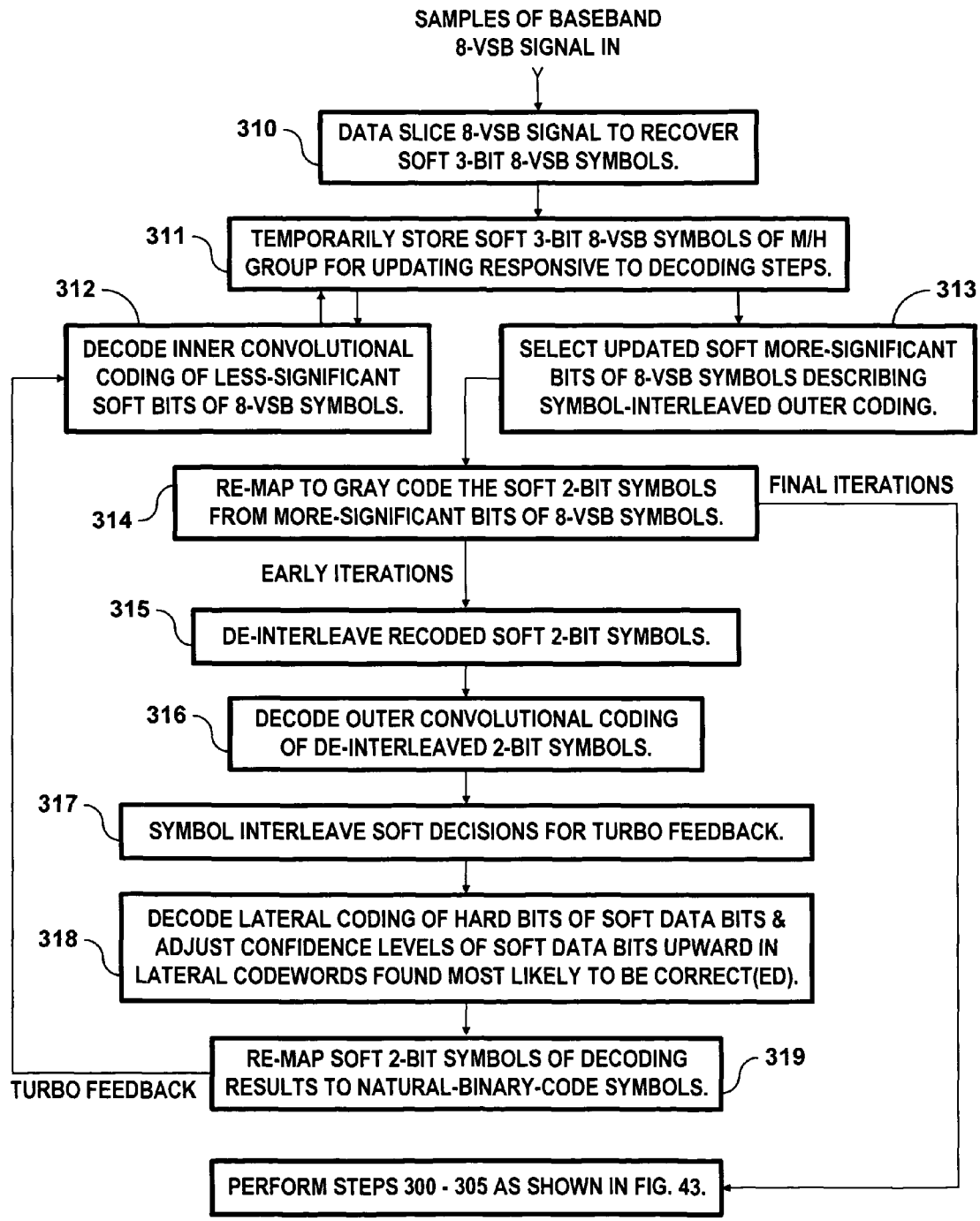
FIG. 46 is a flow chart illustrating the basic decoding method performed by one of the paralleled turbo decoders of FIG. 45 and a subsequent RS-Frame decoder, when receiving single-time M/H transmissions at a code rate one-half the 8-VSB symbol rate.

FIG. 46 is an informal flow chart illustrating the basic turbo decoding method as performed by the turbo decoder 130-2 of FIG. 45 when receiving single-time M/H transmissions at a code rate one-half the 8-VSB symbol rate. The FIG. 46 flow chart differs from the FIG. 44 flow chart only in that the turbo decoding results of the final iterations are not extracted after the step 318 of decoding the LRS coding. Instead, they are extracted after the step of 314 of re-mapping the soft 2-bit symbols to Gray code, which step 314 precedes the step 315 of de-interleaving the Gray-coded soft 2-bit symbols.

Figure 47:
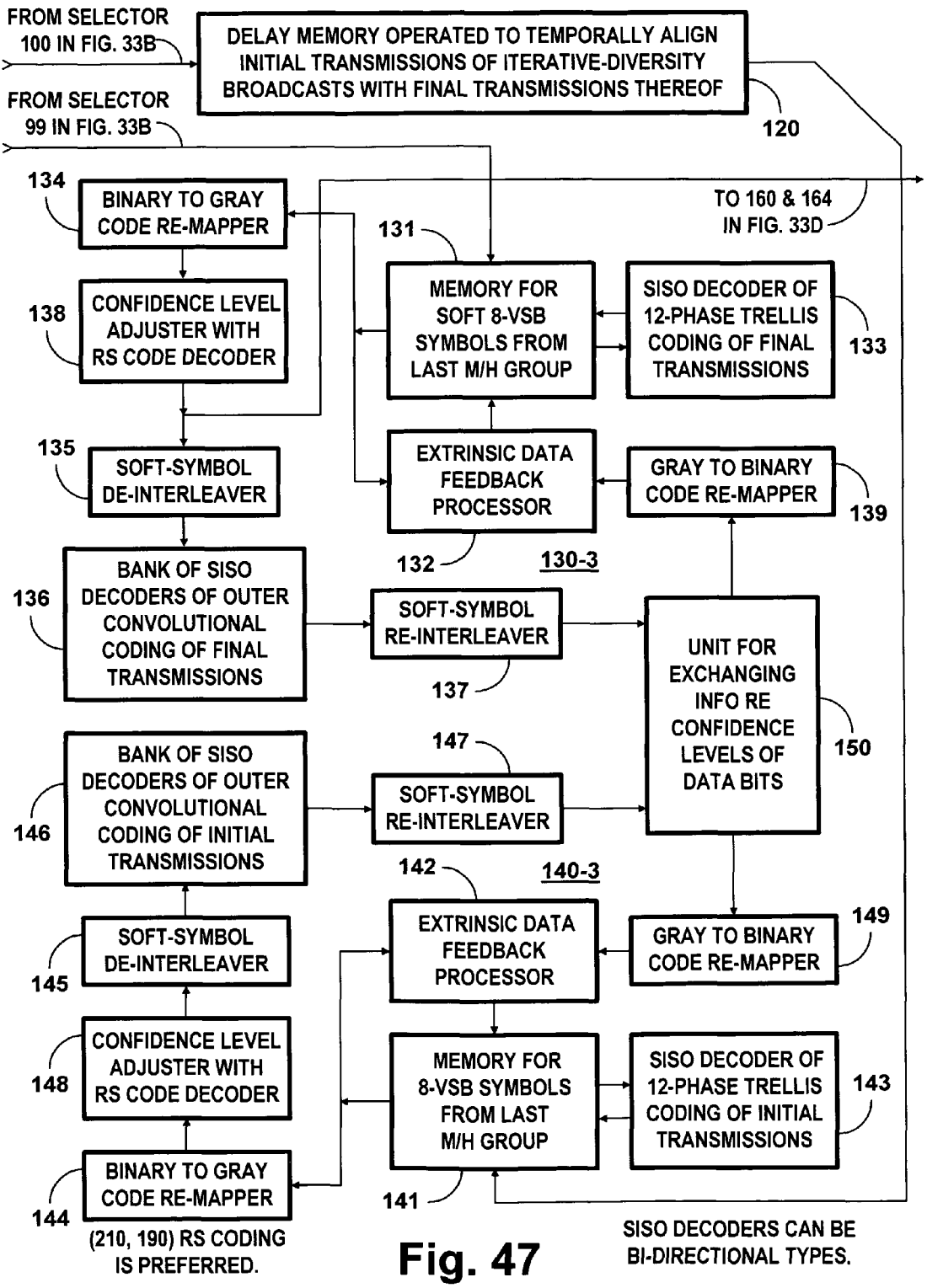
FIG. 47 is a schematic diagram of a third representative embodiment of the paralleled turbo decoders for diversity reception shown in the FIG. 33D portion of the FIG. 33 receiver apparatus.

FIG. 47 is a more detailed schematic diagram of another illustrative embodiment of the FIG. 33D portion of the FIG. 33 M/H receiver apparatus comprising the delay memory 120, a third embodiment 130-3 of the turbo decoder 130, a third embodiment 140-3 of the turbo decoder 140, and the information-exchange unit 150. The paralleled turbo decoders 130-3 and 140-3 shown in FIG. 47 differ from the paralleled turbo decoders 130-1 and 140-1 shown in FIG. 37 in the following ways. The unit 150 for exchanging information concerning confidence levels of data bits is relocated to replace the confidence-level adjusters 138 and 148 as positioned per FIG. 37. The unit 150 is reconnected for receiving the responses of the soft-symbol re-interleavers 137 and 147 as input signals. The unit 150 is further connected to supply soft 2-bit symbols with adjusted data bits to the Gray-to-binary-code re-mappers 139 and 149 as input signals thereto, rather than to supply the soft-symbol de-interleavers 135 and 145 with input signals.

Paralleled turbo decoders 130-3 and 140-3 shown in FIG. 47 differ further from the paralleled turbo decoders 130-1 and 140-1 shown in FIG. 37 in that the confidence-level adjusters 138 and 148 are also relocated. In turbo decoder 130-3 the input port of the confidence-level adjuster 138 is connected for receiving its input signal from the output port of the binary-to-Gray-code re-mapper 134. In turbo decoder 130-3 the output port of the confidence-level adjuster 138 is connected for supplying its response to the soft-symbol de-interleaver 134 as input signal thereto. In turbo decoder 140-3 the input port of the confidence-level adjuster 148 is connected for receiving its input signal from the output port of the binary-to-Gray-code re-mapper 144. In turbo decoder 140-3 the output port of the confidence-level adjuster 148 is connected for supplying its response to the soft-symbol de-interleaver 144 as input signal thereto. The response of the confidence-level adjuster 138 is also supplied to the FIG. 33D hard-decision unit 160 as input signal thereto. The response of the confidence-level adjuster 138 is further supplied to the FIG. 33D battery 164 of XOR gates as input signal thereto.

Figure 48:
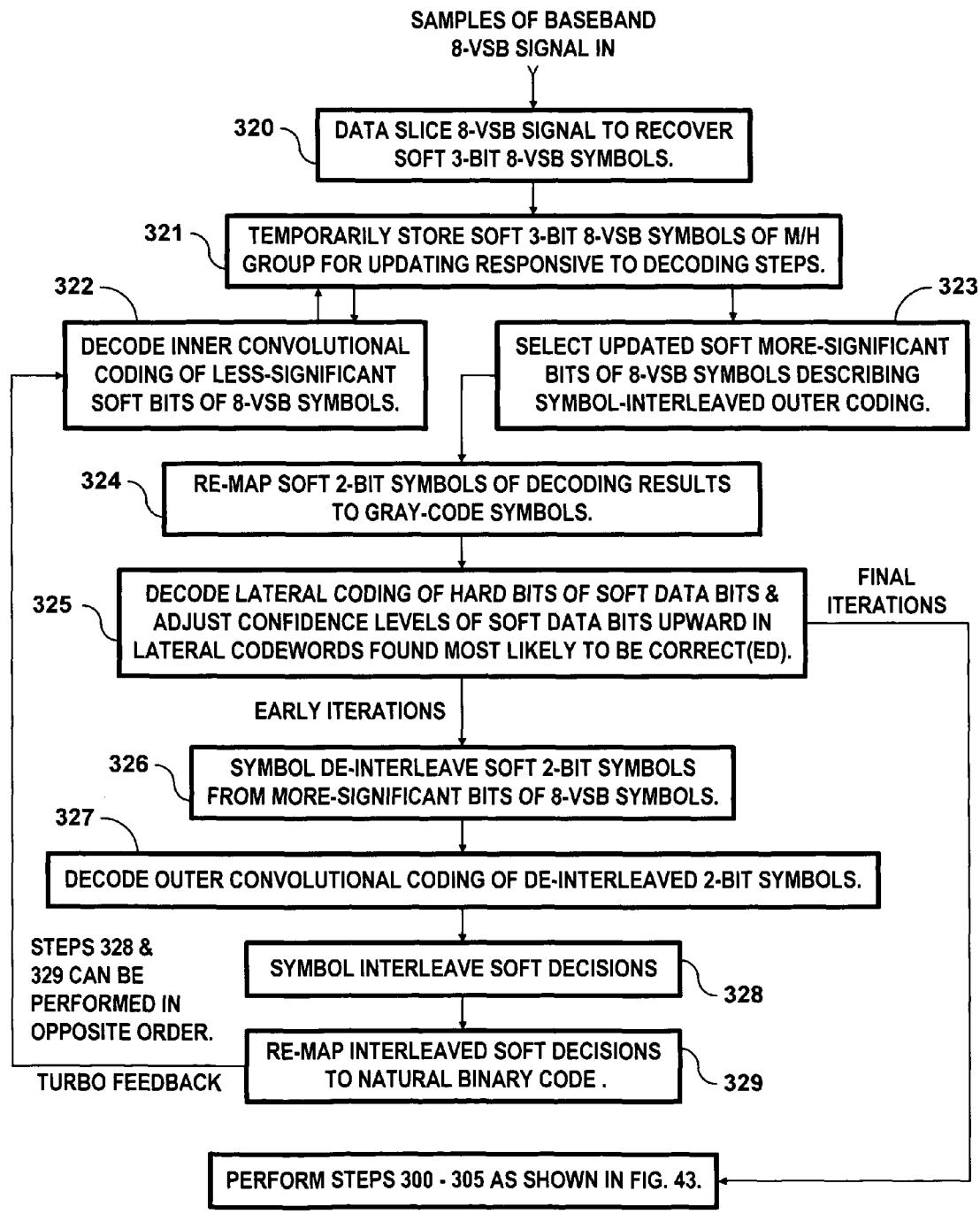
FIG. 48 is a flow chart illustrating the basic decoding method performed by one of the paralleled turbo decoders of FIG. 47 and a subsequent RS-Frame decoder, when receiving single-time M/H transmissions at a code rate one-half the 8-VSB symbol rate.

FIG. 48 is an informal flow chart illustrating the basic turbo decoding method as performed by the turbo decoder 130-3 of FIG. 47 when receiving single-time M/H transmissions at a code rate one-half the 8-VSB symbol rate. In a step 321 of this method samples of analog 8-VSB signal are data sliced to generate digitized 8-VSB symbols composed of three soft bits. This data slicing does not include post-comb filtering of the soft most-significant bits of the digitized 8-VSB symbols, presuming that the most-significant bits of 8-VSB symbols were in contradistinction to practice prescribed by A/153 not precoded in the M/H transmissions.

In a subsequent step 322 the three soft bits descriptive of each of the successive digitized 8-VSB symbols are temporarily stored in the memory 131, capable of temporarily storing all the soft 8-VSB symbols in an M/H Group. In a step 323 the successive less-significant two soft bits descriptive of inner convolutional coding in the digitized 8-VSB symbols are decoded by the 12-phase SISO decoder 133, which updates the more-significant bits of the inner convolutional coding. The FIG. 44 flow chart shows the decoding results of step 323 returned with updates for continued temporary storage in the memory 131 per step 321.

In a step 324 the successive more-significant two soft bits descriptive of outer convolutional coding in the digitized 8-VSB symbols, as updated by step 323 of decoding the inner convolutional coding, are selectively read from the memory 131 as soft 2-bit symbols. The selective reading in step 324 omits those portions of the digitized 8-VSB symbols temporarily stored in the memory 131 that do not relate to the outer convolutional coding of M/H transmissions. In a subsequent successive step 325 the soft 2-bit symbols are re-mapped to Gray code. The soft data bits in the re-mapped 2-bit symbols include respective hard bits that should reproduce the CRC codewords from one of the RS Frames. In a subsequent step 326 these hard bits are subjected to CRC decoding. If the decoding results for a CRC codeword indicate that the hard data bits therein are most likely to be correct, the soft data bits containing those hard data bits have their confidence levels adjusted to a higher confidence level. In the final iterations of turbo decoding cycles, the soft data bits with adjusted confidence levels are forwarded as turbo decoding results to be further processed by the steps 300, 301, 302, 303, 304 and 305 of the FIG. 43 method.

In the earlier iterations of turbo decoding cycles, the soft 2-bit symbols modified in step 326 to include soft data bits with adjusted confidence levels are de-interleaved in a subsequent step 327. The resulting de-interleaved soft 2-bit symbols reproduce the outer convolutional coding, which is then decoded in a subsequent step 328.

In steps 329 and 330 soft 2-bit symbols resulting from the decoding step 328 are interleaved and re-mapped to natural-binary-code symbols, thereby generating a turbo feedback signal fed back for use in the step 323 of decoding inner convolutional coding in the next iteration of the turbo decoding procedure. Symbol interleaving may be done before re-mapping to natural-binary-code symbols, or re-mapping to natural-binary-code symbols may be done before symbol interleaving. The resulting turbo feedback signal is used for generating an extrinsic turbo feedback signal as part of the iterated step 323 of decoding inner convolutional coding, this procedure not being explicitly shown in the FIG. 48 flow chart for want of space. When the M/H transmissions use SCCC, both soft bits of the interleaved and re-mapped soft 2-bit symbols are fed back to be used in the next iterated step 323 of decoding inner convolutional coding. When the M/H transmissions use PCCC, only the soft data bits of the interleaved and re-mapped soft 2-bit symbols need be fed back to be used in the next iterated step 323 of decoding inner convolutional coding.

Figure 49:
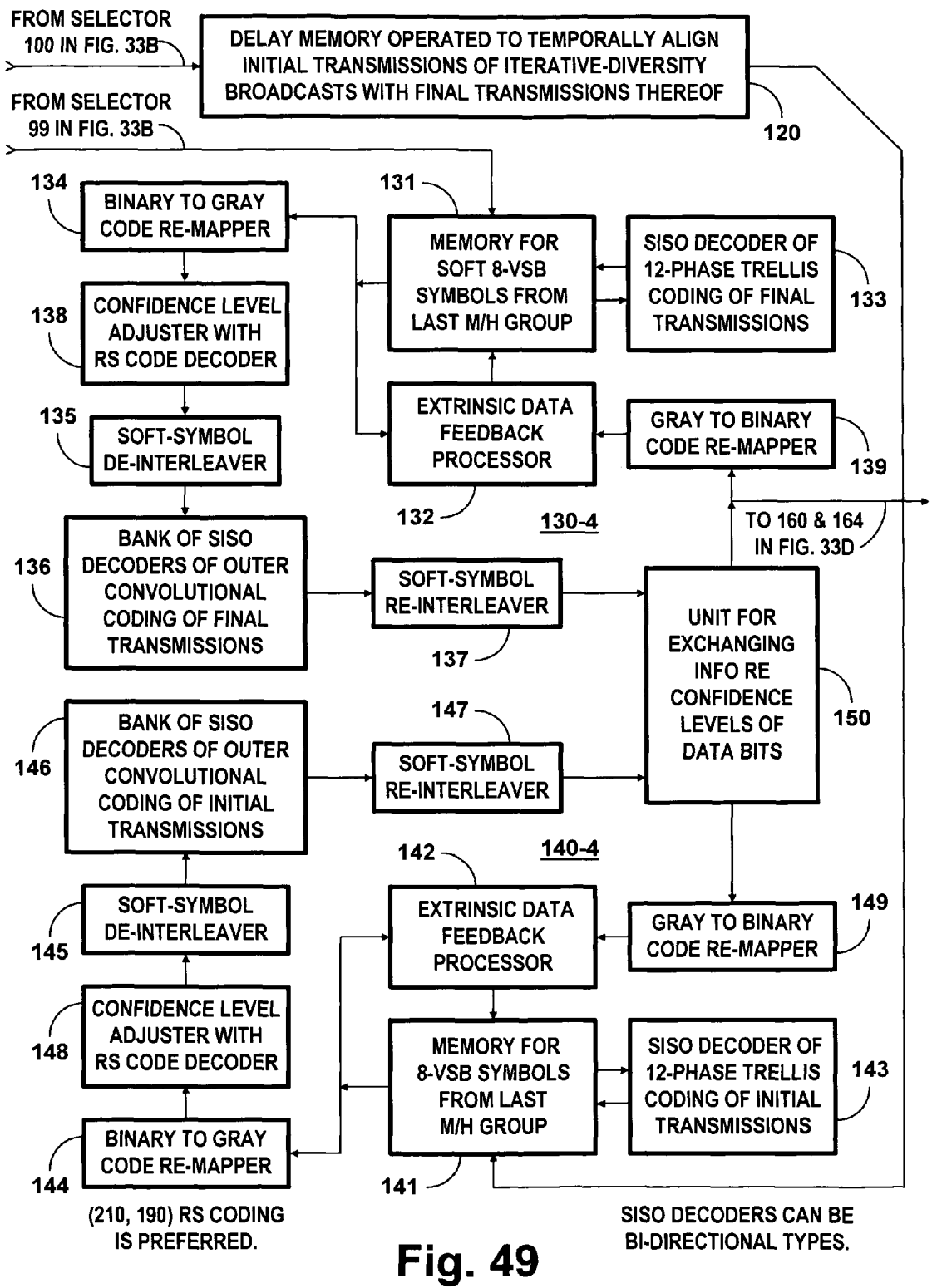
FIG. 49 is a schematic diagram of a fourth representative embodiment of the paralleled turbo decoders for diversity reception shown in the FIG. 33D portion of the FIG. 33 receiver apparatus.

FIG. 49 is a more detailed schematic diagram of another illustrative embodiment of the FIG. 33D portion of the FIG. 33 M/H receiver apparatus comprising the delay memory 120, a fourth embodiment 130-4 of the turbo decoder 130, a fourth embodiment 140-4 of the turbo decoder 140, and the information-exchange unit 150. The paralleled turbo decoders 130-4 and 140-4 shown in FIG. 49 differ in the following way from the paralleled turbo decoders 130-3 and 140-3 shown in FIG. 47. The response of the confidence-level adjuster 138 is not supplied as input signals to the hard-decision unit 160 and the battery 164 of XOR gates shown in FIG. 33D. Instead, the adjusted data bits that the unit 150 for exchanging information supplies to the Gray-to-binary-code re-mapper 139 are also supplied as input signals to the hard-decision unit 160 and to the battery 164 of XOR gates.

Figure 50:
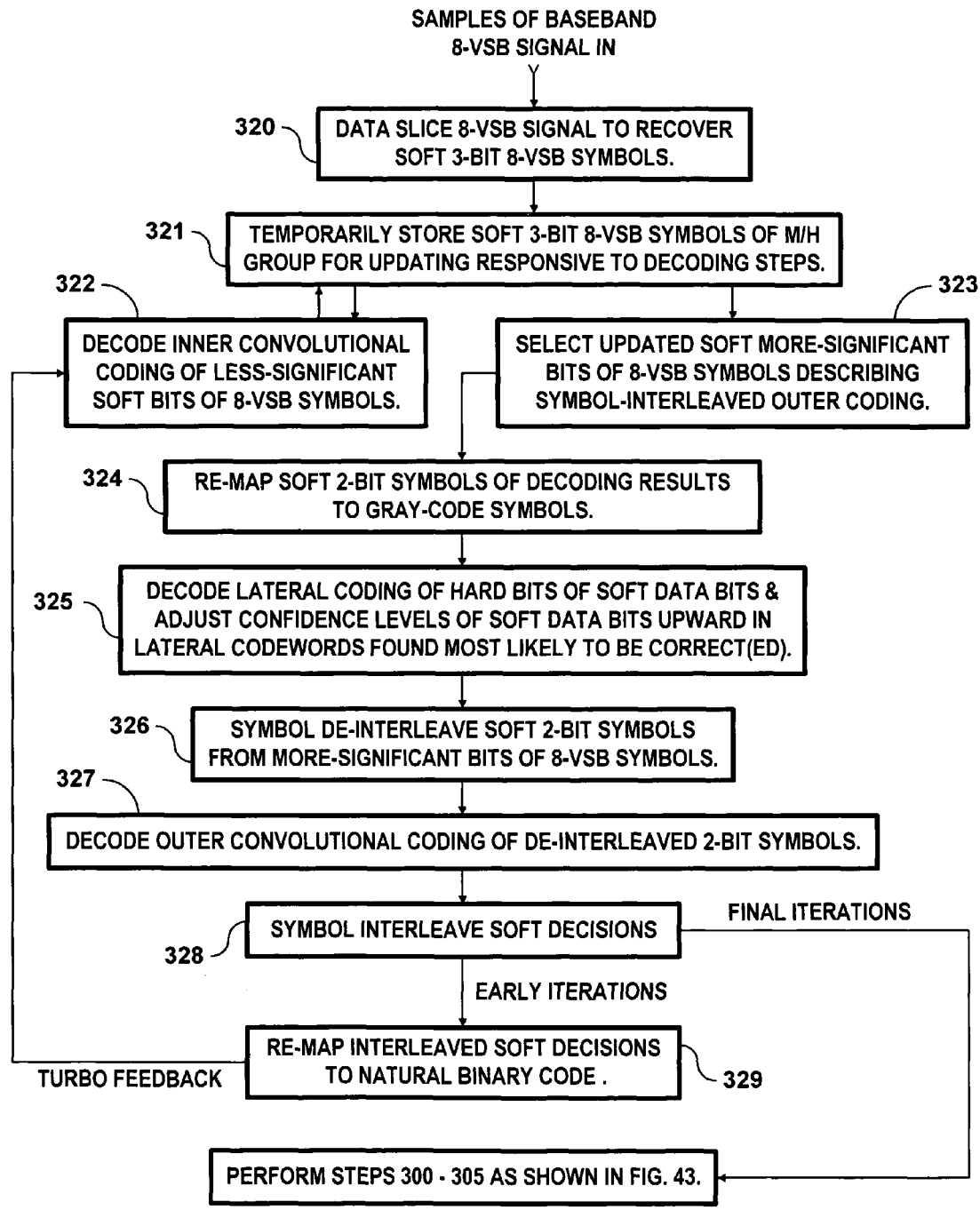
FIG. 50 is a flow chart illustrating the basic decoding method performed by one of the paralleled turbo decoders of FIG. 49 and a subsequent RS-Frame decoder, when receiving single-time M/H transmissions at a code rate one-half the 8-VSB symbol rate.

FIG. 50 is an informal flow chart illustrating the basic turbo decoding method as performed by the turbo decoder 130-4 of FIG. 49 when receiving single-time M/H transmissions at a code rate one-half the 8-VSB symbol rate. The FIG. 50 flow chart differs from the FIG. 48 flow chart only in that the turbo decoding results of the final iterations are not extracted after the step 325 of decoding the LRS coding. Instead, they are extracted after the step of 328 of interleaving soft 2-bit symbols following the step of decoding the outer convolutional coding.

Figure 51:
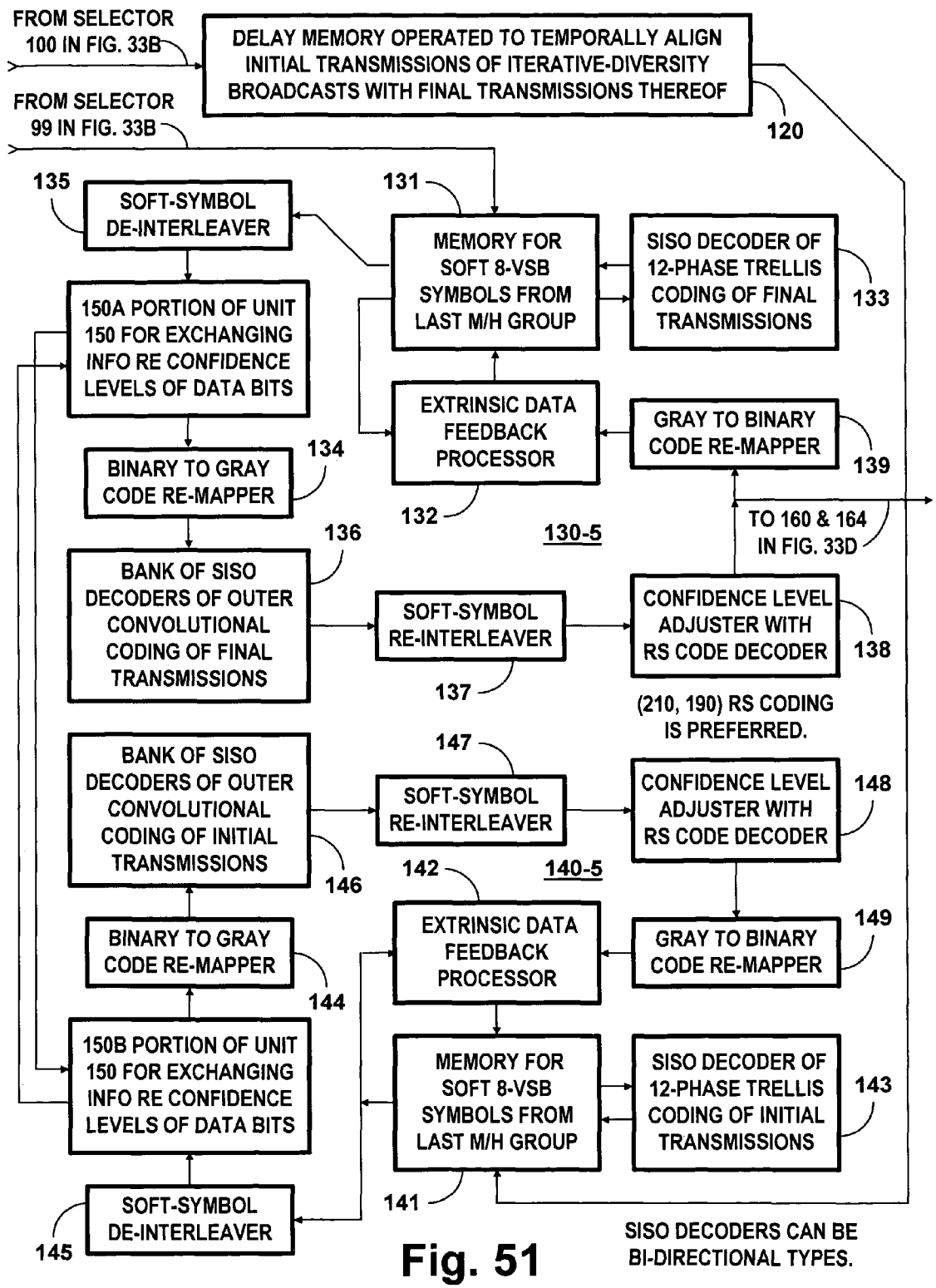
FIGS. 51, 52, 53, 54, 55 and 56 are schematic diagrams of fifth, sixth, seventh, eighth, ninth and tenth further representative embodiments of the paralleled turbo decoders for diversity reception shown in the FIG. 33D portion of the FIG. 33 receiver apparatus.

FIG. 51 depicts a fifth representative embodiment of the paralleled turbo decoders for diversity reception shown in the FIG. 33D portion of the FIG. 33 receiver apparatus. Turbo decoders 130-5 and 140-5 in FIG. 53 differ from the turbo decoders 130-1 and 140-1 in FIG. 37 in regard to the connection of elements between the memory 131 and the SISO decoder 136, and in regard to the connection of elements between the memory 141 and the SISO decoder 146. In the turbo decoders 130-5 and 140-5 the binary-to-Gray-code re-mappers 134 and 144 succeed, rather than precede, the information-exchange unit 150. Also, in the turbo decoders 130-5 and 140-5 the soft-symbol de-interleavers 135 and 145 precede, rather than succeed, the information-exchange unit 150.

The soft-symbol de-interleavers 135 and 145 are no longer proximate to the SISO decoders 136 and 146 and cannot be subsumed into the memory for input symbols in those decoders. The soft-symbol de-interleavers 135 and 145 can be subsumed into a portion of the memory 131 and a portion of the memory 141, respectively, however.

Figure 52:
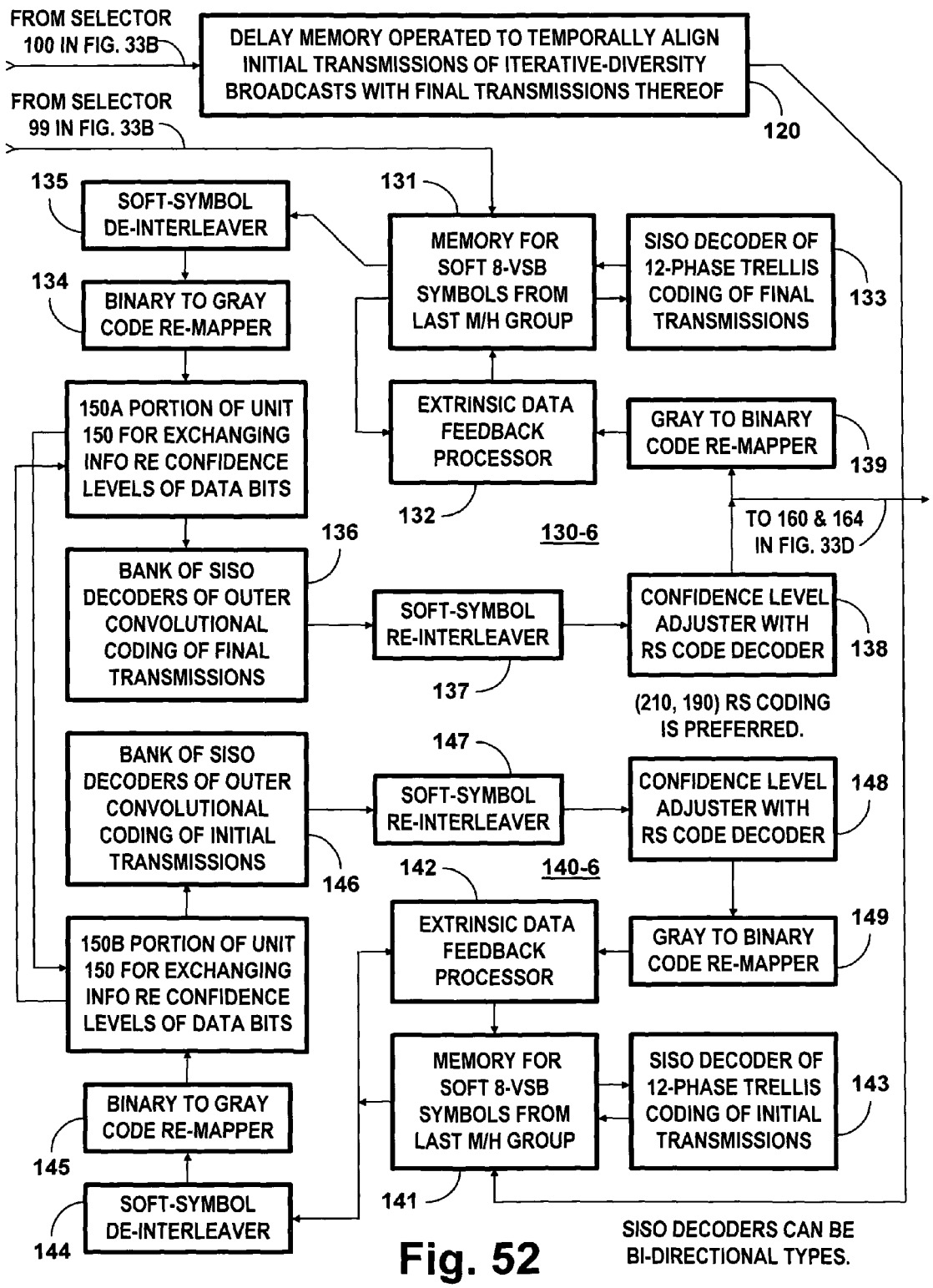

FIG. 52 depicts a sixth representative embodiment of the paralleled turbo decoders for diversity reception shown in the FIG. 33D portion of the FIG. 33 receiver apparatus. Turbo decoders 130-6 and 140-6 in FIG. 52 differ from the turbo decoders 130-1 and 140-1 in FIG. 37 in regard to the connection of elements between the memory 131 and the SISO decoder 136, and in regard to the connection of elements between the memory 141 and the SISO decoder 146. As in the turbo decoders 130-5 and 140-5, the soft-symbol de-interleavers 135 and 145 in the turbo decoders 130-6 and 140-6 are connected for de-interleaving soft symbols of interleaved outer convolutional coding respectively supplied from the memories 131 and 141 of the SISO decoders 133 and 143. So, the soft-symbol de-interleavers 135 and 145 can be subsumed within the memories 131 and 141, respectively. FIG. 52 shows the binary-to-Gray-code re-mappers 134 and 144 connected for re-mapping the responses of the soft-symbol de-interleavers 135 and 145 for application to the information-exchange unit 150 and thenceforth to the SISO decoders 136 and 146 for decoding.

Figure 53:
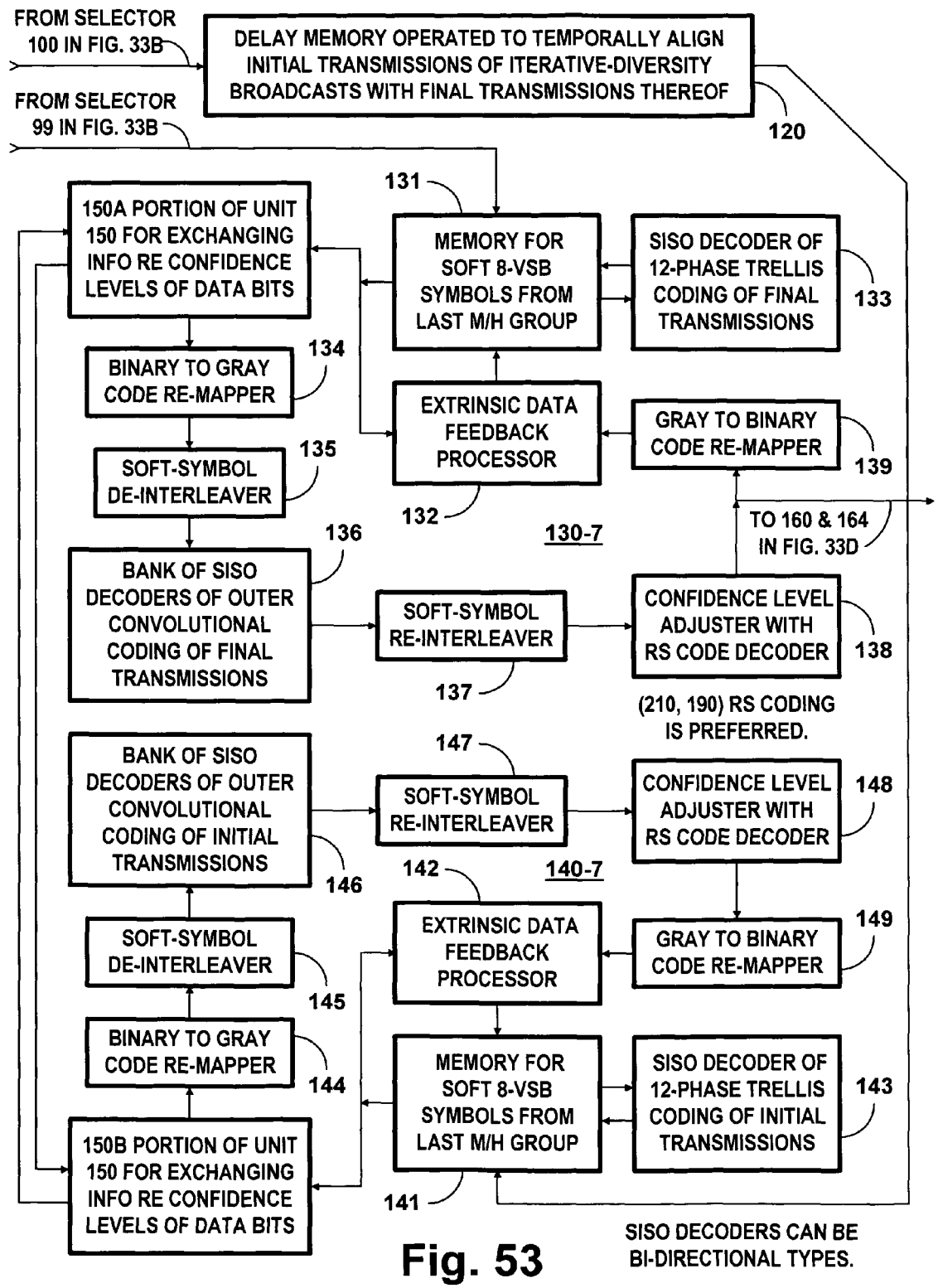

FIG. 53 depicts a seventh representative embodiment of the paralleled turbo decoders for diversity reception shown in the FIG. 33D portion of the FIG. 33 receiver apparatus. Turbo decoders 130-7 and 140-7 in FIG. 53 differ from the turbo decoders 130-6 and 140-6 in FIG. 52 in regard to the connection of elements between the memory 131 and the SISO decoder 136, and in regard to the connection of elements between the memory 141 and the SISO decoder 146. The information-exchange unit 150 is connected for receiving soft symbols of interleaved outer convolutional coding respectively supplied from the memories 131 and 141 of the SISO decoders 133 and 143. The information-exchange unit 150 is further connected for supplying modified soft symbols of interleaved outer convolutional coding to the SISO decoder 136 via a cascade connection of the binary-to-Gray-code re-mapper 134 and the soft-symbol de-interleaver 135. Also, the information-exchange unit 150 is further connected for supplying modified soft symbols of interleaved outer convolutional coding to the SISO decoder 146 via a cascade connection of the binary-to-Gray-code re-mapper 144 and the soft-symbol de-interleaver 145. FIG. 53 shows the binary-to-Gray-code re-mapper 134 preceding the soft-symbol de-interleaver 135 in their cascade connection. FIG. 53 also shows the binary-to-Gray-code re-mapper 144 preceding the soft-symbol de-interleaver 145 in their cascade connection. Such order of the cascade connections facilitates the soft-symbol de-interleavers 135 and 145 being subsumed into the memories for input symbols in the SISO decoders 136 and 146.

Figure 54:
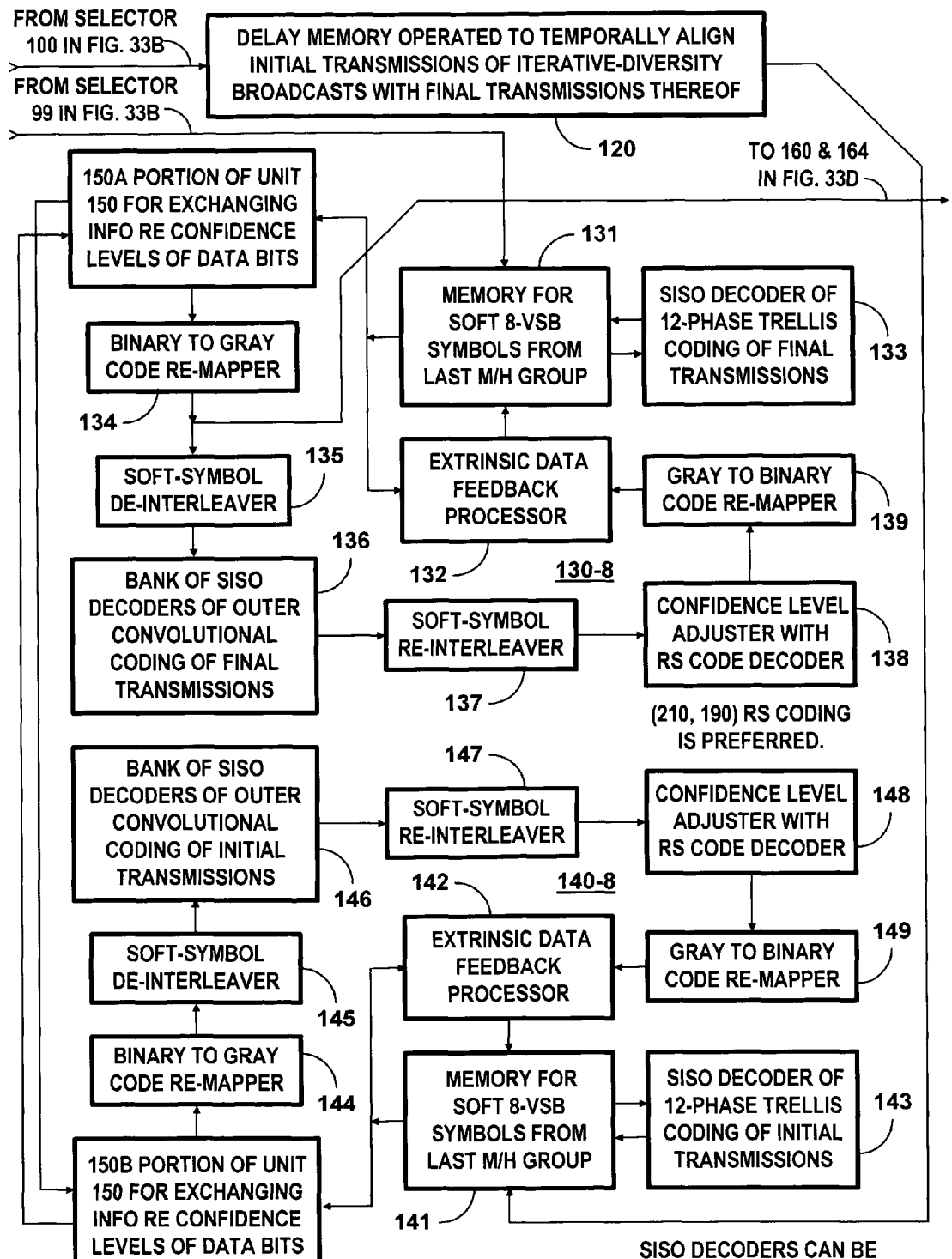

FIG. 54 depicts an eighth representative embodiment of the paralleled turbo decoders for diversity reception shown in the FIG. 33D portion of the FIG. 33 receiver apparatus. Turbo decoders 130-8 and 140-8 in FIG. 54 differ from the turbo decoders 130-7 and 140-7 in FIG. 53 in regard to how soft data bits are supplied to the input port of the hard-decision unit 160 and to the input ports of the XOR gates 164. FIG. 54 shows a connection for supplying these soft data bits from the response of the binary-to-Gray-code re-mapper 134, rather than from the input signal supplied to the Gray-to-binary-code re-mapper 139 as shown in FIG. 53. Alternatively, the eighth representative embodiment of the paralleled turbo decoders for diversity reception shown in FIG. 54 can be viewed as a variant of the second representative embodiment of the paralleled turbo decoders for diversity reception shown in FIG. 45. This variant relocates the information-exchange unit 150 to precede the binary-to-Gray-code re-mappers 134 and 144, rather than succeeding them.

Figure 55:
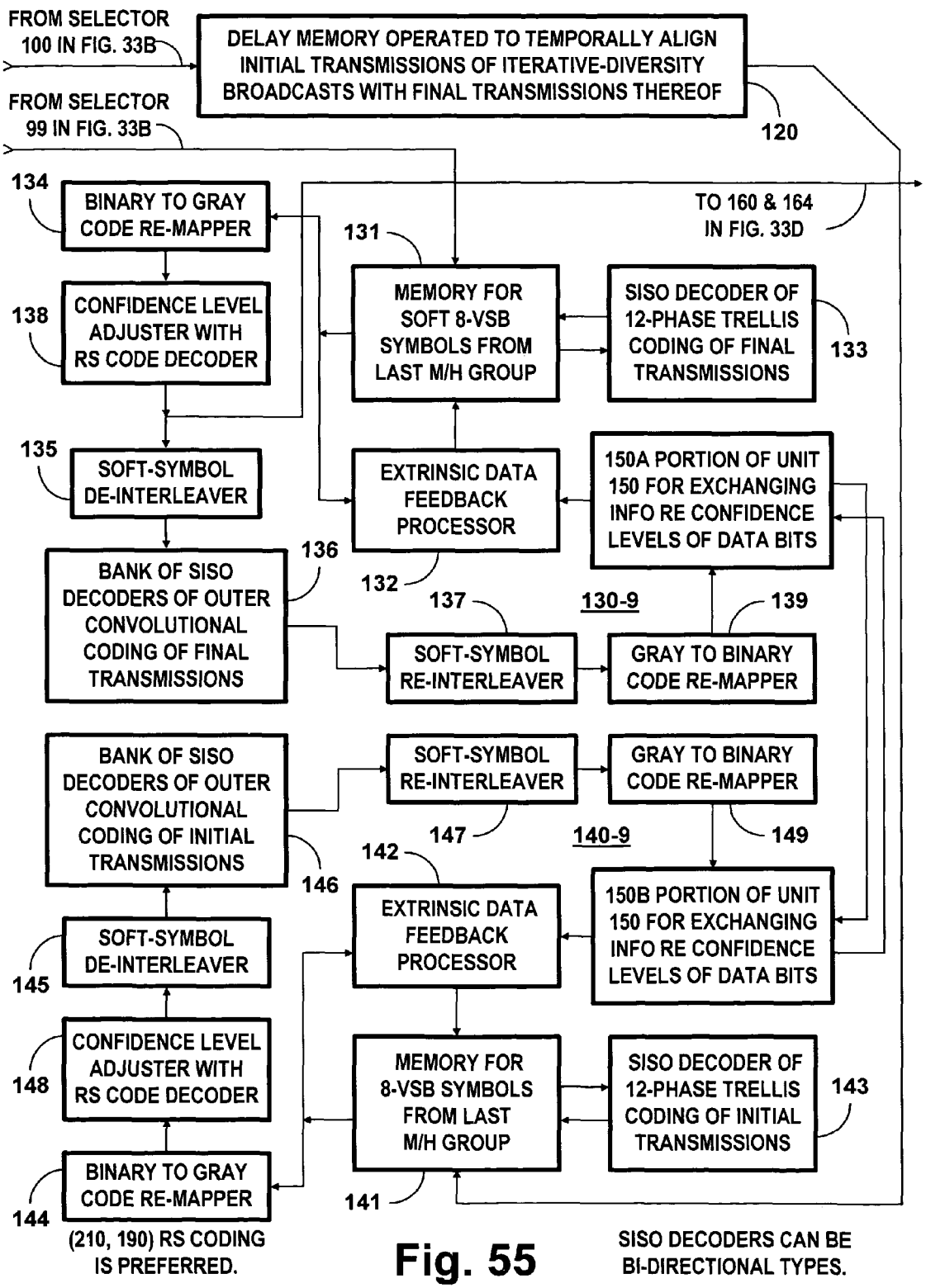

FIG. 55 depicts a ninth representative embodiment of the paralleled turbo decoders for diversity reception shown in the FIG. 33D portion of the FIG. 33 receiver apparatus. This ninth embodiment comprising turbo decoders 130-9 and 140-9 can be viewed as a variant of the third representative embodiment of the paralleled turbo decoders shown in FIG. 47. This variant relocates the information-exchange unit 150 to succeed the Gray-to-binary-code re-mappers 139 and 149, rather than preceding them.

Figure 56:
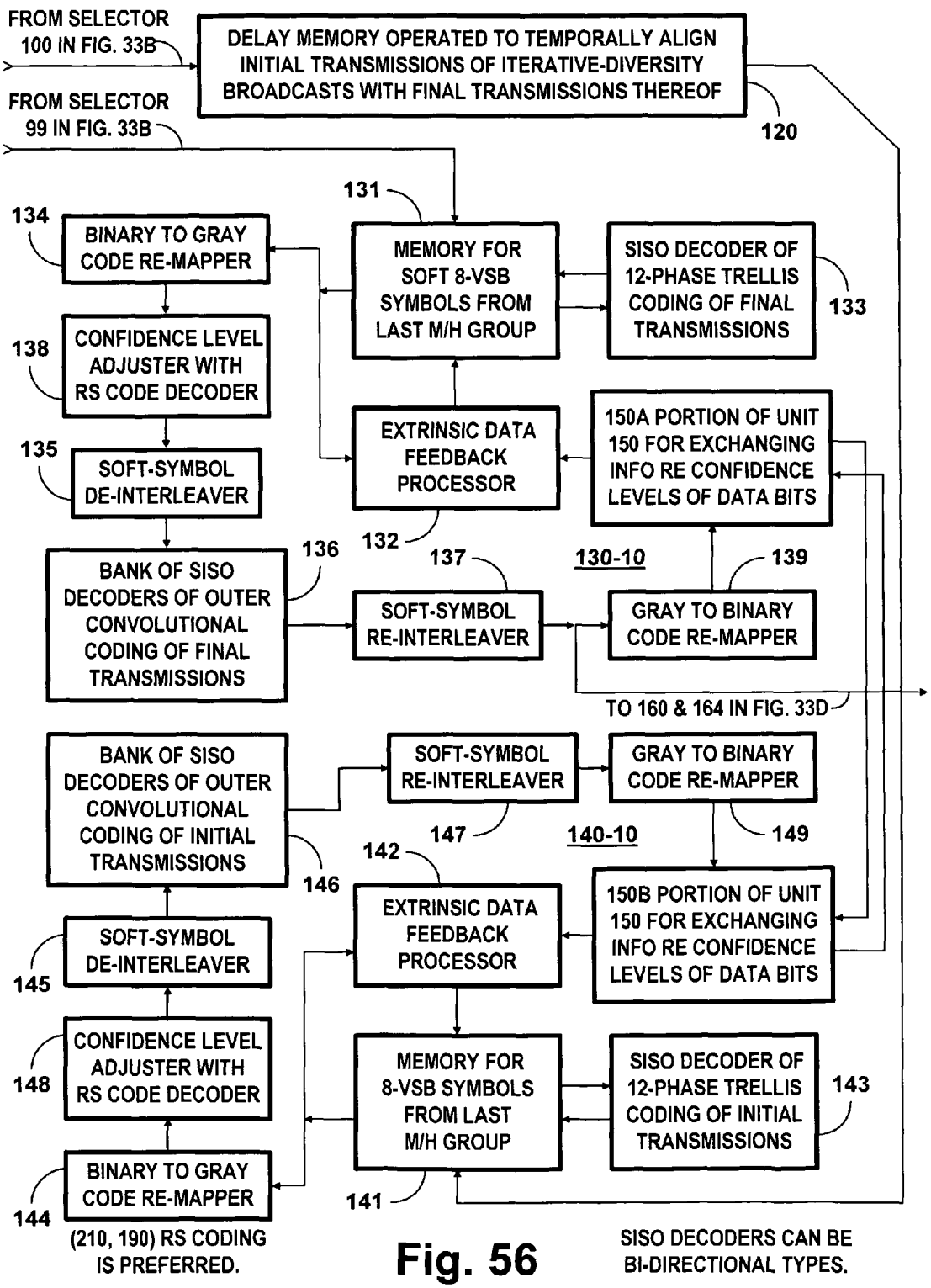

FIG. 56 depicts a tenth representative embodiment of the paralleled turbo decoders for diversity reception shown in the FIG. 33D portion of the FIG. 33 receiver apparatus. This tenth embodiment comprising turbo decoders 130-10 and 140-10 can be viewed as a variant of the fourth representative embodiment of the paralleled turbo decoders shown in FIG. 49. This variant relocates the information-exchange unit 150 to succeed the Gray-to-binary-code re-mappers 139 and 149, rather than preceding them.

One should appreciate that when lateral block coding is decoded during each cycle of turbo decoding CCC of an M/H Group, in order to gain information to benefit subsequent turbo decoding procedures, the complete codewords of the lateral block coding including parity bits continue to be included in the CCC for further coding. If the lateral block coding is forward-error-correcting in nature, these complete codewords are usually corrected before continuing to be included in the CCC for further coding. When turbo decoding CCC of an M/H Group reaches its conclusion, the hard bits in the soft bits of the final turbo decoding results reproduce successive complete codewords of the lateral block coding. If the parity bits for the lateral block coding are not used for locating byte errors when decoding the TRS coding of RS Frames, these parity bits are not forwarded for storage as part of a TRS-coded RS Frame to be decoded subsequently. This is the case when the soft data bits in the final turbo decoding results are analyzed to locate probable byte errors for decoding the TRS coding of RS Frames.

The TRS coding is described supra as being systematic. However, other M/H broadcasting systems can be constructed in accordance with the foregoing precepts, which other systems employ non-systematic TRS codes in which the parity bytes for RS Frames are transmitted prior to their respective data bytes. While the inventor found 230-byte TRS codewords and 210-byte LRS codewords to be especially advantageous for packing M/H Groups, 210—byte TRS codewords and 230-byte LRS codewords could be used instead. So could 220-byte TRS codewords and 220-byte LRS codewords, though preferably the initial LRS codeword in each M/H Group would be a byte or so shorter than 220 bytes in length. The inventor preferred the 230-byte TRS codewords over the 210-byte and 220-byte TRS codewords because it was easier to choose a TRS codeword of intermediate capability for correcting erroneous bytes. Other possible coding combinations are 235-byte TRS codewords combined with LRS codewords that are 205 or 206 bytes in length, which coding combinations have the advantage that A/153 already prescribes (235, 187) TRS codewords. If LRS codewords are 206 bytes long, preferably the initial LRS codeword in each M/H Group would be 3 bytes or so shorter than 206 bytes in length.

Turbo decoding of M/H Group data benefits particularly from the error correction that LRS coding provides when PCCC, rather than SCCC, is used for transmitting the M/H Group data. The error-correction that LRS coding provides is directly applicable to the inner convolutional coding of PCCC, as well as being directly applicable to the outer convolutional coding of PCCC, since data bits are included in both the inner convolutional coding and the outer convolutional coding of PCCC. Both SISO decoders in a turbo decoder benefit individually, as well as cooperatively, from the error correction that LRS coding provides. Data bits are included just in the outer convolutional coding of SCCC. So, the error-correction that LRS coding provides is directly applicable to the outer convolutional coding of SCCC, but not to its inner convolutional coding. The error-correction that LRS coding directly benefits just the SISO decoder for outer convolutional coding; the SISO decoder for inner convolutional coding is benefited only indirectly, responsive to the direct benefit afforded to the SISO decoder for outer convolutional coding. This is another reason for preferring PCCC to SCCC for transmitting M/H Group data.

This specification and its drawing specifically describe decoding procedures in which 12-phase codes are decoded on a time-interleaved basis. However, persons skilled in the art are aware that alternative decoding procedures exist in which the twelve phases of 12-phase codes are de-interleaved and each decoded separately. These alternative decoding procedures are functionally equivalent. They offer an advantage of lower clocking rates for some digital operations, but require additional de-interleaving and re-interleaving procedures.

FIGS. 33A and 33B show the FIG. 33 M/H receiver having a single tuner that recovers soft CCC data descriptive of 8-level digital symbols from a first selected RF carrier wave, which tuner includes an adaptive channel-equalization filter 77 in the tuner apparatus performing that recovery. This single tuner includes further tuning apparatus to make it frequency-agile, for recovering soft CCC data descriptive of 8-level digital symbols from a second selected RF carrier wave in time-division multiplex with recovering the soft CCC data from the first selected RF carrier wave. This further tuning apparatus includes an adaptive channel-equalization filter 80 for the soft CCC data descriptive of 8-level digital symbols from the second selected RF carrier wave. The FIG. 33 M/H receiver can be modified by replacing the single, frequency-agile tuner with two tuners, one for recovering soft CCC data from a first selected RF carrier wave and the other for recovering soft CCC data from a second selected RF carrier wave. Each of these two tuners includes a respective adaptive channel-equalization filter. Such modified FIG. 33 M/H receiver is described in detail with reference to eight figures of drawing in a patent application filed 6 Dec. 2010 for A. L. R. Limberg and titled "Frequency-diversity 8-VSB AM broadcasting to mobile/handheld receivers".

One skilled in the design of electronic apparatus will readily appreciate that modifications can be made to the embodiments of the turbo decoders 130 and 140 shown in FIGS. 37, 45, 47 and 49-56 in regard to the order of elements in certain cascade connections, which modifications result in further embodiments that are essentially equivalent in performance. While particular embodiments of the invention in its various aspects have been shown and described, it will be apparent to those skilled in the art that changes and modifications may be made without departing from the invention in its broader aspects. The aim in the appended claims is to cover all such changes and modifications as fall within the true spirit and scope of the invention.

In the claims which follow, the word "said" rather than the word "the" is used to indicate the existence of an antecedent basis for a term having been provided earlier in the claims. The word "the" is used for purposes other than to indicate the existence of an antecedent basis for a term having being provided earlier in the claims, the usage of the word "the" for other purposes being consistent with normal grammar in the American English language.

What is claimed is:

1. A receiver for radio-frequency carrier waves each modulated in amplitude responsive to a respective succession of 8-level digital symbols, said 8-level digital symbols of said respective succession conveying at selected times concatenated convolutional coding (CCC) of data that have previously been subjected to transverse Reed-Solomon (TRS) forward-error-correction (FEC) coding and to subsequent lateral block FEC coding that facilitates correction of reception errors caused by impulse noise, said receiver comprising:

tuner apparatus for recovering soft first CCC descriptive of said 8-level digital symbols from a first selected one of said radio-frequency carrier waves, said first CCC composed of triads of soft bits, a symbol-interleaved outer convolutional coding component of said first CCC being conveyed by the two more significant ones of the soft bits of each said triad therein, an inner convolutional coding component of said first CCC being conveyed by the two less significant ones of the soft bits of each said triad therein, the one of the soft bits of intermediate significance of each said triad of soft bits in said first CCC conveying parts of both said inner convolutional coding component and said symbol-interleaved outer convolutional coding component of said first CCC;

a first memory for temporarily storing said triads of soft bits of said first CCC;

a first soft-input/soft-output (SISO) decoder connected for receiving the two less significant ones of the soft bits of each said triad conveying said inner convolutional coding component of said first CCC and decoding said inner convolutional coding component of said first CCC to generate a response supplying updates of said soft bits of intermediate significance in said triads of the soft bits of said first CCC as temporarily stored in said first memory;

a first symbol de-interleaver having an input port connected for receiving from said first memory 2-bit symbols of said symbol-interleaved outer convolutional coding component of said first CCC composed of the most significant ones of the soft bits of said triads conveying said inner convolutional coding component of said first CCC and corresponding updated ones of the soft bits of intermediate significance in said triads, said first symbol de-interleaver connected for supplying from an output port thereof an outer convolutional coding component of said first CCC as a first symbol de-interleaver response therefrom;

a second soft-input/soft-output (SISO) decoder connected for receiving said first symbol de-interleaver response and decoding said outer convolutional coding component of said first CCC therein to generate a response from said second SISO decoder that updates said soft bits of said outer convolutional coding component of said first CCC data;

a first interleaver connected for receiving at an input port thereof at least the less significant soft bits of said second SISO decoder response and for supplying a first interleaver response from an output port of said first interleaver;

a first extrinsic data processor connected for extracting first extrinsic data in response to said first interleaver response, said first extrinsic data processor connected for supplying said first extrinsic data to said first SISO decoder;

a decoding control unit connected for operating the above-specified connections of said first and second SISO decoders, said first memory, said first symbol de-interleaver, said first interleaver and said first extrinsic data processor as a first turbo decoder to perform successive first series of iterated decoding procedures on each successive M/H Group of said triads of the soft bits of said first CCC temporarily stored in said first memory, thus to generate soft first turbo decoding results including respective preliminary soft first turbo decoding results from each earlier decoding procedure in each said first series and culminating in final soft first turbo decoding results from a concluding decoding procedure in each said first series;

a first hard-decision unit connected for receiving said soft first turbo decoding results from said first turbo decoder, said first hard-decision unit further connected for supplying hard decisions regarding bits of said lateral block FEC coding conveyed in soft bit form within said soft first turbo decoding results;

a first block-FEC-code decoder connected for decoding said lateral block FEC coding in said hard decisions supplied from said first hard-decision unit in response to said final soft first turbo decoding results from a concluding decoding procedure in each said first series, said first block-FEC-code decoder correcting insofar as possible errors in said that lateral block FEC coding caused by impulse noise thus to generate corrected data bits of said first CCC, said first block-FEC-code decoder adapted for generating indications of which portions of said corrected data bits of said first CCC remain in error after processing by said first block-FEC-code decoder; and a TRS-code decoder, connected for receiving said corrected data bits of said first CCC, further connected for receiving said indications of which portions of said corrected data bits of said first CCC remain in error to be used for locating erroneous bytes during error-correction procedures performed by said TRS-code decoder, said TRS-code decoder operable for decoding said corrected data bits of said first CCC to generate further corrected data for further processing.

2. A receiver as set forth in claim 1, wherein said CCC comprises outer convolutional coding followed by inner convolutional coding of symbols of said outer convolutional coding that have been Gray-code labeled and interleaved, said receiver further comprising:

a first binary-to-Gray-code re-mapper cascaded with said first symbol de-interleaver; and a first Gray-to-binary-code re-mapper cascaded with said first interleaver.

3. A receiver as set forth in claim 1, operable for receiving radio waves each modulated in amplitude responsive to a respective succession of 8-level digital symbols that at selected times convey CCC of data that have previously been subjected to transverse Reed-Solomon (TRS) forward-error-correction (FEC) coding and to subsequent lateral block FEC coding that includes lateral Reed-Solomon (LRS) forward-error-correction (FEC) coding, wherein said first block-FEC-code decoder is operable for decoding said LRS FEC coding.

4. A receiver as set forth in claim 3, wherein said lateral Reed-Solomon FEC coding employs code interleaving of bytes contained within blocks of defined size.

5. A receiver as set forth in claim 3, wherein said block-FEC-code decoder is operable for decoding 210-byte lateral Reed-Solomon codewords, and wherein said TRS-code decoding apparatus is operable for decoding 230-byte transverse Reed-Solomon codewords.

6. A receiver as set forth in claim 1,
wherein said first block-FEC-code decoder is connected for decoding said lateral block FEC coding in said hard decisions during earlier ones of said iterated decoding procedures in each said first series as well as in said concluding decoding procedure in each said first series,
wherein said first extrinsic data processor is connected for extracting first extrinsic data from said first interleaver response after updating of soft bits of said lateral block FEC coding therewithin in accordance with corrected bits of said lateral block FEC coding supplied from said first block-FEC-code decoder, and
wherein said first turbo decoder is accordingly operable for updating soft data bits of said first CCC in accordance with corrected bits supplied from said first block-FEC-code decoder.

7. A receiver as set forth in claim 6, said receiver adapted for utilizing iterative-diversity transmissions of the same data as conveyed by a selected one of said modulated radio-frequency carrier waves, earlier transmissions of said same data being made in a different set of time slots than later transmissions of said same data, said receiver accordingly further comprising:

a differential-delay-compensation unit connected for delaying said soft first CCC recovered from an earlier transmission of said same data respective to soft second CCC recovered from a later transmission of said same data, thus to generate contemporaneous first and second responses from said differential-delay-compensation unit respectively composed of first CCC and second CCC that encode corresponding randomized data, said differential-delay-compensation unit connected for supplying its first response as write input signal to said first memory for temporarily storing said triads of the soft bits of said first CCC, said second CCC data composed of additional triads of soft bits, a symbol-interleaved outer convolutional coding component of said second CCC being conveyed by the two more significant ones of the soft bits of each said triad therein, an inner convolutional coding component of said second CCC being conveyed by the two less significant ones of the soft bits of each said triad therein, the one of the soft bits of intermediate significance of each said triad of soft bits in said second CCC data conveying parts of both said inner convolutional coding component and said symbol-interleaved outer convolutional coding component of said second CCC;

a second memory for temporarily storing said triads of soft bits of said second CCC supplied to said second memory as write input signal thereto from said differential-delay-compensation unit as said second response therefrom;

a third soft-input/soft-output (SISO) decoder connected for receiving the two less significant ones of the soft bits of each said triad conveying said inner convolutional coding component of said second CCC and decoding said inner convolutional coding component of said second CCC to generate a response supplying updates of said soft bits of intermediate significance in said triads of the soft bits of said second CCC as temporarily stored in said second memory;

a second symbol de-interleaver having an input port connected for receiving from said second memory 2-bit symbols of said symbol-interleaved outer convolutional coding component of said second CCC composed of the most significant ones of the soft bits of said triads conveying said inner convolutional coding component of said second CCC and corresponding updated ones of the soft bits of intermediate significance in said triads, said second symbol de-interleaver connected for supplying from an output port thereof an outer convolutional coding component of said second CCC as a second symbol de-interleaver response therefrom;

a fourth soft-input/soft-output (SISO) decoder connected for receiving said second symbol de-interleaver response and decoding said outer convolutional coding component of said second CCC therein to generate a response from said second SISO decoder that updates said soft bits of said outer convolutional coding component of said second CCC;

a second interleaver connected for receiving at an input port thereof at least the less significant soft bits of said second SISO decoder response and for supplying a second interleaver response from an output port of said second interleaver;

a second extrinsic data processor connected for extracting second extrinsic data in response to said interleaved response of said second interleaver, said second extrinsic data processor connected for supplying said second extrinsic data to said third SISO decoder;

further connections of said decoding control unit for operating the above-specified connections of said third and fourth SISO decoders, said second memory, said second symbol de-interleaver, said second interleaver and said second extrinsic data processor as a second turbo decoder to perform successive second series of iterated decoding procedures on each successive M/H Group of said triads of the soft bits of said second CCC temporarily stored in said second memory, thus to generate second turbo decoding results including respective preliminary second turbo decoding results from each earlier decoding procedure in each said second series and culminating in final second turbo decoding results from a concluding decoding procedure in each said second series, whereby said decoding control unit is operable for operating said first and said second turbo decoders parallel in time;

a second hard-decision unit connected for receiving said soft second turbo decoding results from said second turbo decoder, said second hard-decision unit further connected for supplying hard decisions regarding bits of said lateral block FEC coding conveyed in soft bit form within said soft second turbo decoding results;

a second block-FEC-code decoder connected for decoding said lateral block FEC coding in said hard decisions supplied from said second hard-decision unit in response to said final soft second turbo decoding results from each decoding procedure in each said second series, said second block-FEC-code decoder correcting insofar as possible errors in said that lateral block FEC coding caused by impulse noise, said first block-FEC-code decoder adapted for generating indications of which portions of said second CCC data remain in error after processing by said first block-FEC-code decoder, said second extrinsic data processor connected for extracting second extrinsic data from said second interleaver response after updating of soft bits of said lateral block FEC coding therewithin in accordance with corrected bits of said lateral block FEC coding supplied from said second block-FEC-code decoder, said first turbo decoder accordingly operable for updating soft data bits of said second CCC in accordance with corrected bits supplied from said second block-FEC-code decoder; and an information-exchange unit for exchanging information concerning confidence levels of data bits between said first turbo decoder and said second turbo decoder, said information-exchange unit having a first input port and a first output port connected for continuing a turbo loop that is within said first turbo decoder, and said information-exchange unit having a second input port and a second output port connected for continuing another turbo loop that is within said second turbo decoder.

8. A receiver as set forth in claim 7, wherein said CCC comprises outer convolutional coding followed by inner convolutional coding of symbols of said outer convolutional coding that have been Gray-code labeled and symbol-interleaved, said receiver further comprising:

a first binary-to-Gray-code re-mapper cascaded with said first symbol de-interleaver;

a first Gray-to-binary-code re-mapper cascaded with said first interleaver;

a second binary-to-Gray-code re-mapper cascaded with said second symbol de-interleaver; and a second Gray-to-binary-code re-mapper cascaded with said second interleaver.

9. A receiver as set forth in claim 1, said receiver further comprising:

further tuner apparatus for recovering soft second CCC descriptive of said 8-level digital symbols from a second selected one of said radio-frequency carrier waves, said second CCC composed of additional triads of soft bits, a symbol-interleaved outer convolutional coding component of said second CCC being conveyed by the two more significant ones of the soft bits of each said triad therein, an inner convolutional coding component of said second CCC being conveyed by the two less significant ones of the soft bits of each said triad therein, the one of the soft bits of intermediate significance of each said triad of soft bits in said second CCC data conveying parts of both said inner convolutional coding component and said symbol-interleaved outer convolutional coding component of said second CCC;

a differential-delay-compensation unit connected for differentially delaying said soft first CCC recovered from a first selected one of said radio-frequency carrier waves and said soft second CCC recovered from a second selected one of said radio-frequency carrier waves, thus to generate first and second responses from said differential-delay-compensation unit respectively composed of first CCC and second CCC that encode corresponding randomized data, said differential-delay-compensation unit connected for supplying its first response as write input signal to said first memory for temporarily storing said triads of soft bits of said first CCC;

a second memory for temporarily storing said triads of soft bits of said second CCC supplied to said second memory as write input signal thereto from said differential-delay-compensation unit as said second response therefrom;

a third soft-input/soft-output (SISO) decoder connected for receiving the two less significant ones of the soft bits of each said triad conveying said inner convolutional coding component of said second CCC and decoding said inner convolutional coding component of said second CCC to generate a response supplying updates of said soft bits of intermediate significance in said triads of the soft bits of said second CCC as temporarily stored in said second memory;

a second symbol de-interleaver having an input port connected for receiving from said second memory 2-bit symbols of said symbol-interleaved outer convolutional coding component of said second CCC composed of the most significant ones of the soft bits of said triads conveying said inner convolutional coding component of said second CCC and corresponding updated ones of the soft bits of intermediate significance in said triads, said second symbol de-interleaver connected for supplying from an output port thereof an outer convolutional coding component of said second CCC as a second symbol de-interleaver response therefrom;

a fourth soft-input/soft-output (SISO) decoder connected for receiving said second symbol de-interleaver response and decoding said outer convolutional coding component of said second CCC therein to generate a response from said second SISO decoder that updates said soft bits of said outer convolutional coding component of said second CCC;

a second interleaver connected for receiving at an input port thereof at least the less significant soft bits of said second SISO decoder response and for supplying a second interleaver response from an output port of said second interleaver;

a second extrinsic data processor connected for extracting second extrinsic data in response to said interleaved response of said second interleaver, said second extrinsic data processor connected for supplying said second extrinsic data to said third SISO decoder;

further connections of said decoding control unit for operating the above-specified connections of said third and fourth SISO decoders, said second memory, said second symbol de-interleaver, said second interleaver and said second extrinsic data processor as a second turbo decoder to perform successive second series of iterated decoding procedures on each successive M/H Group of said triads of the soft bits of said second CCC temporarily stored in said second memory, thus to generate second turbo decoding results including respective preliminary second turbo decoding results from each earlier decoding procedure in each said second series and culminating in final second turbo decoding results from a concluding decoding procedure in each said second series, whereby said decoding control unit is operable for operating said first and said second turbo decoders parallel in time;

a second hard-decision unit connected for receiving said soft second turbo decoding results from said second turbo decoder, said second hard-decision unit further connected for supplying hard decisions regarding bits of said lateral block FEC coding conveyed in soft bit form within said soft second turbo decoding results;

a second block-FEC-code decoder connected for decoding said lateral block FEC coding in said hard decisions supplied from said second hard-decision unit in response to said final soft second turbo decoding results from each decoding procedure in each said second series, said second block-FEC-code decoder correcting insofar as possible errors in said that lateral block FEC coding caused by impulse noise, said first block-FEC-code decoder adapted for generating indications of which portions of said second CCC data remain in error after processing by said first block-FEC-code decoder, said second extrinsic data processor connected for extracting second extrinsic data from said second interleaver response after updating of soft bits of said lateral block FEC coding therewithin in accordance with corrected bits of said lateral block FEC coding supplied from said second block-FEC-code decoder, said first turbo decoder accordingly operable for updating soft data bits of said second CCC in accordance with corrected bits supplied from said second block-FEC-code decoder; and an information-exchange unit for exchanging information concerning confidence levels of data bits between said first turbo decoder and said second turbo decoder, said information-exchange unit having a first input port and a first output port connected for continuing a turbo loop that is within said first turbo decoder, and said information-exchange unit having a second input port and a second output port connected for continuing another turbo loop that is within said second turbo decoder.

10. A receiver as set forth in claim 9, wherein said CCC comprises outer convolutional coding followed by inner convolutional coding of symbols of said outer convolutional coding that have been Gray-code labeled and symbol-interleaved, said receiver further comprising:

a first binary-to-Gray-code re-mapper cascaded with said first symbol de-interleaver;

a first Gray-to-binary-code re-mapper cascaded with said first interleaver;

a second binary-to-Gray-code re-mapper cascaded with said second symbol de-interleaver; and a second Gray-to-binary-code re-mapper cascaded with said second interleaver.

11. A receiver for radio-frequency carrier waves each modulated in amplitude responsive to a respective succession of 8-level digital symbols, said 8-level digital symbols of said respective succession conveying at selected times concatenated convolutional coding (CCC) of data that have previously been subjected to transverse Reed-Solomon (TRS) forward-error-correction (FEC) coding and to subsequent lateral block FEC coding that facilitates correction of reception errors caused by impulse noise, said receiver comprising:

tuner apparatus for recovering 8-level digital symbols of soft first CCC and of soft second CCC descriptive of transmissions of the same data for diversity reception, both said first CCC and said second CCC composed of triads of soft bits, a symbol-interleaved outer convolutional coding component of said first CCC being conveyed by the two more significant ones of the soft bits of each said triad therein, an inner convolutional coding component of said first CCC being conveyed by the two less significant ones of the soft bits of each said triad therein, the one of the soft bits of intermediate significance of each said triad of soft bits in said first CCC data conveying parts of both said inner convolutional coding component and said symbol-interleaved outer convolutional coding component of said first CCC, a symbol-interleaved outer convolutional coding component of said second CCC being conveyed by the two more significant ones of the soft bits of each said triad therein, an inner convolutional coding component of said second CCC being conveyed by the two less significant ones of the soft bits of each said triad therein, the one of the soft bits of intermediate significance of each said triad of soft bits in said second CCC conveying parts of both said inner convolutional coding component and said symbol-interleaved outer convolutional coding component of said second CCC;

a differential-delay-compensation unit connected for differentially delaying said soft first CCC and said soft second CCC recovered by said tuner apparatus, thus to generate first and second responses from said differential-delay-compensation unit respectively composed of first CCC and second CCC that encode corresponding randomized data;

a decoding control unit for operating a first turbo decoder and a second turbo decoder in parallel;

a first memory for temporarily storing said triads of the soft bits of said first CCC supplied to said first memory as write input signal thereto from said differential-delay-compensation unit as said first response therefrom;

a first soft-input/soft-output (SISO) decoder connected for receiving the two less significant ones of the soft bits of each said triad conveying said inner convolutional coding component of said first CCC and decoding said inner convolutional coding component of said first CCC to generate a response supplying updates of said soft bits of intermediate significance in said triads of the soft bits of said first CCC as temporarily stored in said first memory;

a first symbol de-interleaver having an input port connected for receiving from said first memory 2-bit symbols of said symbol-interleaved outer convolutional coding component of said first CCC composed of the most significant ones of the soft bits of said triads conveying said inner convolutional coding component of said first CCC and corresponding updated ones of the soft bits of intermediate significance in said triads, said first symbol de-interleaver connected for supplying from an output port thereof an outer convolutional coding component of said first CCC as a first symbol de-interleaver response therefrom;

a second soft-input/soft-output (SISO) decoder having an input port connected for receiving said first symbol de-interleaver response and decoding said outer convolutional coding component of said first CCC therein to generate a response supplied from an output port of said second SISO decoder that updates said soft bits of said outer convolutional coding component of said first CCC data;

a second soft-input/soft-output (SISO) decoder having an input port connected for receiving said first symbol de-interleaver response, decoding said outer convolutional coding component of said first CCC therein to generate a second SISO decoder response reproducing said outer convolutional coding component of said first CCC after updating said soft symbols thereof, and having an output port through which said second SISO decoder response is supplied;

a first symbol re-interleaver having an input port connected for receiving said soft symbols of said second SISO decoder response and having an output port from which to supply a first symbol re-interleaver response;

a first extrinsic data processor connected for extracting first extrinsic data in response to said first symbol re-interleaver response, said first extrinsic data processor connected for supplying said first extrinsic data to said first memory for subsequent decoding by said first SISO decoder;

connections of said decoding control unit for operating the above-specified connections of said first and second SISO decoders, said first memory, said first symbol de-interleaver, said first interleaver and said first extrinsic data processor as said first turbo decoder to perform successive first series of iterated decoding procedures on each successive M/H Group of said triads of the soft bits of said first CCC temporarily stored in said first memory, thus to generate first turbo decoding results including respective preliminary first turbo decoding results from each earlier decoding procedure in each said first series and culminating in final first turbo decoding results from a concluding decoding procedure in each said first series, said first block-FEC-code decoder operable for decoding said lateral block FEC coding in said hard decisions from said first hard-decision unit during earlier ones of said iterated decoding procedures in each said first series as well as in said concluding decoding procedure in each said first series;

a first hard-decision unit connected for receiving said soft first turbo decoding results from said first turbo decoder, said first hard-decision unit further connected for supplying hard decisions regarding bits of said lateral block FEC coding conveyed in soft bit form within said soft first turbo decoding results;

a first block-FEC-code decoder connected for decoding said lateral block FEC coding in said hard decisions supplied from said first hard-decision unit in response to said final soft first turbo decoding results from a concluding decoding procedure in each said first series, said first block-FEC-code decoder correcting insofar as possible errors in said that lateral block FEC coding caused by impulse noise thus to generate corrected data bits of said first CCC, said first turbo decoder operable for updating soft data bits of said first CCC in accordance with corrected bits supplied from said first block-FEC-code decoder, said first block-FEC-code decoder adapted for generating indications of which portions of said corrected data bits of said first CCC remain in error after processing by said first block-FEC-code decoder;

a TRS-code decoder, connected for receiving said corrected data bits of said first CCC as an input signal thereto, further connected for receiving said indications of which portions of said corrected data bits of said first CCC remain in error to be used for locating erroneous bytes during error-correction procedures performed by said TRS-code decoder, said TRS-code decoder operable for decoding said corrected data bits of said first CCC to generate further corrected data for further processing;

a second memory for temporarily storing said triads of the soft bits of said second CCC supplied to said second memory as write input signal thereto from said differential-delay-compensation unit as said second response therefrom;

a third soft-input/soft-output (SISO) decoder connected for receiving the two less significant ones of the soft bits of each said triad conveying said inner convolutional coding component of said second CCC and decoding said inner convolutional coding component of said second CCC to generate a response supplying updates of said soft bits of intermediate significance in said triads of the soft bits of said second CCC as temporarily stored in said second memory;

a second symbol de-interleaver having an input port connected for receiving from said second memory 2-bit symbols of said symbol-interleaved outer convolutional coding component of said second CCC composed of the most significant ones of the soft bits of said triads conveying said inner convolutional coding component of said second CCC and corresponding updated ones of the soft bits of intermediate significance in said triads, said second symbol de-interleaver connected for supplying from an output port thereof an outer convolutional coding component of said second CCC as a second symbol de-interleaver response therefrom;

a fourth soft-input/soft-output (SISO) decoder having an input port for receiving said second symbol de-interleaver response, decoding said outer convolutional coding component of said second CCC therein to generate a fourth SISO decoder response reproducing said outer convolutional coding component of said second CCC after updating said soft symbols thereof, and having an output port through which said fourth SISO decoder response is supplied;

a second symbol re-interleaver having an input port connected for receiving said soft symbols of said fourth SISO decoder response and having an output port from which to supply a second symbol re-interleaver response;

a second extrinsic data processor connected for extracting second extrinsic data in response to said second symbol re-interleaver response, said second extrinsic data processor connected for supplying said second extrinsic data to said second memory for subsequent decoding by said third SISO decoder;

further connections of said decoding control unit for operating the above-specified connections of said third and fourth SISO decoders, said second memory, said second symbol de-interleaver, said second interleaver and said second extrinsic data processor as said second turbo decoder to perform successive second series of iterated decoding procedures on each successive M/H Group of said triads of the soft bits of said second CCC temporarily stored in said first memory, thus to generate second turbo decoding results including respective preliminary second turbo decoding results from each earlier decoding procedure in each said first series and culminating in final second turbo decoding results from a concluding decoding procedure in each said second series, a second hard-decision unit connected for receiving as input signal thereto said second turbo decoding results, said second hard-decision unit further connected for supplying hard decisions regarding said bits of said lateral block FEC coding;

a second block-FEC-code decoder connected for decoding said lateral block FEC coding in said hard decisions from said second hard-decision unit, for correcting insofar as possible errors caused by impulse noise thus to generate a second set of corrected bits of said TRS-coded data, and adapted for generating indications of which portions of said second set of corrected bits of said TRS-coded data remain in error after processing by said second block-FEC-code decoder, said second block-FEC-code decoder operable for decoding said lateral block FEC coding in said hard decisions during earlier ones of said iterated decoding procedures in each said second series as well as in said concluding decoding procedure in each said second series, said second turbo decoder operable for updating soft data bits of said second CCC in accordance with corrected bits supplied from said second block-FEC-code decoder; and an information-exchange unit for exchanging information concerning confidence levels of data bits between said first turbo decoder and said second turbo decoder, said information-exchange unit having a first input port and a first output port connected for continuing a turbo loop that is within said first turbo decoder, and said information-exchange unit having a second input port and a second output port connected for continuing another turbo loop that is within said second turbo decoder.

12. A receiver as set forth in claim 11, wherein said CCC comprises outer convolutional coding followed by inner convolutional coding of symbols of said outer convolutional coding that have been Gray-code labeled and symbol-interleaved, wherein said first output port of said information-exchange unit connects with said input port of said first symbol de-interleaves, and wherein said second output port of said information-exchange unit connects with said input port of said second symbol de-interleaver, said receiver further comprising:

a first binary-to-Gray-code re-mapper having an input port connected for receiving from said first memory said 2-bit symbols of said symbol-interleaved outer convolutional coding component of said first CCC in binary-coded format, said first binary-to-Gray-code re-mapper having an output port connected for supplying said first input port of said information-exchange unit with 2-bit symbols of said symbol-interleaved outer convolutional coding component of said first CCC as re-mapped to Gray-coded format;

a first confidence-level adjuster having an input port connected for receiving said first symbol re-interleaver response, said first confidence-level adjuster including therein said first hard-decision unit and said first block-FEC-code decoder, said first hard-decision unit connected for receiving successive soft data bits from said first symbol re-interleaver response, said first confidence-level adjuster having an output port for supplying a response reproducing said first symbol re-interleaver response with soft data bits thereof having been updated responsive to decoding results from said first block-FEC-code decoder, said TRS-code decoder connected for receiving as said input signal thereto data bits from said response supplied from said output port of said first confidence-level adjuster;

a first Gray-to-binary-code re-mapper having an input port to which said output port of said first confidence-level adjuster connects and having an output port connected for supplying said first extrinsic data processor an input signal thereto from which to extract said first extrinsic data;

a second binary-to-Gray-code re-mapper having an input port connected for receiving from said second memory said 2-bit symbols of said symbol-interleaved outer convolutional coding component of said second CCC in binary-coded format, said second binary-to-Gray-code re-mapper having an output port connected for supplying said second input port of said information-exchange unit with 2-bit symbols of said symbol-interleaved outer convolutional coding component of said second CCC as re-mapped to Gray-coded format;

a second confidence-level adjuster having an input port connected for receiving said second symbol re-interleaver response, said second confidence-level adjuster including therein said second hard-decision unit and said second block-FEC-code decoder, said second hard-decision unit connected for receiving successive soft data bits from said second symbol re-interleaver response, said second confidence-level adjuster having an output port for supplying a response reproducing said second symbol re-interleaver response with soft data bits thereof having been updated responsive to decoding results from said second block-FEC-code decoder; and a second Gray-to-binary-code re-mapper having an input port to which said output port of said second confidence-level adjuster connects and having an output port connected for supplying said second extrinsic data processor an input signal from which to extract said second extrinsic data.

13. A receiver as set forth in claim 11, wherein said CCC comprises outer convolutional coding followed by inner convolutional coding of symbols of said outer convolutional coding that have been Gray-code labeled and symbol-interleaved, wherein said first output port of said information-exchange unit connects with said input port of said first symbol de-interleaver, wherein said TRS-code decoder is connected for receiving as said input signal thereto data bits from said first output port of said information-exchange unit, and wherein said second output port of said information-exchange unit connects with said input port of said second symbol de-interleaver, said receiver further comprising:
- a first binary-to-Gray-code re-mapper having an input port connected for receiving from said first memory said 2-bit symbols of said symbol-interleaved outer convolutional coding component of said first CCC in binary-coded format, said first binary-to-Gray-code re-mapper having an output port connected for supplying said first input port of said information-exchange unit with 2-bit symbols of said symbol-interleaved outer convolutional coding component of said first CCC as re-mapped to Gray-coded format;
- a first confidence-level adjuster having an input port connected for receiving said first symbol re-interleaver response, said first confidence-level adjuster including therein said first hard-decision unit and said first block-FEC-code decoder, said first hard-decision unit connected for receiving successive soft data bits from said first symbol re-interleaver response, said first confidence-level adjuster having an output port for supplying a response reproducing said first symbol re-interleaver response with soft data bits thereof having been updated responsive to decoding results from said first block-FEC-code decoder;
- a first Gray-to-binary-code re-mapper having an input port to which said output port of said first confidence-level adjuster connects and having an output port connected for supplying said first extrinsic data processor an input signal from which to extract said first extrinsic data;
- a second binary-to-Gray-code re-mapper having an input port connected for receiving from said second memory said 2-bit symbols of said symbol-interleaved outer convolutional coding component of said second CCC in binary-coded format, said second binary-to-Gray-code re-mapper having an output port connected for supplying said second input port of said information-exchange unit with 2-bit symbols of said symbol-interleaved outer convolutional coding component of said second CCC as re-mapped to Gray-coded format;
- a second confidence-level adjuster having an input port connected for receiving said second symbol re-interleaver response, said second confidence-level adjuster including therein said second hard-decision unit and said second block-FEC-code decoder, said second hard-decision unit connected for receiving successive soft data bits from said second symbol re-interleaver response, said second confidence-level adjuster having an output port for supplying a response reproducing said second symbol re-interleaver response with soft data bits thereof having been updated responsive to decoding results from said second block-FEC-code decoder; and
- a second Gray-to-binary-code re-mapper having an input port to which said output port of said second confidence-level adjuster connects and having an output port connected for supplying said second extrinsic data processor an input signal from which to extract said second extrinsic data.

14. A receiver as set forth in claim 11, wherein said CCC comprises outer convolutional coding followed by inner convolutional coding of symbols of said outer convolutional coding that have been Gray-code labeled and symbol-interleaved, wherein said output port of said first symbol re-interleaver connects with said first input port of said information-exchange unit, wherein said output port of said second symbol re-interleaver connects with said second input port of said information-exchange unit, said receiver further comprising:
- a first binary-to-Gray-code re-mapper having an input port connected for receiving from said first memory said 2-bit symbols of said symbol-interleaved outer convolutional coding component of said first CCC in binary-coded format, said first binary-to-Gray-code re-mapper having an output port connected for supplying 2-bit symbols of said symbol-interleaved outer convolutional coding component of said first CCC as re-mapped to Gray-coded format;
- a first confidence-level adjuster having an input port to which said output port of said first binary-to-Gray-code re-mapper connects, said first confidence-level adjuster including therein said first hard-decision unit and said first block-FEC-code decoder, said first hard-decision unit connected for receiving successive soft data bits from said 2-bit symbols of said symbol-interleaved outer convolutional coding component of said first CCC as re-mapped to Gray-coded format, said first confidence-level adjuster having an output port for supplying a response reproducing said symbol-interleaved outer convolutional coding component of said first CCC as re-mapped to Gray-coded format with soft data bits thereof having been updated responsive to decoding results from said first block-FEC-code decoder, said output port of said first confidence-level adjuster connected to said input port of said first symbol de-interleaver and also connected for supplying said TRS-code decoder data bits as said input signal thereto;
- a first Gray-to-binary-code re-mapper having an input port to which said first output port of said first information-exchange unit connects and having an output port connected for supplying said first extrinsic data processor an input signal from which to extract said first extrinsic data;
- a second binary-to-Gray-code re-mapper having an input port connected for receiving from said second memory said 2-bit symbols of said symbol-interleaved outer convolutional coding component of said second CCC in binary-coded format, said second binary-to-Gray-code re-mapper having an output port connected for supplying 2-bit symbols of said symbol-interleaved outer convolutional coding component of said second CCC as re-mapped to Gray-coded format;
- a second confidence-level adjuster having an input port to which said output port of said second binary-to-Gray-code re-mapper connects, said second confidence-level adjuster including therein said second hard-decision unit and said second block-FEC-code decoder, said second hard-decision unit connected for receiving successive soft data bits from said 2-bit symbols of said symbol-interleaved outer convolutional coding component of said second CCC as re-mapped to Gray-coded format, said second confidence-level adjuster having an output port for supplying a response reproducing said symbol-interleaved outer convolutional coding component of said second CCC as re-mapped to Gray-coded format with soft data bits thereof having been updated responsive to decoding results from said second block-FEC-code decoder, said output port of said second confidence-level adjuster connected to said input port of said second symbol de-interleaver; and
a second Gray-to-binary-code re-mapper having an input port to which said second output port of said information-exchange unit connects and having an output port connected for supplying said second extrinsic data processor an input signal from which to extract said second extrinsic data.

15. A receiver as set forth in claim 11, wherein said CCC comprises outer convolutional coding followed by inner convolutional coding of symbols of said outer convolutional coding that have been Gray-code labeled and symbol-interleaved, wherein said output port of said first symbol re-interleaver connects with said first input port of said information-exchange unit, wherein said output port of said second symbol re-interleaver connects with said second input port of said information-exchange unit, and wherein said TRS-code decoder is connected for receiving as said input signal thereto data bits from said first output port of said information-exchange unit, said receiver further comprising:
   a first binary-to-Gray-code re-mapper having an input port connected for receiving from said first memory said 2-bit symbols of said symbol-interleaved outer convolutional coding component of said first CCC in binary-coded format, said first binary-to-Gray-code re-mapper having an output port connected for supplying 2-bit symbols of said symbol-interleaved outer convolutional coding component of said first CCC as re-mapped to Gray-coded format;
   a first confidence-level adjuster having an input port to which said output port of said first binary-to-Gray-code re-mapper connects, said first confidence-level adjuster including therein said first hard-decision unit and said first block-FEC-code decoder, said first hard-decision unit connected for receiving successive soft data bits from said 2-bit symbols of said symbol-interleaved outer convolutional coding component of said first CCC as re-mapped to Gray-coded format, said first confidence-level adjuster having an output port for supplying a response reproducing said symbol-interleaved outer convolutional coding component of said first CCC as re-mapped to Gray-coded format with soft data bits thereof having been updated responsive to decoding results from said first block-FEC-code decoder, said output port of said first confidence-level adjuster connected to said input port of said first symbol de-interleaver;
   a first Gray-to-binary-code re-mapper having an input port to which said first output port of said first information-exchange unit connects and having an output port connected for supplying said first extrinsic data processor an input signal from which to extract said first extrinsic data;
   a second binary-to-Gray-code re-mapper having an input port connected for receiving from said second memory said 2-bit symbols of said symbol-interleaved outer convolutional coding component of said second CCC in binary-coded format, said second binary-to-Gray-code re-mapper having an output port connected for supplying 2-bit symbols of said symbol-interleaved outer convolutional coding component of said second CCC as re-mapped to Gray-coded format;
   a second confidence-level adjuster having an input port to which said output port of said second binary-to-Gray-code re-mapper connects, said second confidence-level adjuster including therein said second hard-decision unit and said second block-FEC-code decoder, said second hard-decision unit connected for receiving successive soft data bits from said 2-bit symbols of said symbol-interleaved outer convolutional coding component of said second CCC as re-mapped to Gray-coded format, said second confidence-level adjuster having an output port for supplying a response reproducing said symbol-interleaved outer convolutional coding component of said second CCC as re-mapped to Gray-coded format with soft data bits thereof having been updated responsive to decoding results from said second block-FEC-code decoder, said output port of said second confidence-level adjuster connected to said input port of said second symbol de-interleaver; and
   a second Gray-to-binary-code re-mapper having an input port to which said second output port of said information-exchange unit connects and having an output port connected for supplying said second extrinsic data processor an input signal from which to extract said second extrinsic data.

16. A receiver as set forth in claim 11, wherein said CCC comprises outer convolutional coding followed by inner convolutional coding of symbols of said outer convolutional coding that have been Gray-code labeled and symbol-interleaved, wherein said output port of said first symbol de-interleaver connects with said first input port of said information-exchange unit, and wherein said output port of said second symbol de-interleaver connects with said second input port of said information-exchange unit, said receiver further comprising:
   a first binary-to-Gray-code re-mapper having an input port to which said first output port of said information-exchange unit connects and having an output port connected to said input port of said second SISO decoder for supplying 2-bit symbols of said outer convolutional coding component of said first CCC as re-mapped to Gray-coded format as input signal to said second SISO decoder;
   a first confidence-level adjuster having an input port connected for receiving said first symbol re-interleaver response, said first confidence-level adjuster including therein said first hard-decision unit and said first block-FEC-code decoder, said first hard-decision unit connected for receiving successive soft data bits from said first symbol re-interleaver response, said first confidence-level adjuster having an output port for supplying a response reproducing said first symbol re-interleaver response with soft data bits thereof having been updated responsive to decoding results from said first block-FEC-code decoder, said TRS-code decoder connected for receiving as said input signal thereto data bits from said response supplied from said output port of said first confidence-level adjuster;
   a first Gray-to-binary-code re-mapper having an input port to which said output port of said first confidence-level adjuster connects and having an output port connected for supplying said first extrinsic data processor an input signal from which to extract said first extrinsic data;
   a second binary-to-Gray-code re-mapper having an input port to which said second output port of said information-exchange unit connects and having an output port connected to said input port of said fourth SISO decoder for supplying 2-bit symbols of said outer convolutional coding component of said second CCC as re-mapped to Gray-coded format as input signal to said fourth SISO decoder;

a second confidence-level adjuster having an input port connected for receiving said second symbol re-interleaver response, said second confidence-level adjuster including therein said second hard-decision unit and said second block-FEC-code decoder, said second hard-decision unit connected for receiving successive soft data bits from said second symbol re-interleaver response, said second confidence-level adjuster having an output port for supplying a response reproducing said second symbol re-interleaver response with soft data bits thereof having been updated responsive to decoding results from said second block-FEC-code decoder; and a second Gray-to-binary-code re-mapper having an input port to which said output port of said second confidence-level adjuster connects and having an output port connected for supplying said second extrinsic data processor an input signal from which to extract said second extrinsic data.

17. A receiver as set forth in claim 11, wherein said CCC comprises outer convolutional coding followed by inner convolutional coding of symbols of said outer convolutional coding that have been Gray-code labeled and symbol-interleaved, wherein said first output port of said information-exchange unit connects with said input port of said second SISO decoder, and wherein said second output port of said information-exchange unit connects with said input port of said fourth SISO decoder, said receiver further comprising:

a first binary-to-Gray-code re-mapper having an input port to which said output port of said first symbol de-interleaver connects and having an output port connected to said first input port of said information-exchange unit for supplying 2-bit symbols of said outer convolutional coding component of said first CCC as re-mapped to Gray-coded format;

a first confidence-level adjuster having an input port connected for receiving said first symbol re-interleaver response, said first confidence-level adjuster including therein said first hard-decision unit and said first block-FEC-code decoder, said first hard-decision unit connected for receiving successive soft data bits from said first symbol re-interleaver response, said first confidence-level adjuster having an output port for supplying a response reproducing said first symbol re-interleaver response with soft data bits thereof having been updated responsive to decoding results from said first block-FEC-code decoder, said TRS-code decoder connected for receiving as said input signal thereto data bits from said response supplied from said output port of said first confidence-level adjuster;

a first Gray-to-binary-code re-mapper having an input port to which said output port of said first confidence-level adjuster connects and having an output port connected for supplying said first extrinsic data processor an input signal from which to extract said first extrinsic data;

a second binary-to-Gray-code re-mapper having an input port to which said output port of said second symbol de-interleaver connects and having an output port connected to said second input port of said information-exchange unit for supplying 2-bit symbols of said outer convolutional coding component of said second CCC as re-mapped to Gray-coded format;

a second confidence-level adjuster having an input port connected for receiving said second symbol re-interleaver response, said second confidence-level adjuster including therein said second hard-decision unit and said second block-FEC-code decoder, said second hard-decision unit connected for receiving successive soft data bits from said second symbol re-interleaver response, said second confidence-level adjuster having an output port for supplying a response reproducing said second symbol re-interleaver response with soft data bits thereof having been updated responsive to decoding results from said second block-FEC-code decoder; and a second Gray-to-binary-code re-mapper having an input port to which said output port of said second confidence-level adjuster connects and having an output port connected for supplying said second extrinsic data processor an input signal from which to extract said second extrinsic data.

18. A receiver as set forth in claim 11, wherein said CCC comprises outer convolutional coding followed by inner convolutional coding of symbols of said outer convolutional coding that have been Gray-code labeled and symbol-interleaved, wherein said first input port of said information-exchange unit is connected for receiving from said first memory 2-bit symbols of said symbol-interleaved outer convolutional coding component of said first CCC, and wherein said second input port of said information-exchange unit is connected for receiving from said second memory 2-bit symbols of said symbol-interleaved outer convolutional coding component of said second CCC, said receiver further comprising:

a first binary-to-Gray-code re-mapper having an input port to which said first output port of said information-exchange unit is connected and having an output port connected with said input port of said first symbol de-interleaver;

a first confidence-level adjuster having an input port connected for receiving said first symbol re-interleaver response, said first confidence-level adjuster including therein said first hard-decision unit and said first block-FEC-code decoder, said first hard-decision unit connected for receiving successive soft data bits from said first symbol re-interleaver response, said first confidence-level adjuster having an output port for supplying a response reproducing said first symbol re-interleaver response with soft data bits thereof having been updated responsive to decoding results from said first block-FEC-code decoder, said TRS-code decoder connected for receiving as said input signal thereto data bits from said response supplied from said output port of said first confidence-level adjuster;

a first Gray-to-binary-code re-mapper having an input port to which said output port of said first confidence-level adjuster connects and having an output port connected for supplying said first extrinsic data processor an input signal from which to extract said first extrinsic data;

a second binary-to-Gray-code re-mapper having an input port to which said second output port of said information-exchange unit is connected and having an output port connected with said input port of said second symbol de-interleaver;

a second confidence-level adjuster having an input port connected for receiving said second symbol re-interleaver response, said second confidence-level adjuster including therein said second hard-decision unit and said second block-FEC-code decoder, said second hard-decision unit connected for receiving successive soft data bits from said second symbol re-interleaver response, said second confidence-level adjuster having an output port for supplying a response reproducing said second symbol re-interleaver response with soft data bits thereof having been updated responsive to decoding results from said second block-FEC-code decoder; and a second Gray-to-binary-code re-mapper having an input port to which said output port of said second confidence-level adjuster connects and having an output port connected for supplying said second extrinsic data processor an input signal from which to extract said second extrinsic data.

19. A receiver as set forth in claim 11, wherein said CCC comprises outer convolutional coding followed by inner convolutional coding of symbols of said outer convolutional coding that have been Gray-code labeled and symbol-interleaved, wherein said first input port of said information-exchange unit is connected for receiving from said first memory 2-bit symbols of said symbol-interleaved outer convolutional coding component of said first CCC, and wherein said second input port of said information-exchange unit is connected for receiving from said second memory 2-bit symbols of said symbol-interleaved outer convolutional coding component of said second CCC, said receiver further comprising:

a first binary-to-Gray-code re-mapper having an input port to which said first output port of said information-exchange unit is connected and having an output port connected with said input port of said first symbol de-interleaver, said TRS-code decoder connected for receiving as said input signal thereto data bits from a response of said first binary-to-Gray-code re-mapper supplied from said output port of said first binary-to-Gray-code re-mapper;

a first confidence-level adjuster having an input port connected for receiving said first symbol re-interleaver response, said first confidence-level adjuster including therein said first hard-decision unit and said first block-FEC-code decoder, said first hard-decision unit connected for receiving successive soft data bits from said first symbol re-interleaver response, said first confidence-level adjuster having an output port for supplying a response reproducing said first symbol re-interleaver response with soft data bits thereof having been updated responsive to decoding results from said first block-FEC-code decoder;

a first Gray-to-binary-code re-mapper having an input port to which said output port of said first confidence-level adjuster connects and having an output port connected for supplying said first extrinsic data processor an input signal from which to extract said first extrinsic data;

a second binary-to-Gray-code re-mapper having an input port to which said second output port of said information-exchange unit is connected and having an output port connected with said input port of said second symbol de-interleaver;

a second confidence-level adjuster having an input port connected for receiving said second symbol re-interleaver response, said second confidence-level adjuster including therein said second hard-decision unit and said second block-FEC-code decoder, said second hard-decision unit connected for receiving successive soft data bits from said second symbol re-interleaver response, said second confidence-level adjuster having an output port for supplying a response reproducing said second symbol re-interleaver response with soft data bits thereof having been updated responsive to decoding results from said second block-FEC-code decoder; and a second Gray-to-binary-code re-mapper having an input port to which said output port of said second confidence-level adjuster connects and having an output port connected for supplying said second extrinsic data processor an input signal from which to extract said second extrinsic data.

20. A receiver as set forth in claim 11, wherein said CCC comprises outer convolutional coding followed by inner convolutional coding of symbols of said outer convolutional coding that have been Gray-code labeled and symbol-interleaved, said receiver further comprising:

a first binary-to-Gray-code re-mapper having an input port connected for receiving from said first memory said 2-bit symbols of said symbol-interleaved outer convolutional coding component of said first CCC in binary-coded format, said first binary-to-Gray-code re-mapper having an output port connected for supplying 2-bit symbols of said symbol-interleaved outer convolutional coding component of said first CCC as re-mapped to Gray-coded format;

a first confidence-level adjuster having an input port to which said output port of said first binary-to-Gray-code re-mapper connects, said first confidence-level adjuster including therein said first hard-decision unit and said first block-FEC-code decoder, said first hard-decision unit connected for receiving successive soft data bits from said 2-bit symbols of said symbol-interleaved outer convolutional coding component of said first CCC as re-mapped to Gray-coded format, said first confidence-level adjuster having an output port for supplying a response reproducing said symbol-interleaved outer convolutional coding component of said first CCC as re-mapped to Gray-coded format with soft data bits thereof having been updated responsive to decoding results from said first block-FEC-code decoder, said TRS-code decoder connected for receiving as said input signal thereto data bits from said response of said first confidence-level adjuster, said output port of said first confidence-level adjuster connecting to said input port of said first symbol de-interleaver;

a first Gray-to-binary-code re-mapper having an input port to which said output port of said first symbol re-interleaver connects and having an output port connected to said first input port of said information-exchange unit, said first output port of said information-exchange unit connected for supplying response therefrom to said first extrinsic data processor to have said first extrinsic data extracted therefrom;

a second binary-to-Gray-code re-mapper having an input port connected for receiving from said second memory said 2-bit symbols of said symbol-interleaved outer convolutional coding component of said second CCC in binary-coded format, said second binary-to-Gray-code re-mapper having an output port connected for supplying 2-bit symbols of said symbol-interleaved outer convolutional coding component of said second CCC as re-mapped to Gray-coded format;

a second confidence-level adjuster having an input port to which said output port of said second binary-to-Gray-code re-mapper connects, said second confidence-level adjuster including therein said second hard-decision unit and said second block-FEC-code decoder, said second hard-decision unit connected for receiving successive soft data bits from said 2-bit symbols of said symbol-interleaved outer convolutional coding component of said second CCC as re-mapped to Gray-coded format, said second confidence-level adjuster having an output port for supplying a response reproducing said symbol-interleaved outer convolutional coding component of said second CCC as re-mapped to Gray-coded format with soft data bits thereof having been updated responsive to decoding results from said second block-FEC-code decoder, said output port of said second confidence-level adjuster connecting to said input port of said second symbol de-interleaver; and a second Gray-to-binary-code re-mapper having an input port to which said output port of said second symbol re-interleaver connects and having an output port connected to said second input port of said information-exchange unit, said second output port of said information-exchange unit connected for supplying response therefrom to said second extrinsic data processor to have said second extrinsic data extracted therefrom.

21. A receiver as set forth in claim 11, wherein said CCC comprises outer convolutional coding followed by inner convolutional coding of symbols of said outer convolutional coding that have been Gray-code labeled and symbol-interleaved, and wherein said TRS-code decoder is connected for receiving as said input signal thereto data bits from said first symbol re-interleaver response, said receiver further comprising:

a first binary-to-Gray-code re-mapper having an input port connected for receiving from said first memory said 2-bit symbols of said symbol-interleaved outer convolutional coding component of said first CCC in binary-coded format, said first binary-to-Gray-code re-mapper having an output port connected for supplying 2-bit symbols of said symbol-interleaved outer convolutional coding component of said first CCC as re-mapped to Gray-coded format;

a first confidence-level adjuster having an input port to which said output port of said first binary-to-Gray-code re-mapper connects, said first confidence-level adjuster including therein said first hard-decision unit and said first block-FEC-code decoder, said first hard-decision unit connected for receiving successive soft data bits from said 2-bit symbols of said symbol-interleaved outer convolutional coding component of said first CCC as re-mapped to Gray-coded format, said first confidence-level adjuster having an output port for supplying a response reproducing said symbol-interleaved outer convolutional coding component of said first CCC as re-mapped to Gray-coded format with soft data bits thereof having been updated responsive to decoding results from said first block-FEC-code decoder, said output port of said first confidence-level adjuster connecting to said input port of said first symbol de-interleaver;

a first Gray-to-binary-code re-mapper having an input port to which said output port of said first symbol re-interleaver connects and having an output port connected to said first input port of said information-exchange unit, said first output port of said information-exchange unit connected for supplying response therefrom to said first extrinsic data processor to have said first extrinsic data extracted therefrom;

a second binary-to-Gray-code re-mapper having an input port connected for receiving from said second memory said 2-bit symbols of said symbol-interleaved outer convolutional coding component of said second CCC in binary-coded format, said second binary-to-Gray-code re-mapper having an output port connected for supplying 2-bit symbols of said symbol-interleaved outer convolutional coding component of said second CCC as re-mapped to Gray-coded format;

a second confidence-level adjuster having an input port to which said output port of said second binary-to-Gray-code re-mapper connects, said second confidence-level adjuster including therein said second hard-decision unit and said second block-FEC-code decoder, said second hard-decision unit connected for receiving successive soft data bits from said 2-bit symbols of said symbol-interleaved outer convolutional coding component of said second CCC as re-mapped to Gray-coded format, said second confidence-level adjuster having an output port for supplying a response reproducing said symbol-interleaved outer convolutional coding component of said second CCC as re-mapped to Gray-coded format with soft data bits thereof having been updated responsive to decoding results from said second block-FEC-code decoder, said output port of said second confidence-level adjuster connecting to said input port of said second symbol de-interleaver; and a second Gray-to-binary-code re-mapper having an input port to which said output port of said second symbol re-interleaver connects and having an output port connected to said second input port of said information-exchange unit, said second output port of said information-exchange unit connected for supplying response therefrom to said second extrinsic data processor to have said second extrinsic data extracted therefrom.

\* \* \* \* \*